US012811486B2

(12) United States Patent
Suyakov et al.

(10) Patent No.: US 12,811,486 B2
(45) Date of Patent: Nov. 24, 2026

(54) COMMUNICATION SYSTEMS AND SYNCHRONIZATION TECHNIQUES FOR ENERGY STORAGE SYSTEMS

(71) Applicant: TAE Technologies, Inc., Foothill Ranch, CA (US)

(72) Inventors: Sergey Suyakov, Foothill Ranch, CA (US); Sergey Alexandrovich Golubev, Nizhny Novgorod Oblast (RU)

(73) Assignee: TAE Technologies, Inc., Foothill Ranch (CA)

(*) Notice: Subject to any disclaimer, the term of this patent is extended or adjusted under 35 U.S.C. 154(b) by 526 days.

(21) Appl. No.: 18/188,940

(22) Filed: Mar. 23, 2023

(65) Prior Publication Data

US 2023/0308006 A1 Sep. 28, 2023

Related U.S. Application Data

(60) Provisional application No. 63/323,359, filed on Mar. 24, 2022.

(51) Int. Cl.

| | |
|---|---|
| ***H02M 1/00*** | (2007.01) |
| ***H02M 7/483*** | (2007.01) |
| ***H04B 3/04*** | (2006.01) |

(52) U.S. Cl.

CPC ........... *H02M 1/007* (2021.05); *H02M 7/483* (2013.01); *H04B 3/04* (2013.01)

(58) Field of Classification Search

CPC .......... H02M 1/00; H02M 1/32; H02M 3/158; H02M 7/5387; H02J 7/00; H02J 7/0032;

(Continued)

(56) References Cited

U.S. PATENT DOCUMENTS

| | | | |
|---|---|---|---|
| 4,860,186 | A | 8/1989 | Maekawa et al. |
| 5,204,548 | A | 4/1993 | Daehler et al. |

(Continued)

FOREIGN PATENT DOCUMENTS

| | | |
|---|---|---|
| CA | 2810369 | 3/2012 |
| CN | 201789411 | 4/2011 |

(Continued)

OTHER PUBLICATIONS

"Capacitor Voltage Control Technique For A Modular Converter", An IP.com Prior Art Database Technical Disclosure, Jun. 10, 2015, pp. 1-7.

(Continued)

*Primary Examiner* — Thienvu V Tran
*Assistant Examiner* — Yahveh Comas Torres
(74) *Attorney, Agent, or Firm* — ALSTON & BIRD LLP

(57) ABSTRACT

Example embodiments of systems, devices, and methods are provided herein for energy systems that include an array of cascaded modules configured to output a voltage waveform and/or a current waveform to a load. Each module can include an energy source, switch circuitry, and a local control device. Each module can have an identifier. The energy system can include a master control device communicably coupled to each local control device over a communication path. The master control device can be configured to send, over the communication path, control information data elements to the local control devices. Each control information data element can include a normalized reference signal for each module of the array of cascaded modules, a single identifier selected from a set of identifiers including the identifier for each module in the array of cascaded modules, and a modulation index for the module having the single identifier.

19 Claims, 49 Drawing Sheets

(58) Field of Classification Search
CPC ........ H02J 7/0013; H02J 3/32; H02J 2207/20; H04B 3/04
See application file for complete search history.

(56) References Cited

U.S. PATENT DOCUMENTS

| | | | | |
|---|---|---|---|---|
| 5,428,522 | A | 6/1995 | Millner et al. | |
| 5,642,275 | A | 6/1997 | Peng et al. | |
| 5,905,371 | A | 5/1999 | Limpaecher | |
| 5,933,339 | A | 8/1999 | Duba et al. | |
| 5,949,664 | A | 9/1999 | Bernet et al. | |
| 6,051,961 | A | 4/2000 | Jang et al. | |
| 6,058,032 | A | 5/2000 | Yamanaka et al. | |
| 6,064,180 | A | 5/2000 | Sullivan et al. | |
| 6,236,580 | B1 | 5/2001 | Aiello et al. | |
| 6,373,734 | B1 | 4/2002 | Martinelli | |
| 7,091,701 | B2 | 8/2006 | Turner et al. | |
| 7,485,987 | B2 | 2/2009 | Mori et al. | |
| 8,395,280 | B2 | 3/2013 | Graovac et al. | |
| 8,476,888 | B1 | 7/2013 | Chen et al. | |
| 8,503,202 | B2 | 8/2013 | Chimento et al. | |
| 8,614,525 | B2 | 12/2013 | Teichmann et al. | |
| 8,829,723 | B2 | 9/2014 | Graovac et al. | |
| 9,172,254 | B2 | 10/2015 | Ganor | |
| 9,444,275 | B2 | 9/2016 | Huang et al. | |
| 9,444,280 | B2 * | 9/2016 | Lee | H02M 7/44 |
| 9,461,474 | B2 | 10/2016 | Deboy et al. | |
| 9,673,732 | B2 | 6/2017 | Deboy et al. | |
| 10,014,611 | B2 | 7/2018 | Götz | |
| 10,074,995 | B2 | 9/2018 | Smedley et al. | |
| 10,193,359 | B2 | 1/2019 | Ganor | |
| 10,218,189 | B2 | 2/2019 | Goetz | |
| 10,291,037 | B2 | 5/2019 | Birkl et al. | |
| 10,391,870 | B2 | 8/2019 | Götz et al. | |
| 10,396,682 | B2 | 8/2019 | Götz et al. | |
| 10,439,506 | B2 | 10/2019 | Götz | |
| 10,442,309 | B2 | 10/2019 | Götz | |
| 10,454,331 | B2 | 10/2019 | Götz | |
| 10,473,728 | B2 | 11/2019 | Goetz | |
| 10,630,201 | B2 | 4/2020 | Götz et al. | |
| 10,700,587 | B2 | 6/2020 | Götz | |
| 10,759,284 | B2 | 9/2020 | Jaensch et al. | |
| 10,784,698 | B2 | 9/2020 | Jaensch et al. | |
| 10,840,714 | B2 | 11/2020 | Götz et al. | |
| 10,980,103 | B2 | 4/2021 | Götz et al. | |
| 10,985,551 | B2 | 4/2021 | Götz | |
| 10,998,739 | B2 | 5/2021 | Hinterberger et al. | |
| 11,038,435 | B2 | 6/2021 | Götz | |
| 11,135,923 | B2 * | 10/2021 | Slepchenkov | H02J 3/32 |
| 11,597,284 | B2 * | 3/2023 | Slepchenkov | B60L 1/00 |
| 11,603,001 | B2 * | 3/2023 | Slepchenkov | H02J 7/00712 |
| 11,794,599 | B2 * | 10/2023 | Slepchenkov | B60L 53/22 |
| 12,231,061 | B2 * | 2/2025 | Ido | H02M 1/0003 |
| 12,391,132 | B2 * | 8/2025 | Slepchenkov | H02J 7/1423 |
| 2003/0102845 | A1 | 6/2003 | Aker et al. | |
| 2004/0008016 | A1 | 1/2004 | Sutardja et al. | |
| 2004/0037101 | A1 | 2/2004 | Meynard et al. | |
| 2005/0065684 | A1 | 3/2005 | Larson et al. | |
| 2006/0097782 | A1 | 5/2006 | Ebner | |
| 2006/0202636 | A1 | 9/2006 | Schneider | |
| 2007/0147098 | A1 | 6/2007 | Mori et al. | |
| 2007/0194627 | A1 | 8/2007 | Mori et al. | |
| 2007/0246635 | A1 | 10/2007 | Nakajima et al. | |
| 2008/0080212 | A1 | 4/2008 | Grbovic | |
| 2008/0245593 | A1 | 10/2008 | Kim | |
| 2008/0304296 | A1 | 12/2008 | Nadimpalliraju et al. | |
| 2009/0251212 | A1 | 10/2009 | Pillonnet et al. | |
| 2009/0311891 | A1 | 12/2009 | Lawrence et al. | |
| 2010/0060235 | A1 | 3/2010 | Dommaschk et al. | |
| 2010/0085789 | A1 | 4/2010 | Ulrich et al. | |
| 2010/0121511 | A1 | 5/2010 | Onnerud et al. | |
| 2010/0298957 | A1 | 11/2010 | Sanchez Rocha et al. | |
| 2010/0301827 | A1 | 12/2010 | Chen et al. | |
| 2011/0133573 | A1 | 6/2011 | Ratnaparkhi et al. | |
| 2011/0140533 | A1 | 6/2011 | Zeng et al. | |
| 2011/0148198 | A1 | 6/2011 | Tripathi et al. | |
| 2011/0187184 | A1 | 8/2011 | Ichikawa | |
| 2011/0198936 | A1 | 8/2011 | Graovac et al. | |
| 2012/0053871 | A1 | 3/2012 | Sirard | |
| 2012/0074949 | A1 | 3/2012 | Kepley et al. | |
| 2012/0112693 | A1 | 5/2012 | Kusch et al. | |
| 2012/0155140 | A1 | 6/2012 | Chen et al. | |
| 2012/0161858 | A1 | 6/2012 | Permuy et al. | |
| 2012/0195084 | A1 | 8/2012 | Norrga | |
| 2012/0262967 | A1 | 10/2012 | Cuk | |
| 2013/0027126 | A1 | 1/2013 | Jayaraman et al. | |
| 2013/0083563 | A1 | 4/2013 | Wang et al. | |
| 2013/0088254 | A1 | 4/2013 | Hoang et al. | |
| 2013/0088903 | A1 | 4/2013 | Sagona et al. | |
| 2013/0090872 | A1 | 4/2013 | Kurimoto | |
| 2013/0154379 | A1 | 6/2013 | Tiefenbach | |
| 2013/0154521 | A1 | 6/2013 | Butzmann et al. | |
| 2013/0260188 | A1 | 10/2013 | Coates | |
| 2013/0285457 | A1 | 10/2013 | Kepley | |
| 2013/0302652 | A1 | 11/2013 | Wolff et al. | |
| 2014/0042815 | A1 | 2/2014 | Maksimovic et al. | |
| 2014/0042827 | A1 | 2/2014 | Wolff | |
| 2014/0104899 | A1 | 4/2014 | Fischer et al. | |
| 2014/0152109 | A1 | 6/2014 | Kanakasabai et al. | |
| 2014/0226379 | A1 | 8/2014 | Harrison | |
| 2014/0239927 | A1 | 8/2014 | Nascimento et al. | |
| 2014/0254219 | A1 | 9/2014 | Davies | |
| 2014/0340052 | A1 | 11/2014 | Dwertmann et al. | |
| 2014/0354212 | A1 | 12/2014 | Sugeno et al. | |
| 2015/0009594 | A1 | 1/2015 | Okaeme et al. | |
| 2015/0049532 | A1 | 2/2015 | Bernet et al. | |
| 2015/0124506 | A1 | 5/2015 | Sahoo et al. | |
| 2015/0229227 | A1 | 8/2015 | Aeloiza et al. | |
| 2015/0249351 | A1 | 9/2015 | Wolff et al. | |
| 2015/0270801 | A1 | 9/2015 | Kessler et al. | |
| 2015/0280604 | A1 | 10/2015 | Hassanpoor | |
| 2015/0288287 | A1 | 10/2015 | Madawala et al. | |
| 2015/0296292 | A1 | 10/2015 | Hogan et al. | |
| 2015/0303820 | A1 | 10/2015 | Cubaines | |
| 2015/0340964 | A1 | 11/2015 | Modeer | |
| 2015/0364935 | A1 | 12/2015 | Fetzer et al. | |
| 2016/0072396 | A1 | 3/2016 | Deboy et al. | |
| 2016/0183451 | A1 | 6/2016 | Conrad et al. | |
| 2016/0240894 | A1 | 8/2016 | Wartenberg et al. | |
| 2016/0254682 | A1 | 9/2016 | Yip et al. | |
| 2016/0308466 | A1 | 10/2016 | Oates | |
| 2017/0054306 | A1 | 2/2017 | Vo et al. | |
| 2017/0099007 | A1 | 4/2017 | Oates et al. | |
| 2017/0163171 | A1 | 6/2017 | Park | |
| 2017/0179745 | A1 | 6/2017 | Tritschler et al. | |
| 2017/0338654 | A1 | 11/2017 | Subramanian | |
| 2017/0366079 | A1 | 12/2017 | Bhowmik et al. | |
| 2018/0043789 | A1 | 2/2018 | Goetz | |
| 2018/0167059 | A1 * | 6/2018 | Pasqualetto | H02M 1/44 |
| 2018/0175744 | A1 | 6/2018 | Jasim et al. | |
| 2018/0241239 | A1 | 8/2018 | Frost et al. | |
| 2019/0031042 | A1 | 1/2019 | Müller | |
| 2019/0131851 | A1 | 5/2019 | Herb | |
| 2019/0288522 | A1 | 9/2019 | Hinterberger et al. | |
| 2019/0288526 | A1 | 9/2019 | Jaensch et al. | |
| 2019/0288527 | A1 | 9/2019 | Jaensch et al. | |
| 2019/0288547 | A1 | 9/2019 | Jaensch et al. | |
| 2019/0288617 | A1 | 9/2019 | Jaensch et al. | |
| 2019/0312504 | A1 | 10/2019 | Kim et al. | |
| 2020/0212687 | A1 | 7/2020 | Hinterberger et al. | |
| 2020/0235439 | A1 | 7/2020 | Frost et al. | |
| 2020/0244076 | A1 | 7/2020 | Wang et al. | |
| 2020/0278936 | A1 | 9/2020 | Gopalakrishnan et al. | |
| 2020/0307393 | A1 * | 10/2020 | Slepchenkov | B60L 58/18 |
| 2020/0307395 | A1 * | 10/2020 | Slepchenkov | B60L 3/12 |
| 2020/0313445 | A1 * | 10/2020 | Slepchenkov | H02J 3/28 |
| 2020/0317086 | A1 | 10/2020 | Goetz et al. | |
| 2020/0328593 | A1 | 10/2020 | Goetz | |
| 2020/0338997 | A1 | 10/2020 | Goetz et al. | |
| 2020/0358370 | A1 | 11/2020 | Goetz et al. | |
| 2020/0395840 | A1 | 12/2020 | Goetz | |
| 2021/0005855 | A1 | 1/2021 | Götz et al. | |
| 2021/0146791 | A1 | 5/2021 | Hinterberger et al. | |
| 2021/0151726 | A1 | 5/2021 | Hinterberger et al. | |

(56) References Cited

U.S. PATENT DOCUMENTS

| | | | |
|---|---|---|---|
| 2021/0151727 A1 | 5/2021 | Hinterberger et al. | |
| 2021/0151728 A1 | 5/2021 | Hinterberger et al. | |
| 2021/0170886 A1* | 6/2021 | Slepchenkov | B60L 50/66 |
| 2021/0197676 A1 | 7/2021 | Goetz et al. | |

FOREIGN PATENT DOCUMENTS

| | | |
|---|---|---|
| CN | 204156591 | 2/2015 |
| CN | 103812377 | 5/2016 |
| DE | 102014008399 | 12/2015 |
| DE | 102016109077 | 11/2017 |
| DE | 102017220175 | 5/2019 |
| DE | 102018109921 | 8/2019 |
| DE | 102018109922 | 10/2019 |
| DE | 102018109925 | 10/2019 |
| DE | 102018109926 | 12/2019 |
| DE | 102018121403 | 3/2020 |
| DE | 102018121490 | 3/2020 |
| DE | 102018121547 | 3/2020 |
| DE | 102018126780 | 4/2020 |
| DE | 102018129111 | 5/2020 |
| DE | 102018126779 | 6/2020 |
| DE | 102019112826 | 6/2020 |
| DE | 102019102306 | 7/2020 |
| DE | 102019102311 | 7/2020 |
| DE | 102019103757 | 7/2020 |
| DE | 102019120615 | 8/2020 |
| DE | 102019112373 | 11/2020 |
| DE | 102019112823 | 11/2020 |
| DE | 102019120616 | 11/2020 |
| DE | 102019120947 | 11/2020 |
| DE | 102019125577 | 11/2020 |
| DE | 102019125578 | 11/2020 |
| DE | 102019120945 | 2/2021 |
| DE | 102019130736 | 5/2021 |
| DE | 102019130737 | 5/2021 |
| DE | 102019132685 | 6/2021 |
| DE | 102020117264 | 6/2021 |
| DE | 102020117435 | 6/2021 |
| DE | 102020118242 | 7/2021 |
| DE | 102020129135 | 1/2022 |
| EP | 0907238 | 4/1999 |
| EP | 2290799 | 3/2011 |
| EP | 2658071 | 10/2013 |
| EP | 2693598 | 2/2014 |
| KR | 10-0689325 B1 | 3/2007 |
| WO | WO 2011/009689 | 1/2011 |
| WO | WO 2011/082855 | 7/2011 |
| WO | WO 2011/082856 | 7/2011 |
| WO | WO 2011/128133 | 10/2011 |
| WO | WO 2012/016735 | 2/2012 |
| WO | WO 2012/038162 | 3/2012 |
| WO | WO 2013/056900 | 4/2013 |
| WO | WO 2014/151178 | 9/2014 |
| WO | WO 2014/193254 | 12/2014 |
| WO | WO 2016/030144 | 3/2016 |
| WO | WO 2018/072837 | 4/2018 |
| WO | WO 2018/095552 | 5/2018 |
| WO | WO 2018/154206 | 8/2018 |
| WO | WO 2018/193173 | 10/2018 |
| WO | WO 2018/210451 | 11/2018 |
| WO | WO 2018/210452 | 11/2018 |
| WO | WO 2018/231810 | 12/2018 |
| WO | WO 2018/232403 | 12/2018 |
| WO | WO 2018/233871 | 12/2018 |
| WO | WO 2019/020215 | 1/2019 |
| WO | WO 2019/161875 | 8/2019 |
| WO | WO 2019/166733 | 9/2019 |
| WO | WO 2019/180699 | 9/2019 |
| WO | WO 2019/183553 | 9/2019 |
| WO | WO 2020/078580 | 4/2020 |
| WO | WO 2020/205511 | 10/2020 |
| WO | WO 2020/205574 | 10/2020 |
| WO | WO 2020/243655 | 12/2020 |
| WO | WO 2021/032989 | 2/2021 |

OTHER PUBLICATIONS

Bode, G.H., et al., "Hysteresis Current Regulation For Single-Phase Multilevel Inverters Using Asynchronous State Machines", 29th Annual Conference of the IEEE Industrial Electronics Society, Piscataway, NJ, 2003, pp. 1203-4208.

Chang, F., et al., "Improving the Overall Efficiency of Automotive Inverters Using a Multilevel Converter Composed of Low Voltage Si MOSFETs", IEEE Transactions on Power Electronics, 2019, vol. 34, No. 4, pp. 3586-3602.

De Simone, "Modular Multilevel Converter with Integrated Storage System for Automotive Applications," Dissertation for the degree of Doctor of Electrical Engineering, Politecnico di Milano, Department of Electronics, Information and Bioengineering, Sep. 21, 2021, 181 pages.

Debnath, S., et al., "Operation, Control, and Applications of the Modular Multilevel Converter: A Review", IEEE Transactions on Power Electronics, 2015, vol. 30, No. 1, pp. 37-53.

EP 18816636.7 Extended Search Report, Feb. 19, 2021, 11 pages.

EP 18817541.8 Supplementary Search Report, Jan. 20, 2021, 5 pages.

EP 18817541.8 Written Opinion, Feb. 2, 2021, 6 pages.

Farr, E., et al., "A Sub-module Capacitor Voltage Balancing Scheme for the Alternate Arm Converter (AAC)", 15th European Conference on IEEE Power Electronics and Applications, 2013, pp. 1-10.

Gelman, V., "Energy Storage That May Be Too Good to Be True", IEEE Vehicular Technology Magazine, 2031, pp. 70-80.

Gupta, R., et al., "Cascaded Multilevel Control of DSTATCOM Using Multiband Hysteresis Modulation", IEEE Power Engineering Society General Meeting, Piscataway, NJ, 2006, pp. 1-7.

Hassanpoor, A., et al., "Tolerance Band Modulation Methods for Modular Multilevel Converters", IEEE Transactions on Power Electronics, 2015, vol. 30, No. 1, pp. 311-326.

Herrera, V. I., et al., "Optimal Energy Management and Sizing of a Battery—Supercapacitor-Based Light Rail Vehicle With a Multiobjective Approach", IEEE Transactions on Industry Applications, 2016, vol. 52, No. 4, pp. 3367-3377.

International Search Report and Written Opinion in International Appln. No. PCT/US2023/016086, mailed on Aug. 15, 2023, 16 pages.

Kersten, A., "Battery Loss and Stress Mitigation in a Cascaded H-Bridge Multilevel Inverter for Vehicle Traction Applications by Filter Capacitors", IEEE Transactions on Transportation Electrification, 2019, pp. 1-13.

Khoshkbar-Sadigh, A., et al., "Thermal and Performance Comparison of Active Neutral-Point-Clamped (ANPC) and Dual Flying-Capacitor ANPC (DFC-ANPC) Inverters", IEEE Energy Conversion Congress and Exposition (ECCE), 2019, pp. 5522-5528.

Konstantinou, G., et al., "A Hybrid Modular Multilevel Converter with Partial Embedded Energy Storage", Energies, 2016, vol. 9, No. 12, pp. 1-18.

Li, N., et al., "SOH Balancing Control Method for the MMC Battery Energy Storage System", IEEE Transactions on Industrial Electronics, 2018, vol. 65, No. 8, pp. 6581-6591.

Loh, P.C., et al., "A Reduced Common Mode Hysteresis Current Regulation Strategy for Multilevel Inverters", 18th Annual IEEE Applied Power Electronics Conference and Exposition, Miami Beach, FL, 2003, vol. 1, pp. 576-582.

Loh, P. C., et al., "A Time-Based Double-Band Hysteresis Current Regulation Strategy for Single-Phase Multilevel Inverters", IEEE Transactions on Industry Applications, 2003, vol. 39, No. 3, pp. 883-892.

Maharjan, L., et al., "Fault-Tolerant Operation of a Battery-Energy-Storage System Based on a Multilevel Cascade PWM Converter With Star Configuration", IEEE Transactions On Power Electronics, 2010, vol. 25, No. 9, pp. 2386-2396.

Maharjan, L., et al., "State-of-Charge (SOC)-Balancing Control of a Battery Energy Storage System Based on a Cascade PWM Converter", IEEE Transactions On Power Electronics, 2009, vol. 24, No. 6, pp. 1628-1636.

Mayet et al., "Energetic Macroscopic Representation and Inversion-Based Control of a Multi-Level Inverter with Integrated Battery for

(56) References Cited

OTHER PUBLICATIONS

Electric Vehicles," Proceedings of the 2021 IEEE Vehicle Power and Propulsion Conference, Gijon, Spain, Oct. 25-28, 2021, 6 pages.
Mayet et al., "Simulation and Control of a New Integrated Battery System for Automotive Applications," Proceedings of PCIM Europe Digital Days 2021, Virtual Event, May 3-7, 2021, 6 pages.
Méllo, J.P.R., et al., "Multilevel Reduced Controlled Switches AC-DC Power Conversion Cells", IEEE Energy Conversion Congress and Exposition (ECCE), 2015, pp. 3815-3822.
Naderi, R., "Battery Management Converter System and Multilevel Converter Topology and Control", 2016, Dissertation at the University of California, Irvine, pp. 1-211.
Naderi, R., et al., "A Correction to the State-Machine-Decoder for Stacked Multicell Converters", IEEE Applied Power Electronics Conference and Exposition (APEC), 2014, pp. 1545-1549.
Naderi, R., et al., "A New Hybrid Active Neutral Point Clamped Flying Capacitor Multilevel Inverter", IEEE Applied Power Electronics Conference and Exposition (APEC), 2015, pp. 794-798.
Naderi, R., et al., "Dual Flying Capacitor Active-Neutral-Point-Clamped Multilevel Converter", IEEE Transactions On Power Electronics, 2016, vol. 31, No. 9, pp. 6476-6484.
Naderi, R., et al., "Phase-Shifted Carrier PWM Technique for General Cascaded Inverters", IEEE Transactions On Power Electronics, 2008, vol. 23, No. 3, pp. 1257-1269.
P., S., et al., "Seven Level Inverter Topologies: A Comparative Study", International Journal of Innovative Research in Electrical, Electronics, Instrumentation and Control Engineering, 2016, vol. 3, No. 1, pp. 148-162.
Sangiri, J. B., et al., "Modular Multilevel Converter for Multifunctional Battery Management System of Electric Vehicle", 44th Annual Conference of the IEEE Industrial Electronics Society, 2018, pp. 1333-1338.
SG 11201912049P Written Opinion, Mar. 10, 2021, 12 pages.
Shimada, M., et al., "Energy-saving Technology for Railway Traction Systems Using Onboard Storage Batteries", Hitachi Review, 2012, vol. 61, No. 7, pp. 312-318.
Tajeddine, K., et al., "A Cascaded H-Bridge Multilevel Inverter with SOC Battery Balancing", International Journal of Advanced Computer Science and Applications, 2017, vol. 8, No. 12, pp. 345-350.
Tolbert et al., "Charge Balance Control Schemes for Cascade Multi-level Converter in Hybrid Electric Vehicles," IEEE Trans. Indus. Electronics, Oct. 2002, 49(5):1058-1064.
Varghese, K., "Implementation Of Single Phase Seven Level Cascaded Multilevel Inverter With Reduced No Of Switches", Project Report'15, retrieved from https://www.academia.edu/12826368/single_phase_seven level_cascaded_multilevel_inverter, pp. 1-45.
Venu, K., et al., "A Seven Level Single-Phase Cascaded Inverter with Improved Efficiency", International Journal & Magazine of Engineering, Technology, Management and Research, 2016, vol. 3, No. 10, pp. 243-249.
WO PCT/US18/37081 ISR and Written Opinion, Oct. 17, 2018, 21 pages.
WO PCT/US18/38089 ISR and Written Opinion, Oct. 29, 2018, 18 pages.
WO PCT/US19/23695 ISR and Written Opinion, Aug. 12, 2019, 15 pages.
WO PCT/US21/27154 ISR and Written Opinion, Oct. 14, 2021, 19 pages.
WO PCT/US21/27159 ISR and Written Opinion, Sep. 1, 2021, 10 pages.
WO PCT/US21/32295 ISR and Written Opinion, Sep. 14, 2021, 16 pages.
Wu, B., et al., "Analysis of a distributed maximum power point tracking tracker with low input voltage ripple and flexible gain range", IET Power Electron., 2016, vol. 9, No. 6, pp. 1220-1227.
Zhang, L., et al., "Design and Performance Evaluation of the Modular Multilevel Converter (MMC)-based Grid-tied PV-Battery Conversion System", IEEE Energy Conversion Congress and Exposition (ECCE), 2018, pp. 2649-2654.
Extended European Search Report Mailed on Dec. 15, 2025 for EP Application No. 23775664, 9 page(s).

* cited by examiner

COMMUNICATION SYSTEMS AND SYNCHRONIZATION TECHNIQUES FOR ENERGY STORAGE SYSTEMS

CROSS-REFERENCE TO RELATED APPLICATIONS

This application claims the benefit of, and priority to, U.S. Provisional Application No. 63/323,359, filed Mar. 24, 2022, which is incorporated by reference herein in its entirety and for all purposes.

FIELD

The subject matter described in this document relates generally to communication systems for module-based energy systems, and systems, devices, and methods that facilitate the connection and control of modules in module-based energy systems.

BACKGROUND

In electrical engineering, power engineering, and the electric power industry, power conversion is the conversion of electric energy from one form to another (e.g., converting between AC and DC, adjusting the voltage or frequency, or some combination of these). The proliferation of devices for generating, harnessing, and utilizing electric energy in various forms has necessitated the development of high capacity electric energy storage systems, sometimes referred to as energy storage systems (ESSs). These ESSs include those used in stationary applications (e.g., energy storage for buffering from the grid) and mobile applications (e.g., electric vehicle battery packs). An ESS often has a power conversion capability placed at a discrete interface between the ESS as a whole and some other power consuming or generating entity, such as a load or a grid. An ESS often relies on a combination of many smaller electrochemical batteries connected in a single serial chain to receive and store electric energy from a grid before outputting that electric energy to the load. The processes of receiving and outputting electric energy can involve some power conversion performed at the discrete interface between the ESS and the grid or load. However, the performance of power conversion at this discrete interface is relatively non-dynamic, introduces losses thereby reducing the efficiency of the ESS, and can be expensive. Furthermore, the reliance on a single serial chain of batteries significantly limits the capabilities of the ESS, since the serial chain can only output a single voltage, is susceptible to a fault in any one of the serial batteries, and has a limited lifetime as each battery within the serial chain degrades differently due to structural and chemical differences inherently present in each.

For these and other reasons, a need exists for new systems, devices, and methods for storing electrical energy, outputting electrical energy, and performing power conversion in improved ways.

SUMMARY

Example embodiments of systems, devices, and methods are provided herein for module-based energy systems widely relevant to many applications and that include a communication interface that enables a master control device to send control information to local control devices of the various modules. In general, a communication interface enables a master control device to communicate over a communication path with local control devices of an array of cascaded modules that are configured to output a voltage waveform and/or a current waveform to a load. For example, the modules can be selectively operated in a voltage source mode for outputting a voltage waveform or in a current source mode for outputting a current waveform. The communication interface can be a serial or parallel interface that provides one-way data communication from the master control device to a respective local control device of each cascaded module. The master control device sends, e.g., periodically, control information data elements, such as packets, to the local control devices so that the local control devices can adjust characteristics of their respective output power.

Each control information data element can include a single reference signal for all of the modules of an array of cascaded modules and a modulation index for one of the modules in the array. To enable the cascaded modules to determine whether the modulation index is for that cascaded module, each control information data element can also include an identifier for the cascaded module to which the modulation index applies. The master control device can cycle through the cascaded modules in a sequence such that the local control device for each cascaded module receives an updated modulation index in one of the control information elements sent in the sequence. This can reduce the length of the control information data elements and increase the sampling of the reference signal at each module. For example, this enables the master control device to send the reference signal more frequently per the same period of time. This more frequent sampling increases the voltage and/or current regulation accuracy and reduces the time response in changes of the reference signal.

Each control information data element can also include one or more safety signals. For example, each control information data element can include cyclic redundancy check (CRC) information for error detection and data correction.

The local control device of each cascaded module can scale the most recently received reference signal of the most recent control information data element using its most recently received modulation index and control switch circuitry of the cascaded module using the scaled reference signal. The local control device can control the switch circuitry using the scaled reference signal to output the appropriate voltage or current waveform.

An additional communication interface can provide two-way data communication between the master control device and each local control device. This allows the local control devices to provide status information (e.g., temperature, state of charge, etc.) to the master control device. The master control device can, in turn, adjust the modulation indexes for the cascaded modules based on their status.

The master and local control devices can utilize synchronization techniques to synchronize the reception of control information data elements and/or to synchronize control of the module switching circuitry, such as with pulse width modulation (PWM). The master control device can be configured to generate and send, to each local control device, a synchronization signal that indicates when a control information data element is being sent to the local control device and/or when to synchronize control of switches of modules controlled by the local control device. For example, when the local control device detects a PWM synchronization event based on the synchronization signal, the local control device can reset PWM counters that are used for creating a carrier signal. Similarly, when the local control device detects a data reception synchronization event, the local control device can capture the control information data element being sent from the master control device.

In some embodiments, the local control device is configured to detect synchronization events (e.g., PWM synchronization events and/or data reception synchronization events) based on the absence of data being sent along a path or link between the master control device and local control device. The local control device can monitor the duration of time that elapses after the end of each data segment and, if the duration reaches a threshold without another data segment being received, the local control device can determine that a data absence event has occurred and, correspondingly, a synchronization event has occurred.

Other systems, devices, methods, features and advantages of the subject matter described herein will be or will become apparent to one with skill in the art upon examination of the following figures and detailed description. It is intended that all such additional systems, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF FIGURES

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

DETAILED DESCRIPTION

Figure 1A:
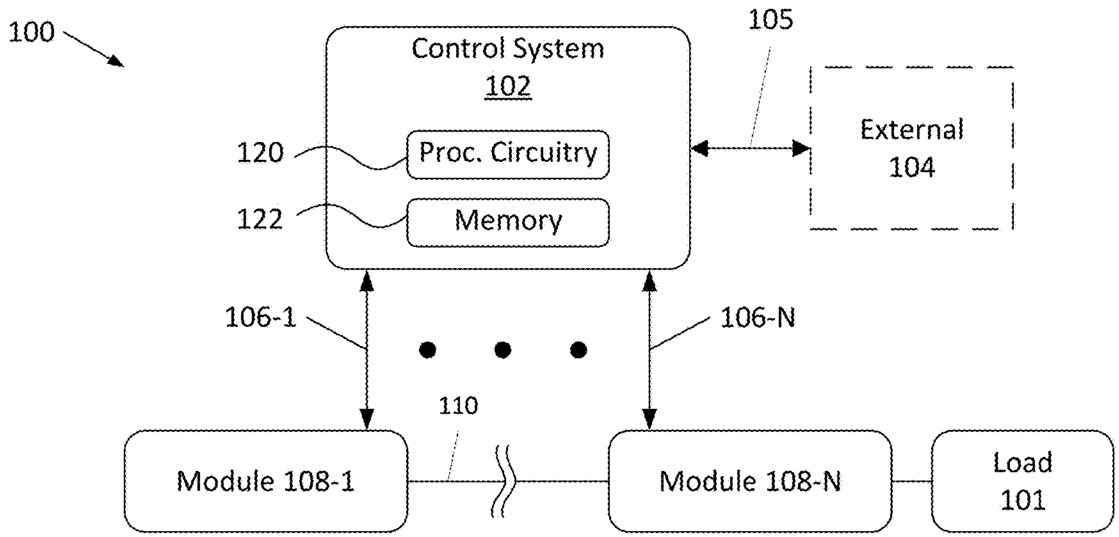
FIGS. 1A-1C are block diagrams depicting example embodiments of a modular energy system.

Before the present subject matter is described in detail, it is to be understood that this disclosure is not limited to the particular embodiments described, as such may, of course, vary. The terminology used herein is for the purpose of describing particular embodiments only, and is not intended to be limiting, since the scope of the present disclosure will be limited only by the appended claims.

Before describing the example embodiments pertaining to modular energy systems and their communication interfaces, it is first useful to describe these underlying systems in greater detail. With reference to FIGS. 1A through 10F, the following sections describe various applications in which embodiments of the modular energy systems can be implemented, embodiments of control systems or devices for the modular energy systems, configurations of the modular energy system embodiments with respect to charging sources and loads, embodiments of individual modules, embodiments of topologies for arrangement of the modules within the systems, embodiments of control methodologies, embodiments of balancing operating characteristics of modules within the systems, and embodiments of the use of interconnection modules.

Examples of Applications

Stationary applications are those in which the modular energy system is located in a fixed location during use, although it may be capable of being transported to alternative locations when not in use. The module-based energy system resides in a static location while providing electrical energy for consumption by one or more other entities, or storing or buffering energy for later consumption. Examples of stationary applications in which the embodiments disclosed herein can be used include, but are not limited to: energy systems for use by or within one or more residential structures or locales, energy systems for use by or within one or more industrial structures or locales, energy systems for use by or within one or more commercial structures or locales, energy systems for use by or within one or more governmental structures or locales (including both military and non-military uses), energy systems for charging the mobile applications described below (e.g., a charge source or a charging station), and systems that convert solar power, wind, geothermal energy, fossil fuels, or nuclear reactions into electricity for storage. Stationary applications often supply loads such as grids and microgrids, motors, and data centers. A stationary energy system can be used in either a storage or non-storage role.

Mobile applications, sometimes referred to as traction applications, are generally ones where a module-based energy system is located on or within an entity, and stores and provides electrical energy for conversion into motive force by a motor to move or assist in moving that entity. Examples of mobile entities with which the embodiments disclosed herein can be used include, but are not limited to, electric and/or hybrid entities that move over or under land, over or under sea, above and out of contact with land or sea (e.g., flying or hovering in the air), or through outer space. Examples of mobile entities with which the embodiments disclosed herein can be used include, but are not limited to, vehicles, trains, trams, ships, vessels, aircraft, and spacecraft. Examples of mobile vehicles with which the embodiments disclosed herein can be used include, but are not limited to, those having only one wheel or track, those having only two-wheels or tracks, those having only three wheels or tracks, those having only four wheels or tracks, and those having five or more wheels or tracks. Examples of mobile entities with which the embodiments disclosed herein can be used include, but are not limited to, a car, a bus, a truck, a motorcycle, a scooter, a bicycle, an industrial vehicle, a mining vehicle, a flying vehicle (e.g., a plane, a helicopter, a drone, etc.), a maritime vessel (e.g., commercial shipping vessels, ships, yachts, boats or other watercraft), a submarine, a locomotive or rail-based vehicle (e.g., a train, a tram, etc.), a military vehicle, a spacecraft, and a satellite.

In describing embodiments herein, reference may be made to a particular stationary application (e.g., grid, micro-grid, data centers, cloud computing environments) or mobile application (e.g., an electric car). Such references are made for ease of explanation and do not mean that a particular embodiment is limited for use to only that particular mobile or stationary application. Embodiments of systems providing power to a motor can be used in both mobile and stationary applications. While certain configurations may be more suitable to some applications over others, all example embodiments disclosed herein are capable of use in both mobile and stationary applications unless otherwise noted.

Module-Based Energy System Examples

FIG. 1A is a block diagram depicts an example embodiment of a module-based energy system 100. Here, system 100 includes control system 102 communicatively coupled with N converter-source modules 108-1 through 108-N, over communication paths or links 106-1 through 106-N, respectively. Modules 108 are configured to store energy and output the energy as needed to a load 101 (or other modules 108). In these embodiments, any number of two or more modules 108 can be used (e.g., N is greater than or equal to two). Modules 108 can be connected to each other in a variety of manners as will be described in more detail with respect to FIGS. 7A-7E. For ease of illustration, in FIGS. 1A-1C, modules 108 are shown connected in series, or as a one dimensional array, where the Nth module is coupled to load 101.

System 100 is configured to supply power to load 101. Load 101 can be any type of load such as a motor or a grid. System 100 is also configured to store power received from a charge source. FIG. 1F is a block diagram depicting an example embodiment of system 100 with a power input interface 151 for receiving power from a charge source 150 and a power output interface for outputting power to load 101. In this embodiment system 100 can receive and store power over interface 151 at the same time as outputting power over interface 152. FIG. 1G is a block diagram depicting another example embodiment of system 100 with a switchable interface 154. In this embodiment, system 100 can select, or be instructed to select, between receiving power from charge source 150 and outputting power to load 101. System 100 can be configured to supply multiple loads 101, including both primary and auxiliary loads, and/or receive power from multiple charge sources 150 (e.g., a utility-operated power grid and a local renewable energy source (e.g., solar)).

Figure 1B:
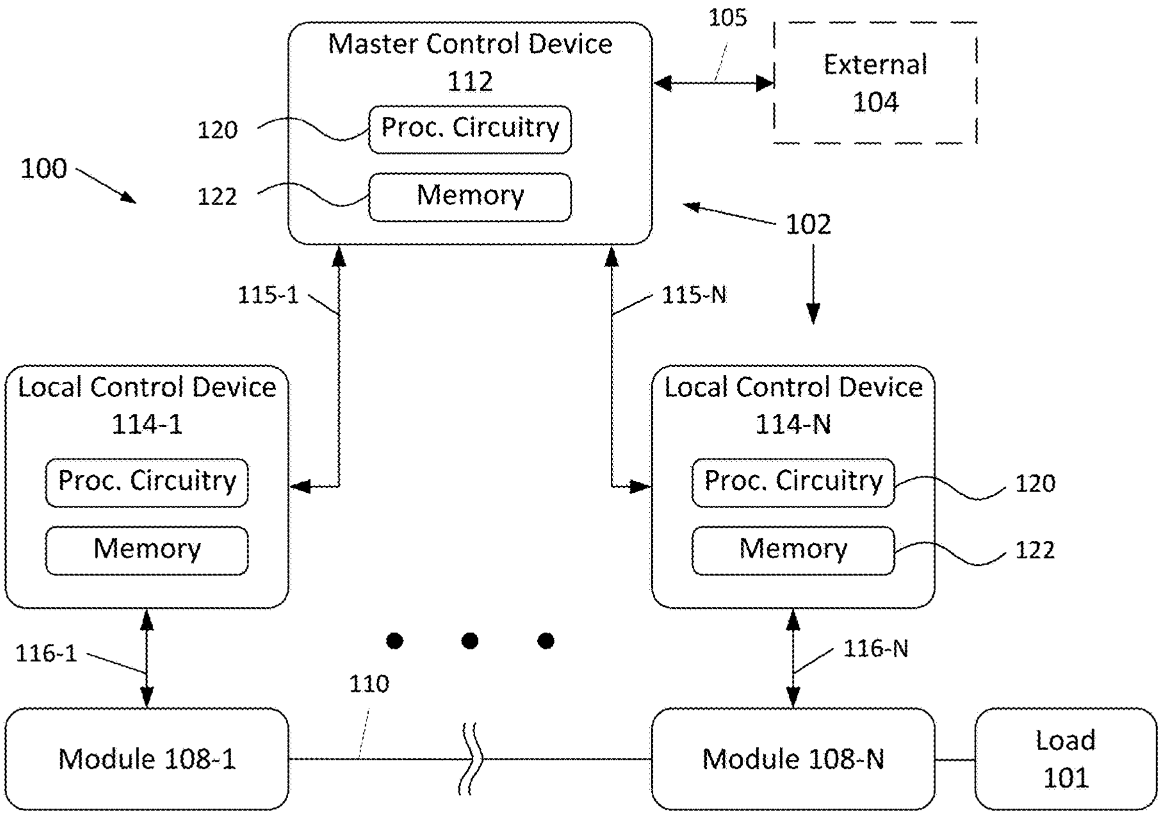

FIG. 1B depicts another example embodiment of system 100. Here, control system 102 is implemented as a master control device (MCD) 112 communicatively coupled with N different local control devices (LCDs) 114-1 through 114-N over communication paths or links 115-1 through 115-N, respectively. Each LCD 114-1 through 114-N is communicatively coupled with one module 108-1 through 108-N over communication paths or links 116-1 through 116-N, respectively, such that there is a 1:1 relationship between LCDs 114 and modules 108.

Figure 1C:
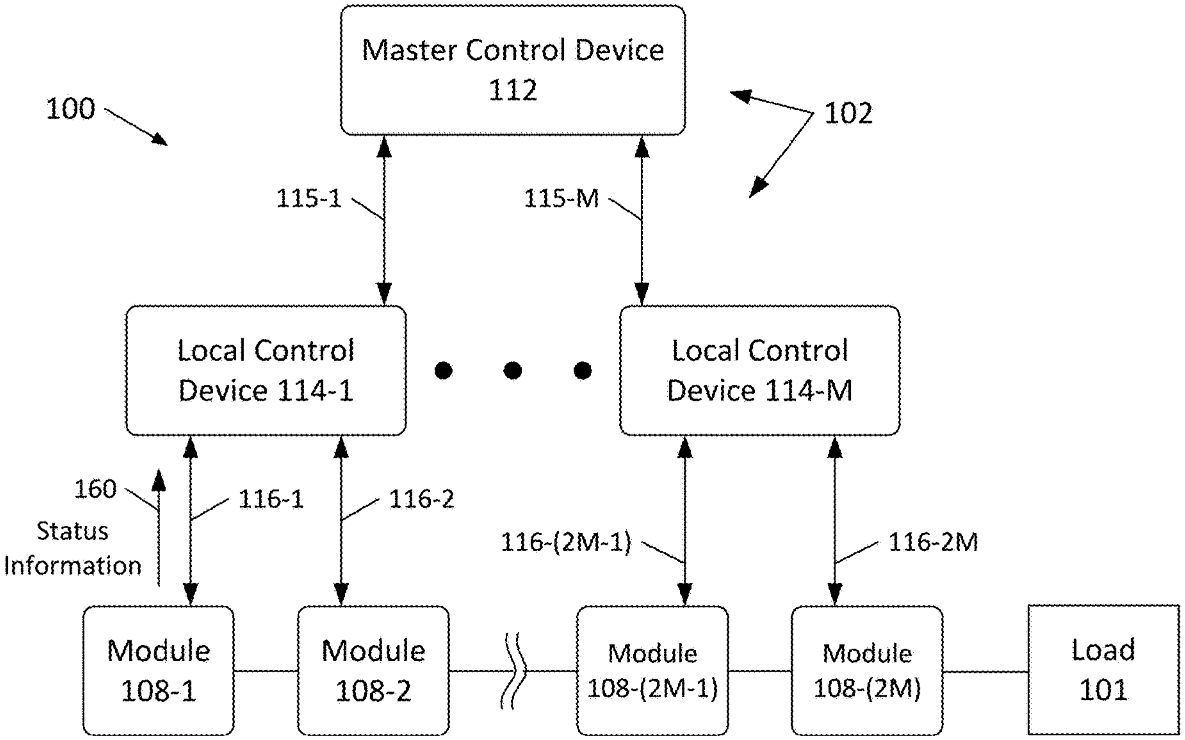

FIG. 1C depicts another example embodiment of system 100. Here, MCD 112 is communicatively coupled with M different LCDs 114-1 to 114-M over communication paths or links 115-1 to 115-M, respectively. Each LCD 114 can be coupled with and control two or more modules 108. In the example shown here, each LCD 114 is communicatively coupled with two modules 108, such that M LCDs 114-1 to 114-M are coupled with 2M modules 108-1 through 108-2M over communication paths or links 116-1 to 116-2M, respectively.

Control system 102 can be configured as a single device (e.g., FIG. 1A) for the entire system 100 or can be distributed across or implemented as multiple devices (e.g., FIGS. 1B-1C). In some embodiments, control system 102 can be distributed between LCDs 114 associated with the modules 108, such that no MCD 112 is necessary and can be omitted from system 100.

Control system 102 can be configured to execute control using software (instructions stored in memory that are executable by processing circuitry), hardware, or a combination thereof. The one or more devices of control system 102 can each include processing circuitry 120 and memory 122 as shown here. Example implementations of processing circuitry and memory are described further below.

Control system 102 can have a communicative interface for communicating with devices 104 external to system 100 over a communication link or path 105. For example, control system 102 (e.g., MCD 112) can output data or information about system 100 to another control device 104 (e.g., the Electronic Control Unit (ECU) or Motor Control Unit (MCU) of a vehicle in a mobile application, grid controller in a stationary application, etc.).

Communication paths or links 105, 106, 115, 116, and 118 (FIG. 2B) can each be wired (e.g., electrical, optical) or wireless communication paths that communicate data or information bidirectionally, in parallel or series fashion. Data can be communicated in a standardized (e.g., IEEE, ANSI) or custom (e.g., proprietary) format. In automotive applications, communication paths 115 can be configured to communicate according to FlexRay or Controller Area Network (CAN) protocols. Communication paths 106, 115, 116, and 118 can also provide wired power to directly supply the operating power for system 102 from one or more modules 108. For example, the operating power for each LCD 114 can be supplied only by the one or more modules 108 to which that LCD 114 is connected and the operating power for MCD 112 can be supplied indirectly from one or more of modules 108 (e.g., such as through a car's power network).

Control system 102 is configured to control one or more modules 108 based on status information 160 received from the same or different one or more of modules 108. Control can also be based on one or more other factors, such as requirements of load 101. Controllable aspects include, but are not limited to, one or more of voltage, current, phase, and/or output power of each module 108.

Status information 160 of every module 108 in system 100 can be communicated to control system 102, which can independently control every module 108-1 . . . 108-N. Other variations are possible. For example, a particular module 108 (or subset of modules 108) can be controlled based on status information 160 of that particular module 108 (or subset), based on status information 160 of a different module 108 that is not that particular module 108 (or subset), based on status information 160 of all modules 108 other than that particular module 108 (or subset), based on status information 160 of that particular module 108 (or subset) and status information 160 of at least one other module 108 that is not that particular module 108 (or subset), or based on status information 160 of all modules 108 in system 100.

The status information 160 can be information about one or more aspects, characteristics, or parameters of each module 108. Types of status information 160 include, but are not limited to, the following aspects of a module 108 or one or more components thereof (e.g., energy source, energy buffer, converter, monitor circuitry): State of Charge (SOC) (e.g., the level of charge of an energy source relative to its capacity, such as a fraction or percent) of the one or more energy sources of the module, State of Health (SOH) (e.g., a figure of merit of the condition of an energy source compared to its ideal conditions) of the one or more energy sources of the module, temperature of the one or more energy sources or other components of the module, capacity of the one or more energy sources of the module, voltage of the one or more energy sources and/or other components of the module, current of the one or more energy sources and/or other components of the module, State of Power (SOP) (e.g., the available power limitation of the energy source during discharge and/or charge), State of Energy (SOE) (e.g., the present level of available energy of an energy source relative to the maximum available energy of the source), and/or the presence of absence of a fault in any one or more of the components of the module.

LCDs 114 can be configured to receive the status information 160 from each module 108, or determine the status information 160 from monitored signals or data received from or within each module 108, and communicate that information to MCD 112. In some embodiments, each LCD 114 can communicate raw collected data to MCD 112, which then algorithmically determines the status information 160 on the basis of that raw data. MCD 112 can then use the status information 160 of modules 108 to make control determinations accordingly. The determinations may take the form of instructions, commands, or other information (such as a modulation index described herein) that can be utilized by LCDs 114 to either maintain or adjust the operation of each module 108.

For example, MCD 112 may receive status information 160 and assess that information to determine a difference between at least one module 108 (e.g., a component thereof) and at least one or more other modules 108 (e.g., comparable components thereof). For example, MCD 112 may determine that a particular module 108 is operating with one of the following conditions as compared to one or more other modules 108: with a relatively lower or higher SOC, with a relatively lower or higher SOH, with a relatively lower or higher capacity, with a relatively lower or higher voltage, with a relatively lower or higher current, with a relatively lower or higher temperature, or with or without a fault. In such examples, MCD 112 can output control information that causes the relevant aspect (e.g., output voltage, current, power, temperature) of that particular module 108 to be reduced or increased (depending on the condition). In this manner, the utilization of an outlier module 108 (e.g., operating with a relatively lower SOC or higher temperature), can be reduced so as to cause the relevant parameter of that module 108 (e.g., SOC or temperature) to converge towards that of one or more other modules 108.

The determination of whether to adjust the operation of a particular module 108 can be made by comparison of the status information 160 to predetermined thresholds, limits, or conditions, and not necessarily by comparison to statuses of other modules 108. The predetermined thresholds, limits, or conditions can be static thresholds, limits, or conditions, such as those set by the manufacturer that do not change during use. The predetermined thresholds, limits, or conditions can be dynamic thresholds, limits, or conditions, that are permitted to change, or that do change, during use. For example, MCD 112 can adjust the operation of a module 108 if the status information 160 for that module 108 indicates it to be operating in violation (e.g., above or below) of a predetermined threshold or limit, or outside of a predetermined range of acceptable operating conditions. Similarly, MCD 112 can adjust the operation of a module 108 if the status information 160 for that module 108 indicates the presence of an actual or potential fault (e.g., an alarm, or warning) or indicates the absence or removal of an actual or potential fault. Examples of a fault include, but are not limited to, an actual failure of a component, a potential failure of a component, a short circuit or other excessive current condition, an open circuit, an excessive voltage condition, a failure to receive a communication, the receipt of corrupted data, and the like. Depending on the type and severity of the fault, the faulty module's utilization can be decreased to avoid damaging the module, or the module's utilization can be ceased altogether. For example, if a fault occurs in a given module, then MCD 112 or LCD 114 can cause that module to enter a bypass state as described herein.

MCD 112 can control modules 108 within system 100 to achieve or converge towards a desired target. The target can be, for example, operation of all modules 108 at the same or similar levels with respect to each other, or within predetermined thresholds limits, or conditions. This process is also referred to as balancing or seeking to achieve balance in the operation or operating characteristics of modules 108. The term "balance" as used herein does not require absolute equality between modules 108 or components thereof, but rather is used in a broad sense to convey that operation of system 100 can be used to actively reduce disparities in operation (or operative state) between modules 108 that would otherwise exist.

MCD 112 can communicate control information to LCD 114 for the purpose of controlling the modules 108 associated with the LCD 114. The control information can be, e.g., a modulation index and a reference signal as described herein, a reference signal, or otherwise. Each LCD 114 can use (e.g., receive and process) the control information to generate switch signals that control operation of one or more components (e.g., a converter) within the associated module (s) 108. In some embodiments, MCD 112 generates the switch signals directly and outputs them to LCD 114, which relays the switch signals to the intended module component.

All or a portion of control system 102 can be combined with a system external control device 104 that controls one or more other aspects of the mobile or stationary application. When integrated in this shared or common control device (or subsystem), control of system 100 can be implemented in any desired fashion, such as one or more software applications executed by processing circuitry of the shared device, with hardware of the shared device, or a combination thereof. Non-exhaustive examples of external control devices 104 include: a vehicular ECU or MCU having control capability for one or more other vehicular functions (e.g., motor control, driver interface control, traction control, etc.); a grid or micro-grid controller having responsibility for one or more other power management functions (e.g., load interfacing, load power requirement forecasting, transmission and switching, interface with charge sources (e.g., diesel, solar, wind), charge source power forecasting, back up source monitoring, asset dispatch, etc.); and a data center control subsystem (e.g., environmental control, network control, backup control, etc.).

Figure 1D:
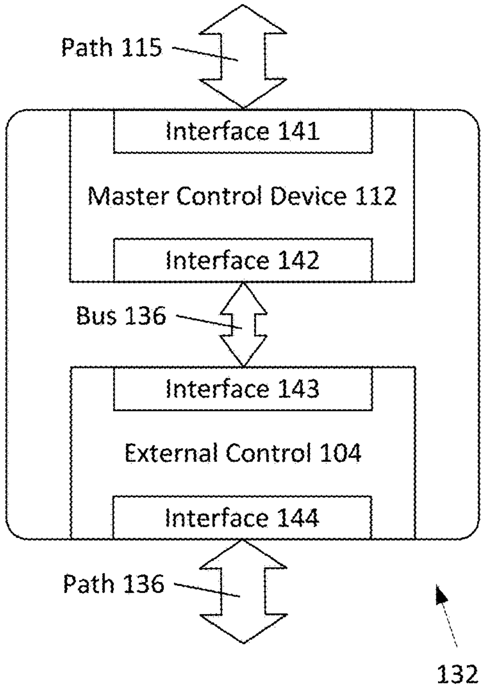
FIGS. 1D-1E are block diagrams depicting example embodiments of control devices for an energy system.
Figure 1E:
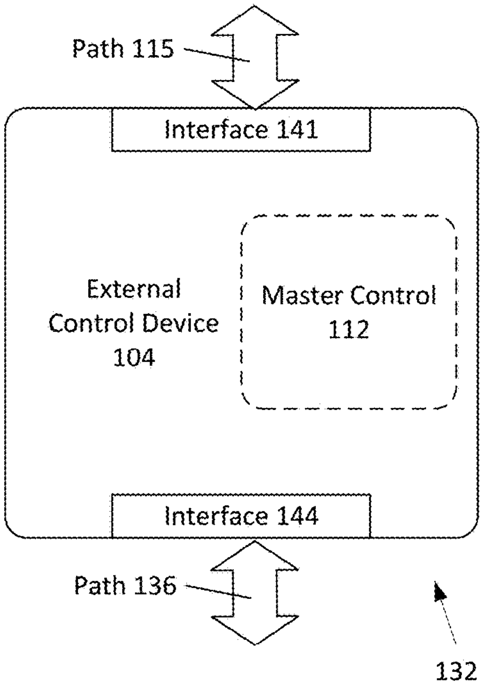
Figure 1F:
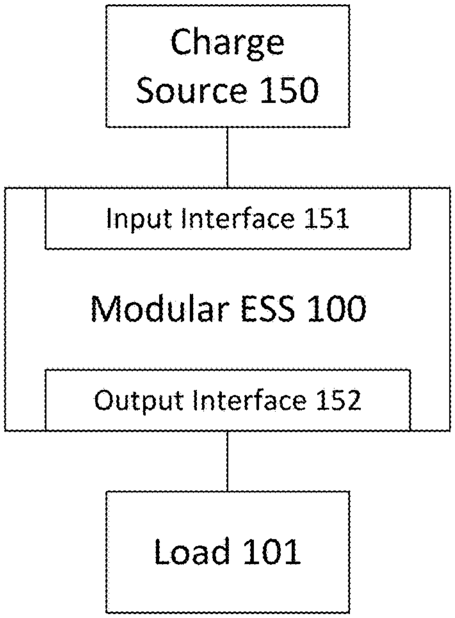
FIGS. 1F-1G are block diagrams depicting example embodiments of modular energy systems coupled with a load and a charge source.
Figure 1G:
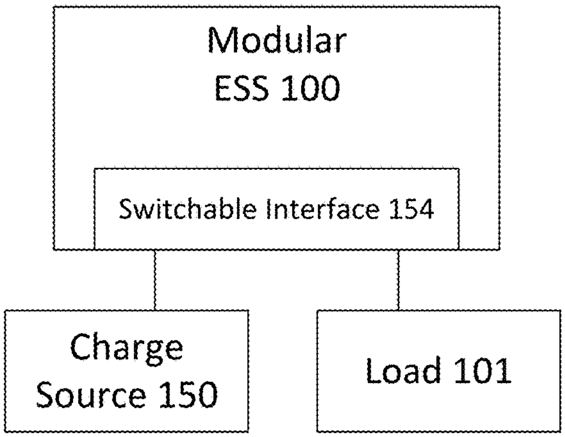

FIGS. 1D and 1E are block diagrams depicting example embodiments of a shared or common control device (or system) 132 in which control system 102 can be implemented. In FIG. 1D, common control device 132 includes master control device 112 and external control device 104. Master control device 112 includes an interface 141 for communication with LCDs 114 over path 115, as well as an interface 142 for communication with external control device 104 over internal communication bus 136. External control device 104 includes an interface 143 for communication with master control device 112 over bus 136, and an interface 144 for communication with other entities (e.g., components of the vehicle or grid) of the overall application over communication path 136. In some embodiments, common control device 132 can be integrated as a common housing or package with devices 112 and 104 implemented as discrete integrated circuit (IC) chips or packages contained therein.

In FIG. 1E, external control device 104 acts as common control device 132, with the master control functionality implemented as a component within device 104. This component 112 can be or include software or other program instructions stored and/or hardcoded within memory of device 104 and executed by processing circuitry thereof. The component can also contain dedicated hardware. The component can be a self-contained module or core, with one or more internal hardware and/or software interfaces (e.g., application program interface (API)) for communication with the operating software of external control device 104. External control device 104 can manage communication with LCDs 114 over interface 141 and other devices over interface 144. In various embodiments, device 104/132 can be integrated as a single IC chip, can be integrated into multiple IC chips in a single package, or integrated as multiple semiconductor packages within a common housing.

In the embodiments of FIGS. 1D and 1E, the master control functionality of system 102 is shared in common device 132, however, other divisions of shared control or permitted. For example, part of the master control functionality can be distributed between common device 132 and a dedicated MCD 112. In another example, both the master control functionality and at least part of the local control functionality can be implemented in common device 132 (e.g., with remaining local control functionality implemented in LCDs 114). In some embodiments, all of control system 102 is implemented in common device (or subsystem) 132. In some embodiments, local control functionality is implemented within a device shared with another component of each module 108, such as a Battery Management System (BMS).

Examples of Modules within Cascaded Energy Systems

Figure 2A:
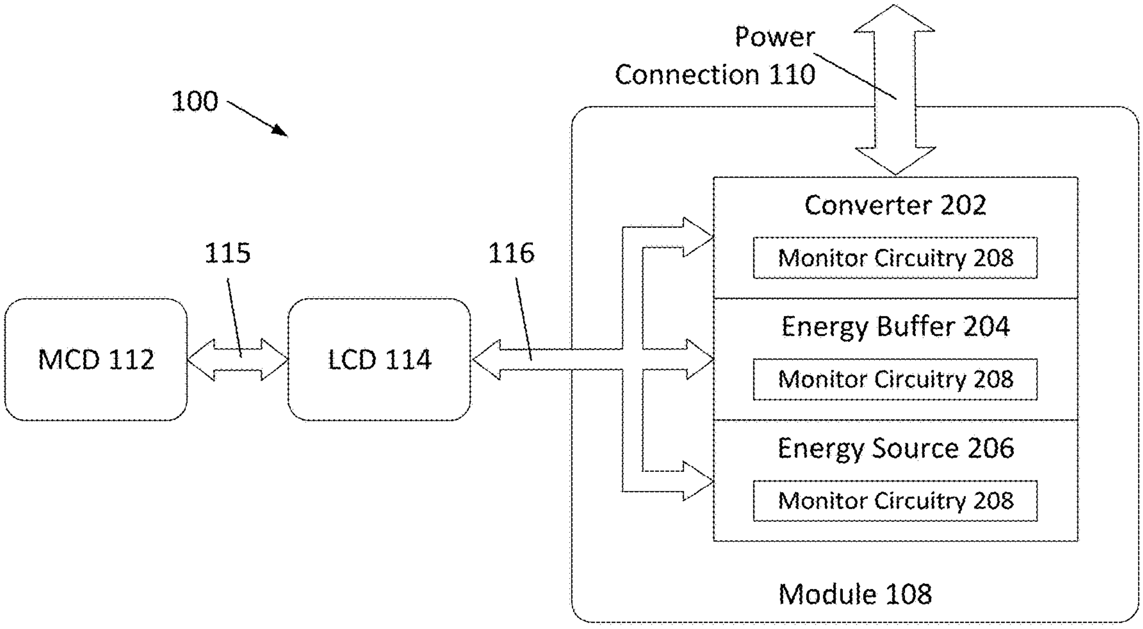
FIGS. 2A-2B are block diagrams depicting example embodiments of a module and control system within an energy system.
Figure 2B:
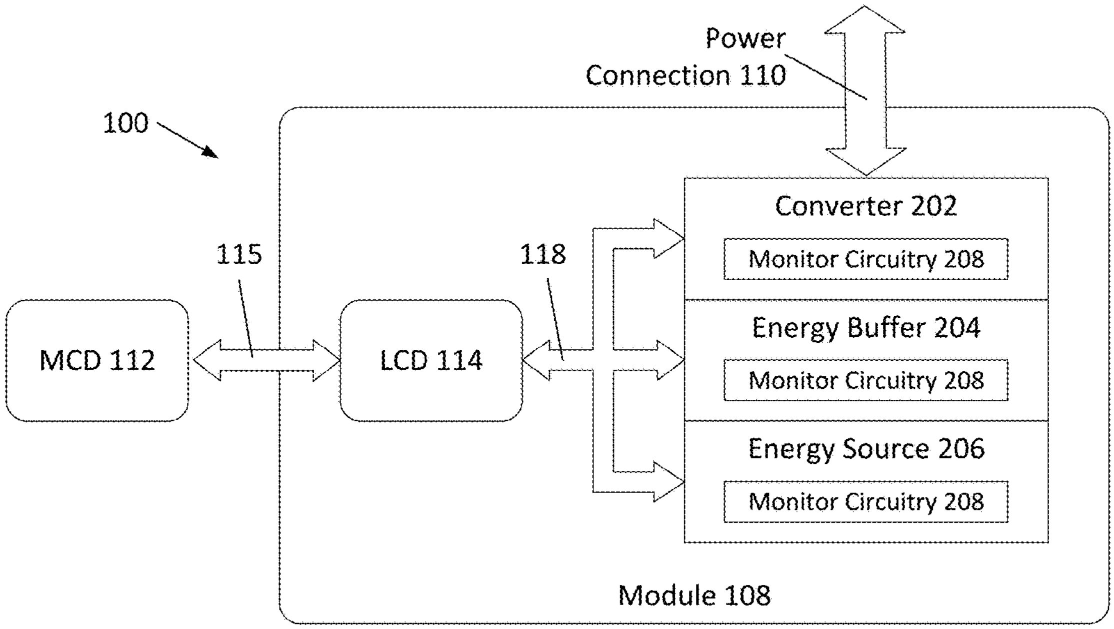

Module 108 can include one or more energy sources and a power electronics converter and, if desired, an energy buffer. FIGS. 2A-2B are block diagrams depicting additional example embodiments of system 100 with module 108 having a power converter 202, an energy buffer 204, and an energy source 206. Converter 202 can be a voltage converter or a current converter. The embodiments are described herein with reference to voltage converters, although the embodiments are not limited to such. Converter 202 can be configured to convert a direct current (DC) signal from energy source 206 into an alternating current (AC) signal and output it over power connection 110 (e.g., an inverter). Converter 202 can also receive an AC or DC signal over connection 110 and apply it to energy source 206 with either polarity in a continuous or pulsed form. Converter 202 can be or include an arrangement of switches (e.g., power transistors) such as a half bridge of full bridge (H-bridge). In some embodiments converter 202 includes only switches and the converter (and the module as a whole) does not include a transformer.

Converter 202 can be also (or alternatively) be configured to perform AC to DC conversion (e.g., a rectifier) such as to charge a DC energy source from an AC source, DC to DC conversion, and/or AC to AC conversion (e.g., in combination with an AC-DC converter). In some embodiments, such as to perform AC-AC conversion, converter 202 can include a transformer, either alone or in combination with one or more power semiconductors (e.g., switches, diodes, thyristors, and the like). In other embodiments, such as those where weight and cost is a significant factor, converter 202 can be configured to perform the conversions with only power switches, power diodes, or other semiconductor devices and without a transformer.

Figure 4A:
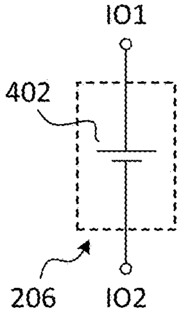
FIGS. 4A-4F are schematic views depicting example embodiments of energy sources.
Figure 4B:
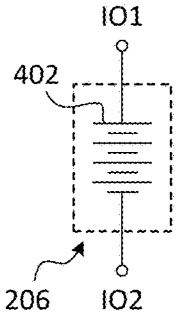
Figure 4C:
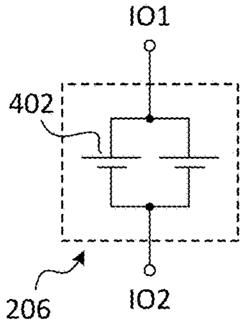
Figure 4D:
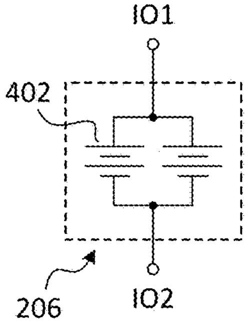

Energy source 206 is preferably a robust energy storage device capable of outputting direct current and having an energy density suitable for energy storage applications for electrically powered devices. Energy source 206 can be an electrochemical battery, such as a single battery cell or multiple battery cells connected together in a battery module or array, or any combination thereof. FIGS. 4A-4D are schematic diagrams depicting example embodiments of energy source 206 configured as a single battery cell 402 (FIG. 4A), a battery module with a series connection of multiple (e.g., four) cells 402 (FIG. 4B), a battery module with a parallel connection of single cells 402 (FIG. 4C), and a battery module with a parallel connection with legs having two cells 402 each (FIG. 4D). A non-exhaustive list of examples of battery types is set forth elsewhere herein.

Energy source 206 can also be a high energy density (HED) capacitor, such as an ultracapacitor or supercapacitor. An HED capacitor can be configured as a double layer capacitor (electrostatic charge storage), pseudocapacitor (electrochemical charge storage), hybrid capacitor (electrostatic and electrochemical), or otherwise, as opposed to a solid dielectric type of a typical electrolytic capacitor. The HED capacitor can have an energy density of 10 to 100 times (or higher) that of an electrolytic capacitor, in addition to a higher capacity. For example, HED capacitors can have a specific energy greater than 1.0 watt hours per kilogram (Wh/kg), and a capacitance greater than 10-100 farads (F). As with the batteries described with respect to FIGS. 4A-4D, energy source 206 can be configured as a single HED capacitor or multiple HED capacitors connected together in an array (e.g., series, parallel, or a combination thereof).

Energy source 206 can also be a fuel cell. The fuel cell can be a single fuel cell, multiple fuel cells connected in series or parallel, or a fuel cell module. Examples of fuel cell types include proton-exchange membrane fuel cells (PEMFC), phosphoric acid fuel cells (PAFC), solid acid fuel cells, alkaline fuel cells, high temperature fuel cells, solid oxide fuel cells, molten electrolyte fuel cells, and others. As with the batteries described with respect to FIGS. 4A-4D, energy source 206 can be configured as a single fuel cell or multiple fuel cells connected together in an array (e.g., series, parallel, or a combination thereof). The aforementioned examples of source classes (e.g., batteries, capacitors, and fuel cells) and types (e.g., chemistries and/or structural configurations within each class) are not intended to form an exhaustive list, and those of ordinary skill in the art will recognize other variants that fall within the scope of the present subject matter.

Energy buffer 204 can dampen or filter fluctuations in current across the DC line or link (e.g., $+V_{DCL}$ and $-V_{DCL}$ as described below), to assist in maintaining stability in the DC link voltage. These fluctuations can be relatively low (e.g., kilohertz) or high (e.g., megahertz) frequency fluctuations or harmonics caused by the switching of converter 202, or other transients. These fluctuations can be absorbed by buffer 204 instead of being passed to source 206 or to ports 103 and 104 of converter 202.

Power connection 110 is a connection for transferring energy or power to, from and through module 108. Module 108 can output energy from energy source 206 to power connection 110, where it can be transferred to other modules of the system or to a load. Module 108 can also receive energy from other modules 108 or a charging source (DC charger, single phase charger, multi-phase charger). Signals can also be passed through module 108 bypassing energy source 206. The routing of energy or power into and out of module 108 is performed by converter 202 under the control of LCD 114 (or another entity of system 102).

In the embodiment of FIG. 2A, LCD 114 is implemented as a component separate from module 108 (e.g., not within a shared module housing) and is connected to and capable of communication with converter 202 via communication path 116. In the embodiment of FIG. 2B, LCD 114 is included as a component of module 108 and is connected to and capable of communication with converter 202 via internal communication path 118 (e.g., a shared bus or discrete connections). LCD 114 can also be capable of receiving signals from, and transmitting signals to, energy buffer 204 and/or energy source 206 over paths 116 or 118.

Module 108 can also include monitor circuitry 208 configured to monitor (e.g., collect, sense, measure, and/or determine) one or more aspects of module 108 and/or the components thereof, such as voltage, current, temperature or other operating parameters that constitute status information 160 (or can be used to determine status information 160 by, e.g., LCD 114). A main function of the status information 160 is to describe the state of the one or more energy sources 206 of the module 108 to enable determinations as to how much to utilize the energy source in comparison to other sources in system 100, although status information 160 describing the state of other components (e.g., voltage, temperature, and/or presence of a fault in buffer 204, temperature and/or presence of a fault in converter 202, presence of a fault elsewhere in module 108, etc.) can be used in the utilization determination as well. Monitor circuitry 208 can include one or more sensors, shunts, dividers, fault detectors, Coulomb counters, controllers or other hardware and/or software configured to monitor such aspects. Monitor circuitry 208 can be separate from the various components 202, 204, and 206, or can be integrated with each component 202, 204, and 206 (as shown in FIGS. 2A-2B), or any combination thereof. In some embodiments, monitor circuitry 208 can be part of or shared with a Battery Management System (BMS) for a battery energy source 206. Discrete circuitry is not needed to monitor each type of status information 160, as more than one type of status information 160 can be monitored with a single circuit or device, or otherwise algorithmically determined without the need for additional circuits.

LCD 114 can receive status information 160 (or raw data) about the module components over communication paths 116, 118. LCD 114 can also transmit information to module components over paths 116, 118. Paths 116 and 118 can include diagnostics, measurement, protection, and control signal lines. The transmitted information can be control signals for one or more module components. The control signals can be switch signals for converter 202 and/or one or more signals that request the status information 160 from module components. For example, LCD 114 can cause the status information 160 to be transmitted over paths 116, 118 by requesting the status information 160 directly, or by applying a stimulus (e.g., voltage) to cause the status information 160 to be generated, in some cases in combination with switch signals that place converter 202 in a particular state.

Figure 2C:
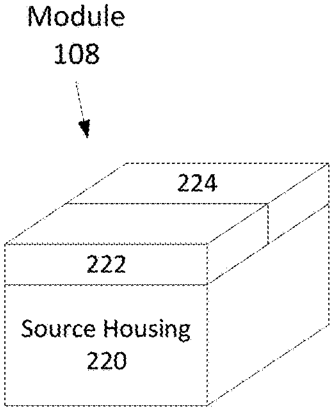
FIG. 2C is a block diagram depicting an example embodiment of a physical configuration of a module.

The physical configuration or layout of module 108 can take various forms. In some embodiments, module 108 can include a common housing in which all module components, e.g., converter 202, buffer 204, and source 206, are housed, along with other optional components such as an integrated LCD 114. In other embodiments, the various components can be separated in discrete housings that are secured together. FIG. 2C is a block diagram depicting an example embodiment of a module 108 having a first housing 220 that holds an energy source 206 of the module and accompanying electronics such as monitor circuitry, a second housing 222 that holds module electronics such as converter 202, energy buffer 204, and other accompany electronics such as monitor circuitry, and a third housing 224 that holds LCD 114 (not shown) for the module 108. In alternative embodiments the module electronics and LCD 114 can be housed within the same single housing. In still other embodiments, the module electronics, LCD 114, and energy source(s) can be housed within the same single housing for the module 108. Electrical connections between the various module components can proceed through the housings 220, 222, 224 and can be exposed on any of the housing exteriors for connection with other devices such as other modules 108 or MCD 112.

Figure 2D:
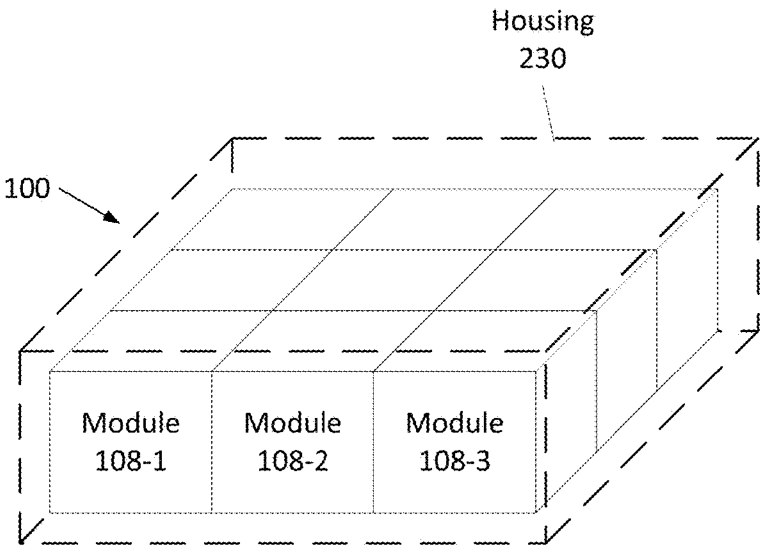
FIG. 2D is a block diagram depicting an example embodiment of a physical configuration of a modular energy system.

Modules 108 of system 100 can be physically arranged with respect to each other in various configurations that depend on the needs of the application and the number of loads. For example, in a stationary application where system 100 provides power for a microgrid, modules 108 can be placed in one or more racks or other frameworks. Such configurations may be suitable for larger mobile applications as well, such as maritime vessels. Alternatively, modules 108 can be secured together and located within a common housing, referred to as a pack. A rack or a pack may have its own dedicated cooling system shared across all modules. Pack configurations are useful for smaller mobile applications such as electric cars. System 100 can be implemented with one or more racks (e.g., for parallel supply to a microgrid) or one or more packs (e.g., serving different motors of the vehicle), or combination thereof. FIG. 2D is a block diagram depicting an example embodiment of system 100 configured as a pack with nine modules 108 electrically and physically coupled together within a common housing 230.

Examples of these and further configurations are described in Int'l. Appl. No. PCT/US20/25366, filed Mar. 27, 2020 and titled Module-Based Energy Systems Capable of Cascaded and Interconnected Configurations, and Methods Related Thereto, which is incorporated by reference herein in its entirety for all purposes.

Figure 3A:
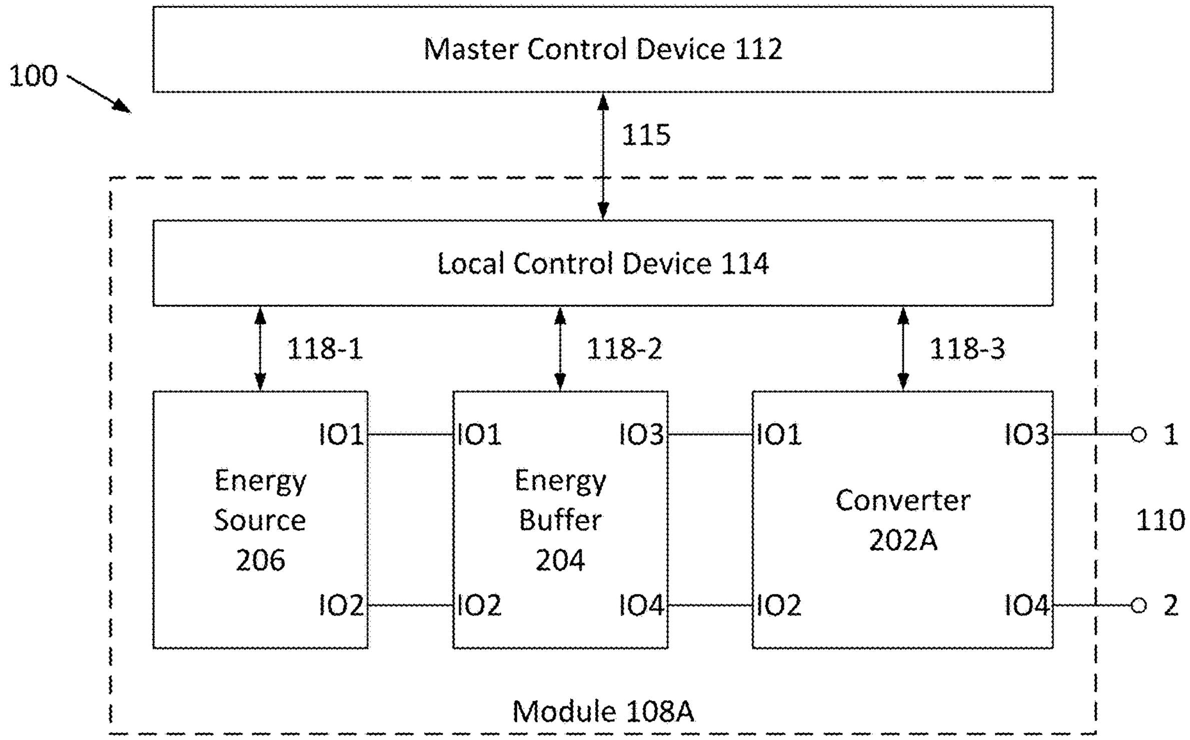
FIGS. 3A-3C are block diagrams depicting example embodiments of modules having various electrical configurations.
Figure 3B:
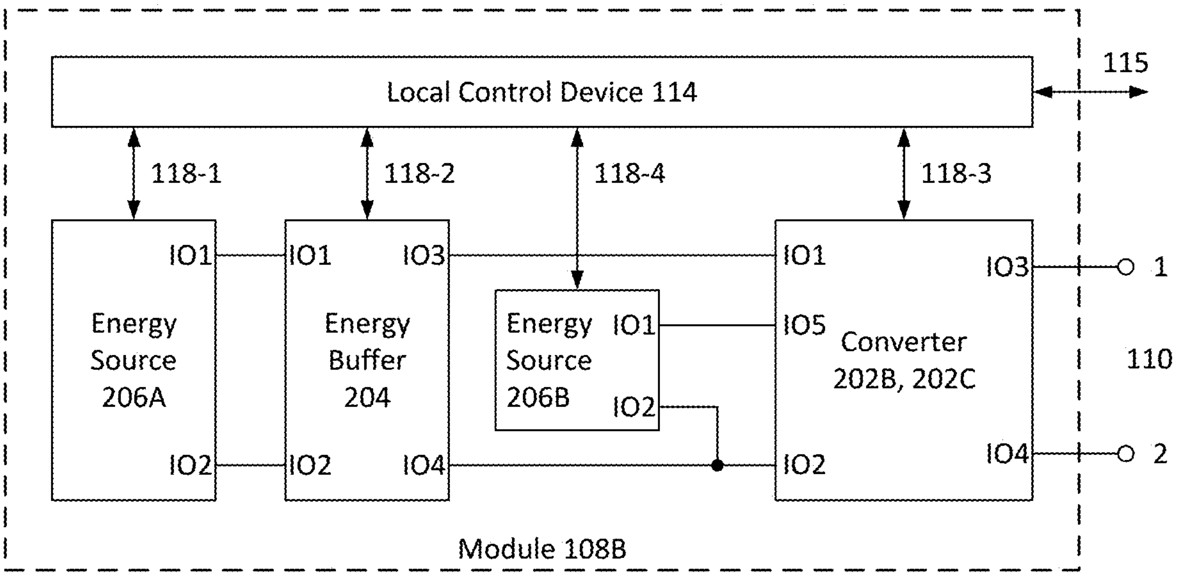
Figure 3C:
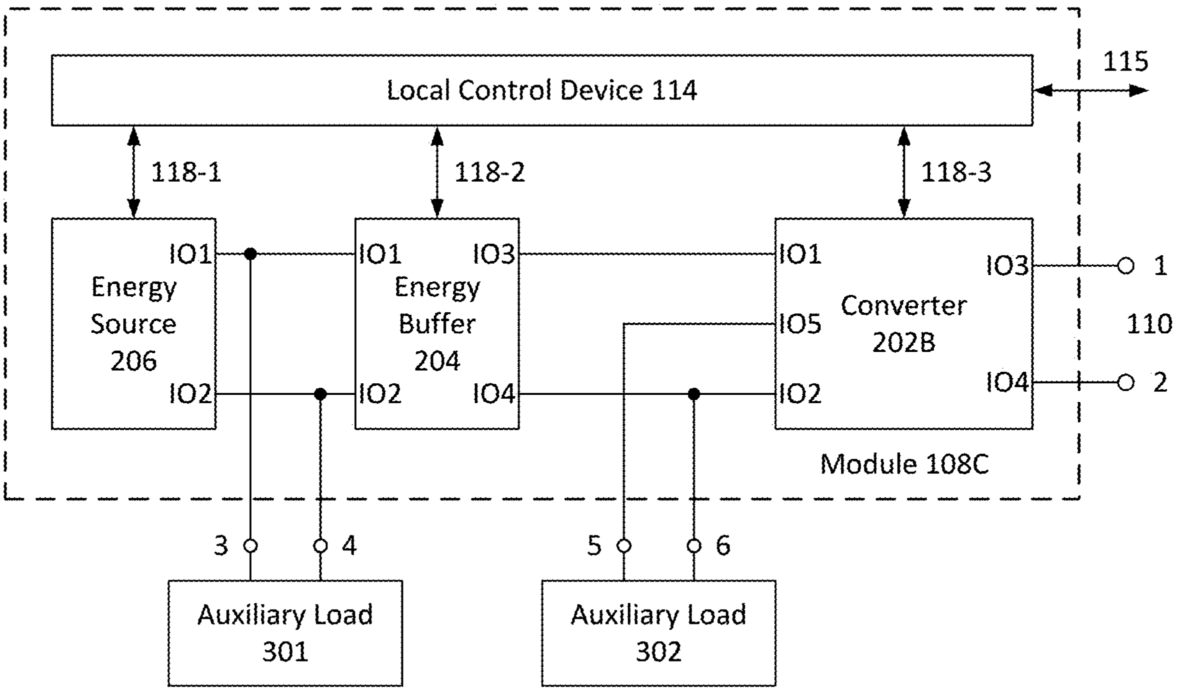

FIGS. 3A-3C are block diagrams depicting example embodiments of modules 108 having various electrical configurations. These embodiments are described as having one LCD 114 per module 108, with the LCD 114 housed within the associated module, but can be configured otherwise as described herein. FIG. 3A depicts a first example configuration of a module 108A within system 100. Module 108A includes energy source 206, energy buffer 204, and converter 202A. Each component has power connection ports (e.g., terminals, connectors) into which power can be input and/or from which power can be output, referred to herein as IO ports. Such ports can also be referred to as input ports or output ports depending on the context.

Figure 5A:
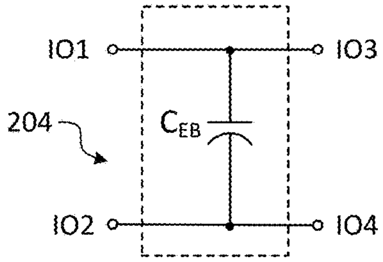
FIGS. 5A-5C are schematic views depicting example embodiments of energy buffers.
Figure 5B:
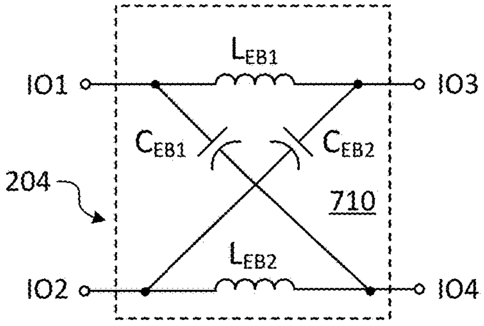
Figure 5C:
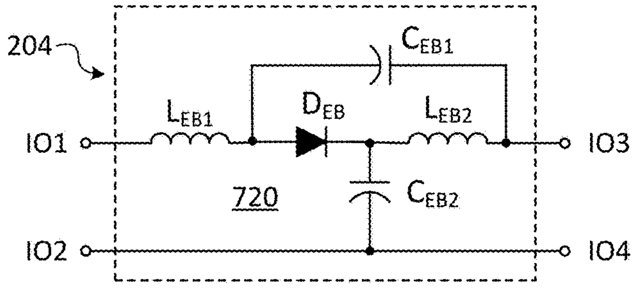

Energy source 206 can be configured as any of the energy source types described herein (e.g., a battery as described with respect to FIGS. 4A-4D, an HED capacitor, a fuel cell, or otherwise). Ports IO1 and IO2 of energy source 206 can be connected to ports IO1 and IO2, respectively, of energy buffer 204. Energy buffer 204 can be configured to buffer or filter high and low frequency energy pulsations arriving at buffer 204 through converter 202, which can otherwise degrade the performance of module 108. The topology and components for buffer 204 are selected to accommodate the maximum permissible amplitude of these high frequency voltage pulsations. Several (non-exhaustive) example embodiments of energy buffer 204 are depicted in the schematic diagrams of FIGS. 5A-5C. In FIG. 5A, buffer 204 is an electrolytic and/or film capacitor $C_{EB}$, in FIG. 5B buffer 204 is a Z-source network 710, formed by two inductors $L_{EB1}$ and $L_{EB2}$ and two electrolytic and/or film capacitors $C_{EB1}$ and $C_{EB2}$, and in FIG. 5C buffer 204 is a quasi Z-source network 720, formed by two inductors $L_{EB1}$ and $L_{EB2}$, two electrolytic and/or film capacitors $C_{EB1}$ and $C_{EB2}$ and a diode $D_{EB}$.

Figure 6A:
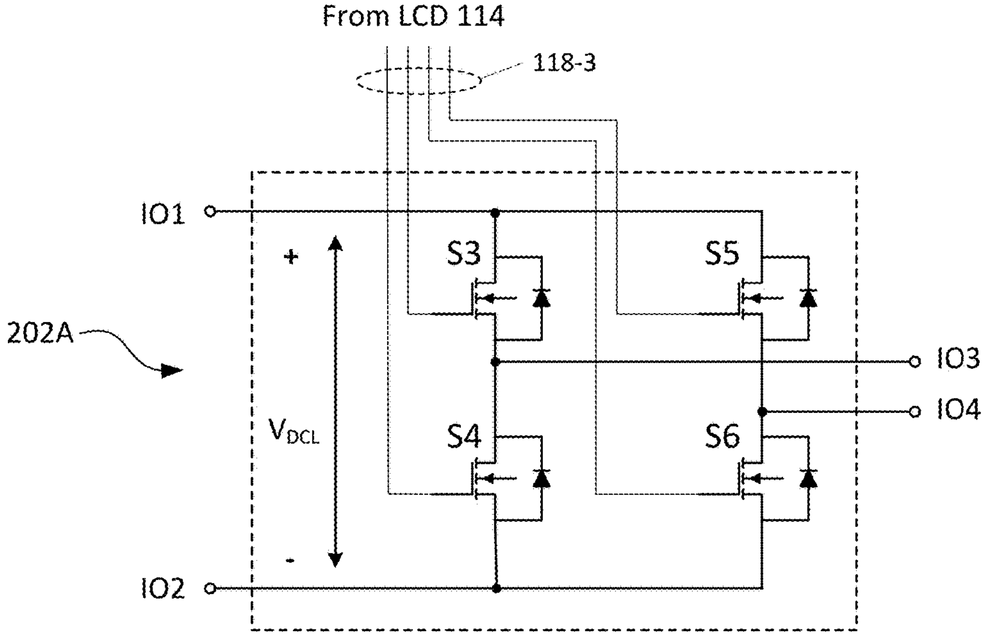
FIGS. 6A-6C are schematic views depicting example embodiments of converters.

Ports IO3 and IO4 of energy buffer 204 can be connected to ports IO1 and IO2, respectively, of converter 202A, which can be configured as any of the power converter types described herein. FIG. 6A is a schematic diagram depicting an example embodiment of converter 202A configured as a DC-AC converter that can receive a DC voltage at ports 101 and 102 and switch to generate pulses at ports 103 and 104. Converter 202A can include multiple switches, and here converter 202A includes four switches S3, S4, S5, S6 arranged in a full bridge configuration. Control system 102 or LCD 114 can independently control each switch via control input lines 118-3 to each gate.

The switches can be any suitable switch type, such as power semiconductors like the metal-oxide-semiconductor field-effect transistors (MOSFETs) shown here, insulated gate bipolar transistors (IGBTs), or gallium nitride (GaN) transistors. Semiconductor switches can operate at relatively high switching frequencies, thereby permitting converter 202 to be operated in pulse-width modulated (PWM) mode if desired, and to respond to control commands within a relatively short interval of time. This can provide a high tolerance of output voltage regulation and fast dynamic behavior in transient modes.

In this embodiment, a DC line voltage $V_{DCL}$ can be applied to converter 202 between ports IO1 and IO2. By connecting $V_{DCL}$ to ports 103 and 104 by different combinations of switches S3, S4, S5, S6, converter 202 can generate three different voltage outputs at ports 103 and 104: $+V_{DCL}$, 0, and $-V_{DCL}$. A switch signal provided to each switch controls whether the switch is on (closed) or off (open). To obtain $+V_{DCL}$, switches S3 and S6 are turned on while S4 and S5 are turned off, whereas $-V_{DCL}$ can be obtained by turning on switches S4 and S5 and turning off S3 and S6. The output voltage can be set to zero (including near zero) or a reference voltage by turning on S3 and S5 with S4 and S6 off, or by turning on S4 and S6 with S3 and S5 off. These voltages can be output from module 108 over power connection 110. Ports IO3 and IO4 of converter 202 can be connected to (or form) module IO ports 1 and 2 of power connection 110, so as to generate the output voltage for use with output voltages from other modules 108.

The control or switch signals for the embodiments of converter 202 described herein can be generated in different ways depending on the control technique utilized by system 100 to generate the output voltage of converter 202. In some embodiments, the control technique is a PWM technique such as space vector pulse-width modulation (SVPWM) or sinusoidal pulse-width modulation (SPWM), or variations thereof. FIG. 8A is a graph of voltage versus time depicting an example of an output voltage waveform 802 of converter 202. For ease of description, the embodiments herein will be described in the context of a PWM control technique, although the embodiments are not limited to such. Other classes of techniques can be used. One alternative class is based on hysteresis, examples of which are described in Int'l Publ. Nos. WO 2018/231810A1, WO 2018/232403A1, and WO 2019/183553A1, which are incorporated by reference herein for all purposes.

Each module 108 can be configured with multiple energy sources 206 (e.g., two, three, four, or more). Each energy source 206 of module 108 can be controllable (switchable) to supply power to connection 110 (or receive power from a charge source) independent of the other sources 206 of the module. For example, all sources 206 can output power to connection 110 (or be charged) at the same time, or only one (or a subset) of sources 206 can supply power (or be charged) at any one time. In some embodiments, the sources 206 of the module can exchange energy between them, e.g., one source 206 can charge another source 206. Each of the sources 206 can be configured as any energy source described herein (e.g., battery, HED capacitor, fuel cell). Each of the sources 206 can be the same class (e.g., each can be a battery, each can be an HED capacitor, or each can be a fuel cell), or a different class (e.g., a first source can be a battery and a second source can be an HED capacitor or fuel cell, or a first source can be an HED capacitor and a second source can be a fuel cell).

FIG. 3B is a block diagram depicting an example embodiment of a module 108B in a dual energy source configuration with a primary energy source 206A and secondary energy source 206B. Ports IO1 and IO2 of primary source 202A can be connected to ports IO1 and IO2 of energy buffer 204. Module 108B includes a converter 202B having an additional IO port. Ports IO3 and IO4 of buffer 204 can be connected ports IO1 and IO2, respectively, of converter 202B. Ports IO1 and IO2 of secondary source 206B can be connected to ports 105 and 102, respectively, of converter 202B (also connected to port 104 of buffer 204).

In this example embodiment of module 108B, primary energy source 202A, along with the other modules 108 of system 100, supplies the average power needed by the load. Secondary source 202B can serve the function of assisting energy source 202 by providing additional power at load power peaks, or absorbing excess power, or otherwise.

Figure 4E:
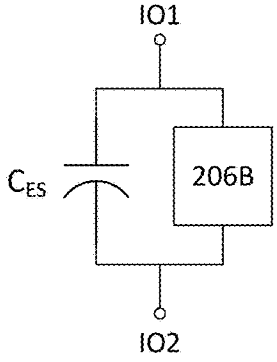
Figure 4F:
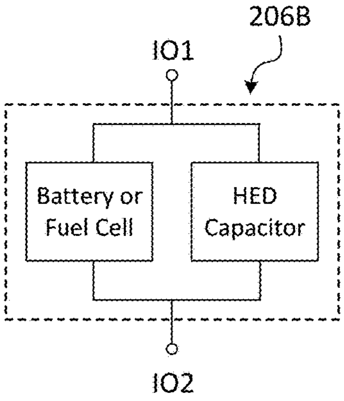

As mentioned both primary source 206A and secondary source 206B can be utilized simultaneously or at separate times depending on the switch state of converter 202B. If at the same time, an electrolytic and/or a film capacitor (CEO) can be placed in parallel with source 206B as depicted in FIG. 4E to act as an energy buffer for the source 206B, or energy source 206B can be configured to utilize an HED capacitor in parallel with another energy source (e.g., a battery or fuel cell) as depicted in FIG. 4F.

Figure 6B:
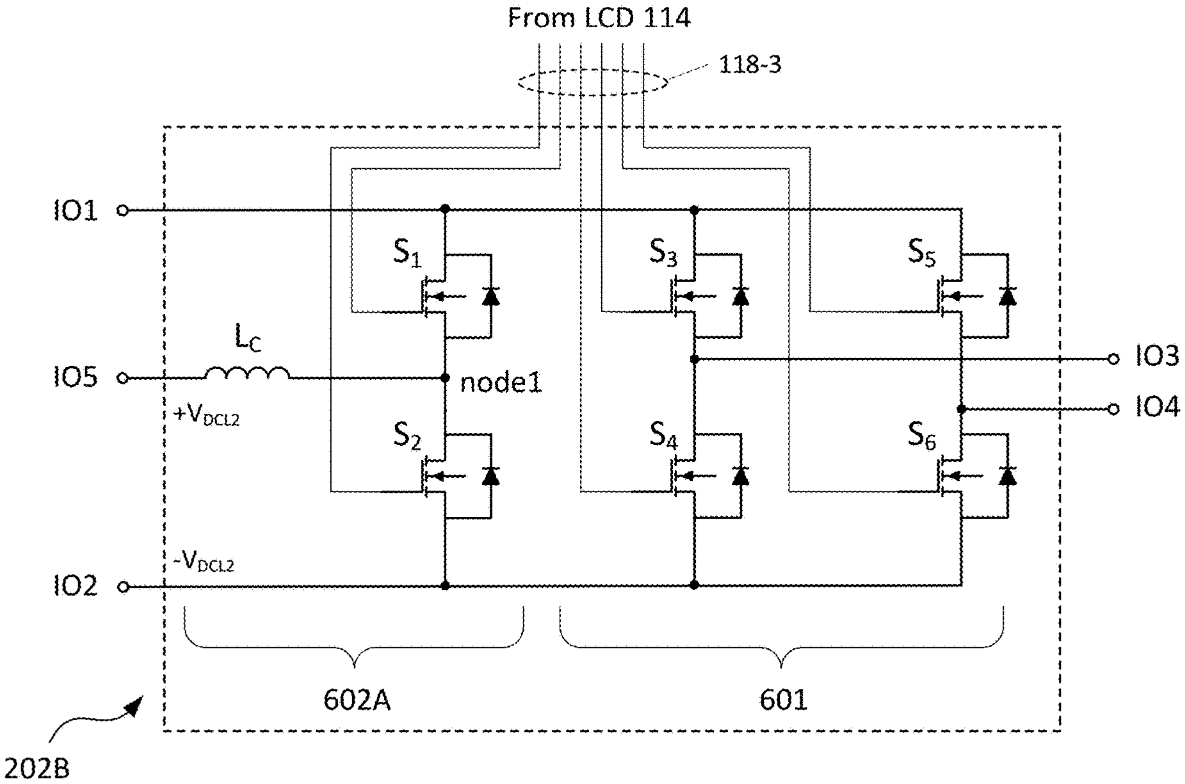
Figure 6C:
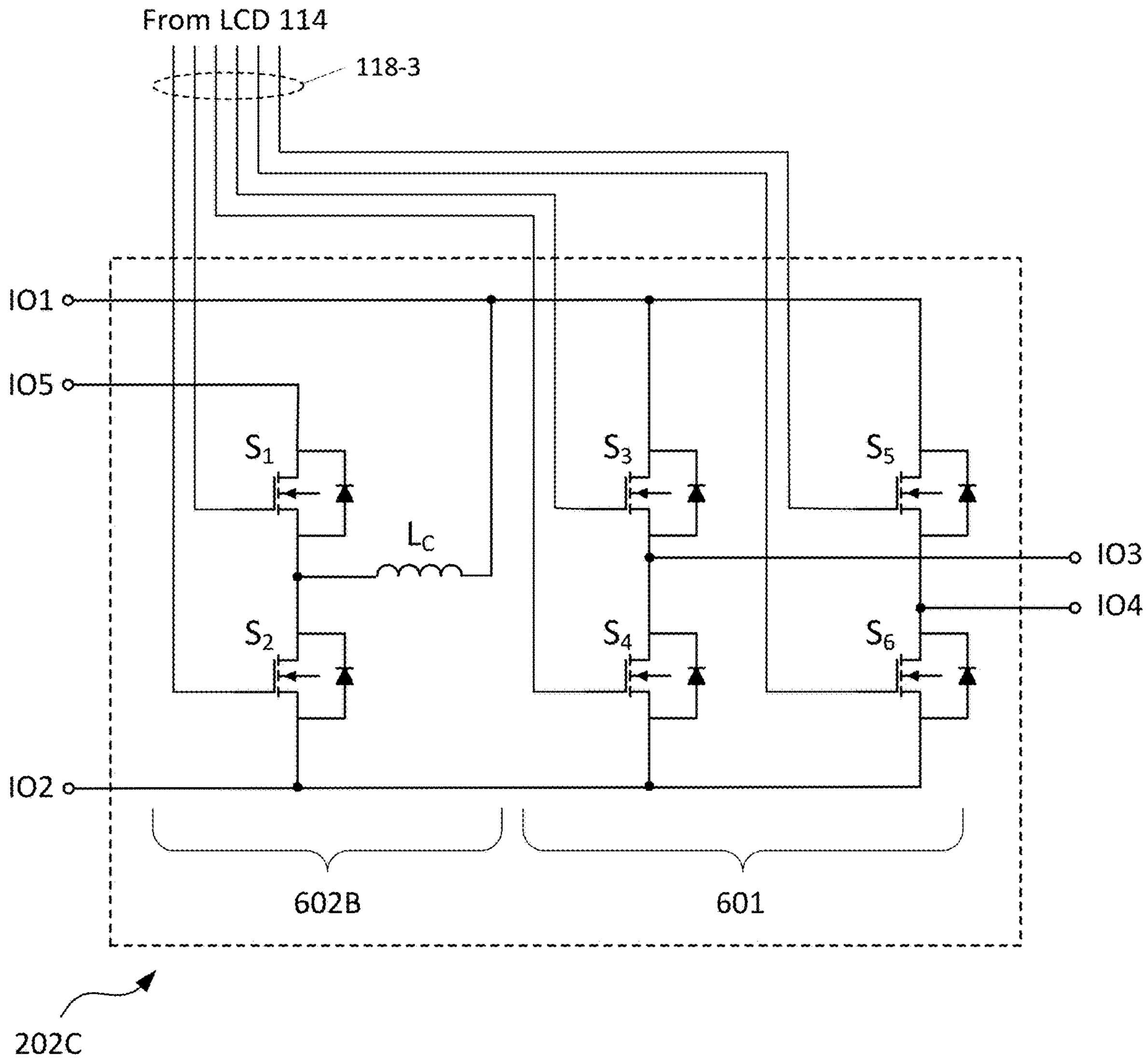

FIGS. 6B and 6C are schematic views depicting example embodiments of converters 202B and 202C, respectively. Converter 202B includes switch circuitry portions 601 and 602A. Portion 601 includes switches S3 through S6 configured as a full bridge in similar manner to converter 202A, and is configured to selectively couple 101 and 102 to either of 103 and 104, thereby changing the output voltages of module 108B. Portion 602A includes switches S1 and S2 configured as a half bridge and coupled between ports IO1 and IO2. A coupling inductor $L_C$ is connected between port 105 and a node1 present between switches S1 and S2 such that switch portion 602A is a bidirectional converter that can regulate (boost or buck) voltage (or inversely current). Switch portion 602A can generate two different voltages at node1, which are $+V_{DCL2}$ and 0, referenced to port 102, which can be at virtual zero potential. The current drawn from or input to energy source 202B can be controlled by regulating the voltage on coupling inductor $L_C$, using, for example, a pulse-width modulation technique or a hysteresis control method for commutating switches S1 and S2. Other techniques can also be used.

Converter 202C differs from that of 202B as switch portion 602B includes switches S1 and S2 configured as a half bridge and coupled between ports 105 and 102. A coupling inductor $L_C$ is connected between port 101 and a node1 present between switches S1 and S2 such that switch portion 602B is configured to regulate voltage.

Control system 102 or LCD 114 can independently control each switch of converters 202B and 202C via control input lines 118-3 to each gate. In these embodiments and that of FIG. 6A, LCD 114 (not MCD 112) generates the switching signals for the converter switches. Alternatively, MCD 112 can generate the switching signals, which can be communicated directly to the switches, or relayed by LCD 114.

In some embodiments, driver circuitry for generating the switching signals can be present in or associated with MCD 112 and/or LCD 114.

The aforementioned zero voltage configuration for converter 202 (turning on S3 and S5 with S4 and S6 off, or turning on S4 and S6 with S3 and S5 off) can also be referred to as a bypass state for the given module. This bypass state can be entered if a fault is detected in the given module, or if a system fault is detected warranting shut-off of more than one (or all modules) in an array or system. A fault in the module can be detected by LCD 114 and the control switching signals for converter 202 can be set to engage the bypass state without intervention by MCD 112. Alternatively, fault information for a given module can be communicated by LCD 114 to MCD 112, and MCD 112 can then make a determination whether to engage the bypass state, and if so, can communicate instructions to engage the bypass state to the LCD 114 associated with the module having the fault, at which point LCD 114 can output switching signals to cause engagement of the bypass state.

In embodiments where a module 108 includes three or more energy sources 206, converters 202B and 202C can be scaled accordingly such that each additional energy source 206B is coupled to an additional IO port leading to an additional switch circuitry portion 602A or 602B, depending on the needs of the particular source. For example a dual source converter 202 can include both switch portions 202A and 202B.

Modules 108 with multiple energy sources 206 are capable of performing additional functions such as energy sharing between sources 206, energy capture from within the application (e.g., regenerative braking), charging of the primary source by the secondary source even while the overall system is in a state of discharge, and active filtering of the module output. The active filtering function can also be performed by modules having a typical electrolytic capacitor instead of a secondary energy source. Examples of these functions are described in more detail in Int'l. Appl. No. PCT/US20/25366, filed Mar. 27, 2020 and titled Module-Based Energy Systems Capable of Cascaded and Interconnected Configurations, and Methods Related Thereto, and Int'l. Publ. No. WO 2019/183553, filed Mar. 22, 2019, and titled Systems and Methods for Power Management and Control, both of which are incorporated by reference herein in their entireties for all purposes.

Each module 108 can be configured to supply one or more auxiliary loads with its one or more energy sources 206. Auxiliary loads are loads that require lower voltages than the primary load 101. Examples of auxiliary loads can be, for example, an on-board electrical network of an electric vehicle, or an HVAC system of an electric vehicle. The load of system 100 can be, for example, one of the phases of the electric vehicle motor or electrical grid. This embodiment can allow a complete decoupling between the electrical characteristics (terminal voltage and current) of the energy source and those of the loads.

FIG. 3C is a block diagram depicting an example embodiment of a module 108C configured to supply power to a first auxiliary load 301 and a second auxiliary load 302, where module 108C includes an energy source 206, energy buffer 204, and converter 202B coupled together in a manner similar to that of FIG. 3B. First auxiliary load 301 requires a voltage equivalent to that supplied from source 206. Load 301 is coupled to IO ports 3 and 4 of module 108C, which are in turn coupled to ports IO1 and IO2 of source 206. Source 206 can output power to both power connection 110 and load 301. Second auxiliary load 302 requires a constant voltage lower than that of source 206. Load 302 is coupled to IO ports 5 and 6 of module 108C, which are coupled to ports 105 and 102, respectively, of converter 202B. Converter 202B can include switch portion 602 having coupling inductor $L_C$ coupled to port 105 (FIG. 6B). Energy supplied by source 206 can be supplied to load 302 through switch portion 602 of converter 202B. It is assumed that load 302 has an input capacitor (a capacitor can be added to module 108C if not), so switches S1 and S2 can be commutated to regulate the voltage on and current through coupling inductor $L_C$ and thus produce a stable constant voltage for load 302. This regulation can step down the voltage of source 206 to the lower magnitude voltage is required by load 302.

Module 108C can thus be configured to supply one or more first auxiliary loads in the manner described with respect to load 301, with the one or more first loads coupled to IO ports 3 and 4. Module 108C can also be configured to supply one or more second auxiliary loads in the manner described with respect to load 302. If multiple second auxiliary loads 302 are present, then for each additional load 302 module 108C can be scaled with additional dedicated module output ports (like 5 and 6), an additional dedicated switch portion 602, and an additional converter IO port coupled to the additional portion 602.

Energy source 206 can thus supply power for any number of auxiliary loads (e.g., 301 and 302), as well as the corresponding portion of system output power needed by primary load 101. Power flow from source 206 to the various loads can be adjusted as desired.

Module 108 can be configured as needed with two or more energy sources 206 (FIG. 3B) and to supply first and/or second auxiliary loads (FIG. 3C) through the addition of a switch portion 602 and converter port 105 for each additional source 206B or second auxiliary load 302. Additional module IO ports (e.g., 3, 4, 5, 6) can be added as needed. Module 108 can also be configured as an interconnection module to exchange energy (e.g., for balancing) between two or more arrays, two or more packs, or two or more systems 100 as described further herein. This interconnection functionality can likewise be combined with multiple source and/or multiple auxiliary load supply capabilities.

Control system 102 can perform various functions with respect to the components of modules 108A, 108B, and 108C. These functions can include management of the utilization (amount of use) of each energy source 206, protection of energy buffer 204 from over-current, over-voltage and high temperature conditions, and control and protection of converter 202.

For example, to manage (e.g., adjust by increasing, decreasing, or maintaining) utilization of each energy source 206, LCD 114 can receive one or more monitored voltages, temperatures, and currents from each energy source 206 (or monitor circuitry). The monitored voltages can be at least one of, preferably all, voltages of each elementary component independent of the other components (e.g., each individual battery cell, HED capacitor, and/or fuel cell) of the source 206, or the voltages of groups of elementary components as a whole (e.g., voltage of the battery array, HED capacitor array, and/or fuel cell array). Similarly the monitored temperatures and currents can be at least one of, preferably all, temperatures and currents of each elementary component independent of the other components of the source 206, or the temperatures and currents of groups of elementary components as a whole, or any combination thereof. The monitored signals can be status information 160, with which LCD 114 can perform one or more of the following: calculation or determination of a real capacity, actual State of Charge (SOC) and/or State of Health (SOH) of the elementary components or groups of elementary components; set or output a warning or alarm indication based on monitored and/or calculated status information 160; and/or transmission of the status information 160 to MCD 112. LCD 114 can receive control information (e.g., a modulation index, synchronization signal) from MCD 112 and use this control information to generate switch signals for converter 202 that manage the utilization of the source 206.

To protect energy buffer 204, LCD 114 can receive one or more monitored voltages, temperatures, and currents from energy buffer 204 (or monitor circuitry). The monitored voltages can be at least one of, preferably all, voltages of each elementary component of buffer 204 (e.g., of $C_{EB}$, $C_{EB1}$, $C_{EB2}$, $L_{EB1}$, $L_{EB2}$, $D_{EB}$) independent of the other components, or the voltages of groups of elementary components or buffer 204 as a whole (e.g., between 101 and 102 or between 103 and 104). Similarly the monitored temperatures and currents can be at least one of, preferably all, temperatures and currents of each elementary component of buffer 204 independent of the other components, or the temperatures and currents of groups of elementary components or of buffer 204 as a whole, or any combination thereof. The monitored signals can be status information 160, with which LCD 114 can perform one or more of the following: set or output a warning or alarm indication; communicate the status information 160 to MCD 112; or control converter 202 to adjust (increase or decrease) the utilization of source 206 and module 108 as a whole for buffer protection.

To control and protect converter 202, LCD 114 can receive the control information from MCD 112 (e.g., a modulated reference signal, or a reference signal and a modulation index), which can be used with a PWM technique in LCD 114 to generate the control signals for each switch (e.g., S1 through S6). LCD 114 can receive a current feedback signal from a current sensor of converter 202, which can be used for overcurrent protection together with one or more fault status signals from driver circuits (not shown) of the converter switches, which can carry information about fault statuses (e.g., short circuit or open circuit failure modes) of all switches of converter 202. Based on this data, LCD 114 can make a decision on which combination of switching signals to be applied to manage utilization of module 108, and potentially bypass or disconnect converter 202 (and the entire module 108) from system 100.

If controlling a module 108C that supplies a second auxiliary load 302, LCD 114 can receive one or more monitored voltages (e.g., the voltage between IO ports 5 and 6) and one or more monitored currents (e.g., the current in coupling inductor $L_C$, which is a current of load 302) in module 108C. Based on these signals, LCD 114 can adjust the switching cycles (e.g., by adjustment of modulation index or reference waveform) of S1 and S2 to control (and stabilize) the voltage for load 302.

Cascaded Energy System Topology Examples

Figure 7C:
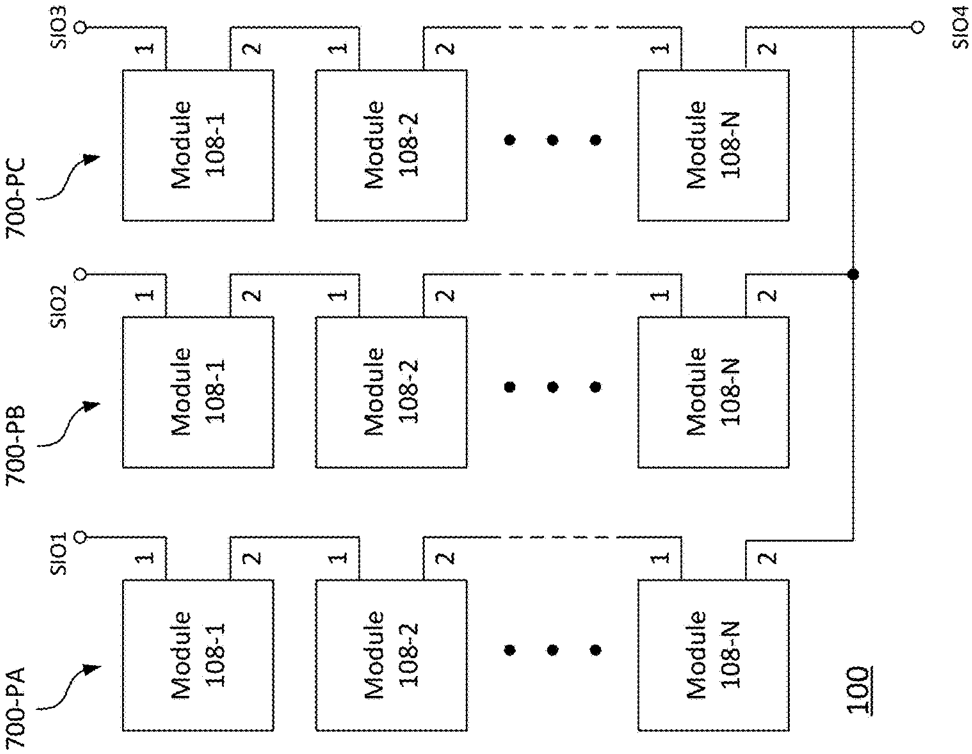
FIGS. 7A-7E are block diagrams depicting example embodiments of modular energy systems having various topologies.

Two or more modules 108 can be coupled together in a cascaded array that outputs a voltage signal formed by a superposition of the discrete voltages generated by each module 108 within the array. FIG. 7A is a block diagram depicting an example embodiment of a topology for system 100 where N modules 108-1, 108-2 . . . 108-N are coupled together in series to form a serial array 700. In this and all embodiments described herein, N can be any integer greater than one. Array 700 includes a first system IO port SIO1 and a second system IO port SIO2 across which is generated an array output voltage. Array 700 can be used as a DC or single phase AC energy source for DC or AC single-phase loads, which can be connected to SIO1 and SIO2 of array 700. FIG. 8A is a plot of voltage versus time depicting an example output signal produced by a single module 108 having a 48 volt energy source. FIG. 8B is a plot of voltage versus time depicting an example single phase AC output signal generated by array 700 having six 48V modules 108 coupled in series.

System 100 can be arranged in a broad variety of different topologies to meet varying needs of the applications. System 100 can provide multi-phase power (e.g., two-phase, three-phase, four-phase, five-phase, six-phase, etc.) to a load by use of multiple arrays 700, where each array can generate an AC output signal having a different phase angle.

Figure 7B:
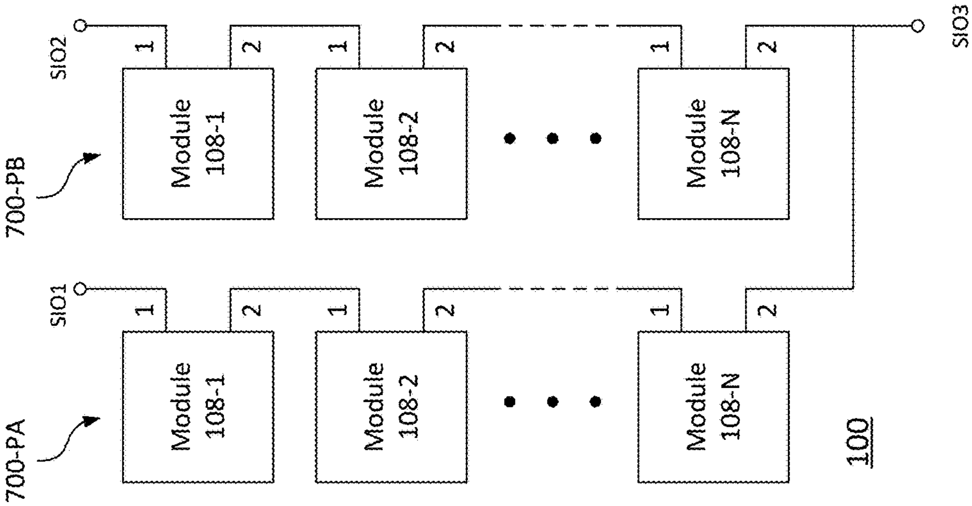
Figure 7A:
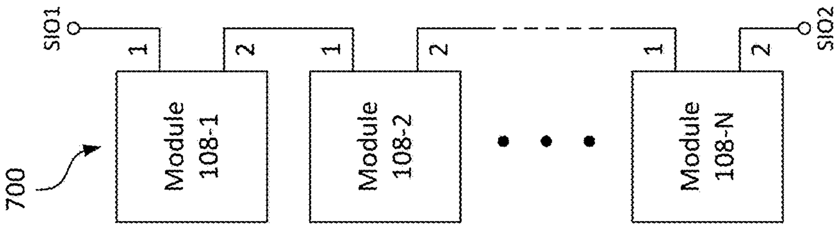

FIG. 7B is a block diagram depicting system 100 with two arrays 700-PA and 700-PB coupled together. Each array 700 is one-dimensional, formed by a series connection of N modules 108. The two arrays 700-PA and 700-PB can each generate a single-phase AC signal, where the two AC signals have different phase angles PA and PB (e.g., 180 degrees apart). IO port 1 of module 108-1 of each array 700-PA and 700-PB can form or be connected to system IO ports SIO1 and SIO2, respectively, which in turn can serve as a first output of each array that can provide two phase power to a load (not shown). Or alternatively ports SIO1 and SIO2 can be connected to provide single phase power from two parallel arrays. IO port 2 of module 108-N of each array 700-PA and 700-PB can serve as a second output for each array 700-PA and 700-PB on the opposite end of the array from system IO ports SIO1 and SIO2, and can be coupled together at a common node and optionally used for an additional system IO port SIO3 if desired, which can serve as a neutral. This common node can be referred to as a rail, and IO port 2 of modules 108-N of each array 700 can be referred to as being on the rail side of the arrays.

FIG. 7C is a block diagram depicting system 100 with three arrays 700-PA, 700-PB, and 700-PC coupled together. Each array 700 is one-dimensional, formed by a series connection of N modules 108. The three arrays 700-1 and 700-2 can each generate a single-phase AC signal, where the three AC signals have different phase angles PA, PB, PC (e.g., 120 degrees apart). IO port 1 of module 108-1 of each array 700-PA, 700-PB, and 700-PC can form or be connected to system IO ports SIO1, SIO2, and SIO3, respectively, which in turn can provide three phase power to a load (not shown). IO port 2 of module 108-N of each array 700-PA, 700-PB, and 700-PC can be coupled together at a common node and optionally used for an additional system IO port SIO4 if desired, which can serve as a neutral.

The concepts described with respect to the two-phase and three-phase embodiments of FIGS. 7B and 7C can be extended to systems 100 generating still more phases of power. For example, a non-exhaustive list of additional examples includes: system 100 having four arrays 700, each of which is configured to generate a single phase AC signal having a different phase angle (e.g., 90 degrees apart): system 100 having five arrays 700, each of which is configured to generate a single phase AC signal having a different phase angle (e.g., 72 degrees apart); and system 100 having six arrays 700, each array configured to generate a single phase AC signal having a different phase angle (e.g., 60 degrees apart).

System 100 can be configured such that arrays 700 are interconnected at electrical nodes between modules 108 within each array. FIG. 7D is a block diagram depicting system 100 with three arrays 700-PA, 700-PB, and 700-PC coupled together in a combined series and delta arrangement. Each array 700 includes a first series connection of M modules 108, where M is two or greater, coupled with a second series connection of N modules 108, where N is two or greater. The delta configuration is formed by the interconnections between arrays, which can be placed in any desired location. In this embodiment, IO port 2 of module 108-(M+N) of array 700-PC is coupled with IO port 2 of module 108-M and IO port 1 of module 108-(M+1) of array 700-PA, IO port 2 of module 108-(M+N) of array 700-PB is coupled with IO port 2 of module 108-M and IO port 1 of module 108-(M+1) of array 700-PC, and IO port 2 of module 108-(M+N) of array 700-PA is coupled with IO port 2 of module 108-M and IO port 1 of module 108-(M+1) of array 700-PB.

Figure 7E:
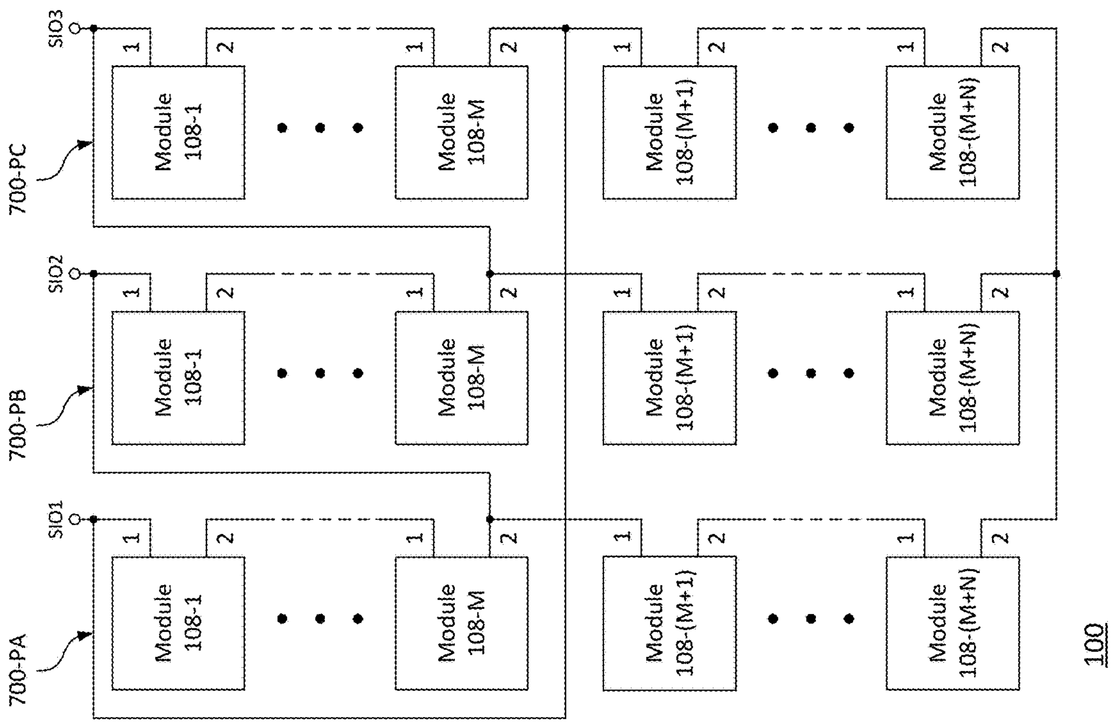
Figure 7D:
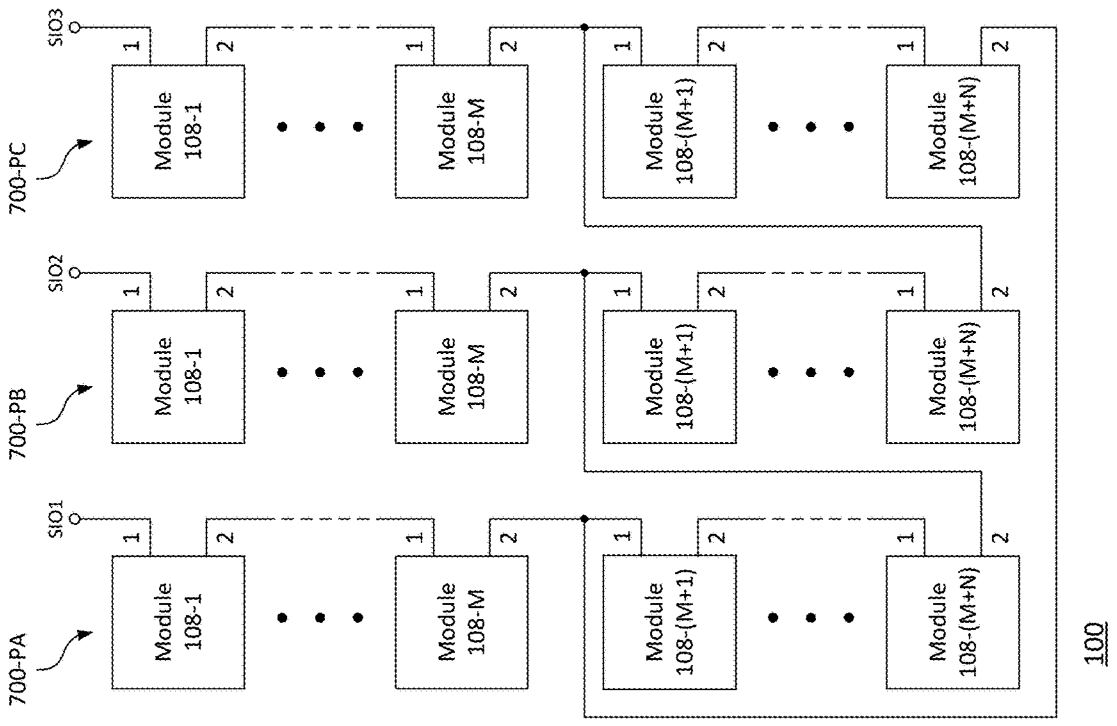

FIG. 7E is a block diagram depicting system 100 with three arrays 700-PA, 700-PB, and 700-PC coupled together in a combined series and delta arrangement. This embodiment is similar to that of FIG. 7D except with different cross connections. In this embodiment, IO port 2 of module 108-M of array 700-PC is coupled with IO port 1 of module 108-1 of array 700-PA, IO port 2 of module 108-M of array 700-PB is coupled with IO port 1 of module 108-1 of array 700-PC, and IO port 2 of module 108-M of array 700-PA is coupled with IO port 1 of module 108-1 of array 700-PB. The arrangements of FIGS. 7D and 7E can be implemented with as little as two modules in each array 700. Combined delta and series configurations enable an effective exchange of energy between all modules 108 of the system (interphase balancing) and phases of power grid or load, and also allows reducing the total number of modules 108 in an array 700 to obtain the desired output voltages.

In the embodiments described herein, although it is advantageous for the number of modules 108 to be the same in each array 700 within system 100, such is not required and different arrays 700 can have differing numbers of modules 108. Further, each array 700 can have modules 108 that are all of the same configuration (e.g., all modules are 108A, all modules are 108B, all modules are 108C, or others) or different configurations (e.g., one or more modules are 108A, one or more are 108B, and one or more are 108C, or otherwise). As such, the scope of topologies of system 100 covered herein is broad.

Control Methodology Examples

As mentioned, control of system 100 can be performed according to various methodologies, such as hysteresis or PWM. Several examples of PWM include space vector modulation and sine pulse width modulation, where the switching signals for converter 202 are generated with a phase shifted carrier technique that continuously rotates utilization of each module 108 to equally distribute power among them.

Figure 8C:
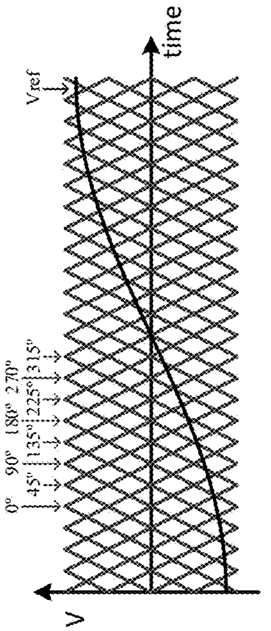
FIG. 8C is a plot depicting an example reference signal and carrier signals usable in a pulse width modulation control technique.
Figure 8D:
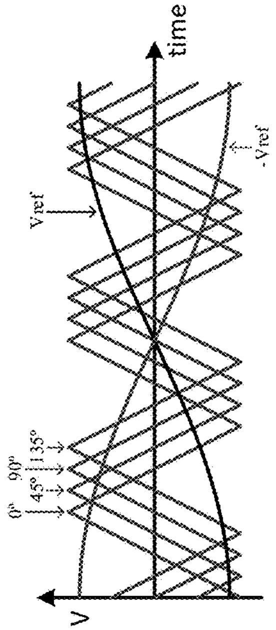
FIG. 8D is a plot depicting example reference signals and carrier signals usable in a pulse width modulation control technique.
Figure 8E:
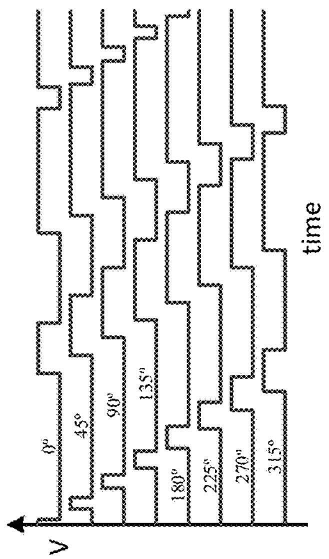
FIG. 8E is a plot depicting example switch signals generated according to a pulse width modulation control technique.
Figure 8F:
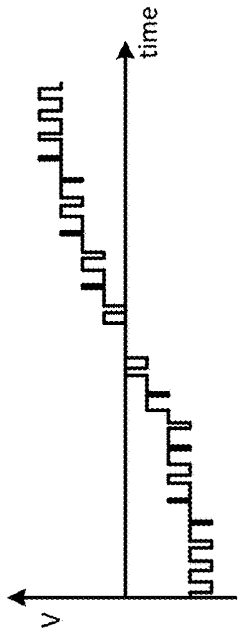
FIG. 8F as a plot depicting an example multilevel output voltage generated by superposition of output voltages from an array of modules under a pulse width modulation control technique.
Figure 8A:
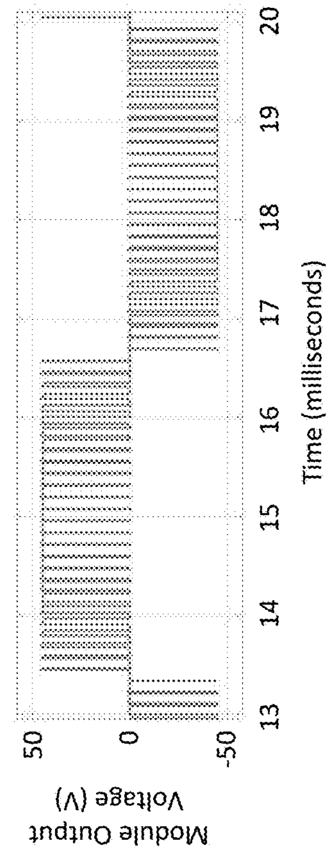
FIG. 8A is a plot depicting an example output voltage of a module.
Figure 8B:
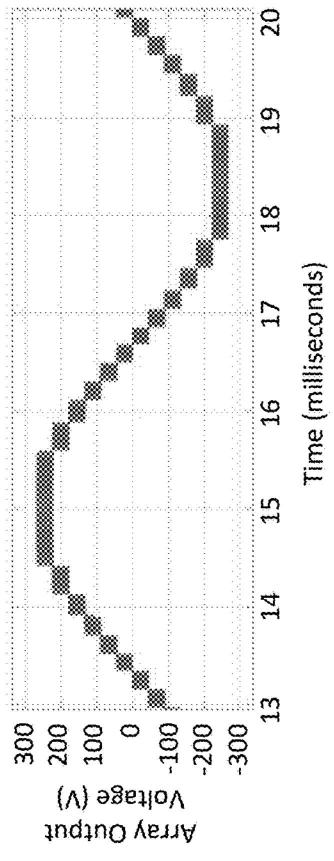
FIG. 8B is a plot depicting an example multilevel output voltage of an array of modules.

FIGS. 8C-8F are plots depicting an example embodiment of a phase-shifted PWM control methodology that can generate a multilevel output PWM waveform using incrementally shifted two-level waveforms. An X-level PWM waveform can be created by the summation of (X−1)/2 two-level PWM waveforms. These two-level waveforms can be generated by comparing a reference waveform Vref to carriers incrementally shifted by 360°/(X−1). The carriers are triangular, but the embodiments are not limited to such. A nine-level example is shown in FIG. 8C (using four modules 108). The carriers are incrementally shifted by 360°/(9−1)=45° and compared to Vref. The resulting two-level PWM waveforms are shown in FIG. 8E. These two-level waveforms may be used as the switching signals for semiconductor switches (e.g., S1 though S6) of converters 202. As an example with reference to FIG. 8E, for a one-dimensional array 700 including four modules 108 each with a converter 202, the 0° signal is for control of S3 and the 180° signal for S6 of the first module 108-1, the 45° signal is for S3 and the 225° signal for S6 of the second module 108-2, the 90 signal is for S3 and the 270 signal is for S6 of the third module 108-3, and the 135 signal is for S3 and the 315 signal is for S6 of the fourth module 108-4. The signal for S3 is complementary to S4 and the signal for S5 is complementary to S6 with sufficient dead-time to avoid shoot through of each half-bridge. FIG. 8F depicts an example single phase AC waveform produced by superposition (summation) of output voltages from the four modules 108.

An alternative is to utilize both a positive and a negative reference signal with the first (N−1)/2 carriers. A nine-level example is shown in FIG. 8D. In this example, the 0° to 135° switching signals (FIG. 8E) are generated by comparing +Vref to the 0° to 135° carriers of FIG. 8D and the 180° to 315° switching signals are generated by comparing −Vref to the 0° to 135° carriers of FIG. 8D. However, the logic of the comparison in the latter case is reversed. Other techniques such as a state machine decoder may also be used to generate gate signals for the switches of converter 202.

In multi-phase system embodiments, the same carriers can be used for each phase, or the set of carriers can be shifted as a whole for each phase. For example, in a three phase system with a single reference voltage (Vref), each array 700 can use the same number of carriers with the same relative offsets as shown in FIGS. 8C and 8D, but the carriers of the second phase are shift by 120 degrees as compared to the carriers of the first phase, and the carriers of the third phase are shifted by 240 degrees as compared to the carriers of the first phase. If a different reference voltage is available for each phase, then the phase information can be carried in the reference voltage and the same carriers can be used for each phase. In many cases the carrier frequencies will be fixed, but in some example embodiments, the carrier frequencies can be adjusted, which can help to reduce losses in EV motors under high current conditions.

The appropriate switching signals can be provided to each module by control system 102. For example, MCD 112 can provide Vref and the appropriate carrier signals to each LCD 114 depending upon the module or modules 108 that LCD 114 controls, and the LCD 114 can then generate the switching signals. Or all LCDs 114 in an array can be provided with all carrier signals and the LCD can select the appropriate carrier signals. In another example, LCD 114 can generate carrier signals, e.g., using a PWM controller as described below with reference to FIGS. 11A and 11B.

The relative utilizations of each module 108 can adjusted based on status information 160 to perform balancing or of one or more parameters as described herein. Balancing of parameters can involve adjusting utilization to minimize parameter divergence over time as compared to a system where individual module utilization adjustment is not performed. The utilization can be the relative amount of time a module 108 is discharging when system 100 is in a discharge state, or the relative amount of time a module 108 is charging when system 100 is in a charge state.

As described herein, modules 108 can be balanced with respect to other modules in an array 700, which can be referred to as intra array or intraphase balancing, and different arrays 700 can be balanced with respect to each other, which can be referred to as interarray or interphase balancing. Arrays 700 of different subsystems can also be balanced with respect to each other. Control system 102 can simultaneously perform any combination of intraphase balancing, interphase balancing, utilization of multiple energy sources within a module, active filtering, and auxiliary load supply.

Figure 9A:
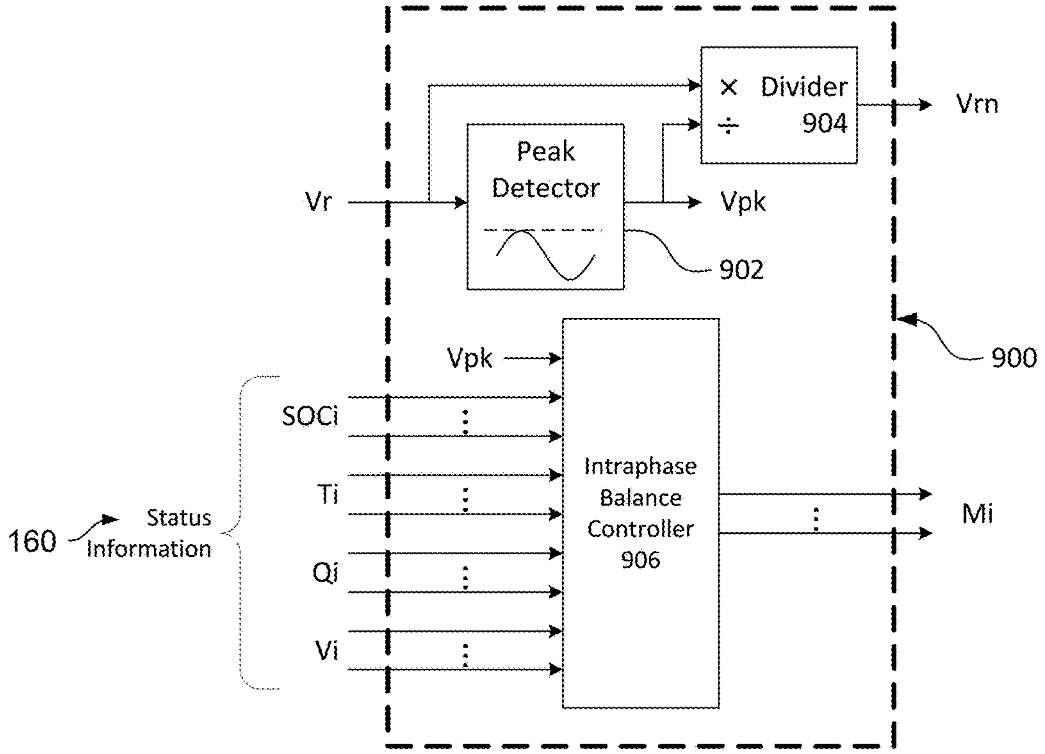
FIGS. 9A-9B are block diagrams depicting example embodiments of controllers for a modular energy system.

FIG. 9A is a block diagram depicting an example embodiment of an array controller 900 of control system 102 for a single-phase AC or DC array. Array controller 900 can include a peak detector 902, a divider 904, and an intraphase (or intra array) balance controller 906. Array controller 900 can receive a reference voltage waveform (Vr) and status information 160 about each of the N modules 108 in the array (e.g., state of charge (SOCi), temperature (Ti), capacity (Qi), and voltage (Vi)) as inputs, and generate a normalized reference signal, e.g., voltage waveform (Vrn), and modulation indexes (Mi) as outputs. Peak detector 902 detects the peak (Vpk) of Vr, which can be specific to the phase that controller 900 is operating with and/or balancing. Divider 904 generates Vrn by dividing Vr by its detected Vpk. Intraphase balance controller 906 uses Vpk along with the status information 160 (e.g., SOCi, Ti, Qi, Vi, etc.) to generate modulation indexes Mi for each module 108 within the array 700 being controlled.

The modulation indexes and Vrn can be used to generate the switching signals for each converter 202. The modulation index can be a number between zero and one (inclusive of zero and one). For a particular module 108, the normalized reference signal Vrn can be modulated or scaled by Mi, and this modulated reference signal (Vrnm) can be used as Vref (or −Vref) according to the PWM technique described with respect to FIGS. 8C-8F, or according to other techniques. In this manner, the modulation index can be used to control the PWM switching signals provided to the converter switching circuitry (e.g., S3-S6 or S1-S6), and thus regulate the operation of each module 108. For example, a module 108 being controlled to maintain normal or full operation may receive an Mi of one, while a module 108 being controlled to less than normal or full operation may receive an Mi less than one, and a module 108 controlled to cease power output may receive an Mi of zero. This operation can be performed in various ways by control system 102, such as by MCD 112 outputting Vrn and Mi to the appropriate LCDs 114 for modulation and switch signal generation, by MCD 112 performing modulation and outputting the modulated Vrnm to the appropriate LCDs 114 for switch signal generation, or by MCD 112 performing modulation and switch signal generation and outputting the switch signals to the LCDs or the converters 202 of each module 108 directly. Vrn can be sent continually with Mi sent at regular intervals, such as once for every period of the Vrn, or one per minute, etc.

Controller 906 can generate an Mi for each module 108 using any type or combination of types of status information 160 (e.g., SOC, temperature (T), Q, SOH, voltage, current) described herein. For example, when using SOC and T, a module 108 can have a relatively high Mi if SOC is relatively high and temperature is relatively low as compared to other modules 108 in array 700. If either SOC is relatively low or T is relatively high, then that module 108 can have a relatively low Mi, resulting in less utilization than other modules 108 in array 700. Controller 906 can determine Mi such that the sum of module voltages does not exceed Vpk. For example, Vpk can be the sum of the products of the voltage of each module's source 206 and Mi for that module (e.g., $Vpk=M_1V_1+M_2V_2+M_3V_3 \ldots +M_NV_N$, etc). A different combination of modulation indexes, and thus respective voltage contributions by the modules, may be used but the total generated voltage should remain the same.

Controller 900 can control operation, to the extent it does not prevent achieving the power output requirements of the system at any one time (e.g., such as during maximum acceleration of an EV), such that SOC of the energy source (s) in each module 108 remains balanced or converges to a balanced condition if they are unbalanced, and/or such that temperature of the energy source(s) or other component (e.g., energy buffer) in each module remains balanced or converges to a balanced condition if they are unbalanced. Power flow in and out of the modules can be regulated such that a capacity difference between sources does not cause an SOC deviation. Balancing of SOC and temperature can indirectly cause some balancing of SOH. Voltage and current can be directly balanced if desired, but in many embodiments the main goal of the system is to balance SOC and temperature, and balancing of SOC can lead to balance of voltage and current in a highly symmetric systems where modules are of similar capacity and impedance.

Since balancing all parameters may not be possible at the same time (e.g., balancing of one parameter may further unbalance another parameter), a combination of balancing any two or more parameters (SOC, T, Q, SOH, V, I) may be applied with priority given to either one depending on the requirements of the application. Priority in balancing can be given to SOC over other parameters (T, Q, SOH, V, I), with exceptions made if one of the other parameters (T, Q, SOH, V, I) reaches a severe unbalanced condition outside a threshold.

Figure 9B:
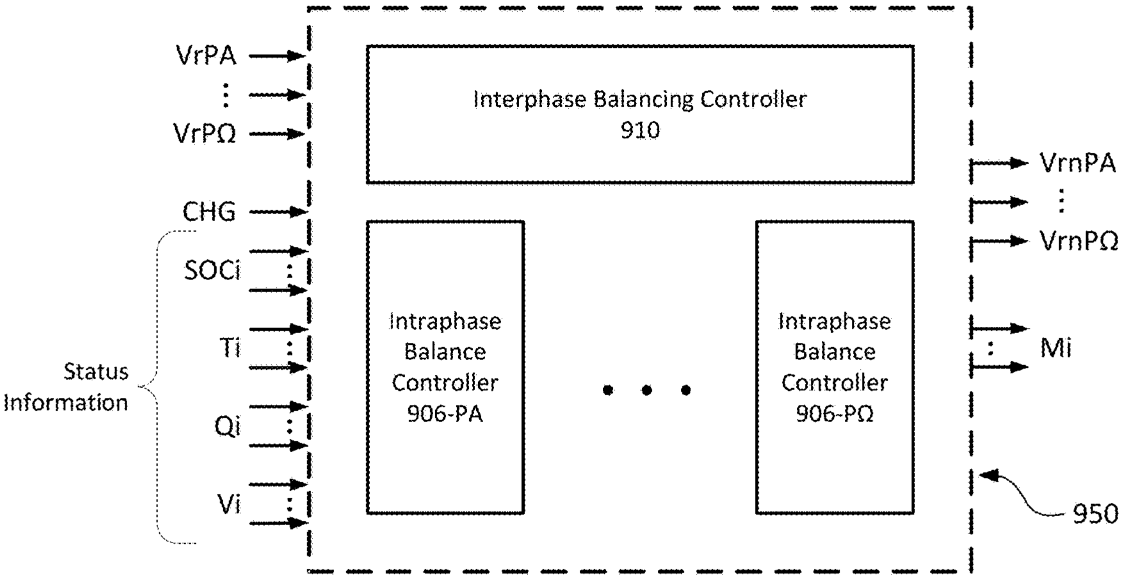

Balancing between arrays 700 of different phases (or arrays of the same phase, e.g., if parallel arrays are used) can be performed concurrently with intraphase balancing. FIG. 9B depicts an example embodiment of an Ω-phase (or Ω-array) controller 950 configured for operation in an Ω-phase system 100, having at least Ω arrays 700, where Ω is any integer greater than one. Controller 950 can include one interphase (or interarray) controller 910 and intraphase balance controllers 906-PA . . . 906-PΩ for phases PA through PΩ, as well as peak detector 902 and divider 904 (FIG. 9A) for generating normalized reference signals VrnPA through VrnPΩ from each phase-specific reference VrPA through VrPΩ. Intraphase controllers 906 can generate Mi for each module 108 of each array 700 as described with respect to FIG. 9A. Interphase balance controller 910 is configured or programmed to balance aspects of modules 108 across the entire multi-dimensional system, for example, between arrays of different phases. This may be achieved through injecting common mode to the phases (e.g., neutral point shifting) or through the use of interconnection modules (described herein) or through both. Common mode injection involves introducing a phase and amplitude shift to the reference signals VrPA through VrPΩ to generate normalized waveforms VrnPA through VrnPΩ to compensate for unbalance in one or more arrays, and is described further in Int'l. Appl. No. PCT/US20/25366 incorporated herein.

Controllers 900 and 950 (as well as balance controllers 906 and 910) can be implemented in hardware, software or a combination thereof within control system 102. Controllers 900 and 950 can be implemented within MCD 112, distributed partially or fully among LCDs 114, or may be implemented as discrete controllers independent of MCD 112 and LCDs 114.

Interconnection (IC) Module Examples

Modules 108 can be connected between the modules of different arrays 700 for the purposes of exchanging energy between the arrays, acting as a source for an auxiliary load, or both. Such modules are referred to herein as interconnection (IC) modules 108IC. IC module 108IC can be implemented in any of the already described module configurations (108A, 108B, 108C) and others to be described herein. IC modules 108IC can include any number of one or more energy sources, an optional energy buffer, switch circuitry for supplying energy to one or more arrays and/or for supplying power to one or more auxiliary loads, control circuitry (e.g., a local control device), and monitor circuitry for collecting status information 160 about the IC module itself or its various loads (e.g., SOC of an energy source, temperature of an energy source or energy buffer, capacity of an energy source, SOH of an energy source, voltage and/or current measurements pertaining to the IC module, voltage and/or current measurements pertaining to the auxiliary load(s), etc.).

Figure 10B:
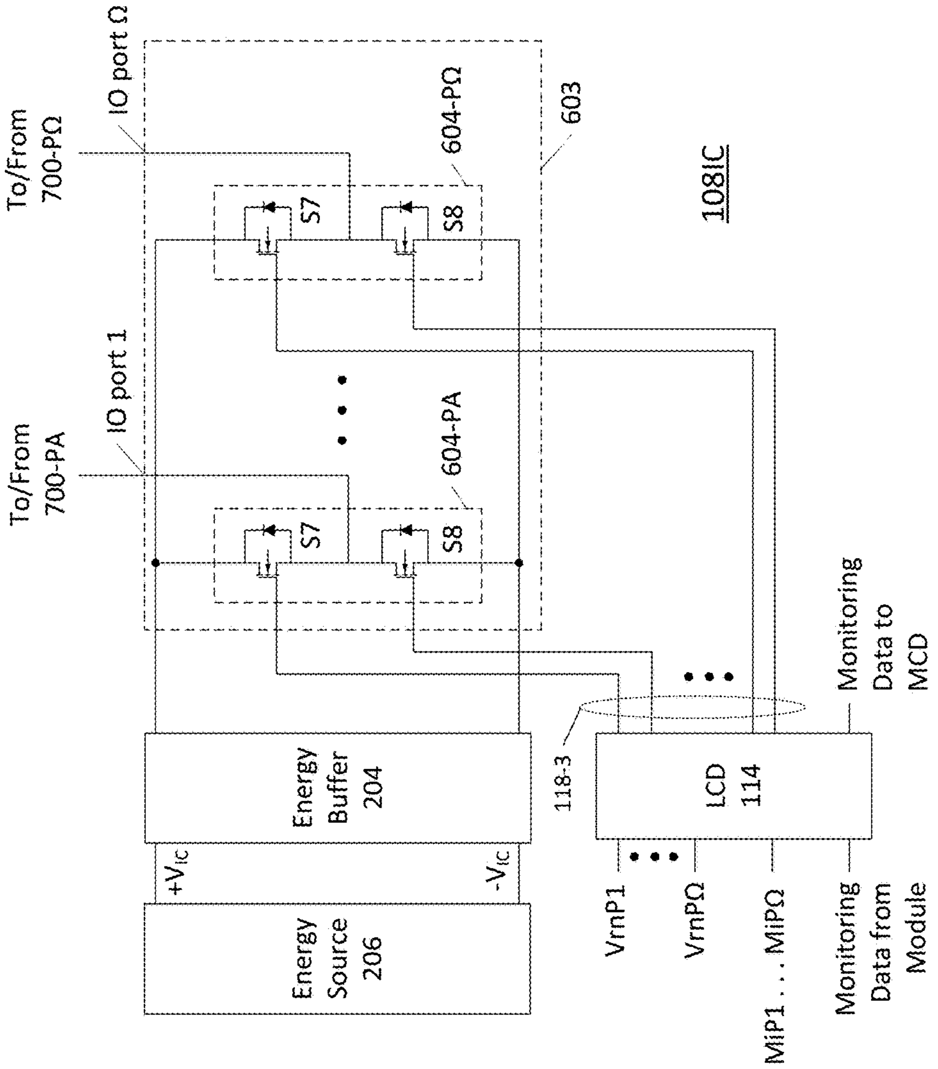
FIG. 10B is a schematic diagram depicting an example embodiment of an interconnection module in the multiphase embodiment of FIG. 10A.
Figure 10A:
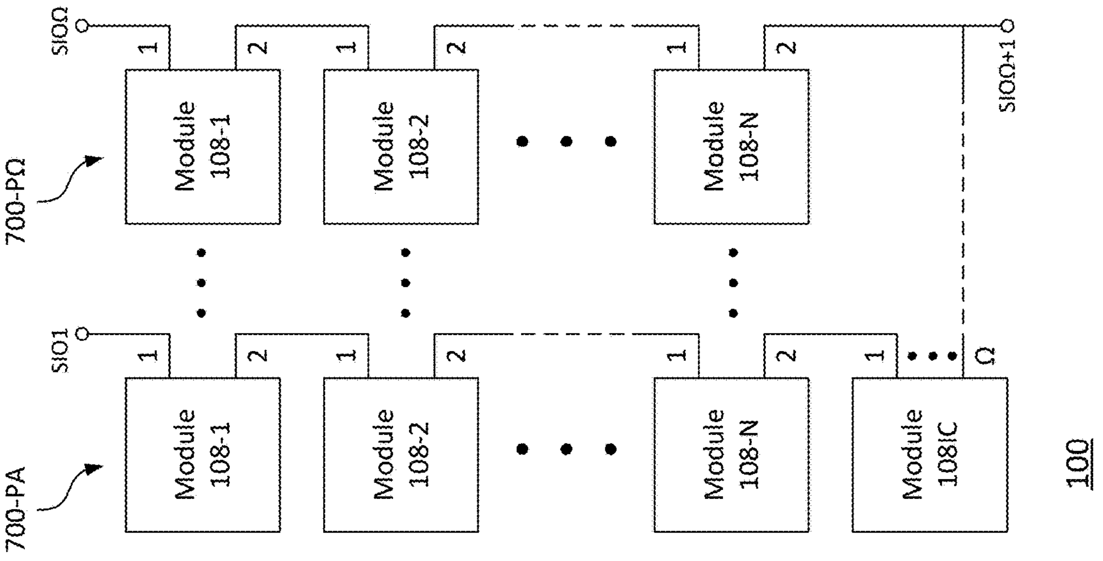
FIG. 10A is a block diagram depicting an example embodiment of a multiphase modular energy system having interconnection module.

FIG. 10A is a block diagram depicting an example embodiment of a system 100 capable of producing Ω-phase power with Ω arrays 700-PA through 700-PΩ, where Ω can be any integer greater than one. In this and other embodiments, IC module 108IC can be located on the rail side of arrays 700 such the arrays 700 to which module 108IC are connected (arrays 700-PA through 700-PΩ in this embodiment) are electrically connected between module 108IC and outputs (e.g., SIO1 through SIOΩ) to the load. Here, module 108IC has Ω IO ports for connection to IO port 2 of each module 108-N of arrays 700-PA through 700-PΩ. In the configuration depicted here, module 108IC can perform interphase balancing by selectively connecting the one or more energy sources of module 108IC to one or more of the arrays 700-PA through 700-PΩ (or to no output, or equally to all outputs, if interphase balancing is not required). System 100 can be controlled by control system 102 (not shown, see FIG. 1A).

FIG. 10B is a schematic diagram depicting an example embodiment of module 108IC. In this embodiment module 108IC includes an energy source 206 connected with energy buffer 204 that in turn is connected with switch circuitry 603. Switch circuitry 603 can include switch circuitry units 604-PA through 604-PΩ for independently connecting energy source 206 to each of arrays 700-PA through 700-PΩ, respectively. Various switch configurations can be used for each unit 604, which in this embodiment is configured as a half-bridge with two semiconductor switches S7 and S8. Each half bridge is controlled by control lines 118-3 from LCD 114. This configuration is similar to module 108A described with respect to FIG. 3A. As described with respect to converter 202, switch circuitry 603 can be configured in any arrangement and with any switch types (e.g., MOSFET, IGBT, Silicon, GaN, etc.) suitable for the requirements of the application.

Switch circuitry units 604 are coupled between positive and negative terminals of energy source 206 and have an output that is connected to an IO port of module 108IC. Units 604-PA through 604-PΩ can be controlled by control system 102 to selectively couple voltage $+V_{IC}$ or $-V_{IC}$ to the respective module I/O ports 1 through Ω. Control system 102 can control switch circuitry 603 according to any desired control technique, including the PWM and hysteresis techniques mentioned herein. Here, control circuitry 102 is implemented as LCD 114 and MCD 112 (not shown). LCD 114 can receive monitoring data or status information 160 from monitor circuitry of module 108IC. This monitoring data and/or other status information 160 derived from this monitoring data can be output to MCD 112 for use in system control as described herein. LCD 114 can also receive timing information (not shown) for purposes of synchronization of modules 108 of the system 100 and one or more carrier signals (not shown), such as the sawtooth signals used in PWM (FIGS. 8C-8D).

For interphase balancing, proportionally more energy from source 206 can be supplied to any one or more of arrays 700-PA through 700-PΩ that is relatively low on charge as compared to other arrays 700. Supply of this supplemental energy to a particular array 700 allows the energy output of those cascaded modules 108-1 thru 108-N in that array 700 to be reduced relative to the unsupplied phase array(s).

For example, in some example embodiments applying PWM, LCD 114 can be configured to receive the normalized voltage reference signal (Vrn) (from MCD 112) for each of the one or more arrays 700 that module 108IC is coupled to, e.g., VrnPA through VrnPΩ. LCD 114 can also receive modulation indexes MiPA through MiPΩ for the switch units 604-PA through 604-PΩ for each array 700, respectively, from MCD 112. LCD 114 can modulate (e.g., multiply) each respective Vrn with the modulation index for the switch section coupled directly to that array (e.g., VrnA multiplied by MiA) and then utilize a carrier signal to generate the control signal(s) for each switch unit 604. In other embodiments, MCD 112 can perform the modulation and output modulated voltage reference waveforms for each unit 604 directly to LCD 114 of module 108IC. In still other embodiments, all processing and modulation can occur by a single control entity that can output the control signals directly to each unit 604.

This switching can be modulated such that power from energy source 206 is supplied to the array(s) 700 at appropriate intervals and durations. Such methodology can be implemented in various ways.

Based on the collected status information 160 for system 100, such as the present capacity (Q) and SOC of each energy source in each array, MCD 112 can determine an aggregate charge for each array 700 (e.g., aggregate charge for an array can be determined as the sum of capacity times SOC for each module of that array). MCD 112 can determine whether a balanced or unbalanced condition exists (e.g., through the use of relative difference thresholds and other metrics described herein) and generate modulation indexes MiPA through MiPΩ accordingly for each switch unit 604-PA through 604-PQ.

During balanced operation, Mi for each switch unit 604 can be set at a value that causes the same or similar amount of net energy over time to be supplied by energy source 206 and/or energy buffer 204 to each array 700. For example, Mi for each switch unit 604 could be the same or similar, and can be set at a level or value that causes the module 108IC to perform a net or time average discharge of energy to the one or more arrays 700-PA through 700-PΩ during balanced operation, so as to drain module 108IC at the same rate as other modules 108 in system 100. In some embodiments, Mi for each unit 604 can be set at a level or value that does not cause a net or time average discharge of energy during balanced operation (causes a net energy discharge of zero). This can be useful if module 108IC has a lower aggregate charge than other modules in the system.

When an unbalanced condition occurs between arrays 700, then the modulation indexes of system 100 can be adjusted to cause convergence towards a balanced condition or to minimize further divergence. For example, control system 102 can cause module 108IC to discharge more to the array 700 with low charge than the others, and can also cause modules 108-1 through 108-N of that low array 700 to discharge relatively less (e.g., on a time average basis). The relative net energy contributed by module 108IC increases as compared to the modules 108-1 through 108-N of the array 700 being assisted, and also as compared to the amount of net energy module 108IC contributes to the other arrays. This can be accomplished by increasing Mi for the switch unit 604 supplying that low array 700, and by decreasing the modulation indexes of modules 108-1 through 108-N of the low array 700 in a manner that maintains Vout for that low array at the appropriate or required levels, and maintaining the modulation indexes for other switch units 604 supplying the other higher arrays relatively unchanged (or decreasing them).

The configuration of module 108IC in FIGS. 10A-10B can be used alone to provide interphase or interarray balancing for a single system, or can be used in combination with one or more other modules 108IC each having an energy source and one or more switch portions 604 coupled to one or more arrays. For example, a module 108IC with Ω switch portions 604 coupled with S2 different arrays 700 can be combined with a second module 108IC having one switch portion 604 coupled with one array 700 such that the two modules combine to service a system 100 having Ω+1 arrays 700. Any number of modules 108IC can be combined in this fashion, each coupled with one or more arrays 700 of system 100.

Figure 10C:
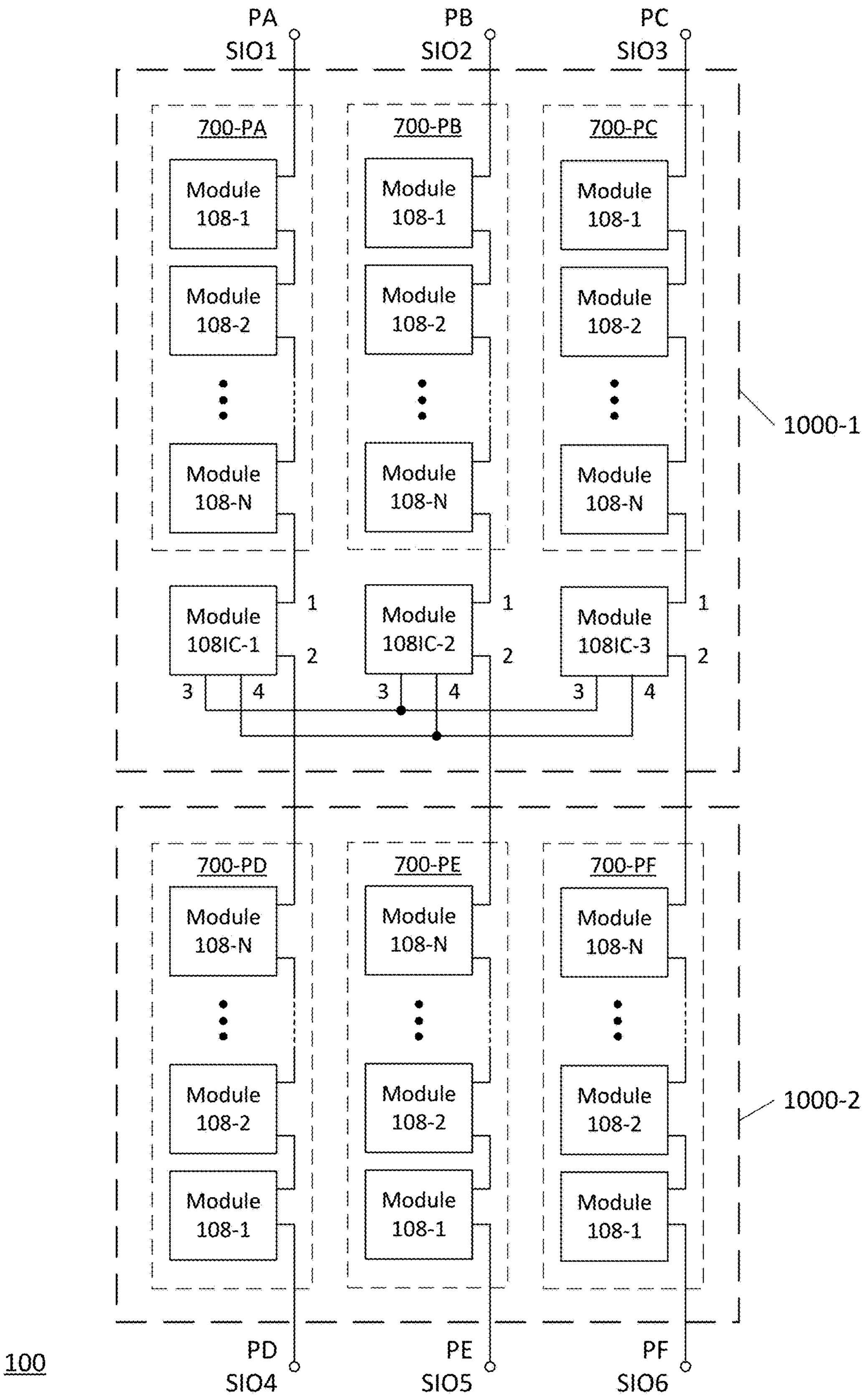
FIG. 10C is a block diagram depicting an example embodiment of a modular energy system having two subsystems connected together by interconnection modules.

Furthermore, IC modules can be configured to exchange energy between two or more subsystems of system 100. FIG. 10C is a block diagram depicting an example embodiment of system 100 with a first subsystem 1000-1 and a second subsystem 1000-2 interconnected by IC modules. Specifically, subsystem 1000-1 is configured to supply three-phase power, PA, PB, and PC, to a first load (not shown) by way of system I/O ports SIO1, SIO2, and SIO3, while subsystem 1000-2 is configured to supply three-phase power PD, PE, and PF to a second load (not shown) by way of system I/O ports SIO4, SIO5, and SIO06, respectively. For example, subsystems 1000-1 and 1000-2 can be configured as different packs supplying power for different motors of an EV or as different racks supplying power for different microgrids.

In this embodiment each module 108IC is coupled with a first array of subsystem 1000-1 (via IO port 1) and a first array of subsystem 1000-2 (via IO port 2), and each module 108IC can be electrically connected with each other module 108IC by way of I/O ports 3 and 4, which are coupled with the energy source 206 of each module 108IC as described with respect to module 108C of FIG. 3C. This connection places sources 206 of modules 108IC-1, 108IC-2, and 108IC-3 in parallel, and thus the energy stored and supplied by modules 108IC is pooled together by this parallel arrangement. Other arrangements such as serious connections can also be used. Modules 108IC are housed within a common enclosure of subsystem 1000-1, however the interconnection modules can be external to the common enclosure and physically located as independent entities between the common enclosures of both subsystems 1000.

Each module 108IC has a switch unit 604-1 coupled with IO port 1 and a switch unit 604-2 coupled with I/O port 2, as described with respect to FIG. 10B. Thus, for balancing between subsystems 1000 (e.g., inter-pack or inter-rack balancing), a particular module 108IC can supply relatively more energy to either or both of the two arrays to which it is connected (e.g., module 108IC-1 can supply to array 700-PA and/or array 700-PD). The control circuitry can monitor relative parameters (e.g., SOC and temperature) of the arrays of the different subsystems and adjust the energy output of the IC modules to compensate for imbalances between arrays or phases of different subsystems in the same manner described herein as compensating for imbalances between two arrays of the same rack or pack. Because all three modules 108IC are in parallel, energy can be efficiently exchanged between any and all arrays of system 100. In this embodiment, each module 108IC supplies two arrays 700, but other configurations can be used including a single IC module for all arrays of system 100 and a configuration with one dedicated IC module for each array 700 (e.g., six IC modules for six arrays, where each IC module has one switch unit 604). In all cases with multiple IC modules, the energy sources can be coupled together in parallel so as to share energy as described herein.

In systems with IC modules between phases, interphase balancing can also be performed by neutral point shifting (or common mode injection) as described above. Such a combination allows for more robust and flexible balancing under a wider range of operating conditions. System 100 can determine the appropriate circumstances under which to perform interphase balancing with neutral point shifting alone, interphase energy injection alone, or a combination of both simultaneously.

Figure 10D:
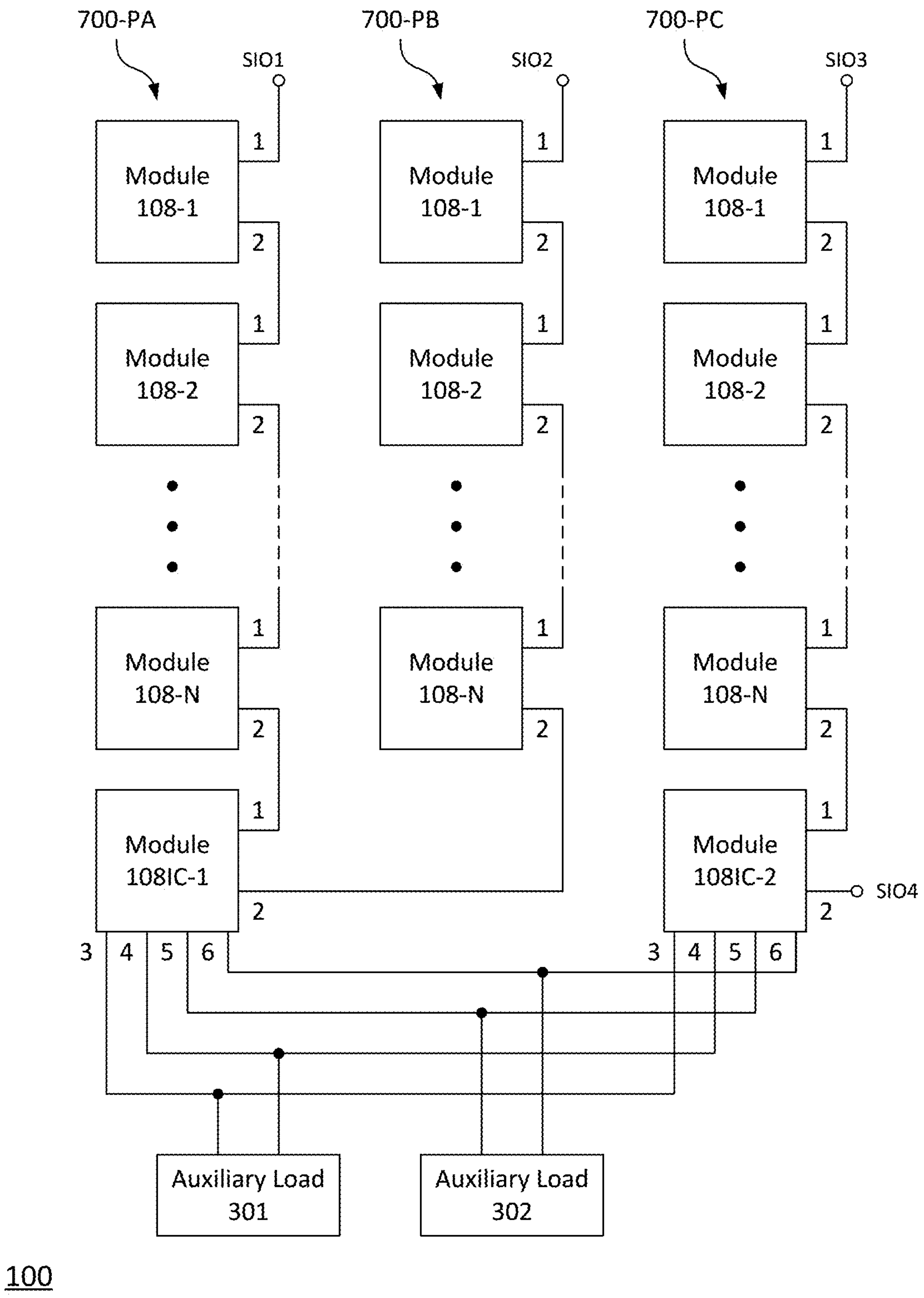
FIG. 10D is a block diagram depicting an example embodiment of a three-phase modular energy system having interconnection modules supplying auxiliary loads.
Figure 10E:
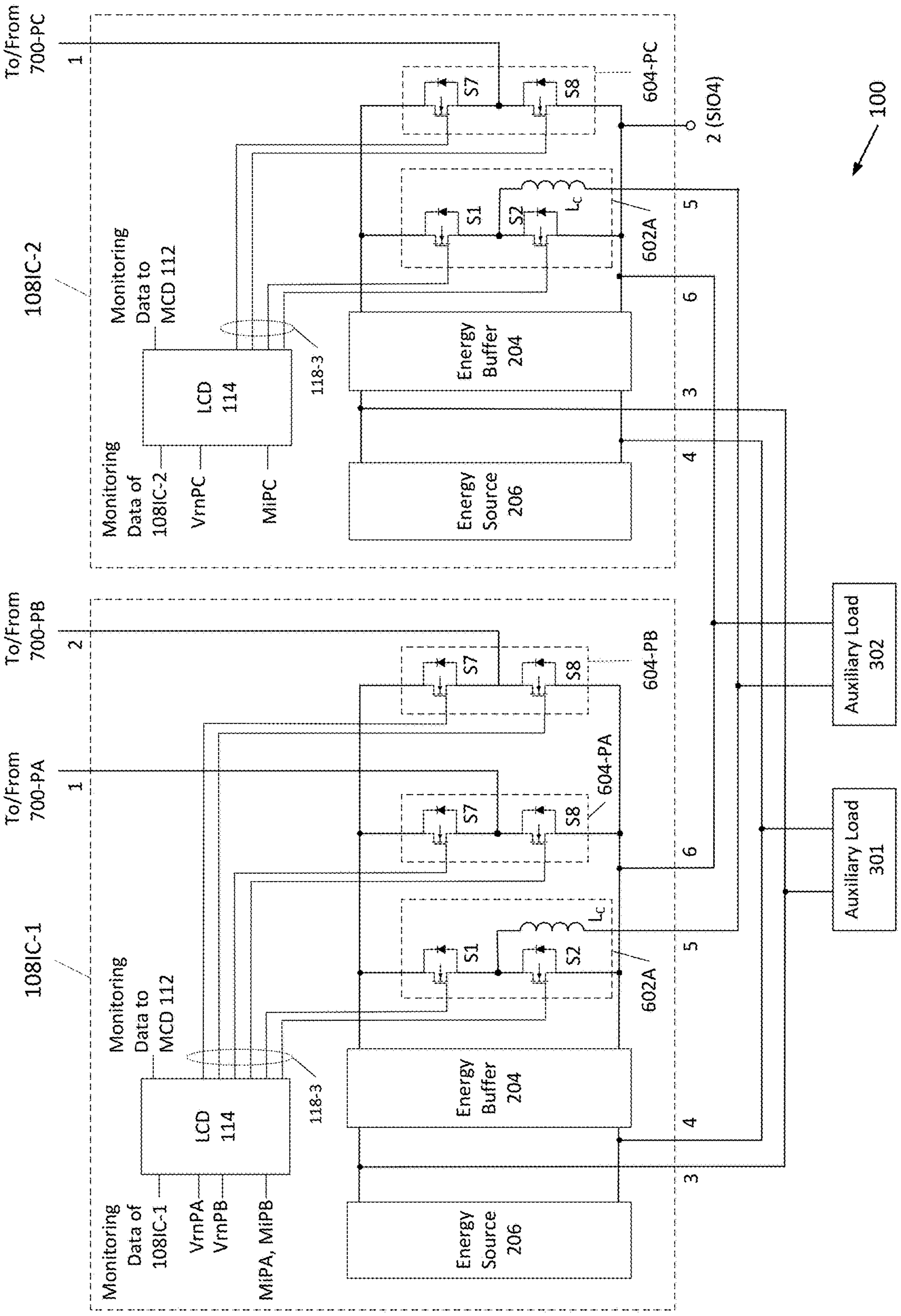
FIG. 10E is a schematic view depicting an example embodiment of the interconnection modules in the multiphase embodiment of FIG. 10D.

IC modules can also be configured to supply power to one or more auxiliary loads 301 (at the same voltage as source 206) and/or one or more auxiliary loads 302 (at voltages stepped down from source 302). FIG. 10D is a block diagram depicting an example embodiment of a three-phase system 100 A with two modules 108IC connected to perform interphase balancing and to supply auxiliary loads 301 and 302. FIG. 10E is a schematic diagram depicting this example embodiment of system 100 with emphasis on modules 108IC-1 and 108IC-2. Here, control circuitry 102 is again implemented as LCD 114 and MCD 112 (not shown). The LCDs 114 can receive monitoring data from modules 108IC (e.g., SOC of ES1, temperature of ES1, Q of ES1, voltage of auxiliary loads 301 and 302, etc.) and can output this and/or other monitoring data to MCD 112 for use in system control as described herein. Each module 108IC can include a switch portion 602A (or 602B described with respect to FIG. 6C) for each load 302 being supplied by that module, and each switch portion 602 can be controlled to maintain the requisite voltage level for load 302 by LCD 114 either independently or based on control input from MCD 112. In this embodiment, each module 108IC includes a switch portion 602A connected together to supply the one load 302, although such is not required.

Figure 10F:
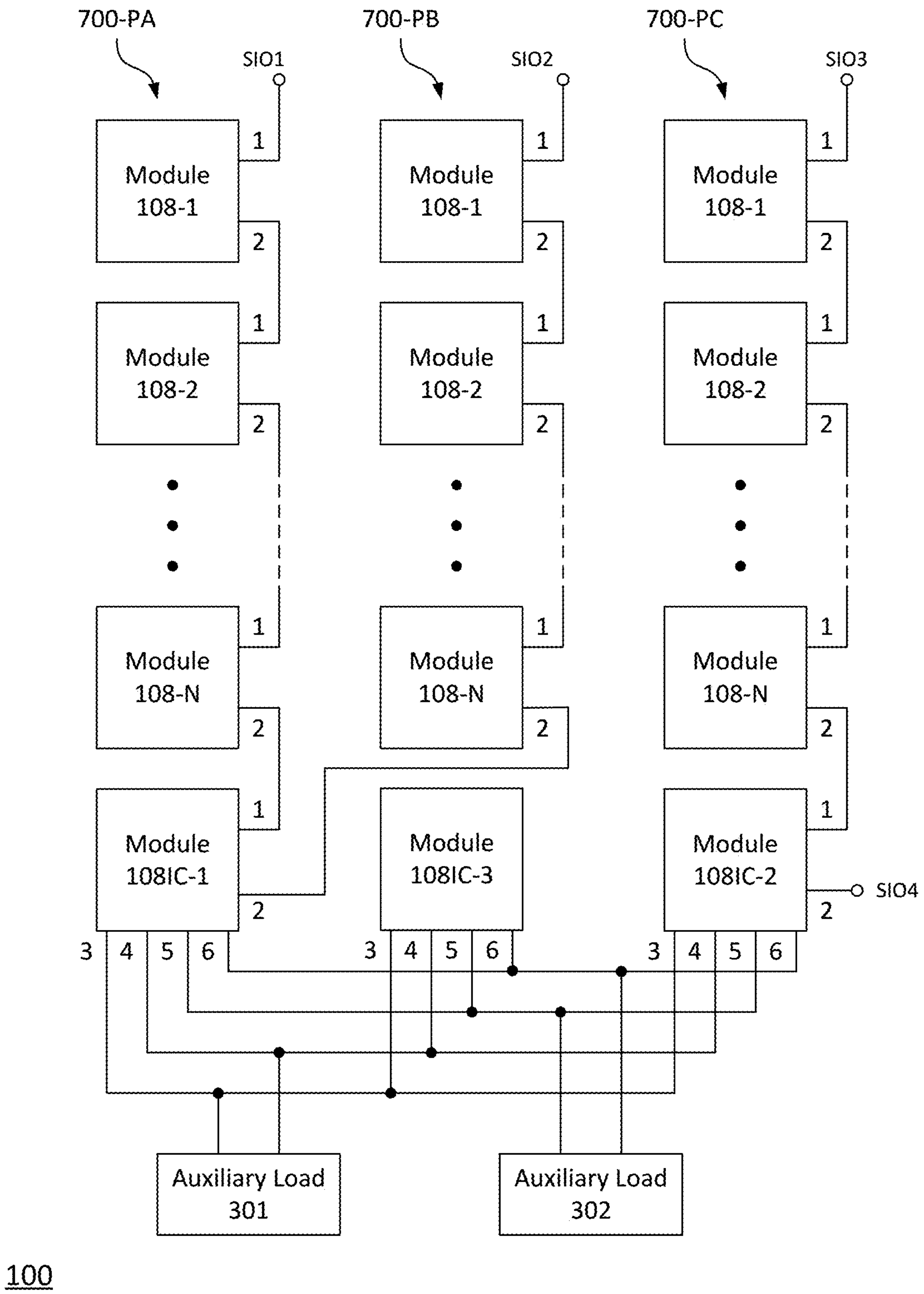
FIG. 10F is a block diagram depicting another example embodiment of a three-phase modular energy system having interconnection modules supplying auxiliary loads.

FIG. 10F is a block diagram depicting another example embodiment of a three-phase system configured to supply power to one or more auxiliary loads 301 and 302 with modules 108IC-1, 108IC-2, and 108IC-3. In this embodiment, modules 108IC-1 and 108IC-2 are configured in the same manner as described with respect to FIGS. 10D-10E. Module 108IC-3 is configured in a purely auxiliary role and does not actively inject voltage or current into any array 700 of system 100. In this embodiment, module 108IC-3 can be configured like module 108C of FIG. 3B, having a converter 202B,C (FIGS. 6B-6C) with one or more auxiliary switch portions 602A, but omitting switch portion 601. As such, the one or more energy sources 206 of module 108IC-3 are interconnected in parallel with those of modules 108IC-1 and 108IC-2, and thus this embodiment of system 100 is configured with additional energy for supplying auxiliary loads 301 and 302, and for maintaining charge on the sources 206A of modules 108IC-1 and 108IC-2 through the parallel connection with the source 206 of module 108IC-3.

The energy source 206 of each IC module can be at the same voltage and capacity as the sources 206 of the other modules 108-1 through 108-N of the system, although such is not required. For example, a relatively higher capacity can be desirable in an embodiment where one module 108IC applies energy to multiple arrays 700 (FIG. 10A) to allow the IC module to discharge at the same rate as the modules of the phase arrays themselves. If the module 108IC is also supplying an auxiliary load, then an even greater capacity may be desired so as to permit the IC module to both supply the auxiliary load and discharge at relatively the same rate as the other modules.

Second Life Energy Source Examples

Energy sources 206 described herein can be used in systems 100 described herein in both first life and second life applications. A first life of a source 206 is an original application in which source 206 is used. For example, the first life application is the first implementation in which sources 206 are put to use by the first customer of sources 206 after their original manufacture (and not refurbishment). The user of sources 206 in their first life will typically have received sources 206 from the manufacturer, distributor, or original equipment manufacturer (OEM). Batteries 206 used in a first life application will typically have the same electrochemistry (e.g., will have the same variant of lithium ion electrochemistry (e.g., LFP, NMC)) and will have the same nominal voltage and will have a capacity variation across the pack or system that is minimal (e.g., 5% or less). Use of an energy storage system with batteries 206 in their first life application will result in batteries 206 having a longer lifespan in that first life application, and upon removal from that first life application, the batteries 206 will be more similar in terms of capacity degradation than batteries from a first life application not using the energy storage system.

As used herein, a "second life" application refers to any application or implementation after the first life application (e.g., a second implementation, third implementation, fourth implementation, etc.) of source 206. A second life energy source refers to any energy source (e.g., battery or HED capacitor) implemented in that source's second life application.

An example of a first life application for batteries 206 is within an energy storage system for an EV. Then, at the end of that life (e.g., after 100,000 miles of driving, or after degradation of the batteries within that battery pack by a threshold amount), the batteries 206 can be removed from the battery pack, optionally subjected to refurbishing and testing, and then implemented in a second life application that can be, e.g., used within a stationary energy storage system (e.g., residential, commercial, or industrial energy buffering, EV charging station energy buffering, renewable source (e.g., wind, solar, hydroelectric), energy buffering, and the like) or another mobile energy storage system (e.g., battery pack for an electric car, bus, train, or truck). Similarly, the first life application can be a first stationary application and the second life application can be a stationary or mobile application.

For the second life application, sources 206 can be selected and/or utilized by system 100 to minimize (or at least reduce) any differences in initial capacity and nominal voltage. For example, sources 206 having a capacity difference of 5% or more can be included within system 100 and operated to provide energy for a load. In another example, an operator or automated system can select sources 206 for system 100 that have a capacity difference within a threshold amount, e.g., to reduce the initial capacity differences between sources of system 206. If modules 108 are compatible with both the first and second life application (e.g., with or without reconfiguration), modules 108 can be selected for the second life application based on the capacity difference of sources 206 of modules 108.

System 100 can adjust utilization of each source 206 individually such that sources 206 within system 100 or packs of system 100 are relatively balanced in terms of SOC or total charge (SOC times capacity) as the pack or system 100 is discharged, even though the sources 206 in system 100 can have widely varying capacities. Similarly, system 100 can maintain balance as the pack or system 100 is charged. Sources 206 can vary not only in terms of capacity but also in nominal voltage, power rating, electrochemical type (e.g., a combination of LFP and NMC batteries) and the like. Thus, system 100 can be used such that all modules 206 within system 100 or each pack of system 100 are second life energy sources (or such that a combination of first life and second life energy sources are used), having various combinations of different characteristics.

In one example, system 100 can include second life energy sources 206 (and optionally one or more first life energy sources 206) having energy capacity variations of 2% or more, 5% or more, 10% or more, 15% or more, 20% or more, or 25% or more, 30% or more, 5-30%, 10-30%, and/or 20-30%.

In another example, system 100 can include second energy life sources 206 (and optionally one or more first life energy sources 206) having energy capacity per mass density variations of 2% or more, 5% or more, 10% or more, 15% or more, 20% or more, or 25% or more, 30% or more, 5-30%, 10-30%, and/or 20-30%.

In another example, system 100 can include second life energy sources 206 (and optionally one or more first life energy sources 206) having peak power per mass density variations of 2% or more, 5% or more, 10% or more, 15% or more, 20% or more, or 25% or more, 30% or more, 5-30%, 10-30%, and/or 20-30%.

In another example, system 100 can include second life energy sources 206 (and optionally one or more first life energy sources 206) having nominal voltage variations of 2% or more, 5% or more, 10% or more, 15% or more, 20% or more, or 25% or more, 30% or more, 5-30%, 10-30%, and/or 20-30%.

In another example, system 100 can include second life energy sources 206 (and optionally one or more first life energy sources 206) having operating voltage range variations of 2% or more, 5% or more, 10% or more, 15% or more, 20% or more, or 25% or more, 30% or more, 5-30%, 10-30%, and/or 20-30%.

In another example, system 100 can include second life energy sources 206 (and optionally one or more first life energy sources 206) having maximum specified current rise time variations of 2% or more, 5% or more, 10% or more, 15% or more, 20% or more, or 25% or more, 30% or more, 5-30%, 10-30%, and/or 20-30%.

In another example, system 100 can include second life energy sources 206 (and optionally one or more first life energy sources 206) having specified peak current variations of 2% or more, 5% or more, 10% or more, 15% or more, 20% or more, or 25% or more, 30% or more, 5-30%, 10-30%, and/or 20-30%.

A variation of X % (e.g., 5% or more, or 5 to 30%) can be met by a variation between the module 108 having the highest value for that parameter and the module 108 having the lowest value for that parameter within system 100. For example, a variation of 5% or more in capacity can be met by a system 100 where the module 108 with the lowest capacity source 206 has a capacity that is 95% or less than that of the module 108 with the highest capacity source 206.

For each and every embodiment and parameter disclosed herein, the time at which the system 100 having one or more second life sources satisfies the X % variation condition in that parameter can be at installation of the system 100, at commissioning of the system 100, after replacement of one source 206 with another source 206, after operation of system 100 for 10 hours or more, after operation of system 100 for 100 hours or more, after operation of system 100 for 1000 hours or more, and/or after operation of system 100 for 10,000 hours or more. For example, a variation of capacity of 5% or more can occur after system 100 is operated for 1000 hours, even though the variation in capacity was not present at the time of commissioning. This reflects the capability of the embodiments of system 100 to continue to operate with and account for capacity differences between sources 206 that grow over time of operation.

In another example, system 100 can include second life energy sources 206 (and optionally one or more first life energy sources 206) having variations of electrochemical type (e.g., lithium ion batteries with non-lithium ion batteries, or different lithium ion batteries (e.g., any combination of NMC, LFP, LTO, or other lithium ion battery types).

System 100 can include second life energy sources 206 (and optionally one or more first life energy sources 206) having any combination of the characteristics provides in the preceding examples.

Figure 11A:
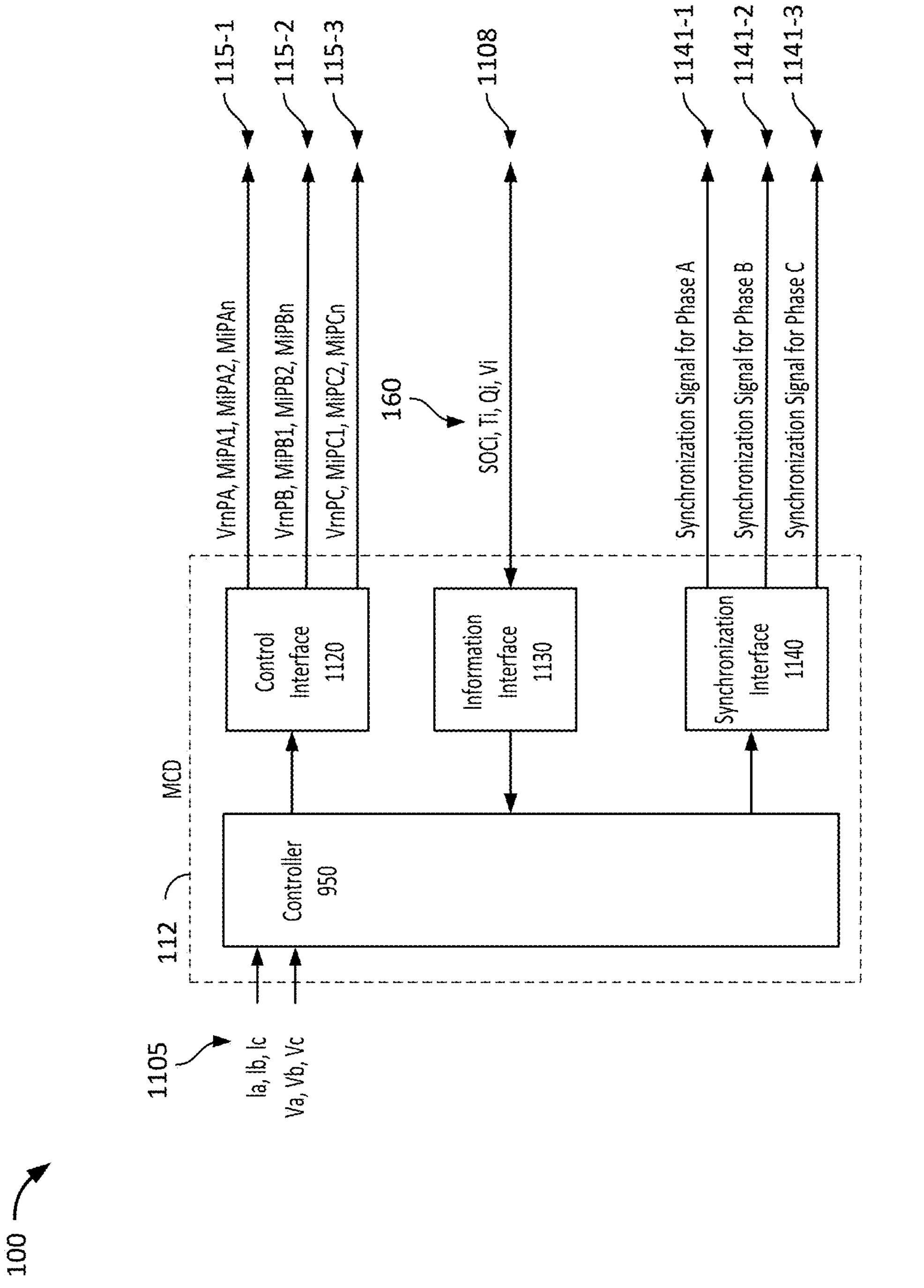
FIGS. 11A-11B are block diagrams depicting an example embodiment of a modular energy system having communication paths that connect a master control device to local control devices.
Figure 11B:
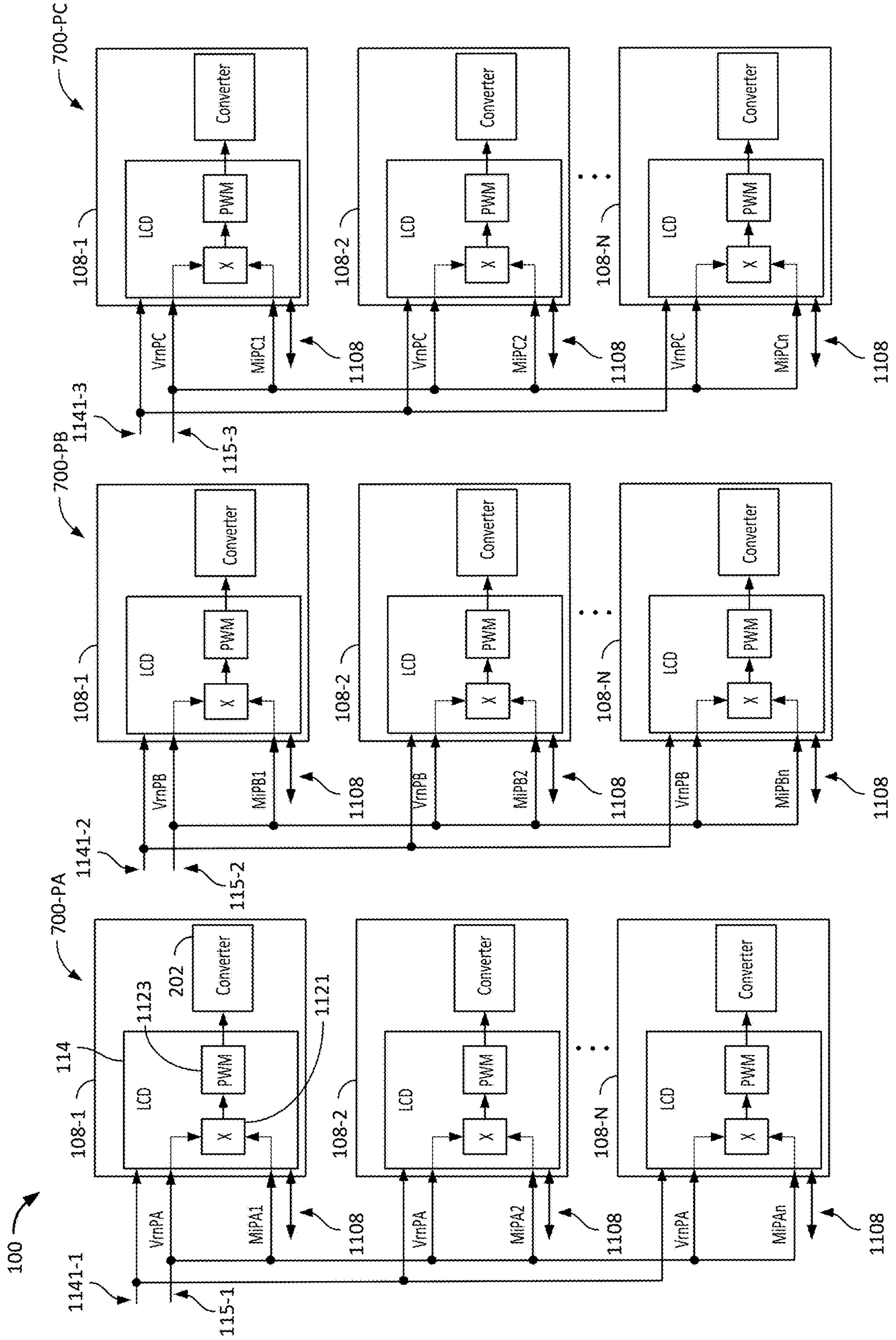

Examples of Communication Interfaces and Control Techniques in Cascaded Energy Systems FIGS. 11A-11B are block diagrams depicting an example embodiment of a modular energy system 100 having communication paths 115 that connect an MCD 112 to LCDs 114 of modules 108 (e.g., modules 108-1 to 108-N of arrays 700-PA-700-PC). In general, MCD 112 sends control information to LCDs 114 over communication path 115. As described in more detail below, MCD 112 and LCDs 114 can include communication interfaces that enable the MCD 112 and LCDs 114 to communicate over the communication path 115. For example, MCD 112 includes a control interface 1120 for communicating control information to LCDs 114 over communication paths 115-1 to 115-3, an information interface 1130 communicating information, e.g., status information 160, to and from LCDs 114 over a communication path 108, and a synchronization interface 1140 for sending synchronization signals to LCDs 114 over communication paths or links 1141-1 to 1141-3.

LCDs 114 use (e.g., receive and process) the control information to generate switch signals that control operation of one or more components (e.g., a power converter 202) within module 108. Although LCDs 114 are shown in FIG. 11B as being part of modules 108, each LCD 114 can be communicably coupled with one or more modules 108 as described above. In this example, modules 108 are arranged in three arrays 700-PA, 700-PB, and 700-PC of cascaded modules 108. Arrays 700-PA, 700-PB, and 700-PC can each generate a single-phase AC signal, where the three AC signals have different phase angles PA, PB, PC (e.g., 120 degrees apart for three phase AC output) for phases A, B, and C. For example, array 700-PA can generate a single-phase AC signal for phase A, array 700-PB can generate a single-phase AC signal for phase B, and array 700-PC can generate a single-phase signal for phase C. Each array 700-PA, 700-PB, and 700-PC includes a number "N" modules 108, which can be the same or different for arrays 700-PA, 700-PB, and 700-PC.

MCD 112 includes a controller 950. Controller 950 can include an interphase (or interarray) controller 910 (FIG. 9B) and an intraphase balance controller 906 (FIG. 9B) for each of phases A, B, and C, as well as peak detector 902 and divider 904 (FIG. 9A). The controller 950 is configured to receive one or more references signals 1105, e.g., a reference voltage for each phase (e.g., Va, Vb, and Vc) and/or a reference current for each phase (e.g., Ia, Ib, and Ic) and status information 160. The controller 150 is also configured to generate, based on the reference signals 1105 and status information 160, normalized reference signals VrnPA through VrnP from each phase-specific reference VrPA through VrPC. Each intraphase controller 906 of the controller 150 can also generate, based on the reference signals 1105 and the status information 160, a modulation index Mi for each module 108 of an array 700 of system 100. For example, an intraphase controller 906-PA can generate MiPA1-MiPAn for modules 108-1 to 108-*n* of array 700-PA; an intraphase controller 906-PB can generate MiPB1-MiPBn for modules 108-1 to 108-*n* of array 700-PA; and an intraphase controller 906-PC can generate MiPC1-MiPCn for modules 108-1 to 108-*n* of array 700-PC.

Although shown as reference voltage waveforms, the normalized reference signals VrnPA, VrnPB, and VrnPC output by the controller 950 includes either a reference current or a reference voltage for each of the three phases, e.g., reference current waveforms or reference voltage waveforms, depending on the mode of operation of system 100. For example, when system 100 is in a grid connected mode such that converters 202 of modules 108 of system 100 are connected to the grid and works like a current source, converters 202 of system 100 generate an output AC signal having a same voltage level, frequency, and phase of the grid. In the grid connected mode, the reference signals 1105 can include a reference current that is based on the current waveform of the grid, or data representing the characteristics (e.g., phase, frequency, magnitude, etc.) of the current waveform. When the system 100 is in a grid independent (e.g., grid islanding) mode, system 100 can work as a voltage source and converters 202 of system 110 can generate an output AC signal having the last known voltage level, frequency, and phase of the grid before the grid was disconnected. In the grid independent mode, the reference signals 1105 can include a reference voltage that is based on these characteristics. Each normalized reference signal VrnPA, VrnPB, and VrnPC represents a reference voltage waveform or current waveform that an array 700-PA, 700-PB, and 700-PC, respectively, that includes the modules 108 will mimic with the generated AC output signal, e.g., but at a higher voltage or current level.

As described above, module 108 can use a reference signal as Vref (or −Vref) according to the PWM technique described with respect to FIGS. 8C-8F, or according to other techniques. The controller 950 can generate a normalized reference signal for each array 700 and a modulation index Mi for each module 108 of each array 700. In this example, when system 100 is being used for multiphase operation (e.g., split-phase, three-phase, and so on), the controller 950 is configured to perform interphase balancing (e.g., in addition to intraphase balancing) by scaling (e.g., scale up or scale down) the normalized reference signals independently for each phase. In single phase implementations in which system includes a single array 700, controller 900 can be used to generate the normalized reference signal for array 700 using a peak detector 902 and divider 904 and to generate a modulation index Mi for each module in array 700 using an intraphase balance controller 906, as described above.

For each phase A, B, and C, the MCD 112 sends the same normalized reference signal to LCD 114 of each module 108 in the array 700 for that phase. That is, MCD 112 can send normalized reference signal VrnPA to LCDs 114 of modules 108 in array 700-PA; MCD 112 can send normalized reference signal VrnPB to LCDs 114 of modules 108 of array 700-PB; and MCD 112 can send normalized reference signal VrnPC to LCDs 114 of modules 108 of array 700-PC.

In some implementations, for each phase A, B, and C, MCD 112 also sends the modulation index Mi for each module 108 in the array 700 for the phase to LCD 114 of each module 108 in the array 700 for that phase. That is, MCD 112 can send the modulation index MiPA1 for module 108-1 of array 700-PA to LCDs 114 for modules 108-1 to 108-N of array 700-PA; MCD 112 can send the modulation index MiPA2 for module 108-2 of array 700-PA to LCDs 114 for modules 108-1 to 108-N of array 700-PA; and MCD 112 can send the modulation index MiPA1 for module 108-N of array 700-PA to LCDs 114 for modules 108-1 to 108-N of array 700-PA.

System 100 can include a respective communication path 115-1, 115-2, and 115-3 for each array 700-PA, 700-PB, and 700-PC, respectively. MCD 112 can use control interface 1120 to send control information that includes the normalized reference signals Vrn and the modulation indexes Mi to modules 108 of an array 700 over communication path 115 for array 700. For example, MCD 112 can send, to each LCD 114 of each module 108-1 through 108-N of array 700-PA, control information that includes normalized reference signal VrnPA and modulation indexes MiPA1 (for module 108-1), MiPA2 (for module 108-2), through MiPAn (for module 108-N) over a respective communication path 115-1 through 115-*n* that connects MCD 112 to LCDs 114 of these modules 108.

In some implementations, each communication path 115 is a serial or parallel path that is configured to provide one-way communication from MCD 112 to LCD 114 of each module 108 of the array, e.g., array 700-PA, 700-PB, or 700-PC. In some implementations, each communication path 115 is a serial or parallel bidirectional path that enables two-way communication between MCD 112 and LCD 114 of each module 108 in the array, e.g., array 700-PA, 700-PB, or 700-PC. In some implementations, the communication path 115 can be connected in a daisy chain, star network topology, mesh topology, or in another appropriate configuration.

Communication path 115 can include an RS-485 physical layer and control interface 1120 of MCD 112 and corresponding control interfaces 1742 (FIG. 17) of LCDs 114 can include a differential half-duplex serial synchronized interface. In this example, communication path 115 can include twisted pair wiring that connects control interface 1120 of MCD 112 to control interfaces 1742 of LCDs 114 of each array 700-PA, 700-PB, and 700-PC. Communication path 115 can be a uni-directional time deterministic communication path having a data sample time that is a factor of the carry frequency of each module's PWM signal. Other appropriate paths can also be used. Being time deterministic means that the control information data elements sent over the communication path 115 are sent according to a defined time period. That is, the data sample time is constant and the time between successive communication data elements can be constant such that each LCD 114 has access to the time at which each control information data element will arrive.

Each module 108 can have, e.g., be assigned, an identifier. The identifier for a module 108 enables MCD 112 to distinguish each module 108 from each other module 108 and to specify which modulation index is for which module 108. Each module 108 in an array, e.g., array 700-PA, 700-PB, or 700-PC, can have an identifier that is unique to module 108 relative to the other modules in the array. For example, the identifiers for the modules 108 of array 700-PA can all be unique within a particular implemented system such that they are different from each other.

In some implementations, MCD 112 sends the control information to the modules 108 of an array, e.g., array 700-PA, 700-PB, or 700-PC, in the form of data elements that include, e.g., that encode, the control information. These control information data elements can be in the form of one or more data packets per control information data element or a data frame for each control information data element. Each control information data element for an array 700 of modules 108 can include the normalized reference signal Vrn for modules 108 (e.g., all modules 108) of array 700, a modulation index Mi for one of the modules 108 of array 700, and the identifier for the one module 108 of array 700. In other examples, the control information data element can include the modulation index Mi and the identifier for multiple modules 108 in array 700. However, MCD 112 can send updated reference signals to modules 108 in array 700 faster if less data (e.g., fewer modulation indexes and identifiers) is sent in each control information data element.

MCD 112 can periodically, e.g., based on a specified time period, send the control information data elements to LCDs 114 of modules 108 of an array, e.g., array 700-PA, 700-PB, or 700-PC, according to a sequence that defines an order of modules 108 for which an updated modulation index is sent to modules 108. For example, if the sequence for array 700-PA is module 108-1, module 108-2, and so on to 108-N, MCD 112 can send, to all modules 108-1 to 108-N of array 700-PA, a first control information data element that includes normalized reference signal VrnPA for all modules 108-1 to 108-N in array 700-PA, modulation index MiPA1 for module 108-1, and the identifier for module 108-1. Next, MCD 112 can send, to all modules 108-1 to 108-N of array 700-PA, a second control information data element that includes normalized reference signal VrnPA for all modules 108-1 to 108-N in array 700-PA, modulation index MiPA2 for module 108-2, and the identifier for module 108-2. After reaching module 108-N in the sequence and sending a control information data element that includes the normalized reference signal VrnPA for all modules 108-1 to 108-N in array 700-PA, modulation index MiPAn for module 108-N, and the identifier for module 108-N, MCD 112 can start over by sending an updated control information data element for module 108-1. MCD 112 can send control information data elements to each other array 700-PB and 700-PC in a similar manner.

MCD 112 can send each control information data element using a defined data protocol. The control information data element can be in the form of one or more data packets. Each data packet can include one or more data segments. Each control information data element includes multiple portions. The multiple portions can include a first portion with two or more bits assigned to represent, e.g., encode, the identifier for a module 108. The multiple portions can include a second portion with two or more bits assigned to represent the modulation index Mi for the module 108 identified by the identifier. The multiple portions can include a third portion with two or more bits assigned to represent the normalized reference signal Vrn for modules 108 in the array 700 that includes the module 108. The first, second, and third portions can be arranged in any predetermined order within the control information data element. The control information data element can also optionally include one or more bits for error detection, e.g., a cyclic redundancy check (CRC). The various portions can be assigned specific bit positions in each byte of a control information data element, such that their locations within a data element do not vary. Each portion can extend across different bytes of the control information data element depending on the length of the portion.

In addition to communication path or link 115 for sending control information to LCDs 114, system 100 can include another communication path or link 1108 for exchanging data between MCD 112 and each LCD 114. For example, communication path 1108 can be used for sending status information 160 from each module 108 to MCD 112. Communication path 1108 can be a serial or parallel bidirectional path that connects MCD 112 to LCD 114 of each module 108 in an array, e.g., array 700-PA, 700-PB, or 700-PC. Each array 700-PA, 700-PB, and 700-PC can have a separate communication path 1108 or all arrays 700-PA, 700-PB, and 700-PC can share a common communication path 1108. In some implementations, communication path 1108 is both bidirectional (from MCD 112 to LCD 114 and from LCD 114 to MCD 112) and not time deterministic. Communication path 1108 can be implemented as a CAN bus to couple MCD 112 to each LCD 114 for communications using CAN protocols. In this example, information interface 1130 can be a CAN interface. Other appropriate types of communication paths can also be used in place of CAN.

Using a combination of a unidirectional serial time deterministic path for controlling converters 202 with a bidirectional not time deterministic path for other data exchange can provide performance advantages, especially for applications with limited bandwidth such as those in which communication is performed over a twisted pair. For example, this enables faster communication of normalized reference signals from MCD 112 to LCDs 114 while also ensuring timely updates to modulations indexes and enabling error corrections using CRC bits. Packing one modulation index into each control information data element can ensure that the normalized reference signal for all modules 108 is updated every frame (e.g., every time a control information data element is sent), while the modulation index for each module 108 is updated 1/N times per frame, where N is the number of modules 108 in the array, e.g., array 700-PA, 700-PB, or 700-PC.

Each module 108 includes its LCD 114, a converter 202 that includes switch circuitry, and an energy source 206, e.g., one or more batteries. In general, LCD 114 decodes the control information data elements received from the MCD 112 and controls switch circuitry of converter 202 using the decoded control information.

In this embodiment, each LCD 114 includes a combiner unit 1121 and a PWM controller 1123. Combiner unit 1121, which can be implemented in hardware and/or software, is configured to modulate or scale a normalized reference signal Vrn of the control information using a modulation index Mi of the control information. In some embodiments, combiner unit 1121 is a software module of LCD 114. Combiner unit 1121 outputs the modulated reference signal to PWM controller 1123.

PWM controller 1123, which can be implemented in hardware and/or software, generates switching signals for switches of converter 202 using PWM techniques, such as those described above. PWM controller 1123 can be configured to generate the carrier signals using a PWM counter. PWM controller 1123 can use the PWM counter to provide the appropriate phase shift between the carrier signals for the switches of converter 202.

LCD 114 can decode the control information data element to obtain the normalized reference signal Vrn, the modulation index Mi, and the identifier. Combiner unit 1121 modulates or scales the normalized reference signal Vrn using the assigned modulation index Mi, e.g., a modulation index Mi received in the control information data element that includes the identifier for the module 108 that includes (or is communicably coupled to) LCD 114. When LCD 114 receives a control information data element, LCD 114 can determine whether the identifier included in the control information data element matches the identifier for its module 108. If so, combiner unit 1121 scales the normalized reference signal Vrn of the received control information data element using the modulation index Mi. If not, combiner unit 1121 scales the normalized reference signal Vrn of the received control information data element using the most recently received modulation index Mi for the module 108 that includes (or is communicably coupled to) LCD 114.

For example, when LCD 114 of module 108-1 of array 700-PA receives a control information data element that includes an identifier that identifies module 108-1 of array 700-PA, the control information data element includes the normalized reference signal VrnPA for array 700-PA and modulation index MiPA1 for module 108-1 of array 700-PA. In this example, LCD 114 of module 108-1 of array 700-PA scales normalized reference signal VrnPA using this modulation index MiPA1. The next control information data element can include an identifier that identifies module 108-2 of array 700-PA, the control information data element includes the normalized reference signal VrnPA for array 700-PA and modulation index MiPA2 for module 108-2 of array 700-PA. Rather than use modulation index MiPA2 to scale normalized reference signal VrnPA, module 108-1 of array 700-PA scales the newly received normalized reference signal VrnPA using modulation index MiPA1 from the previously received control information data element.

When LCD 114 receives a control information data element that includes the identifier and modulation index Mi for its module 108, LCD 114 can store the modulation index Mi for scaling each received reference signal received by LCD 114 until the next modulation index Mi for LCD 114 is received. For example, LCD 114 of module 108-1 of array 700-PA can receive a control information data element with a normalized reference signal VrnA and a modulation index MiPA1. Combiner unit 1121 can use modulation index MiPA1 to scale normalized reference signal VrnA and PWM controller 1123 can control switch circuitry of module 108-1 of array 700-PA using the scaled reference signal. LCD 114 of module 108-1 of array 700-PA can also store modulation index MiPA1. The next control information data element received by LCD 114 of module 108-1 of array 700-PA can include an updated normalized reference signal VrnA and a modulation index MiPA1 for module 108-2 of array 700-PA and no modulation index MiPA1 for module 108-1 of array 700-PA. Combiner unit 1121 of module 108-1 of array 700-PA can scale reference signal VrnPA using the previously received and stored modulation index MiPA1. Combiner unit 1121 of module 108-1 of array 700-PA can continue doing this until another modulation index MiPA1 is received in a control information data element that includes the identifier for module 108-1 of array 700-PA.

Combiner unit 1121 of each LCD 114 can scale the normalized reference signal Vrn using its modulation index Mi, e.g., by determining a product of the normalized reference signal Vrn and its modulation index MiPA1. PWM controller 1123 of each LCD 114 can then operate the switch circuitry (e.g., generate the control signals for each switch)

of its converter 202 using a PWM or hysteresis technique based on the scaled reference signal, as described in detail above. In this manner, modulation index Mi can be used, similar to a modulation index Mi described above, to control the PWM switching signals provided to the power converter switching circuitry, and thus regulate the operation of module 108. The output of each converter 202 can be connected together to provide a cumulative output signal to a load, e.g., of a stationary or mobile application.

As described above, e.g., with reference to FIGS. 8C and 8D, the carrier signals for each module 108 in an array 700 are phase shifted to generate a multilevel output voltage. To ensure the appropriate phase shifts of the carrier signals between modules 108, the PWM counters of PWM controllers 1123 of modules 108 can be synchronized using synchronization techniques described herein. In general, when a PWM synchronization event is detected, PWM controller 1123 can reset its PWM counters to restart the carrier signals generated by PWM controller 1123.

In some embodiments, PWM controllers 1123 are synchronized using a synchronization signal sent from MCD 112 over paths 1141-1 to 1141-3. In such embodiments, MCD 112 includes synchronization interface 1140, which is configured to generate the synchronization signals. In some embodiments, as described in more detail below, PWM controllers 1123 are synchronized using data absence events. In such embodiments, MCD 112 may or may not include synchronization interface 1140.

Communication paths 1141-1 to 1141-3 can traverse the desired unidirectional or bidirectional physical layer, which can be, for example, an RS-485 or Ethernet physical layer. Synchronization interface 1140 of MCD 112 and corresponding synchronization interfaces 1743 (FIG. 17) of LCDs 114 can each include the corresponding interface, such as a differential half-duplex serial synchronized interface for RS-485, or an Ethernet transceiver. Communication paths 1141-1 to 1141-3 can include twisted pair wiring that connects synchronization interface 1140 of MCD 112 to synchronization interfaces 1743 of LCDs 114 of each array 700-PA, 700-PB, and 700-PC. In other embodiments the cabling can be optical fiber or different electrical conductive arrangements other than twisted pair.

The paths and links 105, 106, 115, 116, 118, 1108, 1141, 1213 (FIG. 12), and 2501-2508 (FIG. 25A) discussed herein can be a single conduit or multiple conduit paths or links and different paths or links (e.g., 115 and 1141) between the same entities (e.g., MCD 112 and LCD 114) can be consolidated or combined on a single path. To the extent the present embodiments are described with reference to the RS-485 standard, such is for ease of description, those embodiments are not limited solely to use with RS-485, but are also applicable to other forms of communication, whether standardized or non-standardized.

The synchronization signal can be used for multiple purposes. For example, the synchronization signal can be used to synchronize PWM controllers 1123, to synchronize the reception of control information data packets, and/or to wake LCD 114 when LCD 114 is in a sleep mode.

In general, the synchronization signal can be a modulated signal, e.g., a modulated square wave signal. MCD 112 can adjust the pulse width in the sequence of pulses in the synchronization signal and/or the frequency of the synchronization signal to trigger synchronization events. MCD 112 can be configured to use different types of modulation, e.g., based on the physical layer used for paths 1141-1 to 1141-3 and/or the type of isolation used to isolate interfaces 1140 and 1743 from paths 1141-1 to 1141-3. Example synchronization techniques are described in more detail below.

Figure 12:
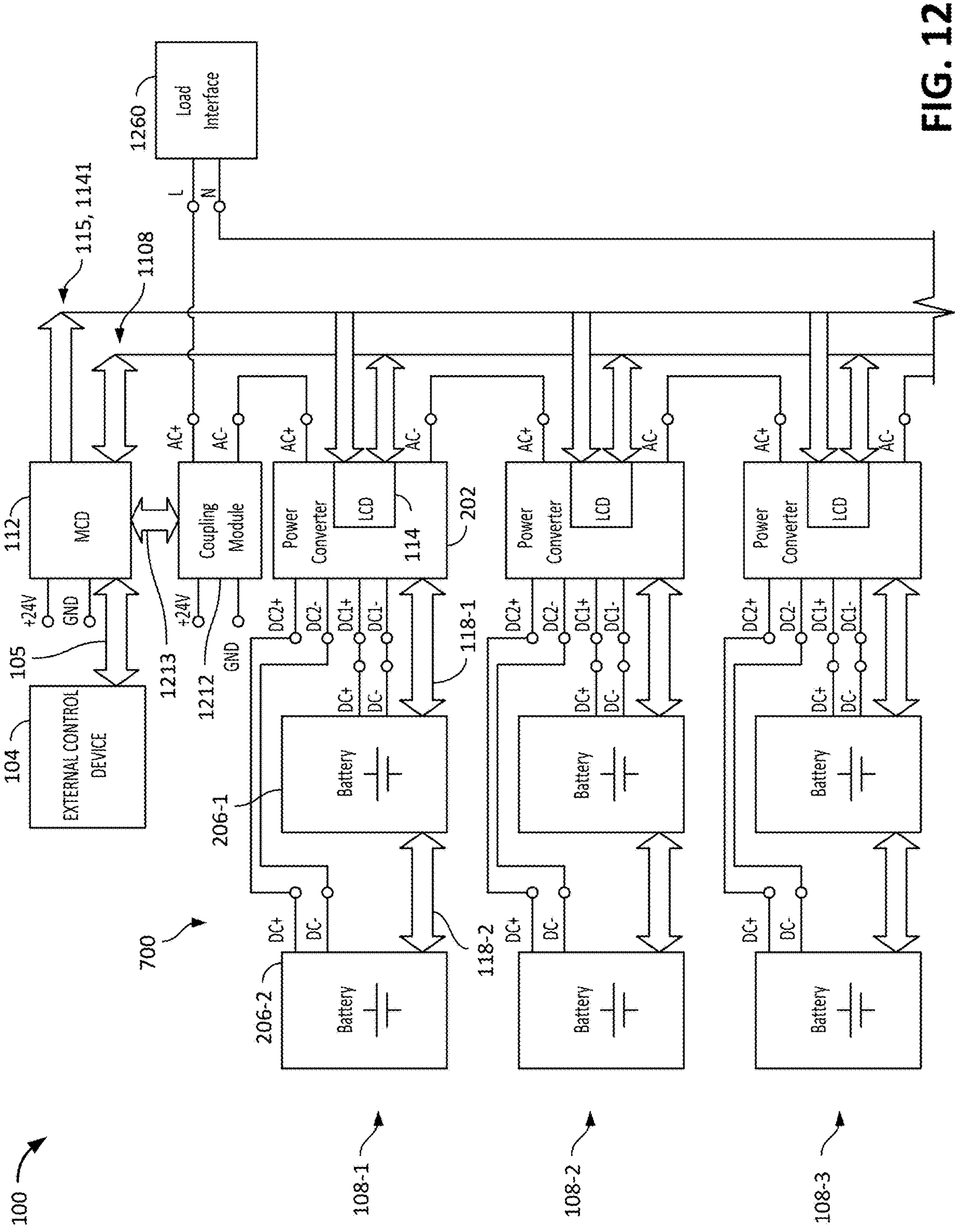
FIG. 12 is a block diagram depicting an example embodiment of a single phase energy system.
Figure 12:
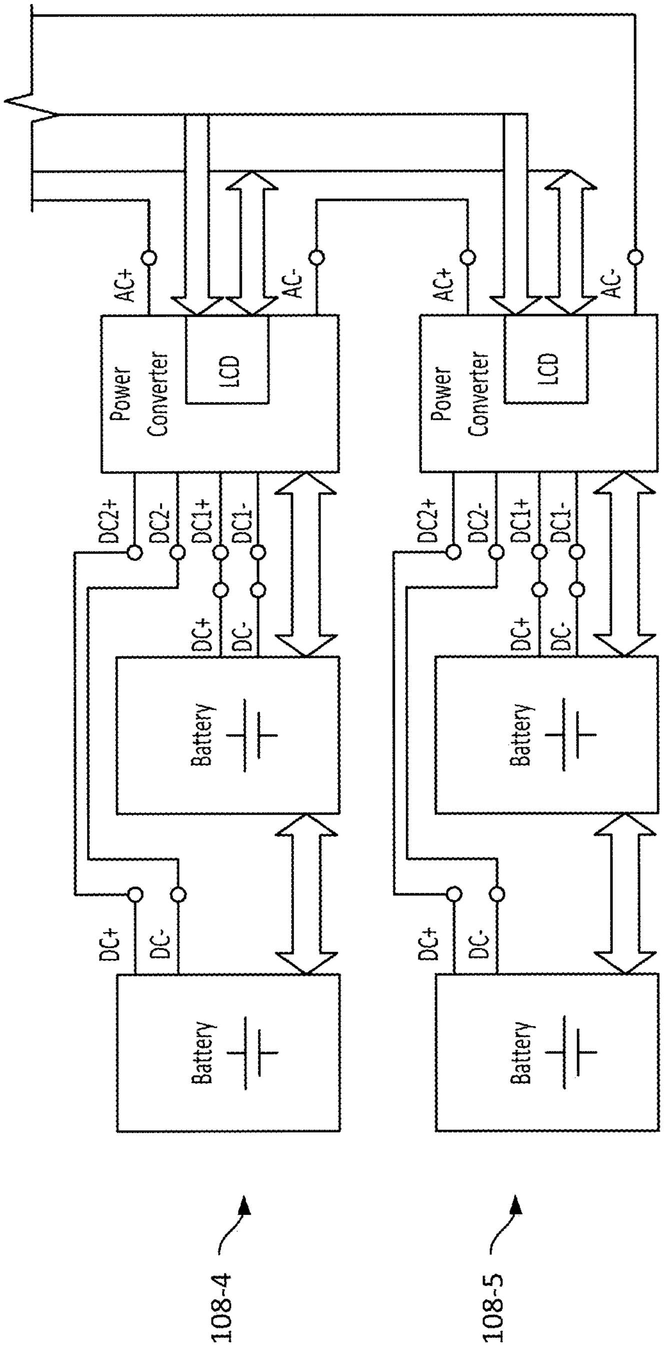

FIG. 12 is a block diagram depicting an example embodiment of a single phase energy system 100. System 100 includes an external control device 104, an MCD 112, and an array 700 of cascaded modules 108 (108-1 to 108-5). Although this example array 700 includes five modules 108, other appropriate quantities of modules 108 can be used.

Each module 108 includes an LCD 114, a converter 202, batteries 206-1 and 206-2, and internal communication paths 118. Although two batteries 206-1 are shown, a module 108 can include other quantities of batteries 206. The internal communication paths include a communication path 118-1 that communicably couples converter 202 and battery 206-1, and a communication path 118-2 that communicably couples batteries 206-1 and 206-2. Communication path 118-1, which can be an RS-485 physical layer or another appropriate path, enables LCD 114 to obtain status information for the batteries. Although batteries 206 are shown in this example, other energy sources can be used, as described above.

As described above, LCD 114 can scale a normalized reference signal Vrn using a modulation index Mi and operate circuitry of converter 202 using a PWM technique based on the scaled reference signal. Each converter 202 can be configured to convert a DC signal from the batteries 206-1 and 206-2 into an AC signal. The combined AC signal of the modules 108-1 to 108-5 is output to a load interface 1260 that can be electrically connected to a load. In some implementations, load interface 1260 is a terminal block at which conductors can be connected.

External control device 104 enables an operator to monitor and control operation of the one or more loads including a load connected to load interface 1260. This can include controlling when and how much power is provided to the load. External control device 104 can provide an interactive interface, e.g., a graphical user interface (GUI), that enables the operator to monitor and control power to the load.

External control device 104 is communicably coupled to MCD 112 by way of a communication path or link 105. In some implementations, this communication path 105 can be implemented using a Modbus protocol, Profibus protocol, or another appropriate communication protocol. External control device 104 can provide, over communication path 105, power control information to MCD 112. This power control information can include, for example, a target voltage level, target current level, target AC frequency, target phase, and/or other appropriate characteristics of a target AC voltage waveform for the load.

MCD 112 controls modules 108-1 to 108-5 to generate an output AC waveform to load interface 1260 based on the power control information received from external control device 104, status information 160 for the modules 108-1 to 108-5, and characteristics of the AC waveform output by modules 108-1 to 108-5 received from a coupling module 1212. As system 100 includes a single array 700 for a single phase, MCD 112 balances the modules 1221 using intraphase balancing, but would not use interarray balancing. As described above, MCD 1210 can use the information and balancing techniques to generate normalized reference signals Vrn and modulation indexes Mi for modules 108-1 to 108-5.

System 100 includes a communication path 115 that communicably couples MCD 112 to LCD 114 of each module 108. MCD 112 can send control information data elements to LCDs 114 over communication path 115. As described above, a control information data element can include a normalized reference signal, a modulation index Mi for a module 108, and an identifier for the module 108. As described above, communication path 115 can be a serial communication path that is coupled to respective communication interfaces of MCD 112 and LCD 114 of each module 108-1 to 108-5 in array 700.

MCD 112 and LCD 114 of each module 108-1 to 108-5 can also communicate over a bidirectional communication path 1108 that communicably couples MCD 112 to LCD 114 of each module 108. As described above, communication path 1108 enables MCD 112 and LCDs 114 to exchange information, such as status information 160 for each module 108-1 to 108-5.

System 100 also includes a communication path 1141 that communicably couples MCD 112 to LCD 114 of each module 108. As described above, MCD 112 can send a synchronization signal to LCDs 114 over communication path 1141.

Figure 16A:
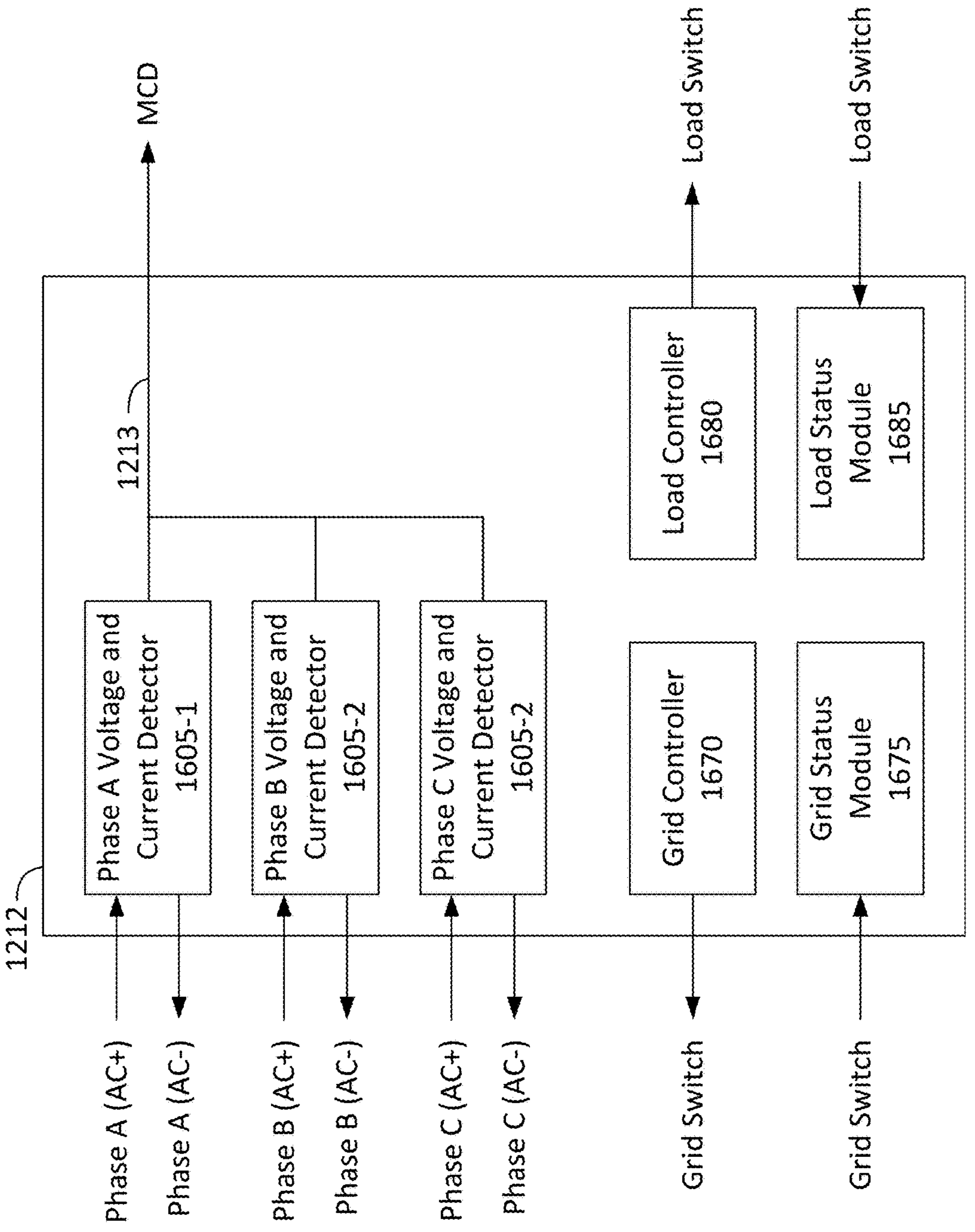
FIGS. 16A-16B are block diagrams depicting example components of an example embodiment of a coupling module.
Figure 16B:
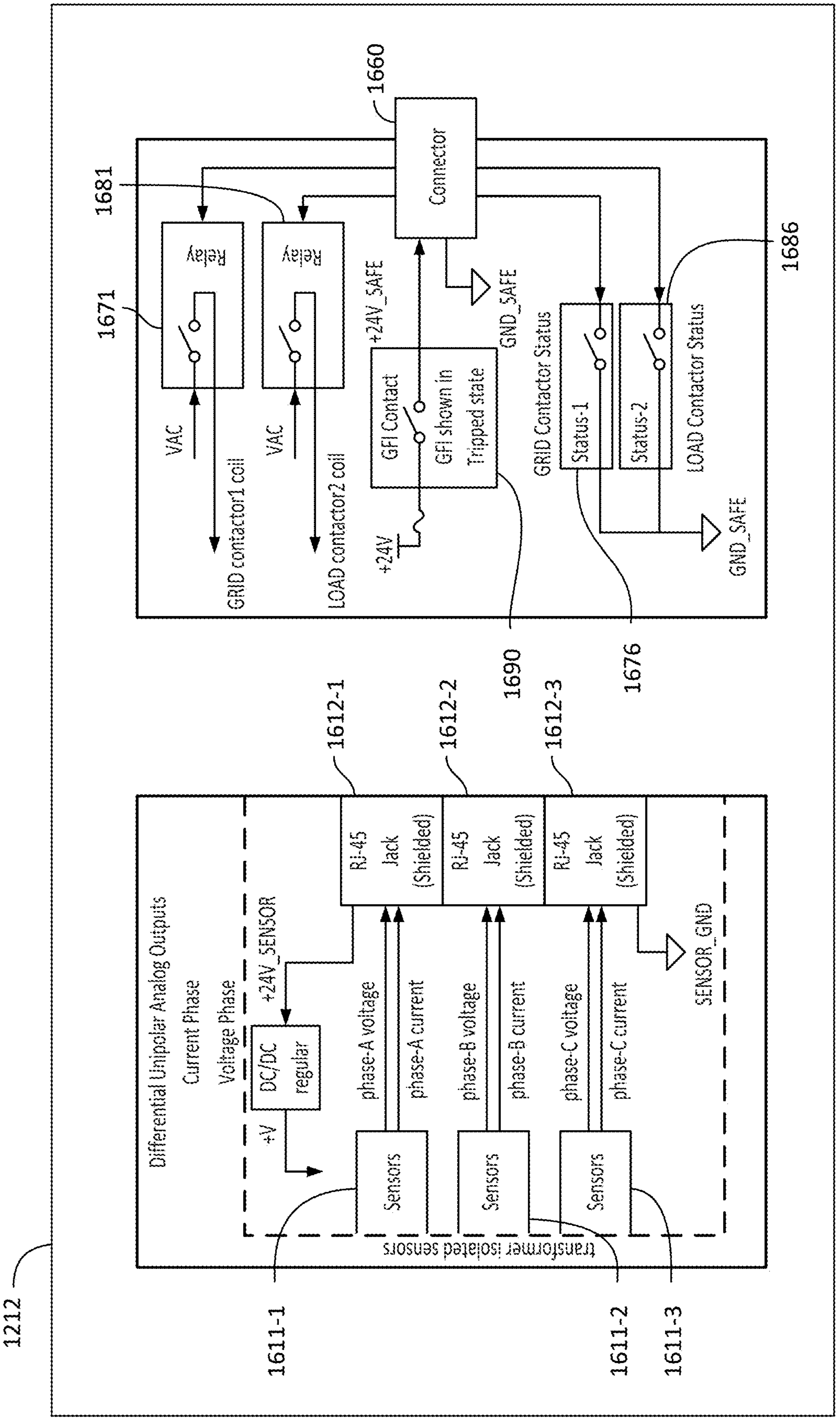

Every embodiment of system 100 described herein can include one or more coupling modules 1212. Each system embodiment can have a single coupling module. Coupling module 1212 is connected in series with the outputs of converters 202 so that coupling module 1212 can measure characteristics of the AC waveform output by the modules 1221. These characteristics can include, for example, a voltage level and a current level of the AC waveform. As example coupling module is depicted in FIGS. 16A-16B and described below.

Coupling module 1212 is communicably coupled to MCD 112 using a communication path or link 1213. Coupling module 1212 provides the measured characteristics to MCD 112 over communication path 1213. In some implementations, communication path 1213 is a high speed serial interface (HSSI). The HSSI can include parallel data lines or a differential pair that enables data transfer rates of 1-2+ gigabits per second (Gbps).

Figure 13:
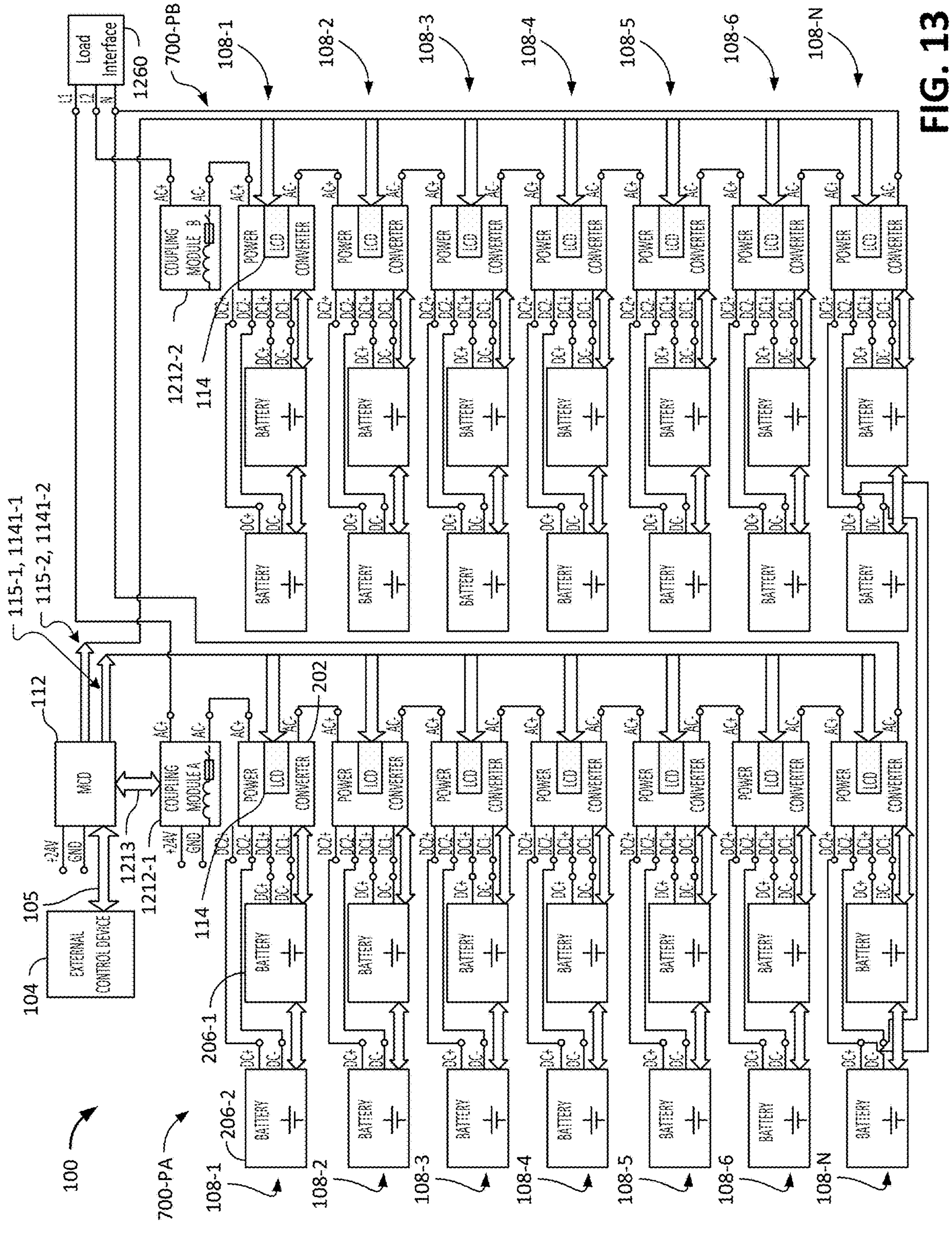
FIG. 13 is block diagram depicting an example embodiment of a split-phase energy system.

FIG. 13 is block diagram depicting an example embodiment of a split-phase energy system 100. System 100 differs from the system 100 of FIG. 12 by having two arrays 700-PA and 700-PB that each include a number "N" modules 108 (108-1 to 108-N) for providing a three-wire split-phase AC output to a load interface 1260 that can be connected to a load. Load interface 1260 can include terminals that make a first AC system output (L1), a second AC system output (L2), and a neutral system output (N) electrically available to the load.

Each module 108 can include an LCD 114, a converter 202, batteries 206-1 and 206-2, and the internal communication paths described above. The AC outputs of arrays 700-PA and 700-PB can be the same voltage (e.g., 120V) but the AC output of array 700-PA can be 180 degrees out of phase with respect to the AC output of array 700-N. This can produce an AC output signal measured between system output L1 and system output L2 that is twice the magnitude of the AC output signal from each array taken individually (e.g., between L1 and N). All embodiments of system 100 described herein can be optionally implemented in a split phase topology.

System 100 includes coupling modules 1212 (e.g., coupling modules 1212-1 and 1212-2). MCD 112 controls modules 108 to generate and output a split-phase AC waveform to load interface 1260 based on the power control information received from external control device 104, status information 160 for modules 108, and characteristics of the AC voltage waveform output by modules 108 received from coupling modules 1212-1 and 1212-2. As this system 100 includes multiple arrays 700-PA and 700-PB for a split-phase power conversion, MCD 112 can be configured to balance modules 108 using intraphase balancing and/or using interphase balancing. As described above, MCD 112 can use the information and balancing techniques to generate normalized reference signals Vrn and modulation index Mi for modules 108.

System includes communication paths 115, e.g., communication paths 115-1 and 115-2. Communication path 115-1 communicably couples MCD 112 to LCD 114 of each module 108 of array 700-PA. Similarly, communication path 115-2 communicably couples MCD 112 to LCD 114 of each module 108 of array 700-PB.

MCD 112 can send control information data elements to LCDs 114 of modules 108 of array 700-PA over communication path 115-1. Similarly, MCD 112 can send control information data elements to LCDs 114 of modules 108 of array 700-PB over communication path 115-2. As described above, a control information data element can include a normalized reference signal Vrn, a modulation index Mi for a module 108, and an identifier for the module 108. As described above, communication paths 115 can be serial communication paths that are coupled to MCD 112 and to LCD 114 of each module 108.

By using two different communication paths 115-1 and 115-2, MCD 112 can send a single normalized reference signal to each module 108 of array 700-PA over communication path 115-1 and a single normalized reference signal to each module 108 of array 700-PB over communication path 115-2. As the normalized reference signals for different arrays may be different, e.g., by at least having different phase angles, this can reduce the amount of data sent along each communication path 115-1 and 115-2 and increase the speed at which updated normalized reference signals are sent to each module 108. For example, MCD 112 does not have to include both normalized reference signals in a same data frame, which would increase the size of the data frame, or reduce the speed at which control information is sent to modules 108 if MCD 112 alternated between the two reference signals.

MCD 112 and LCD 114 of each module 108 can also communicate over a bidirectional communication path that communicably couples MCD 112 to LCD 114 of each module 108. Similar to communication path 1108 of FIGS. 11A-11B, this bidirectional communication path enables MCD 112 to exchange information, such as status information 160 for each module 108. Both arrays 700-PA and 700-PB can share a common bidirectional communication path or have separate bidirectional communication paths, e.g., one that communicably couples LCDs 114 of modules 108 of array 700-PA to MCD 112 and one that communicably couples LCDs 114 of modules 108 of array 700-PB to MCD 112.

System 100 can also include a communication path 1141-1 that communicably couples MCD 112 to LCD 114 of each module 108 of array 700-PA. Similarly, system 100 also includes a communication path 1141-2 that communicably couples MCD 112 to each module 108 of array 700-PB. As described above, MCD 112 can send a synchronization signal to LCDs 114 over communication path 1141.

Coupling module 1212-1 is connected in series with the outputs of converters 202 of modules 108 of array 700-PA so that the coupling module 1212-1 can measure characteristics of the AC waveform output by modules 108 of array 700-PA. These characteristics can include, for example, a voltage level and a current level of the AC waveform. Coupling module 1212-1 is communicably coupled to MCD 112 using a communication path 1213. Coupling module 1212-1 provides the monitored characteristics to MCD 112 over communication path 1213.

Coupling module 1212-1 is connected in series with the outputs of converters 202 of modules 108 of array 700-PB so that coupling module 1212-2 can measure characteristics of the AC waveform output by the modules 108 of array 700-PB. These characteristics can include, for example, a voltage level and a current level of the AC waveform. Although not shown, coupling module 1212-2 can be connected to MCD 112 in the same manner as the coupling module 1212-1, e.g., using a communication path 1213.

The embodiments of systems 100 described herein can include a single coupling module 1212 electrically connected to both arrays 700-PA and 700-PB, or can include multiple discrete coupling modules 1212, one for each array 700-A and 700-B. In this example, outputs of converters 202 of each array 700-PA and 700-PB can both be separately connected in series with coupling module 1212 such that coupling module 1212 can measure the characteristics of the AC waveform output by each array 700-PA and 700-PB and provide the measured characteristics to MCD 112.

Figure 14:
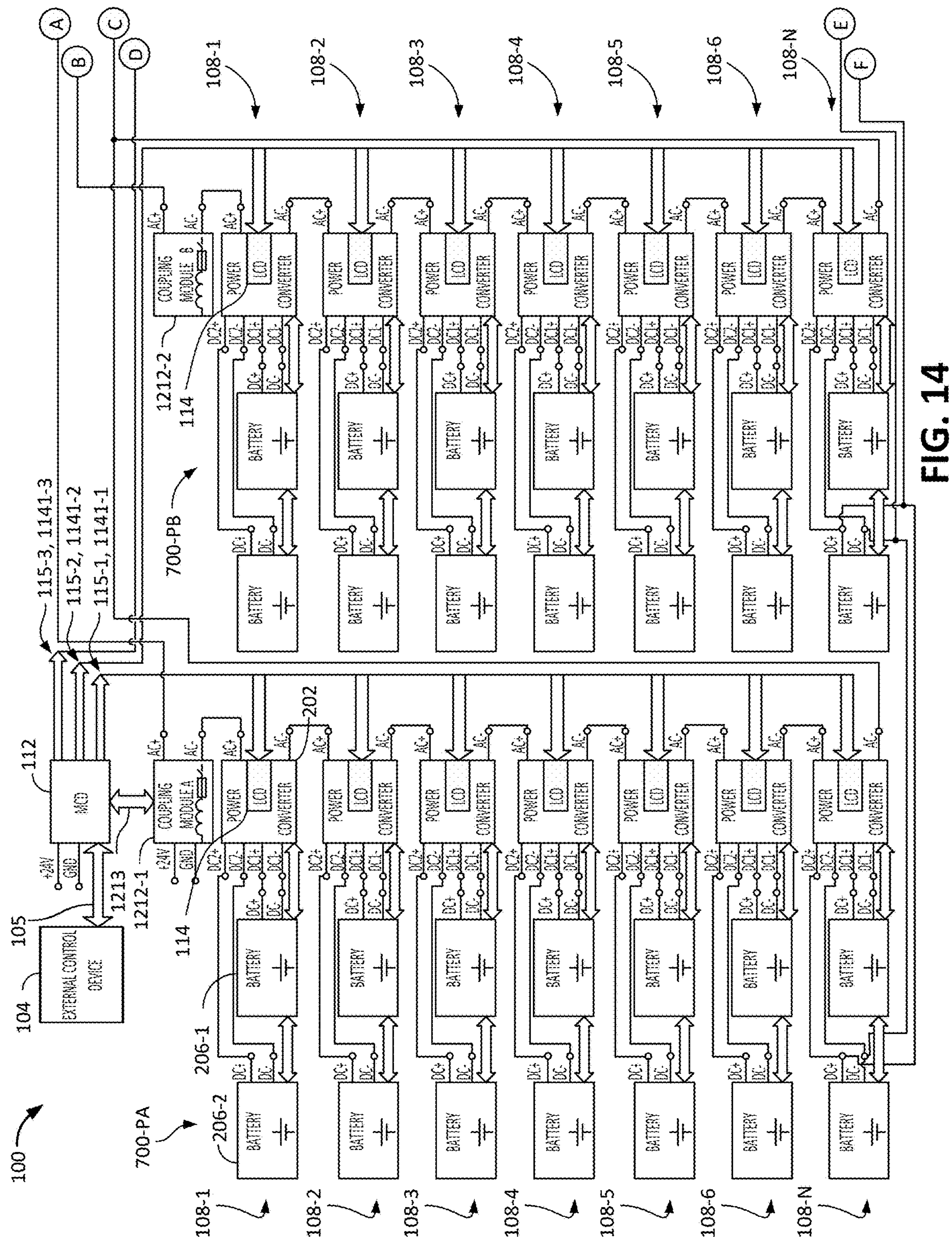
FIG. 14 is a block diagram depicting an example embodiment of a three-phase energy system.
Figure 14:
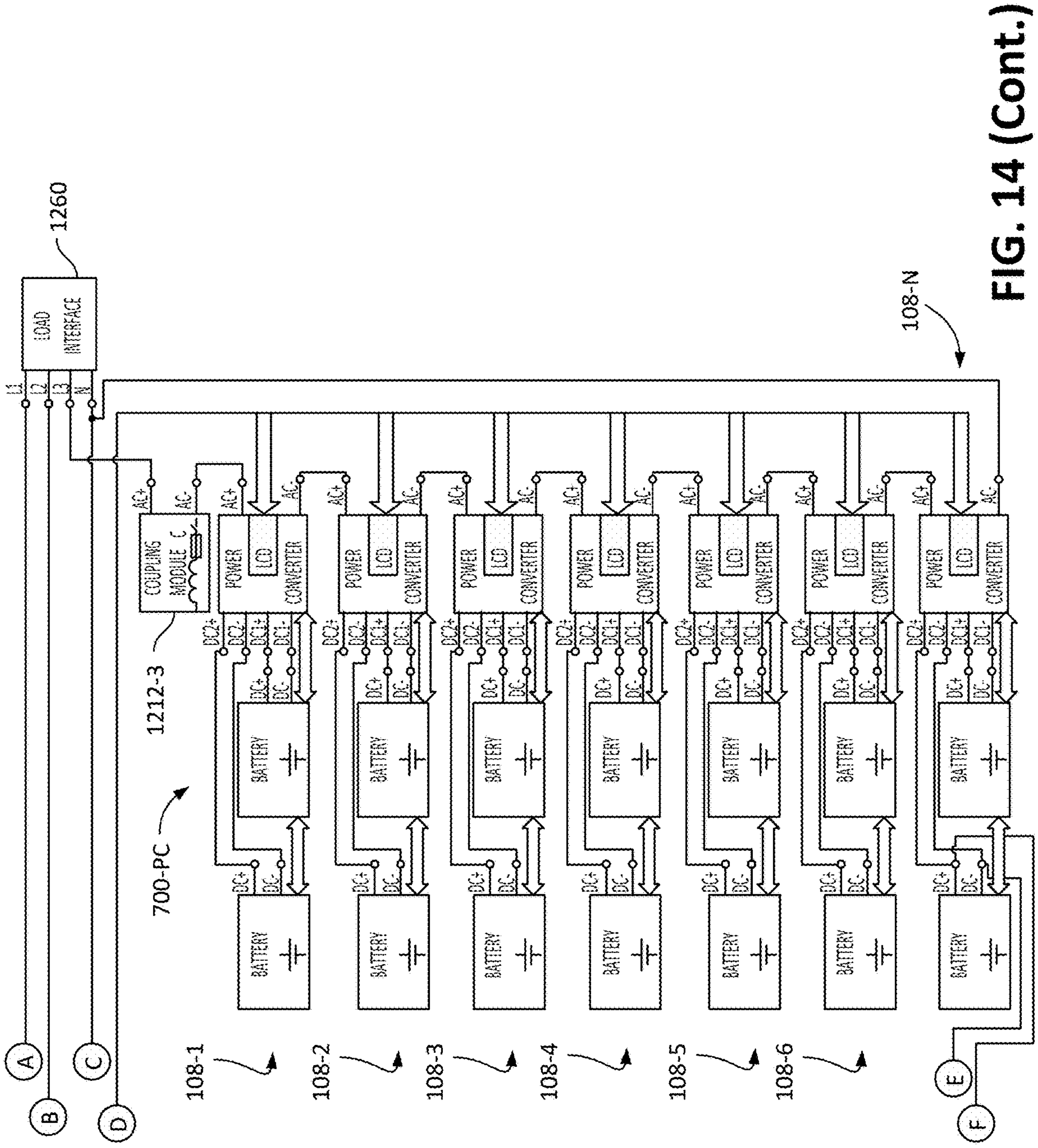

FIG. 14 is a block diagram depicting an example embodiment of a three-phase energy system 100. The system 100 differs from the system 100 of FIG. 12 and the system 100 of FIG. 13 by having three arrays 700-PA, 700-PB, and 700-PC that each include a number "N" modules 108 (108-1 to 108-N) for providing a four-wire three-phase AC output to a load interface 1260 that can be connected to a load.

Each module 108 can include an LCD 114, a converter 202, batteries 206-1 and 206-2, and the internal interfaces described above. The AC output of each array can be 120 degrees out of phase with respect to each other array.

System 100 includes coupling modules 1212 (e.g., coupling modules 1212-1, 1212-2, and 1212-3). MCD 112 controls modules 108 to generate and output a three-phase AC waveform to load interface 1260 based on the power control information received from external control device 104, status information 160 for modules 108, and characteristics of the AC voltage waveform output by the modules 108 received from coupling modules 1212-1, 1212-2, and 1212-3. As this system 100 includes multiple arrays 700-PA, 700-PB, and 700-PC for a three-phase power conversion, MCD 112 can be configured to balance the modules 108 using intraphase balancing and/or using interphase balancing. As described above, MCD 112 can use the information and balancing techniques to generate normalized reference signals Vrn and modulation indexes Mi for modules 108.

System 100 includes communication paths 115, e.g., communication paths 115-1, 115-2, and 115-3. Communication path 115-1 communicably couples MCD 112 to LCD 114 of each module 108 of array 700-PA. Similarly, communication path 115-2 communicably couples MCD 112 to LCD 114 of each module 108 of array 700-PB and communication path 115-3 communicably couples MCD 112 to LCD 114 of each module 108 of array 700-PC.

MCD 112 can send control information data elements to LCDs 114 of the modules 108 of array 700-PA over communication path 115-1. Similarly, MCD 112 can send control information data elements to LCDs 114 of modules 108 of array 700-PB over communication path 115-2 and send control information data elements to LCDs 114 of modules 108 of array 700-PC over communication path 115-3. As described above, a control information data element can include a normalized reference signal Vrn, a modulation index Mi for a module 108, and an identifier for the module 108. As described above, communication path 115 can be a serial interface that is coupled to MCD 112 and to LCD 114 of each module 108.

MCD 112 and LCD 114 of each module 108 can also communicate over a bidirectional communication path that communicably couples MCD 112 to LCD 114 of each module 108. Similar to communication path 1108 of FIGS. 11A-11B, this bidirectional communication path enables MCD 112 and LCDs 114 to exchange information, such as status information 160 for each module 1421. All three arrays 700-PA, 700-PB, and 700-PC can share a common bidirectional communication path or have separate bidirectional communication paths, e.g., one that communicably couples LCDs 114 of modules 108 of array 700-PA to MCD 112, one that communicably couples LCDs 114 of modules 108 of array 700-PB to MCD 112, and one that communicably couples LCDs 114 of modules 108 of array 700-PC to MCD 112.

System 100 also includes a communication path 1141-1 that communicably couples MCD 112 to LCD 114 of each module 108 of array 700-PA. Similarly, system 100 includes a communication path 1141-2 that communicably couples MCD 112 to each module 108 of array 700-PB and a communication path 1141-3 that communicably couples MCD 112 to each module 108 of array 700-PC. As described above, MCD 112 can send a synchronization signal to LCDs 114 over communication path 1141.

Coupling module 1212-1 is connected in series with the outputs of converters 202 of modules 108 of array 700-PA so that coupling module 1212-1 can measure characteristics of the AC waveform output by modules 108 of array 700-PA. These characteristics can include, for example, a voltage level and a current level of the AC waveform. Coupling module 1212-1 is communicably coupled to MCD 112 using a communication path 1213. Coupling module 1212-1 provides the monitored characteristics to the MCD 112 over communication path 1213.

Coupling module 1212-2 is connected in series with the outputs of converters 202 of modules 108 of array 700-PB so that coupling module 1212-2 can measure characteristics of the AC waveform output by modules 108 of array 700-PB. These characteristics can include, for example, a voltage level and a current level of the AC waveform. Although not shown, coupling module 1212-2 can be connected to MCD 112 in the same manner as the coupling module 1212-1, e.g., using a communication path 1213.

Coupling module 1212-3 is connected in series with the outputs of converters 202 of modules 108 of array 700-PC so that coupling module 1212-3 can measure characteristics of the AC waveform output by modules 108 of array 700-PC. These characteristics can include, for example, a voltage level and a current level of the AC waveform. Although not shown, the coupling module 1212-3 can be connected to MCD 112 in the same manner as the coupling module 1212-1, e.g., using a communication path 1213.

In some implementations, the three-phase energy system 100 can include a single coupling module 1212 for all three arrays 700-PA, 700-PB, and 700-PC. In this example, outputs of converters 202 of each array 700-PA, 700-PB, and 700-PC can each be separately connected in series with coupling module 1212 such that coupling module 1212 can measure the characteristics of the AC waveform output by each array 700-PA, 700-PB, and 700-PC and provide the measured characteristics to MCD 112.

Figure 15:
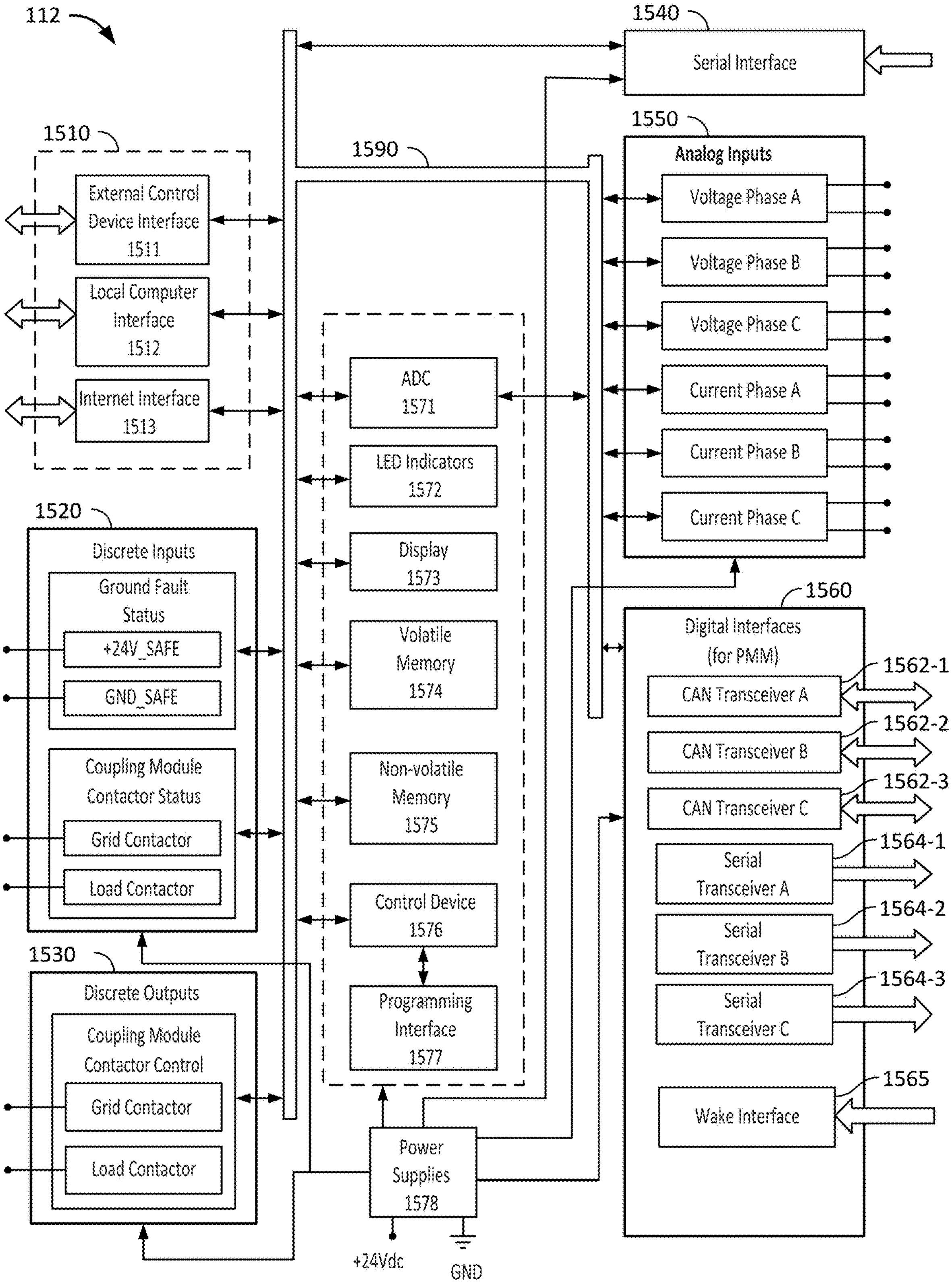
FIG. 15 is block diagram depicting interfaces an example embodiment of a master control device.

FIG. 15 is block diagram depicting interfaces of an example embodiment of a MCD 112. MCD 112 can be used to implement the MCD of any system 100 described herein.

MCD 112 also includes components not shown in FIG. 15, such as a controller 900, a controller 950, and/or other components described above. Although particular types of interfaces are shown in FIG. 15 and described below, other types of appropriate interfaces can be used.

MCD 112 includes control interfaces 1510, including an external control device interface 1511 (e.g., a High Level Control System (HLCS) transceiver), a local computer interface 1512 (e.g., a USB-COM transceiver), and an internet interface 1513 (e.g., Ethernet transceiver). External control device interface 1511 can be configured to communicate with an external control device 104 over path 105. In one example, external control device interface 1511 can be implemented as an RS-485 serial interface for coupling to a bus that is coupled to the site controller. Other suitable interfaces can be used. External control device 104 can provide power control information to MCD 112 through external control device interface 1511.

Local computer interface 1512 can be configured to communicate with one or more computers, e.g., over a USB cable. Internet interface 1513 is configured to connect MCD 112 to remote systems, e.g., via the Internet or another network. MCD 112 can obtain firmware updates, acquire log information, etc. from remote systems using the Ethernet transceiver.

MCD 112 includes discrete inputs 1520. Discrete inputs 1520 receive feedback from coupling module 1212. In this example, discrete inputs 1520 include ground fault status inputs for receipt of an indication of a ground fault (at GND_SAFE) or another type of fault, e.g., a power supply failure (at +24V_SAFE). In the event of a fault, MCD 112 can instruct or cause system 100 to terminate operation and shut down. The discrete inputs can also include coupling module status inputs for indicating whether the grid contactor is closed connecting system 100 to a grid and whether a load contactor is closed connecting system 100 to a load.

MCD 112 includes discrete outputs 1530. Discrete outputs 1530 include one or more outputs to a grid contactor for controlling a grid contactor switch (e.g., an electromechanical relay) that selectively connects to and disconnects from a grid, and includes one or more outputs to a load contactor for controlling a load contactor switch (e.g., an electromechanical relay) that selectively connects to and disconnects from a load. The grid contactor switch and load contactor switch can be located as desired within system 100, such as in coupling module 1212.

MCD 112 includes a serial interface 1540, e.g., an HSSI, that is configured to provide a fast interface for receiving signals from coupling module 1212. For example, coupling module 1212 can digitize analog signals and send them to MCD 112 over a serial bus coupled to the HSSI 1540.

MCD 112 includes analog inputs 1550 that are configured to receive, as analog inputs, analog outputs from coupling module 1212. The analog inputs can include the sensed voltage and current measurements output by each array 700 for the various phases.

As described above, coupling module 1212 can measure characteristics of the AC waveform output by modules 108. These characteristics can include, for example, a voltage level and a current level of the AC waveform. Coupling module 1212 can provide characteristics for each phase in analog form to the corresponding analog inputs and/or digitally to the serial interface 1540, which can be implemented as a HSSI as described above.

MCD 112 includes digital interfaces 1560 for communicating with LCDs 114 of modules 108. Digital interfaces 1560 can be bidirectional and/or unidirectional, and can communicate information according to various standardized or custom protocols. Here, interfaces 1560 include bidirectional CAN protocol transceivers 1562 for each array 700 of cascaded modules 108 (e.g., for each phase of the output AC signal). For example, digital interfaces 1560 include CAN transceiver A 1562-1 for array 700-PA, CAN transceiver B 1562-2 for array 700-PB, and CAN transceiver C 1562-3 for array 700-PC. CAN transceivers 1562 are configured to communicate over a CAN bus that couples the CAN transceiver 1562 to a CAN transceiver of an LCD.

CAN transceivers 1562 enable bidirectional data exchange between the MCD 12 and LCDs 114 and between LCDs 114 directly. For example, LCDs 114 can send status information 160 to MCD 112 over the CAN bus. If a module 108 detects a fault, LCD 114 can notify MCD 112 and the MCD 112 can instruct the faulty module to terminate operation. The CAN interface also enables communication between any LCD 114 and any other LCD 114. This can be useful if one of the LCDs 114 detects a fault but there is also a fault in MCD 112 such that MCD 112 is not able to take action in response to the fault. In this case, the fault command sent from the faulted LCD 114 would be received by other operational LCDs 114 and these LCDs 114 can take safety actions, for example, to disconnect converters 202 from an AC line. Using a CAN interface, or other protocol with similar capability, enables MCD 112 to be bypassed and an LCD 114 can instruct the other LCDs 114 in an array 700, e.g., to shut down. Although MCD 112 includes a CAN transceiver for each array, MCD 112 can communicate with LCDs 114 of multiple arrays using a single CAN transceiver over a single CAN bus that is coupled to MCD 112 and each LCD 114 in the multiple arrays. The number of CAN buses can vary, e.g., based on the bandwidth of the interface and the data being sent across the interface.

Digital interfaces 1560 also include serial transceivers 1564, e.g., RS-485 transceivers, that are configured to be coupled to a serial bus, e.g., a twisted pair cable. Serial transceivers 1564 can be implemented as, for example, RS-485 transceivers and/or Ethernet transceivers.

MCD 112 sends control information to LCDs 114 using the serial transceivers 1564. As described above, the control information can include a normalized reference signal, a modulation index, and an identifier for a module. MCD 112 includes a serial transceiver 1564 for each array of cascaded modules (e.g., for each phase of the output AC signal). In particular, MCD 112 includes serial transceiver A 1564-1 for sending control information to LCDs 114 of modules 108 in array A, serial transceiver B 1564-2 for sending control information to LCDs 114 of modules 108 in array B, and serial transceiver C 1564-3 for sending control information to LCDs 114 of modules 108 in array C.

Digital interfaces 1560 also include a wake interface 1565. Wake interface 1565 can be used to send wake signals to LCDs 114 to wake LCDs 114 from a sleep mode of operation. For example, MCD 112 can send a command over interface 1565 instructing LCDs 114 to go into the sleep mode of operation. To wake LCDs 114 from the sleep mode of operation, MCD 112 can send a wake signal to each LCD 114 using wake interface 1565.

MCD 112 includes an analog to digital converter (ADC) that converts analog signals to digital signals. MCD 112 includes light-emitting diode (LED) indicators 1572 that indicate information about MCD 112 and/or system 110 that includes MCD 112, such as status information, fault information, etc. MCD 112 also include a display 1573 that displays information about MCD 112 and/or system 110 and/or enables a user to provide information or commands to MCD 112. For example, display 1573 can include a touch screen or other input device that enables the user to interact with MCD 112.

MCD 112 includes volatile memory 1574 (e.g., DRAM) and non-volatile memory (e.g., flash memory, hard drive, etc.) 1575. Volatile memory 1574 can be used in the execution of instructions and to store data that is currently being used while non-volatile memory 1575 can be used to store energy independent information, e.g., logs.

MCD 112 includes a control device 1576, which can be in the form of a processor, microcontroller, Field Programmable Gate Arrays (FPGAs), or other appropriate type of control device. Control device 1576 can execute software that performs the various functions of the MCD 112 described herein. For example, control device 1576 can implement controller 900 and/or controller 950.

MCD 112 includes a programming interface 1577. Programming interface 1577 enables a user to program MCD 112 and/or debug MCD 112. In some implementations, programming interface 1577 includes a Joint Test Action Group (JTAG) interface.

MCD 112 includes one or more power supplies 1578 for powering the various hardware components of MCD 112. MCD 112 also includes an internal bus 1590 that communicably couples the various hardware components of MCD 112.

FIGS. 16A-16B are block diagrams depicting example components of a coupling module 1212. The coupling module 1212 can be used to implement the coupling modules described herein.

Referring to FIG. 16A, coupling module 1212 includes a voltage and current detector 1605 for each of one or more phases. In this example, coupling module 1212 includes a phase A voltage and current detector 1605-1, a phase B voltage and current detector 1605-2, and a phase C voltage and current detector 1605-3. Each voltage and current detector 1605 can include a voltage sensor and a current sensor for measuring the voltage and current of an AC waveform generated by converters 202 for its phase.

Each voltage and current detector 1605 can provide its voltage and current measurements to MCD 112 over communication path 1213. Communication path 1212 can include a digital signal path and/or analog signal paths. When communication path 1212 is a digital signal path, coupling module 1212 can include an ADC to convert analog measurements to digital signals. Coupling module 1212 can provide digital signals to serial interface 1540 (FIG. 15) over communication path 1213.

When communication path 1213 includes analog signal paths, communication path 1213 can include respective conductors for each measurement. Coupling module 1212 can provide analog measurements to analog inputs 1550 (FIG. 15) over communication path 1213.

Coupling module 1211 includes a grid controller 1670 and a grid status module 1675. Grid controller 1670 can operate a grid switch that selectively connects system 100 to a grid. Grid status module 1675 can receive a status signal indicating whether the grid switch is opened or closed. For example, grid status module 1675 can be coupled to a contactor of the grid switch that opens and closes with the grid switch.

Coupling module 1211 includes a load controller 1680 and a load status module 1685. Load controller 1680 can operate a load switch that selectively connects system 100 to a load. Load status module 1685 can receive a status signal indicating whether the load switch is opened or closed. For example, load status module 1685 can be coupled to a contactor of the load switch that opens and closes with the load switch.

FIG. 16B provides additional details of internal components of an example coupling module 1212. Coupling module 1212 includes sensor 1611 for each phase of a three-phase AC signal. Sensors 1611-1 through 1611-3 can be part of detectors 1605-1 through 1605-3, respectively. Each set of sensors 1611-1 to 1611-3 can include a voltage sensor that measures the voltage of its phase and a current sensor that measures the current of its phase and provide the measured values to respective interfaces 1612-1 through 1612-3, which can include shielded RJ-45 jacks. Interfaces 1612-1 through 1612-3 can be coupled to respective cables that connect coupling module 1212 to a network that is also coupled to MCD 1212. In this way, the coupling module 1212 can provide the measured voltages and currents to the MCD 1212. In some implementations, coupling module 1212 provides the measured signals to MCD 1212 as differential analog signals. In some implementations, coupling module 1212 provides the measured signals to MCD 1212 using an HSSI. Other appropriate communication interfaces can also be used.

Coupling module 1212 includes a grid contactor status switch 1676 which is part of or implements grid status module 1675. When the grid switch is closed, grid contactor status switch 1676 can also be closed to indicate that the grid switch is closed. Coupling module 1212 also includes a load contactor status switch 1686 which is part of or implements load status module 1685. When the load switch is closed, load contactor status switch 1686 can also be closed to indicate that the load switch is closed.

Coupling module 1212 also includes a grid relay 1671 that is part of or implements grid controller 1670. Coupling module 1212 can close grid relay 1671 to energize a coil of the grid switch to close the grid switch. Coupling module 1211 can open grid relay 1671 to de-energize the coil of the grid switch to open the grid switch.

Coupling module 1212 also includes a load relay 1681 that is part of or implements load controller 1680. Coupling module 1212 can close load relay 1681 to energize a coil of the load switch to close the load switch. Coupling module 1211 can open load relay 1681 to de-energize the coil of the load switch to open the load switch.

Coupling module 1212 also includes a connector 1660 for connecting conductors of coupling module 1212 and a ground fault interrupter (GFI) 1690 for detecting ground faults.

MCD 1212 can send, to coupling module 1212 a command to close grid relay 1671 or load relay 1681 in such a way to minimize overcurrent of an energy storage system (ESS) due to asynchronous AC line voltage and ESS voltage. MCD 1212 can send a command to open grid relay 1671 and load relay 1681 due to islanding detection or other fault detection signals, such as over voltage, under voltage, over current, over temperature, and so on.

Figure 17:
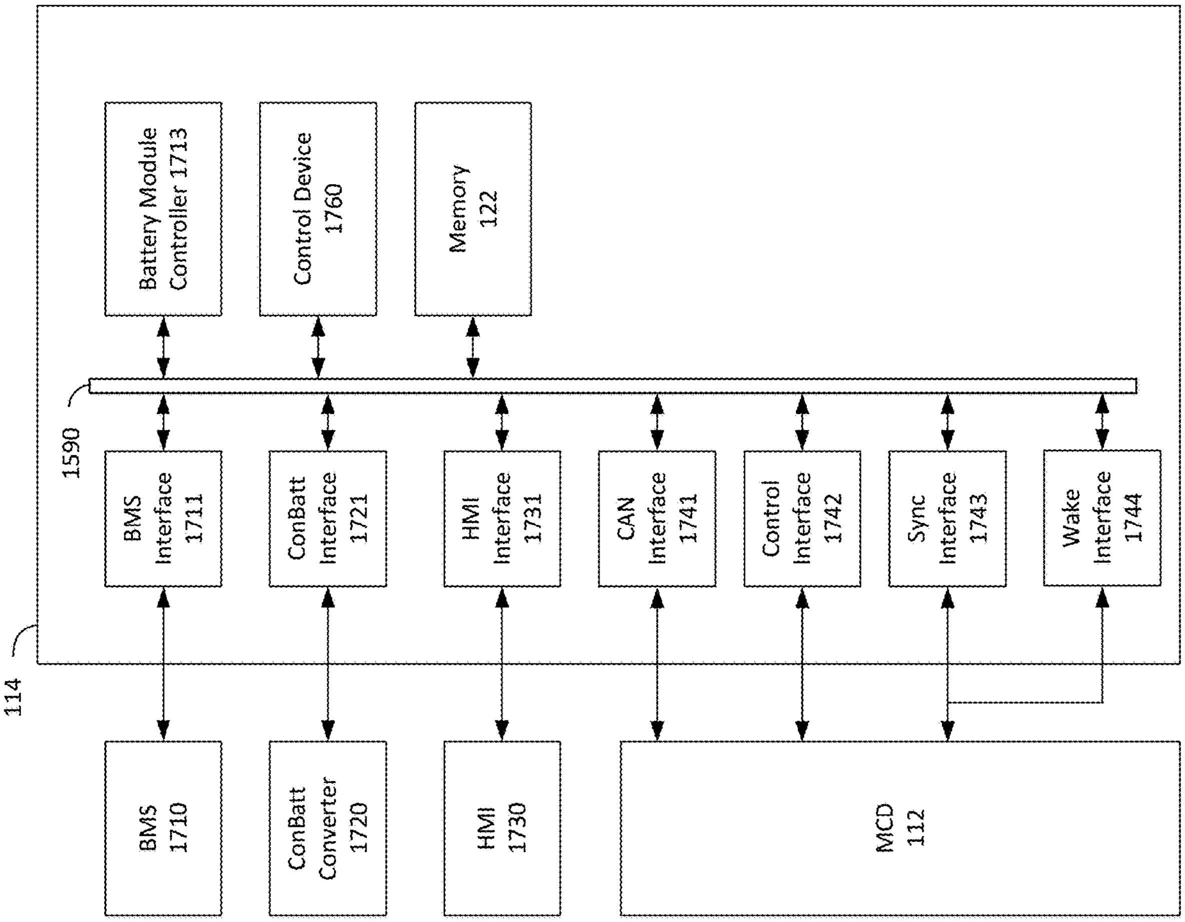
FIG. 17 is a block diagram depicting an example embodiment of a local control device.

FIG. 17 is a block diagram depicting an example embodiment of an LCD 114. LCD 114 can be used to implement the LCDs 114 described herein. As described above, LCD 114 can be part of a module 108 that includes, in addition to LCD 114, an energy source 206 (e.g., one or more batteries) and a converter 202. Although particular types of interfaces are shown in FIG. 17 and described below, other types of appropriate interfaces can be used.

LCD 114 includes a BMS interface 1711 that is configured to communicate with a BMS 1710 that manages and/or monitors one or more batteries of the energy source of the module. In some implementations, BMS interface 1711 includes a CAN controller that is coupled to a CAN bus that is also coupled to BMS 1710. BMS interface 1711 can receive battery status information 160 from BMS 1710 over the CAN bus. Battery status information can include, for example, the voltage, current, temperature, SOC, SOH, and depth of discharge (DOD).

LCD 114 includes a battery module controller 1713 that is configured to perform functions to protect the batteries. For example, battery module controller 1713 can be configured to receive battery status information and perform balancing between batteries 206 of module 108 and provide overvoltage, undervoltage, overcurrent, and undercurrent protection for batteries 206 of the module 108.

LCD 114 includes a ConBatt interface 1721 that is configured to communicate with a ConBatt converter 1720. Conbatt interface 1721 can include an ADC controller, a PWM controller, and a GPIO controller that are each configured to communicate with ConBatt converter 1720, e.g., a serial interface converter. The ADC controller can receive analog data from Conbatt converter 1720, convert the analog data to a digital format and send the digital data to memory 122. ConBatt converter 1720 can be a power converter, similar to converters of FIGS. 6A-6C, and can also include power switch gate drives and a DC-link circuit.

LCD 114 includes a human machine interface (HMI) interface 1731 that is configured to communicate with an HMI 1730 of module 108. HMI 1730 can display status information 160 for module 108 and provide user interfaces that include interactive controls that enable an operator to control module 108 locally.

LCD 114 includes a CAN interface 1741 and control interface 1742 that are configured to communicate with MCD 112. CAN interface 1741 can, for example, send status information 160 for module 108 to MCD 112 over a CAN bus that is coupled to CAN interface 1742 and MCD 112. CAN controller 1741 can obtain status information 160 from memory 122 and send status information 160 to MCD 112 over the CAN bus.

Control interface 1742 can receive control information, e.g., in the form of control information data elements, from MCD 112 over a serial interface that includes a serial bus that is coupled to control interface 1742 and MCD 112. Control interface 1742 can receive the control information data elements and send the control information data elements to memory 122 for storage. Control interface 1742 can be connected to a control information communication device that is configured to decode the control information data elements received from MCD 112.

LCD 114 also includes a synchronization interface 1743 and a wake interface 1744 configured to receive a synchronization signal from MCD 112. As described in more detail below, the synchronization signal can be used to receive control information data packets and wake LCD 114 from a sleep mode of operation. LCD 114 can be configured to monitor wake interface 1744 for a wake signal, e.g., in the form of a synchronization signal, while in a sleep mode of operation. If the wake signal is detected, LCD 114 can activate other components of LCD 114 (e.g., each interface) and transition to an active mode of operation.

LCD 114 also includes a control device 1760, which can be in the form of a processor, microcontroller, FPGAs, or other appropriate type of control device. For example, control device 1760 can include processing circuitry 120. Control device 1760 can execute software that performs the various functions of the LCD 114 described herein.

LCD 114 also includes memory 122, which can include volatile memory and/or non-volatile memory. LCD 114 also includes an internal bus 1590 that communicably couples the various hardware components of LCD 114.

Figure 18:
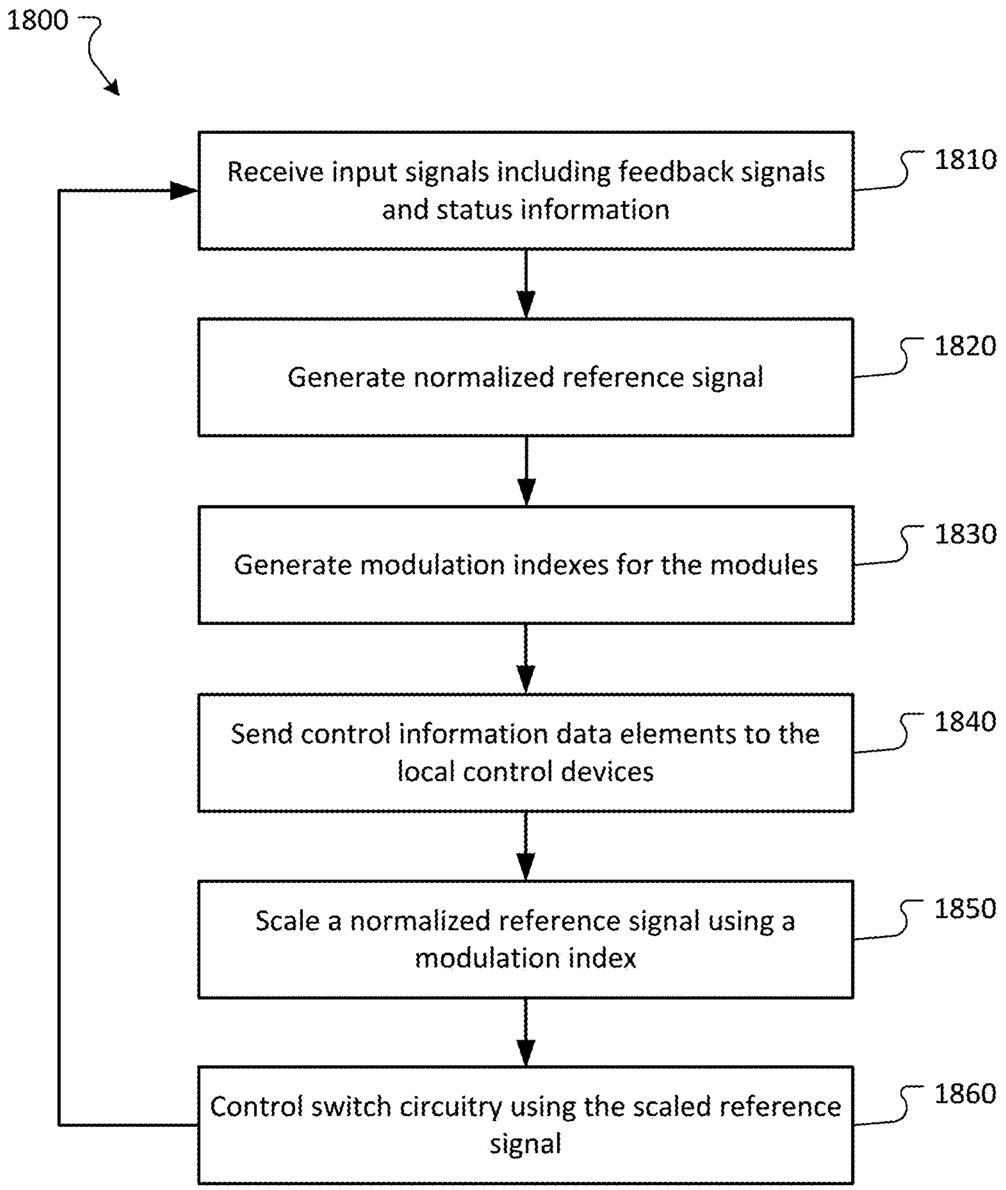
FIG. 18 is a flow diagram depicting an example embodiment of a method of sending control information data elements to local control devices and outputting a voltage waveform based on the control information data packets.

FIG. 18 is a flow diagram depicting an example embodiment of a method 1800 of sending control information data elements to local control devices and outputting a voltage waveform based on the control information data elements. The method 1800 can be performed by an energy system that includes an MCD 112 and one or more arrays 700 of cascaded modules 108. For example, the method 1800 can be performed by any one of the systems 100 having an MCD 112 and LCDs 114 described in this document. As described above, each module 108 can include an energy source 206, a converter 202 that includes switch circuitry and an LCD 114. Each module 108 in an array 700 can also have an identifier that identifies the module 108 and that is unique within array 700.

At step 1810, MCD 112 receives input signals that include feedback signals and status information 160. The feedback signals for each array 700 can include voltage and current measurements (and/or other characteristics) made by a coupling module 1212 that is connected in series with the outputs of converters 202 of modules 108 of array 700. As described above, coupling modules 1212 can measure the voltage and current of each phase and provide data indicating the voltage and current of each phase to MCD 112.

Status information 160 can include status information 160 for each module 108 in the array(s) 700 of cascaded modules 108. As described above, status information 160 can be information about one or more aspects, characteristics, or parameters of each module 108, e.g., SOC of the one or more energy sources of module 108, SOH of one or more energy sources 206 of module 108, temperature of one or more energy sources 206 or other components of module 108, capacity of one or more energy sources 206 of module 108, voltage of one or more energy sources 206 and/or other components of module 108, current of one or more energy sources 206 and/or other components of module 108, SOP, SOE, and/or the presence of absence of a fault in any one or more of the components of module 108.

The input signals can also include set points received by MCD 112 from an external control device 104. These set points can include a target voltage and/or target current, e.g., target voltage and/or target current waveforms, to be output by each array 700. The set points can include other characteristics of a target output AC waveform, such as phase and/or frequency.

MCD 112 is configured to receive status information 160 over a bidirectional communication path between MCD 112 and LCD 114 of each module 108. For example, the bidirectional path can include a CAN bus or another appropriate communication path.

At step 1820, MCD 112 generates a normalized reference signal Vrn for an array 700 of cascaded modules 108 for each phase. As described above, MCD 112 can include a controller 950 that is configured to generate normalized reference signals Vrn based on the feedback signals. In some implementations, MCD 112 can determine the difference between the set point(s) and feedback signals as a regulation error. MCD 112 can generate the normalized reference signals Vrn to compensate for the error. For example, MCD 112 can use a controller, e.g., a proportional-integral (PI), proportional-integral-derivative (PID), or other appropriate controller, to adjust the normalized reference signals based on the error.

At step 1830, MCD 112 generates modulation indexes Mi for modules 108 of array 700 based on status information 160. Step 1830 can be performed after, before, or concurrently with step 1820. As described above, modules 108 can be balanced with respect to other modules 108 in an array 700 (intraphase balancing) and different arrays 700 can be balanced with respect to each other (interphase balancing). The modulation indexes Mi for modules 108 in an array 700 can differ. For example, if one of the modules 108 has a higher temperature than others, MCD 112 can reduce the output voltage level of that module 108 by reducing the modulation index Mi for that module 108. To ensure that the voltage level to the load remains at its target, MCD 112 can also increase the modulation index Mi for one or more of the other modules 108 to increase the output voltage level of the module(s) 108. Thus, the modulation index Mi for at least one module 108 in an array 700 can be different from the modulation index Mi for at least one other module 108 in the array 700.

Figure 19:
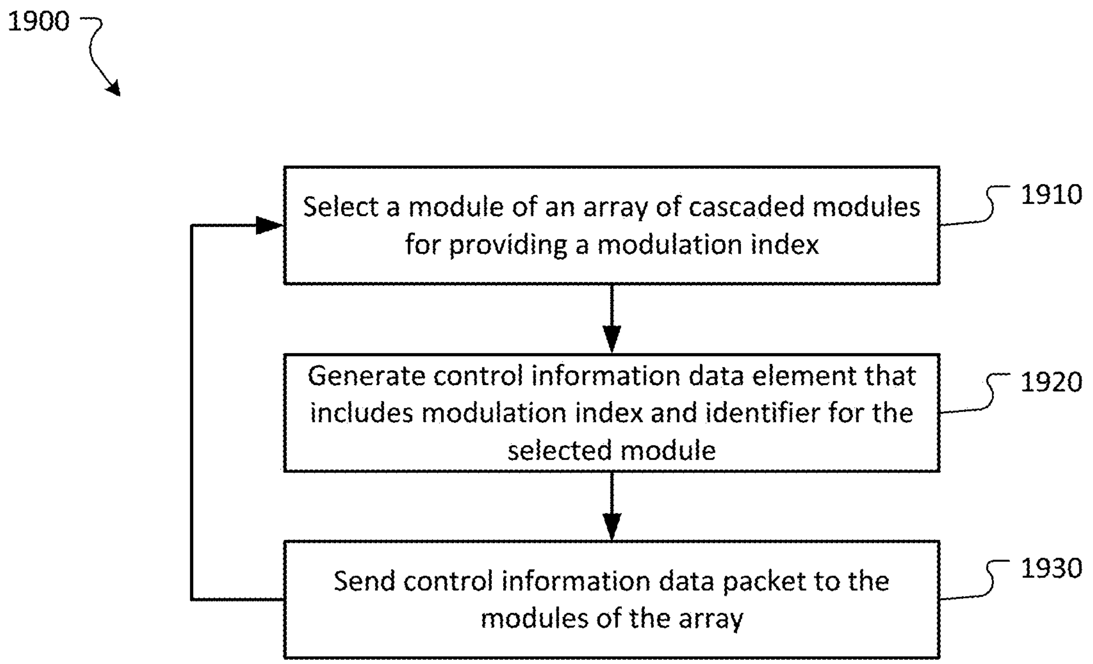
FIG. 19 is a flow diagram depicting an example embodiment of a method of sending control information data elements to local control devices.

At step 1840, MCD 112 sends control information data elements to modules 108. MCD 112 can send different control information data elements to each array 700 of cascaded modules 108. A control information data element for an array 700 can include the normalized reference signal Vrn for all modules 108 of array 700, a single identifier for a single module 108 of array 700, and a modulation index Mi for the single module 108. As described above, MCD 112 can cycle through modules 108 in array 700 in a sequence such that MCD 112 provides the modulation index Mi for each module 108 in array 700 once each cycle. During this cycle, MCD 112 can select the identifier for one of the modules 108 and include the modulation index Mi and the identifier for the selected module 108 in the control information data element. An example process for sending the control information data elements to LCDs 114 is depicted in FIG. 19 and described below. As described above, MCD 112 can send the control information data elements to the LCDs 114 over a serial communication path.

At step 1850, each LCD 114 scales a normalized reference signal Vrn using a modulation index Mi. LCD 114 is configured to receive a control information data element and decode the data element to obtain the normalized reference signal Vrn, the modulation index Mi for one of the modules 108, and the identifier for the one module 108 that is encoded in the control information data element.

LCD 114 is also configured to determine whether the identifier of the control information data element to the identifier of the module that includes LCD 114, e.g., by comparing the identifiers. If they match, LCD 114 can scale the normalized reference signal Vrn of the control information data element using the modulation index Mi of the control information data element. If they do not match, LCD 114 can scale the normalized reference signal Vrn of the control information data element using the modulation index Mi of a most recently received control information data element that included the identifier for the module 108 that includes LCD 114. As described above, scaling a normalized reference signal Vrn using a modulation index Mi can include multiplying the normalized reference signal Vrn by the modulation index Mi.

At step 1860, each LCD 114 controls switch circuitry of a converter 202 of a module 108 that includes LCD 114 using the scaled reference signal. LCD 114 can operate the switch circuitry (e.g., generate the control signals for each switch) of its converter 202 using a PWM or hysteresis technique based on the scaled reference signal, as described in detail above. In this manner, the modulation index Mi can be used to control the PWM switching signals provided to the power converter switching circuitry, and thus regulate the operation of the module 108.

MCD 112 and LCDs 114 can perform the method 1800 continuously to regulate the AC waveform output to a load connected to the outputs of converters 202. For example, MCD 112 can send the control information data elements periodically based on a specified time period. In another example, MCD 112 can send the control information data elements whenever there is a change in the normalized reference signal Vrn or a change in one of the modulation indexes Mi.

FIG. 19 is a flow diagram depicting an example embodiment of a method 1900 of sending control information data elements to LCDs 114. The method can be performed by an MCD 112.

At step 1910, MCD 112 selects a module 108 of an array 700 of cascaded modules 108 for providing a modulation index Mi. As described above, MCD 112 can select modules 108 in a defined sequence, e.g., from a first module 108, to a second module 108, to a third module 108, and so on.

At step 1920, MCD 112 generates a control information data element that includes the modulation index Mi and the identifier for the selected module 108. MCD 112 can encode a normalized reference signal Vrn for all modules 108 in array 700, the modulation index Mi for the selected module 108, and the identifier for the selected module 108 in the control information data element.

At step 1930, MCD 112 sends the control information data element to modules 108 in array 700, e.g., to all modules 108 in array 700. MCD 112 then returns to step 1910 in which MCD 112 selects another module 108 in the sequence. If the most recently sent control information data element included the modulation index Mi and identifier for the last module 108 in the sequence, MCD 112 can start over with the first module 108 in the sequence.

Figure 22:
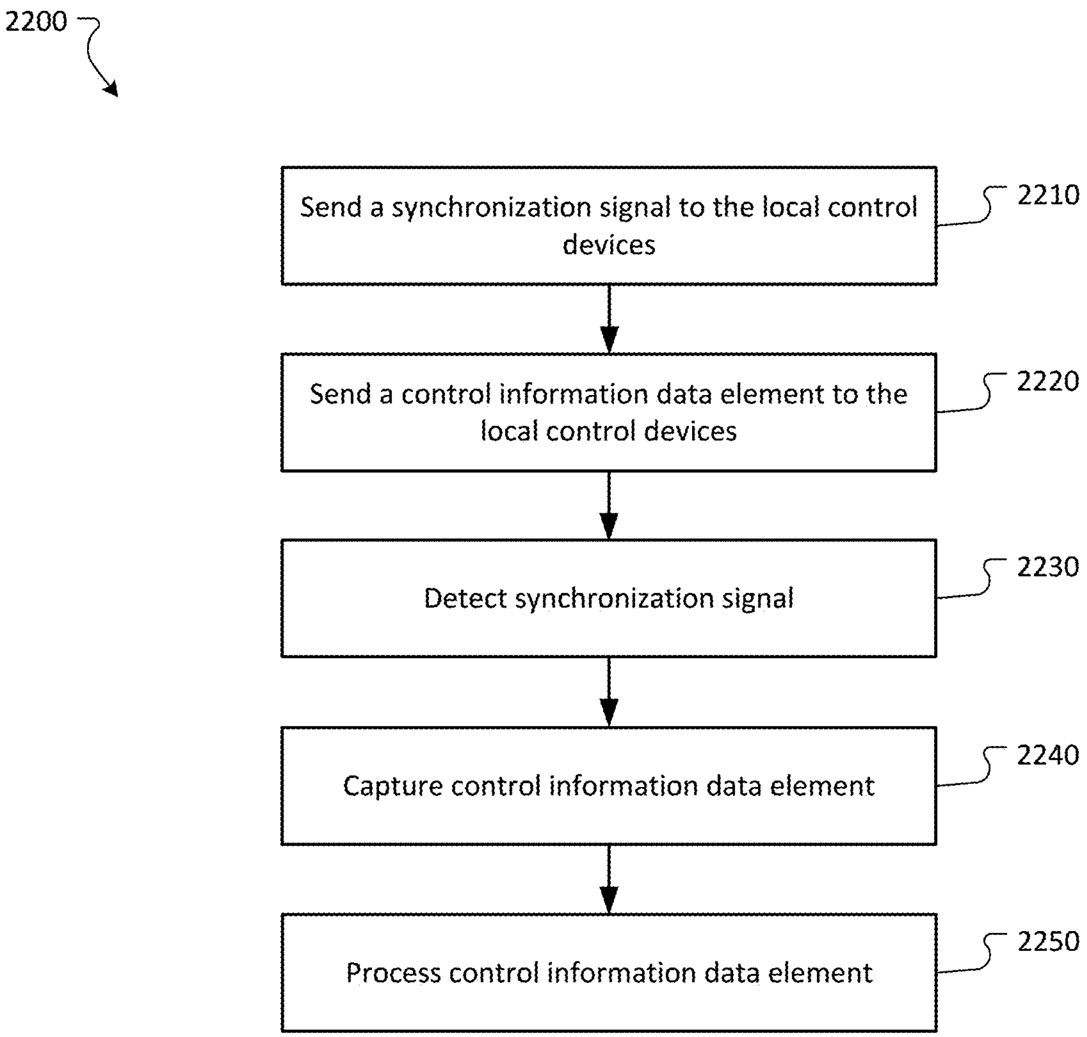
FIG. 22 is a flow diagram depicting an example embodiment of a method of receiving control information data elements using a synchronization signal.

LCDs 114 can employ various techniques for receiving the control information data elements over a serial communication path. One technique involves determining when a complete control information data element has been received based on a duration of time that has elapsed since a first data packet was received and whether additional data packets are being received. Another technique involves MCD 112 sending, to LCDs 114, a synchronization signal that indicates when a control information data element will be arriving at LCDs 114. An example method corresponding to the first technique is depicted in FIG. 20 and an example method corresponding to the second technique is depicted in FIG. 22.

Example Techniques for Receiving Control Information

Figure 20:
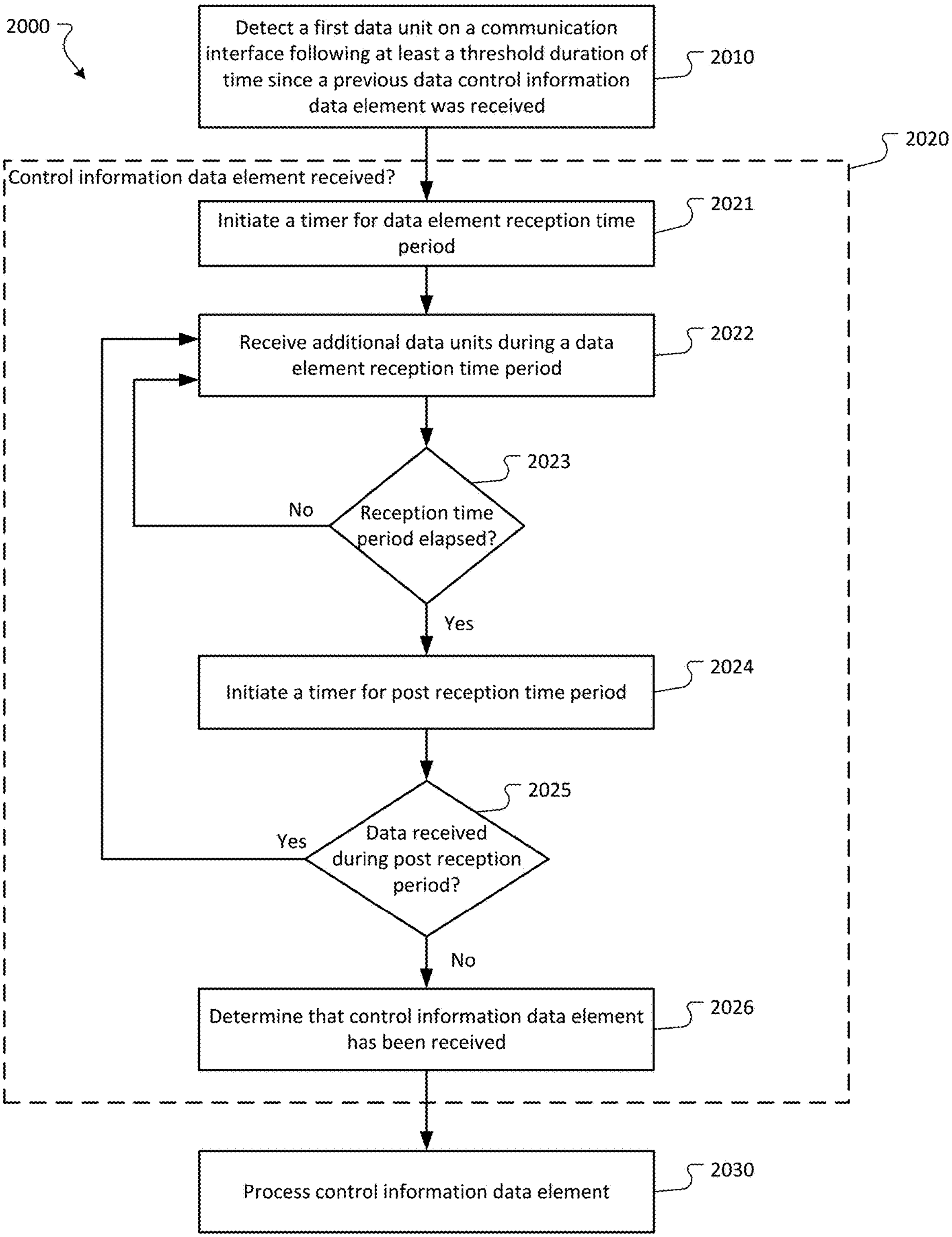
FIG. 20 is a flow diagram depicting an example embodiment of a method of receiving control information data elements.

FIG. 20 is a flow diagram depicting an example embodiment of a method 2000 of receiving control information data elements. The method 2000 can be performed by an LCD 114 of an energy system that includes an MCD 112 and one or more arrays 700 of cascaded modules 108. For example, the method 2000 can be performed by any one of the systems 100 having an MCD 112 and LCDs 114 described in this document. As described above, each module 108 can include an energy source 206, a converter 202 that includes switch circuitry, and an LCD 114. Each module 108 in an array 700 can also have an identifier that identifies the module 108 and that is unique within the array 700. The method 2000 is described with additional reference to FIG. 21, which is a diagram depicting an example data stream 2100.

At step 2010, LCD 114 detects a first data unit on a communication interface connected to a communication path following at least a threshold duration of time since a previous control information data element was received. As described above, an MCD 112 can send a control information data element that includes a normalized reference signal Vrn periodically. The control information data element can also include a modulation index Mi and an identifier for a module 108 to which the modulation index Mi corresponds.

In some embodiments, each control information data element is a data frame that includes one or more data segments. In this example, each data unit can be a data segment of the data frame.

MCD 112 can send the control information data elements periodically such that there is a period of time between the end of reception of one control information data element and the transmission of the next control information data element. For example, referring to FIG. 21, there is a duration of time between each pair of successive data frames 2110, 2120, and 2130. This time period can be used by LCD 114 to ensure that a control information data element is fully received and to determine that a newly received data unit following the time period is for a new control information data element. The threshold duration of time can be this time period or based on this time period. For example, if the MCD waits 150 microseconds after sending one control information data element before sending a next control information data element, the threshold duration of time can be 150 microseconds or a shorter time period, e.g., 100 microseconds, 50 microseconds, or another appropriate duration. In some implementations, the minimum threshold duration of time is the time duration for sending one byte of data, e.g., on the communication path 115 of FIGS. 11A-11B.

As described above, each control information data element can have a common data size. In some implementations, a control information data element can have a data size of four bytes. Other data sizes that are less than or greater than four bytes can also be used. Each data unit can be one byte, one data packet, or another portion of data that can be sent at one time across the communication path.

At step 2020, LCD 114 determines whether a new control information data element that includes the detected data unit has been received. LCD 114 can be configured to determine whether a new control information data element is received based on a duration of time that has elapsed since the first data unit was received and whether additional data units are received following a data reception time period for the new control information data element. LCD 114 can determine whether a new control information data element has been received using constituent steps 2021-2026.

LCD 114 initiates a timer in response to detecting the first data unit. The timer can be for the data reception time period which is for a defined duration of time. For example, the timer can be a count up timer that counts from zero to the end of the defined duration or a count down timer that counts down from defined duration to zero. In a particular example, the duration can be 70 microseconds. In this example, the timer can count up from zero to 70 microseconds or count down from 70 microseconds to zero upon the initiation of the timer.

The data reception time period can be based on an expected time period for receiving an entire control information data element. The expected time period can be based on the data size of each control information data element and the data rate of the communication path over which the control information data elements are sent.

Figure 21:
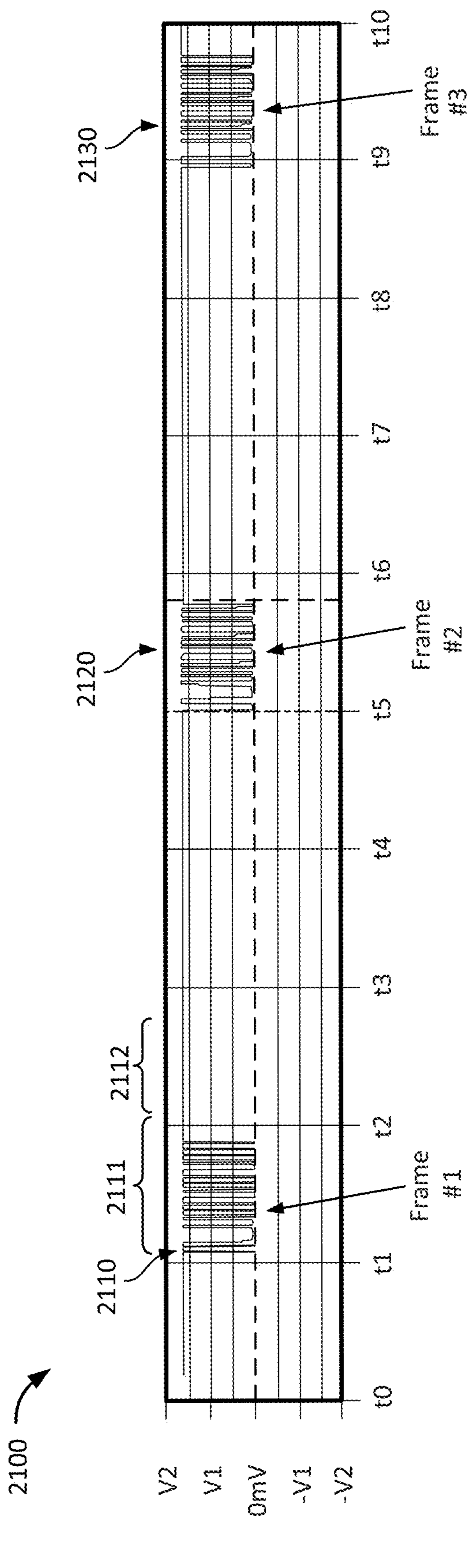
FIG. 21 is a diagram of an example data stream.

In some implementations, the data reception time period is longer than the expected time period. As data transmissions can be delayed, e.g., due to noise on the communication path, using a longer data reception time period can better ensure that an entire control information data element is received. In one example, the data reception time period can be based on the expected time period for the control information data element plus some additional time to receive one or two bytes of data. In another example, data reception time period can be based on the expected time period for the control information data element plus an additional specified duration of time. Referring to FIG. 21, an example data reception time period 2111 extends past the time required to receive the data frame 2110 that includes a control information data element.

At step 2022, LCD 114 receives additional data units during the data reception time period. LCD 114 can store each data unit locally as the data units are received.

At step 2023, LCD 114 determines whether the data reception time period has elapsed (2023). For example, LCD 114 can determine whether the counter has finished counting up or down based on the data reception time period.

If the data reception time period has not elapsed, LCD 114 returns to step 2022 to continue receiving additional data units. If the data reception time period has elapsed, LCD 114 initiates a timer for a post reception time period in step 2024. The post reception time period can immediately follow the data reception time period and can have the same duration, a longer duration, or a shorter duration than the data reception time period. The timer for the post reception time period can be a count up timer or count down timer, similar to the timer for the data reception time period. Referring to FIG. 2100, an example post reception time period 2112 immediately follows the data reception time period 2111.

In some implementations, a single timer can be used for a data element reception time period, e.g., without a post reception time period. In this example, the one time period can have a duration that is longer than an expected duration for receiving a complete control information data element.

At step 2025, LCD 114 determines whether additional data units are received during the post reception time period. LCD 114 can monitor for additional data units until the post reception time period elapses. If additional data units are received during the post reception time period, LCD 114 can determine that the entire control information data element has not been received and return to step 2022 to receive additional data units. As the data reception time period has elapsed, LCD 114 can re-start the post reception time period for each additional data unit received during a post reception time period until no additional data units are received during a post reception time period.

If no additional data units are received during the post reception time period, LCD 114 determines that the control information data element has been received in step 2026. In response, LCD 114 can process the control information data element in step 2030. This processing can include decoding the control information, scaling the normalized reference signal Vrn in the control information using a modulation index Mi, and operating switch circuitry of a converter 202 using the scaled reference signal.

Prior to processing the control information data element, LCD 114 can use the CRC bits to check for errors and/or correct data in the control information data element. If the data cannot be corrected, LCD 114 may not use the control information in the control information data element to operate the switch circuitry. Instead, LCD 114 can use previously received control information of a previously received control information data elements to operate the switch circuitry. This ensures that there are no interruptions in the operation of module 108 due to corrupted data.

FIG. 22 is a flow diagram depicting an example embodiment of a method 2200 of receiving control information data elements using a synchronization signal. The method 2200 can be performed by an energy system that includes an MCD 112 and one or more arrays 700 of cascaded modules 108. For example, the method 2200 can be performed by any one of the systems 100 described in this document. As described above, each module 108 can include an energy source 206, a converter 202 that includes switch circuitry, and an LCD 114. Each module 108 in an array 700 can also have an identifier that identifies the module 108 and that is unique within the array 700. The method 2200 is described with additional reference to FIG. 23, which is a diagram depicting an example data stream 2300.

MCD 112 can be communicably coupled to each LCD 114 via multiple data communication paths. For example, MCD 112 can be communicably coupled to each LCD 114 using a one-way serial communication path over which MCD 112 sends control information data elements, as described above. MCD 112 can also be communicably coupled to each LCD 114 using a synchronization signal bus. In some implementations, a synchronization signal bus in implemented as a one-way serial communication path over which MCD 112 sends a synchronization signal to the LCDs 114. For example, the synchronization signal bus can be implemented as a twisted pair cable that connects MCD 112 to each LCD 114 in an array 700 of cascaded modules 108. Other protocols and buses can also be used for the synchronization signal, such as a digital communication path. For brevity, the method 2200 is described in terms of a differential signal, which can be sent over a twisted pair bus or other appropriate communication path.

At step 2210, MCD 112 sends a synchronization signal to LCDs 114 of modules 108 in an array 700 of cascaded modules 108. The synchronization signal indicates the beginning of the transmission of control information data to LCDs 114. In some implementations, the differential signal can have a high voltage difference, e.g., above a first threshold, to indicate the beginning of the transmission or a low voltage difference, e.g., below second threshold that is less than the first threshold, to indicate the end of a transmission. To indicate that a transmission is beginning, MCD 112 can send a synchronization signal to LCDs 114 by increasing the voltage difference of the differential signal above the first threshold.

At step 2220, MCD 112 sends a control information data element to LCDs 114 of modules 108 in array 700. The control information data element can include one or more data packets within a data frame. MCD 112 can send the control information data element at the same time as the synchronization signal of after a brief delay, e.g., a delay in microseconds or milliseconds.

Figure 23:
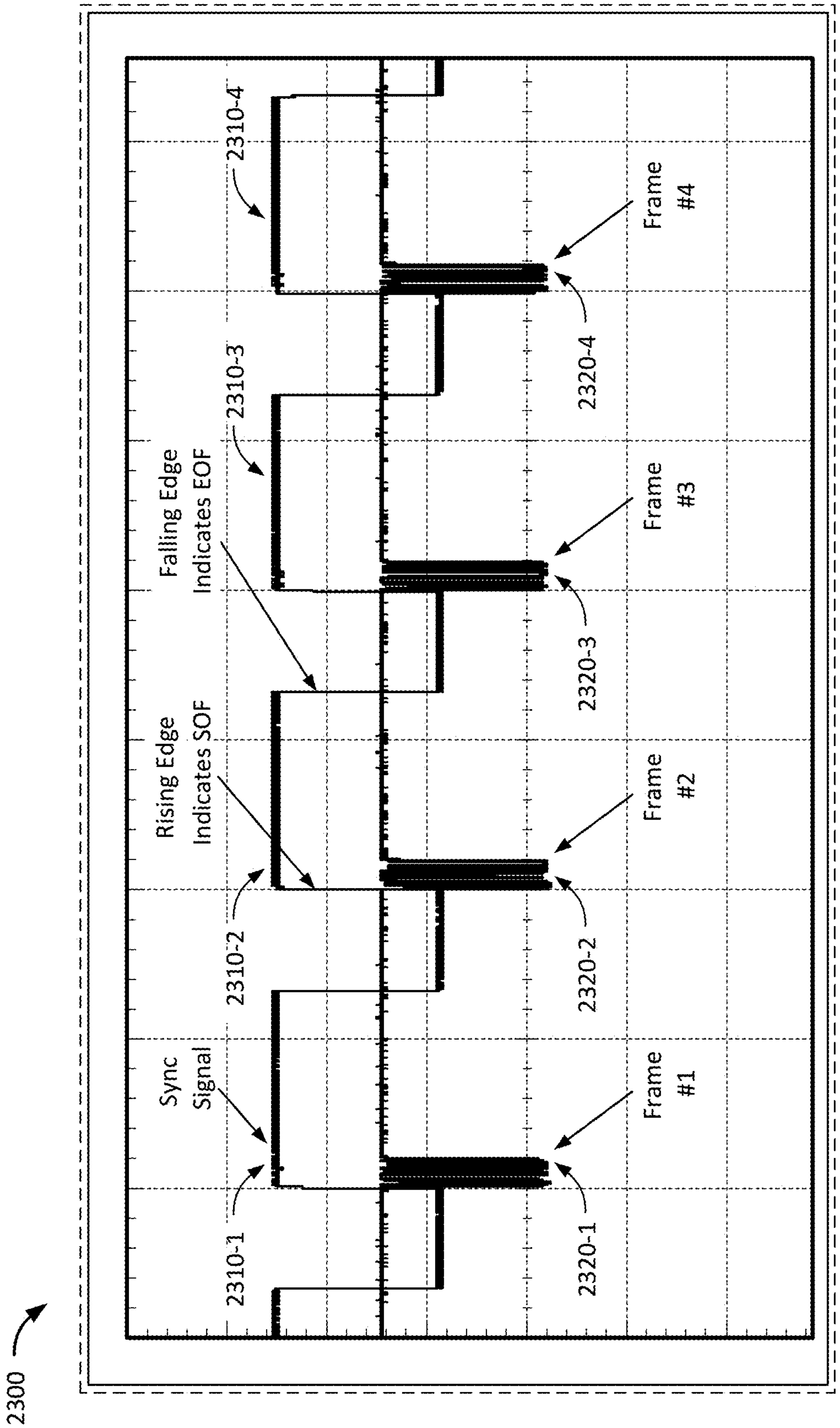
FIG. 23 is a diagram of an example data stream.

Referring to FIG. 23, the leading edge of each synchronization signal 2310-1 to 2310-4 are aligned with the beginning of each frame 2320-1 to 2320-4 in which control information is sent from MCD 112 to LCDs 114.

At step 2230, LCDs 114 detect the synchronization signal (2230). For example, LCDs 114 can detect the synchronization signal based on the voltage difference of the differential signal. In this example, LCDs 114 can compare the voltage level to the first threshold and determine that the synchronization signal is present when the voltage level satisfies the first threshold, e.g., by meeting or exceeding the first threshold.

At step 2240, LCD 114 of each module 108 in array 700 captures the control information data element. LCD 114 can start monitoring for the control information in response to detecting the synchronization signal and continue monitoring for control information until the synchronization signal is no longer present, e.g., when the voltage difference of the differential signal is less than the second threshold. LCD 114 can store the captured control information locally in memory of the LCD.

LCD 114 can stop monitoring for control information upon detecting that the synchronization signal is no longer present. After transmitting all of the control information, MCD 112 can remove the synchronization signal, e.g., by reducing the voltage difference of the differential signal below the second threshold.

Referring to FIG. 23, the falling edge of the synchronization signals 2310-1 to 2310-4 occur after an entire frame 2320-1 to 2320-4, respectively, has been sent from MCD 112 to LCDs 114. In this example, there is a delay from the end of each frame to the falling edge of each synchronization signal. MCD 112 can employ this delay to ensure that all of the data reaches each LCD 114 and is captured before removing the synchronization signal.

At step 2250, LCD 114 of each module 108 processes the control information data element. This processing can include decoding the control information, scaling the normalized reference signal Vrn in the control information using a modulation index Mi, and operating switch circuitry of a converter 202 using the scaled reference signal.

Prior to processing the control information data element, LCD 114 can use the CRC bits to check for errors and/or correct data in the control information data element. If the data cannot be corrected, LCD 114 may not use the control information in the control information data element to operate the switch circuitry. Instead, LCD 114 an use previously received control information of a previously received control information data elements to operate the switch circuitry. This ensures that there are no interruptions in the operation of the module due to corrupted data.

MCD 112 can also use the synchronization signal to "wake" an LCD 114, e.g., from a sleep mode of operation for LCD 114. In this way, the synchronization signal can be used for dual purposes. For example, LCD 114 can go into a sleep mode in which LCD 114 conserves power. In a particular example, when an electric vehicle is parked, the modules' peripheral devices such as power supplies and converters 202 are switched off, e.g., by MCD 112 and/or LCD 114, and LCDs 114 can be configured to go into a sleep mode. To wake up LCD 114 and launch peripheral devices, MCD 112 can provide a trigger pulse on the wake interface, e.g., a wake up pin, of LCD 114. To use the synchronization signal for dual purposes, the synchronization signal can also be connected to the wake up pin to wake LCD 114 from the sleep mode. In response to the synchronizations signal being applied to the wake up pin, the LCD can launch the peripheral devices and begin monitoring for control information.

Using a synchronization signal provides advantages over other approaches. For example, using a synchronization signal provides a clear window to LCDs 114 of when control information is being sent to the LCDs 114. With such clear demarcations, the dead period between frames can be reduced, which reduces latency in the system. This also enables an increase in the number of frames that are sent over a same period of time, which provides a higher sample rate for the reference signal.

Figure 24:
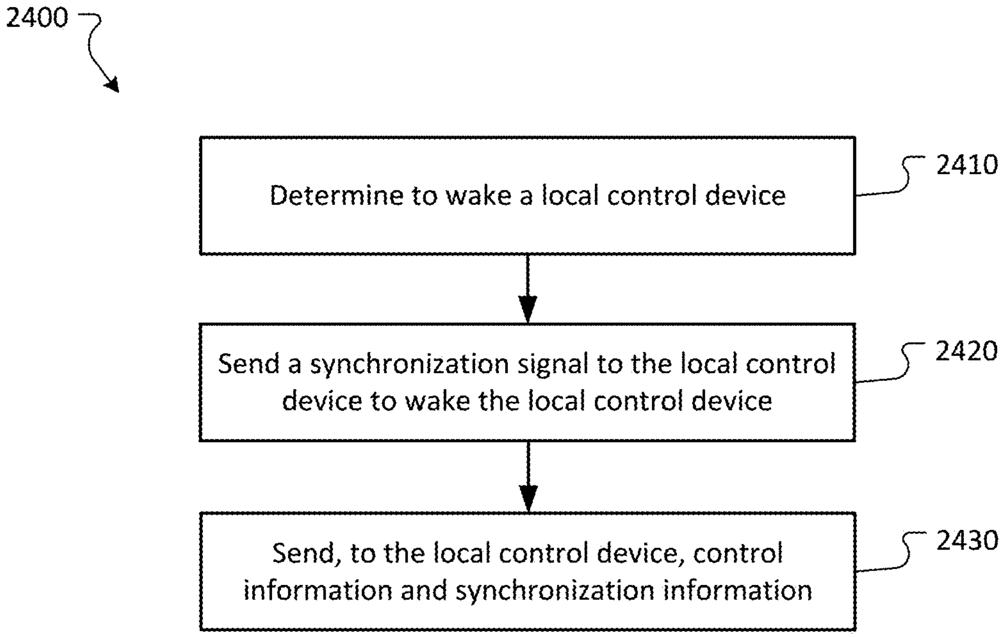
FIG. 24 is a flow diagram depicting an example embodiment of a method of waking a local control device.

FIG. 24 is a flow diagram depicting an example embodiment of a method 2400 of waking a local control device. The method 2400 can be performed by an energy system that includes an MCD 112 and one or more arrays 700 of cascaded modules 108. For example, the method 2400 can be performed by any one of the systems 100 described in this document. As described above, each module 108 can include an energy source 206, a converter 202 that includes switch circuitry, and an LCD 114. Each module 108 in an array 700 can also have an identifier that identifies the module 108 and that is unique within the array 700.

At step 2410, MCD 112 determines to wake an LCD 114. For example, an MCD of an electric vehicle may be configured to wake each LCD 114 of one or more arrays 700 of modules 108 when a user turns the vehicle on or initiates acceleration of the vehicle. When the vehicle is off or still, the MCD 112 can instruct each LCD to go into the sleep mode of operation. The sleep mode of operation can be a relatively low power mode where LCD 114 consumes less power than when in an active or relatively high power mode utilized during normal charging or discharging operation of system 100.

At step 2420, MCD 112 sends a synchronization signal to each LCD 114 that is being awakened. MCD 112 can send the synchronization signal the each LCD over a synchronization path that is used for dual purposes. For example, the synchronization path can be coupled to a synchronization interface of MCD 112 and to both a synchronization interface of each LCD 114 and to a wake interface, e.g., wake pin, of each LCD 114.

Each LCD 114 can be configured to monitor the wake interface even when LCD 114 is in the sleep mode of operation. Upon detecting the synchronization signal at the wake interface, LCD 114 can transition to the active mode of operation in which LCD 114 monitors all or most interfaces, operates with a higher frequency, and/or performs other operations that consume more power. LCD 114 can also wake peripheral devices in response to detecting the synchronization signal at the wake interface.

At step 2430, MCD 112 sends control information and synchronization information to each LCD 114. As described above, MCD 112 can send control information, e.g., in the form of control information data elements, to LCDs 114 over a communication interface, e.g., over a control interface. When sending control information data elements, MCD 112 sends a synchronization signal to LCDs 114 over the synchronization path to notify LCDs that the control information data element is being sent, as described above.

Example Synchronization Techniques

As described above, various techniques can be used to synchronize LCDs 114 with the transmission of control information data packets. Synchronization techniques can also be used to synchronize PWM controllers 1123 of an array 700 or across multiple arrays 700. These techniques can include the use of data absence events, similar to method 2000 of FIG. 20 or the use of a synchronization signal. By precisely synchronizing PWM controllers 1123, the phase shifts between switching signals output by LCDs 114 and the phase shifts of their converters output voltages are more precise and aligned, resulting in superior system performance.

Figure 25A:
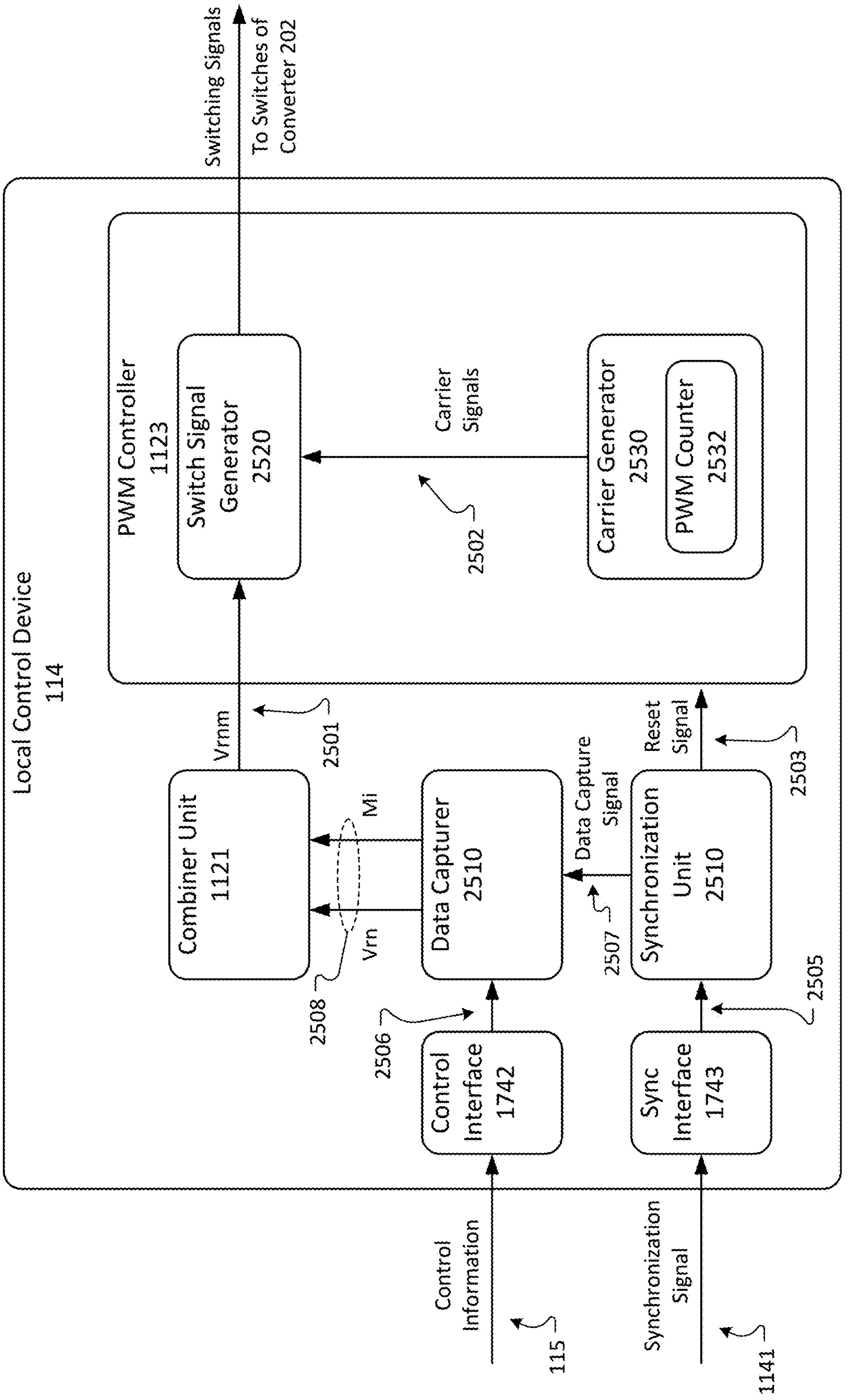
FIG. 25A is a block diagram of an example embodiment of a local control device.

FIG. 25A is a block diagram of an example embodiment of an LCD 114 configured to implement synchronization techniques described herein. LCD 114 can be implemented as an LCD 114 in any system described herein.

LCD 114 includes PWM controller 1123. As described above, PWM controller 1123 is configured to generate switching signals for switches (e.g., switches S1-S6) of converter 202 based on a carrier signal for each switch and a modulated reference signal Vrnm. PWM controller 1123 includes a switch signal generator 2520 and a carrier generator 2530.

Carrier generator 2530 is configured to generate the carrier signals for the switches of converter 202 based on a defined phase shift for converter 202 and to provide the carrier signals to switch signal generator 2520 over communication path or link 2502. The phase shift is different between different converters and as a result the switching signals for the switches of each converter 202 are also different. Carrier generator 2530 includes a PWM counter 2532 that is used to control the phase shift between the carrier signals generated by carrier generator. When PWM counter 2532 is reset, carrier generator 2530 restarts the carrier signal generation process. For example, assume that carrier generator 2530 generates the phase shifted carrier signals starting with a first triangular wave with a phase shift of zero at the beginning of the carrier signal generation process. In this example, when PWM counter 2532 is reset, carrier generator 2530 restarts the carrier signal generation process by generating the first triangular wave and then generates each other phase shifted triangular wave in order according to their phase shifts.

Switch signal generator 2520 is configured to generate the switching signals for each switch of converter 202 based on the carrier signals received from carrier generator 2530 and the modulated reference signal Vrnm received from combiner unit 1121. Switch signal generator 2520 can use PWM techniques, such as but not limited to those described herein with reference to FIGS. 8C-8F, to generate the switching signals based on the carrier signals and the modulated reference signal Vrnm for the module 108 associated with the LCD 114 performing the PWM processing, and output the switching signals to the switches of the associated converter 202 to generate the time-varying output signal from that module 108, where the sum of all time-varying output signals from each module 108 of a phase generates the AC output signal of that phase.

LCD 114 includes control interface 1742 that is configured to receive control information, e.g., control information data elements, from MCD 112 over path or link 115. Similarly, LCD 114 includes synchronization interface 1743 that is configured to receive a synchronization signal from MCD 112. Each interface 1742 and 1743 can include a driver for the interface and an isolation unit.

LCD 114 also includes a synchronization unit 2510 communicably coupled to synchronization interface 1743. Synchronization unit 2510 is configured to receive the synchronization signal from the synchronization interface 1743 over path or link 2505 and detect synchronization events based on the synchronization signal. Synchronization unit 2510 can be implemented in hardware, software or a combination thereof within LCD 114. In some embodiments, synchronization unit 2510 is implemented as a separate component communicably coupled to LCD 114 over a path or link.

Figure 26A:
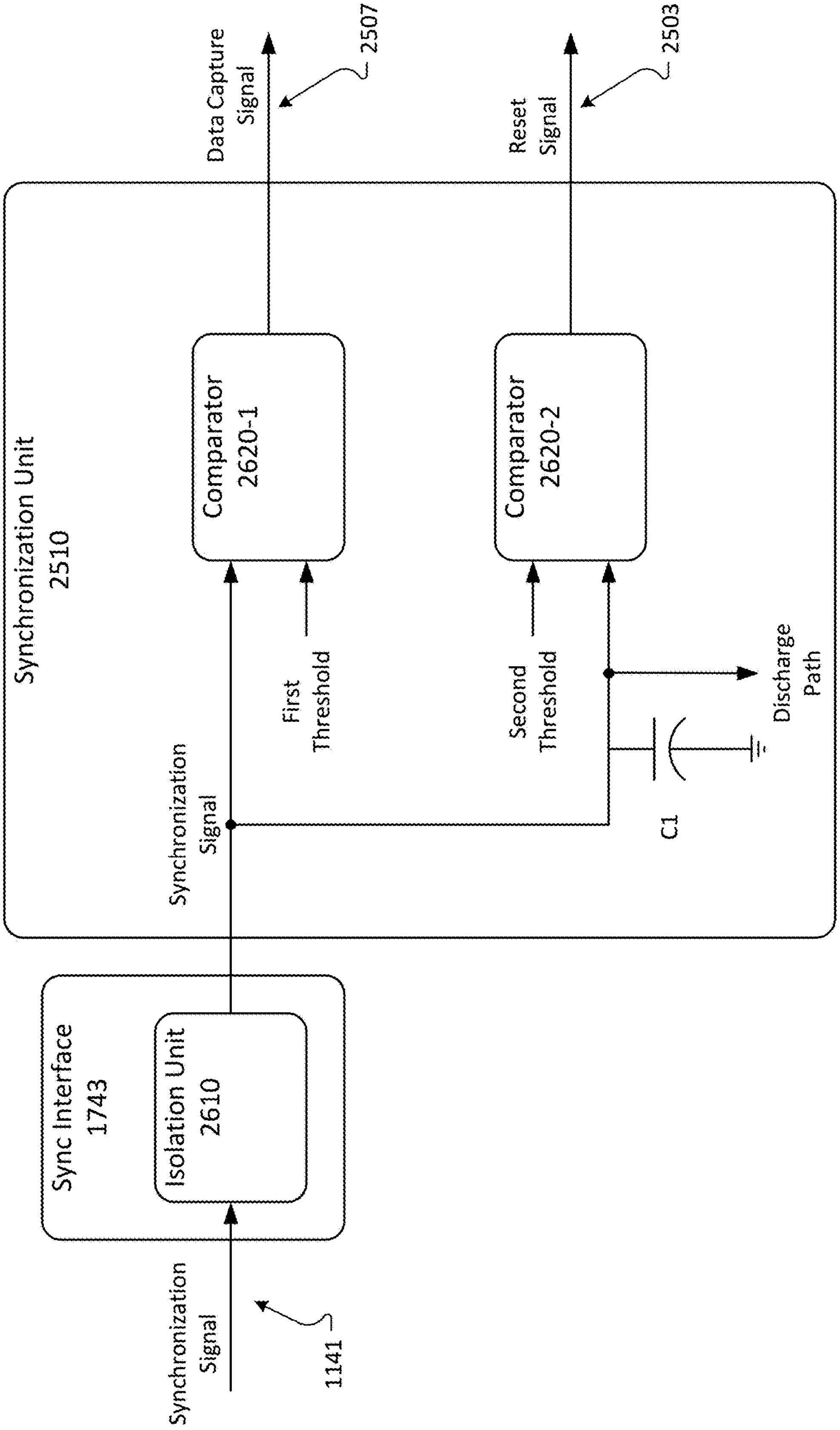
FIG. 26A is a block diagram of an example embodiment of a synchronization unit.

Synchronization unit 2510 can be configured to detect PWM synchronization events and/or data capture events based on the synchronization signal. A PWM synchronization event indicates the time to synchronize PWM controllers 1123 of an array 700 or of a system 100. A data capture event indicates the time to capture control information from path or link 115. For example, a data capture event can indicate that MCD 112 is sending a control information data element on path or link 115. An example, synchronization unit 2510 is shown in FIG. 26A and described below.

When a data capture event is detected, synchronization unit 2510 can output a data capture signal to a data capturer 2510 over communication path or link 2507. Data capturer 2510, which can be implemented in hardware and/or software, can be configured to capture the control information from path or link 2506 between control interface 1742 and data capturer 2510, decode the control information to obtain normalized reference signal Vrn and the modulation index Mi, and store (e.g., in memory 122) the control information. Data capturer 2510 can also provide the normalized reference signal Vrn and the modulation index Mi to combiner unit 1121 over communication paths or links 2508. As described above, combiner unit 1121 is configured to modulate or scale the normalized reference signal Vrn using the modulation index Mi to generate a modulated reference signal Vrnm. Control unit 1121 can output the modulated reference signal Vrnm to PWM controller 1123 over communication path or link 2501. In other embodiments, modulated reference signal Vrnm for each module 108 can be generated by MCD 112 and transmitted directly to each module 108 as assigned.

When a PWM synchronization event is detected, synchronization unit 2510 can be configured to output a reset signal to PWM controller 1123 over communication path or link 2503. When PWM controller 1123 detects the reset signal, PWM controller 1123 can immediately (e.g., without delay) reset PWM counter 2532. In some embodiments, a synchronization output of synchronization unit 2510 is coupled directly to a dedicated PWM counter reset input of PWM controller 1123. For example, the counter reset input can be a pin if PWM controller 1123 is implemented as an integrated circuit. In this way, the reset signal is not delayed by hardware interrupts of PWM controller 1123.

Communication paths or links 2501-2503 and 2506-2508 can each be wired (e.g., electrical, optical) or wireless communication paths that communicate data or information unidirectionally or bidirectionally, in parallel or series fashion, similar to communication paths or links 105, 106, 115, 116, and 118.

Figure 25B:
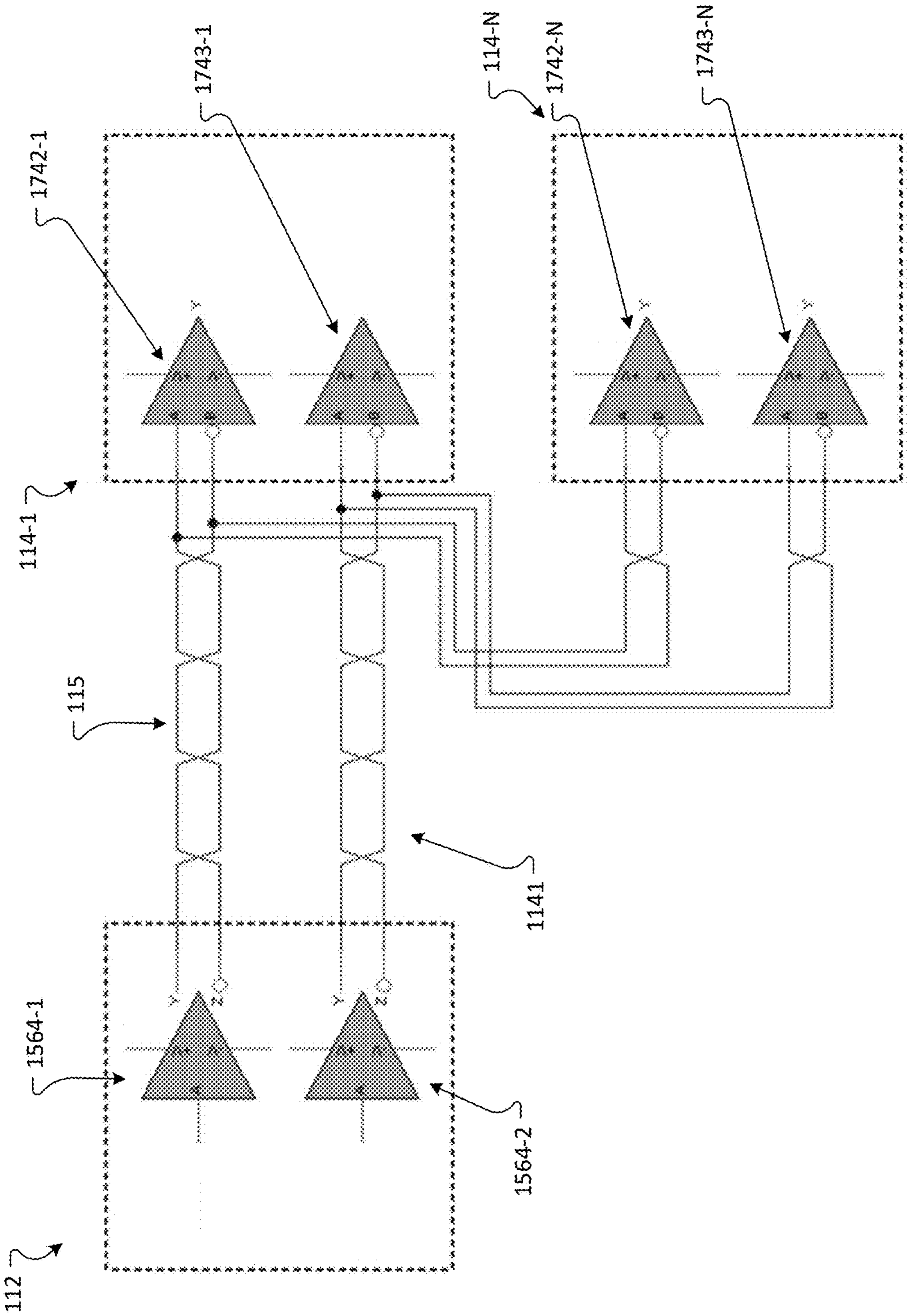
FIG. 25B is a schematic view depicting an example embodiment of communication connections between a master control device and local control devices.

FIG. 25B is a schematic view depicting an example embodiment of communication connections between MCD 112 and LCDs 114. In this embodiment, an RS-485 physical layer is used for communications between MCD 112 and LCDs 114-1 to 114-N. MCD 112 includes an RS-485 interface 1564-1 that is configured to send control information to RS-485 interfaces 1742-1 to 1742-N of LCDs 114-1 to 114-N over a twisted pair cable 115. MCD 112 also includes RS-485 interface 1564-2 that is configured to send a synchronization signal to RS-485 interfaces 1743-1 to 1743-N of LCDs 114 over a twisted pair cable 1141. Although not shown, MCD 112 and LCD 114 include other components as described herein.

Each RS-485 interface 1564, 1742, 1743 includes a RS-485 driver and an isolation unit. In RS-485 physical layer embodiments, the isolation unit can include a capacitor isolator.

RS-485 and other comparable physical layers are suitable for network topologies, e.g., the various topologies of system 100 described herein, and enable the use of long distance paths or links. These physical layers allow for high baud rates for transferring control information to LCDs 114, which allows for high speed sampling of normalized reference signals Vrn and modulation indexes Mi by LCDs 114. This increases the overall system performance, particularly in terms of harmonics. Some example baud rates includes baud rates in the ranges of 5 megabits per second (Mbit/s) to 10 Mbit/s. For such high baud rates, external synchronization using a synchronization signal enables LCDs 114 to determine the start and end of data packets. This same synchronization signal can also be used to synchronize PWM controllers 1123 of LCDs 114. Using the same synchronization signal for these purposes reduces the amount of wires and corresponding insulation, which reduces the size of MCDs 112, LCDs 114, and the systems 100 in which they are implemented, or enables more components in a same size system 100.

Figure 25C:
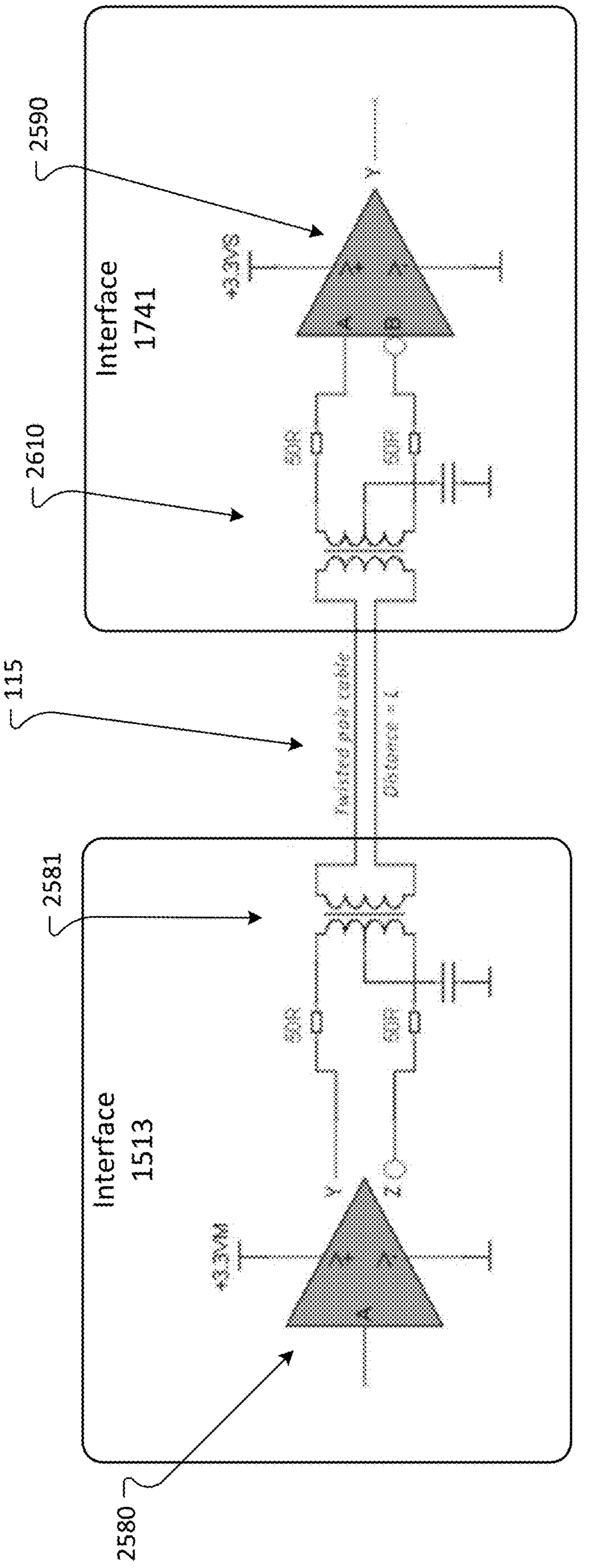
FIG. 25C is a schematic view depicting an example embodiment of communication connections between a master control device and a local control device.

FIG. 25C is a schematic view depicting an example embodiment of communication connections between MCD 112 and LCD 114. In this embodiment, an Ethernet physical layer is used for communications between MCD 112 and LCD 114. MCD 112 includes an Ethernet interface 1513 that is configured to send control information and a synchronization signal to Ethernet interface 1741 of LCD 114 over a twisted pair cable 1141. Although not shown, MCD 112 and LCD 114 include other components as described herein, and MCD 112 can be communicably coupled to multiple LCDs 112 via the same or similar topologies.

Interface 1513 includes an Ethernet driver and a transformer isolation unit 2581. Similarly, LCD 114 includes an Ethernet driver 2590 and a transformer isolation unit 2610 (FIG. 26). The isolation units 2581 and 2610 isolate drivers 2580 and 2590 and the other components of MCD 112 and LCD 114, respectively, from twisted pair cable 1141.

Ethernet interfaces 1513 and 1741 enable high speed data (e.g., between 100 Mbit/s to one gigabit/s (GB/s)). Using Ethernet interfaces enable MCD 112 to send data (e.g., control information) to LCDs 114 using a high speed carrier signal. MCD 112 can also include a synchronization signal (e.g., in the form of a synchronization pulse) inside of the carrier signal. This synchronization signal can be implemented using frequency modulation and the frequency of this synchronization pulse can match that of the PWM frequency of LCD's converter 202. In such examples, a separate synchronization path 1141 would not be required, resulting in fewer wires and insulation and resulting in reduced size systems 100 or more components in a same size system 100.

FIG. 26A is a block diagram of an example embodiment of a synchronization unit 2510. In this embodiment, synchronization unit 2510 receives a synchronization signal from a synchronization interface 1743 having an isolation unit 2610. The isolation unit 2610 electrically isolates LCD 114 from path or link 1141. The type of isolation unit 2610 can be selected based on the physical layer of the paths or links over which the synchronization signal is transmitted from MCD 112 to LCD 114. For RS-485 physical layers, the isolation unit 2610 can include a capacitor-based isolator. For Ethernet physical layers, the isolation unit 2610 can include a transformer-based isolator. Other appropriate isolators may be used for these or other types of physical layers.

In this embodiment, synchronization unit 2510 includes comparators 2620-1 and 2620-2 and a capacitor C1. Comparator 2620-1 is configured to compare the amplitude of the synchronization signal to a first threshold voltage level and output a data capture signal based on the comparison. For example, if the amplitude of the synchronization signal is greater than or equal to the first threshold voltage level, comparator 2620-1 can output a high data capture signal on path or link 2507 to instruct data capturer 2510 to capture control information on communication path or link 2506. The first threshold can be referred to as a data capture threshold.

Comparator 2620-2 is configured to compare a voltage level across capacitor C1 to a second threshold voltage level and output a reset signal based on the comparison. For example, if the voltage level across the capacitor is greater than or equal to the second threshold voltage level, comparator 2620-2 can output a low reset signal on path or link 2503 to reset PWM counter 2532. The second threshold can be referred to as a PWM synchronization threshold.

If the synchronization signal has an alternating amplitude, e.g., a square wave, capacitor C1 will charge when the amplitude of synchronization signal is greater than the voltage level of capacitor C1. If the amplitude of the synchronization signal remains at a level that charges capacitor C1 for a sufficient duration, capacitor C1 will charge to a level that meets or exceeds the second threshold, triggering the reset signal. When the synchronization signal is at a low level, capacitor C1 can discharge through a discharge path.

To initiate PWM synchronization events, MCD 112 can adjust the sequence of pulses of the synchronization signal and/or the frequency of the synchronization signal to drive the voltage level of the capacitor above the second threshold. If the physical layer is RS-485, either technique can be used. For example, MCD 112 can increase the duty cycle of the synchronization signal, such that the synchronization signal stays at a high level for a longer duration relative to the period length, for one or more periods to drive the voltage level of capacitor C1 to a higher level than a regular duty cycle that is not intended to initiate the detection of a synchronization event, which can be higher than the second threshold to cause comparator 2620-2 to output a low reset signal to reset PWM counter 2532.

MCD 112 can also use a frequency modulated synchronization signal to initiate PWM synchronization events. During normal operation, MCD 112 can generate a synchronization signal having a first frequency that is used to initiate data capture events. To initiate a PWM synchronization event, MCD 112 can adjust the frequency of the synchronization signal. For example, MCD 112 can reduce the frequency of the synchronization signal such that the synchronization signal remains at a high level and at a low level for a longer duration each period. The longer duration high level can result in charging capacitor C1 to a voltage level that is higher than the second threshold, thereby causing comparator 2620-2 to output a high reset signal.

Figure 26B:
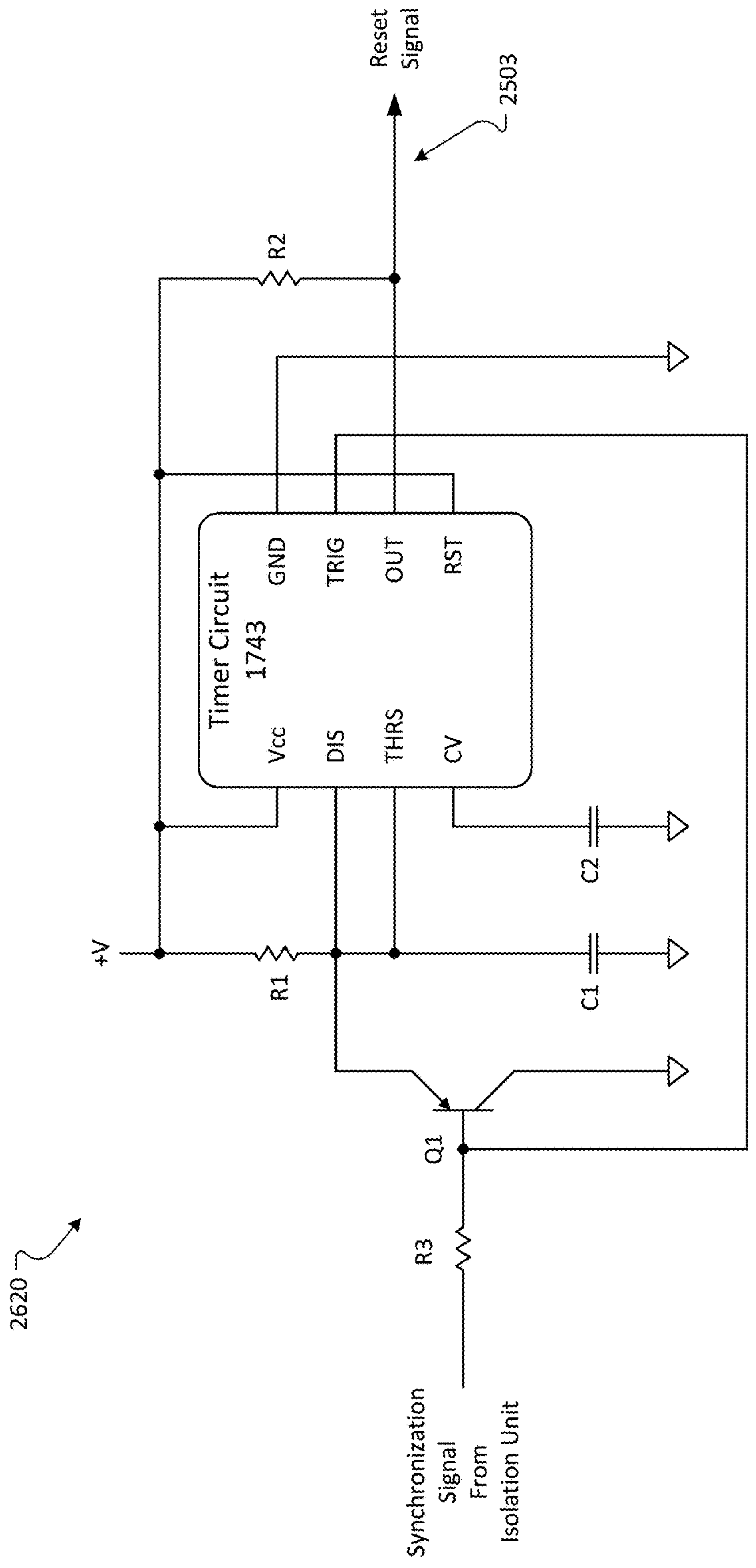
FIG. 26B is a schematic view of an example embodiment of a comparator.

FIG. 26B is a schematic view of an example embodiment of a comparator 2620. This embodiment can be used in synchronization unit 2510 for comparator 2620-1, 2620-2, or as another comparator for initiating another events or actions based on the synchronization signal. For brevity, comparator 2620 is described in terms of outputting a reset signal on communication path or link 2503, which is also output by comparator 2620-2.

Figure 26C:
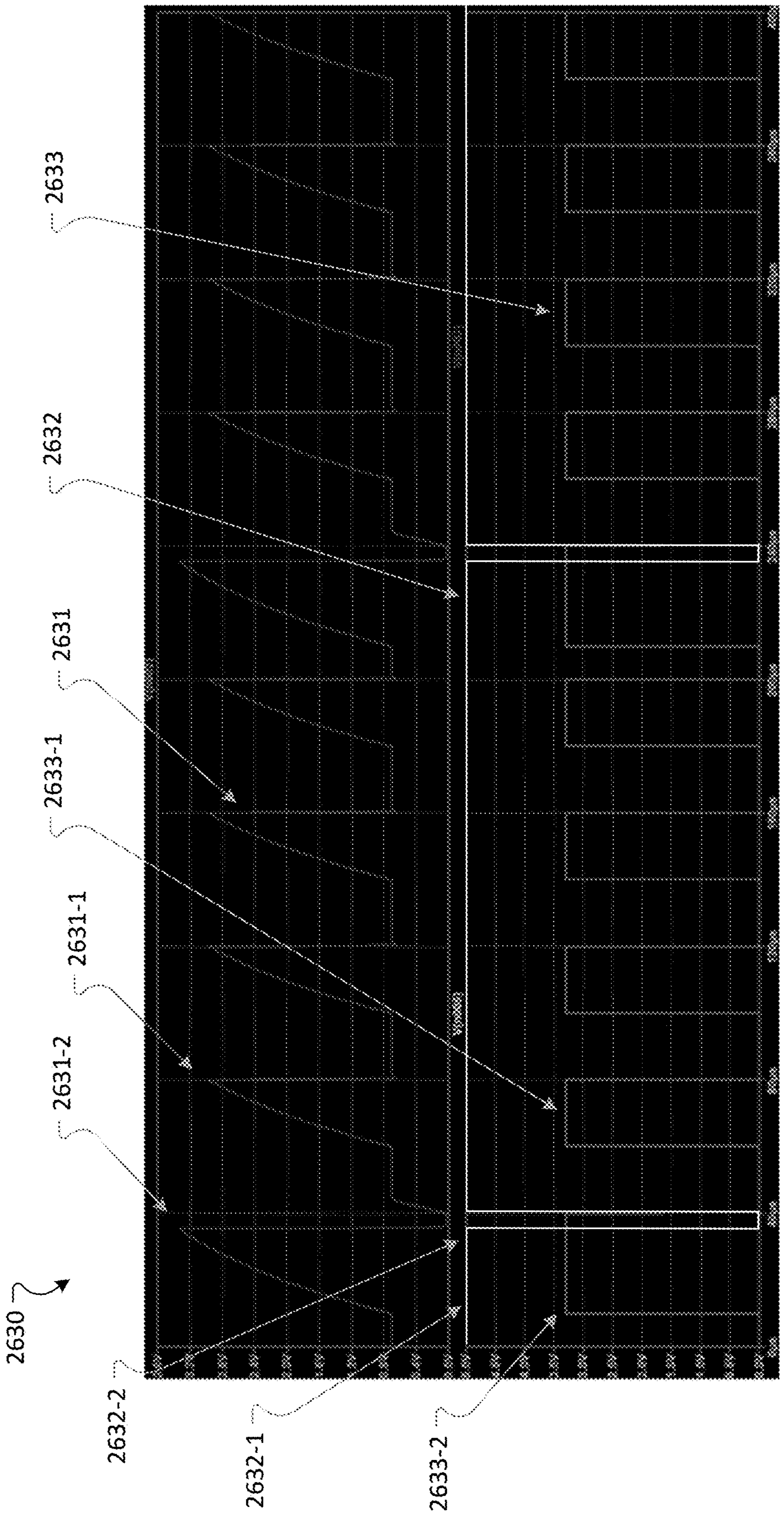
FIGS. 26C and 26D are plots depicting waveforms of signals related to a synchronization unit.
Figure 26D:
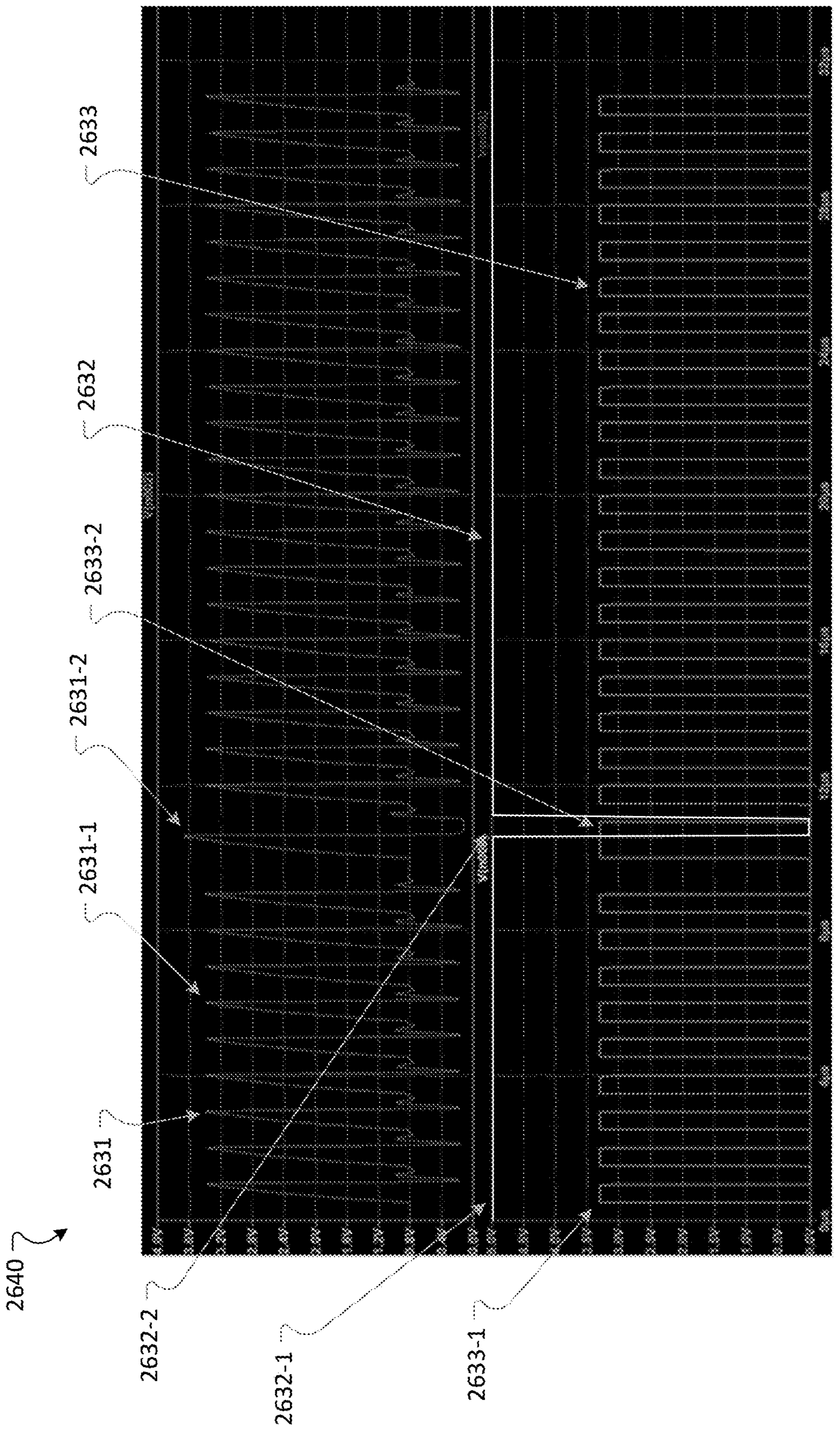

Comparator 2620 is configured to detect synchronization events based on the synchronization signal and be used in embodiments that include a capacitor-based isolator and/or a transformer-based isolator. Example waveforms of signals related to capacitor-based isolators are shown in FIG. 26C and described below. Example waveforms of signals related to transformer-based isolators are shown in FIG. 26D and described below.

As described above, comparator 2620 can be configured to compare a voltage level of capacitor C1 to a threshold voltage level. C1 in FIG. 26B can be the same as C1 of synchronization unit 2510. Comparator 2620 can include a timer circuit 1743 for comparing the voltage level of capacitor C1 to the threshold. The timer circuit 1743 can be implemented as a 555 timer (which is an integrated circuit configured to perform various timer and pulse generation operations), another timer circuit configured to perform comparison operations, or another type of circuit configured perform comparison operations.

In this embodiment, timer circuit 1763 includes a Vcc input for receiving a positive supply voltage, a discharge output (DIS), a threshold input (THRS), a control voltage input (CV), a ground input (GND) coupled to ground, a trigger input (TRIG), an output (OUT) coupled to path or link 2503, and a reset input (RST).

Comparator 2620 includes a transistor Q1, which can be implemented as an IGBT, MOSFET, GaN transistor, or other type of transistor. The gate of transistor Q1 is coupled to the synchronization signal and the emitter or source of transistor Q1 is coupled to the supply voltage via resistor R1 and to the discharge output. When the voltage level of the synchronization signal is at a high level, capacitor C1 is charged by the supply voltage via resistor R1.

When the voltage level of capacitor C1 reaches the threshold voltage level, internal logic of the timer circuit 1763 pulls down the output pin OUT, which creates a short low voltage (e.g., at or about 0 VDC or the potential of GND) pulse on path or link 2503 which initiates a synchronization event. Otherwise, the output pin OUT has a high voltage output, e.g., at or about 5 VDC or the potential of the supply voltage coupled to Vcc.

In particular, the internal logic of timer circuit 1743 compares the voltage level at the threshold input pin THRS to the control voltage input at pin CV, When the voltage level at the threshold input pin THRS is greater than the control voltage input at pin CV, internal logic of the timer circuit 1763 pulls down the output pin OUT. When the output is low, the internal logic of the timer circuit 1743 causes the discharge output to discharge capacitor C1, resulting in the output returning to a high voltage level on path or link 2503.

FIG. 26C is a plot 2630 depicting waveforms 2631-2633 of signals related to a synchronization unit 2510. These waveforms 2631-2633 can represent the waveforms of synchronization units 2510 having or being coupled to capacitor-based isolation units 2610. The plot 2630 depicts a voltage waveform 2631 of the voltage of capacitor C1, a voltage waveform 2632 of the output signal (e.g., data capture signal on path or link 2507 or reset signal on path 2503), and a voltage waveform 2633 of the synchronization signal.

The voltage waveform 2633 of the synchronization signal typically has a normal pulse width 2633-1 for most pulses. This causes capacitor C1 to charge to a first level 2631-1, which may be less than a threshold to initiate a synchronization event such that the output waveform stays at a high level 2632-1. To initiate a synchronization event, the synchronization signal can be adjusted to have a longer pulse width 2633-1 at the high level. This causes capacitor C1 to charge to a higher level 2632-2, which in turn causes the output (e.g., the output of timer circuit 1743) to drop to a low level 2632-2.

FIG. 26D is a plot 2640 depicting waveforms 2641-2643 of signals related to a synchronization unit 2510. These waveforms 2641-2643 can represent the waveforms of synchronization units 2510 having or being coupled to transformer-based isolation units 2610. The primary difference between waveforms 2631-2633 and waveforms 2641-2643 are the shape of waveforms 2631 and 2641.

The plot 2640 depicts a voltage waveform 2641 of the voltage of capacitor C1, a voltage waveform 2642 of the output signal (e.g., data capture signal on path or link 2507 or reset signal on path 2503), and a voltage waveform 2643 of the synchronization signal.

Figure 27:
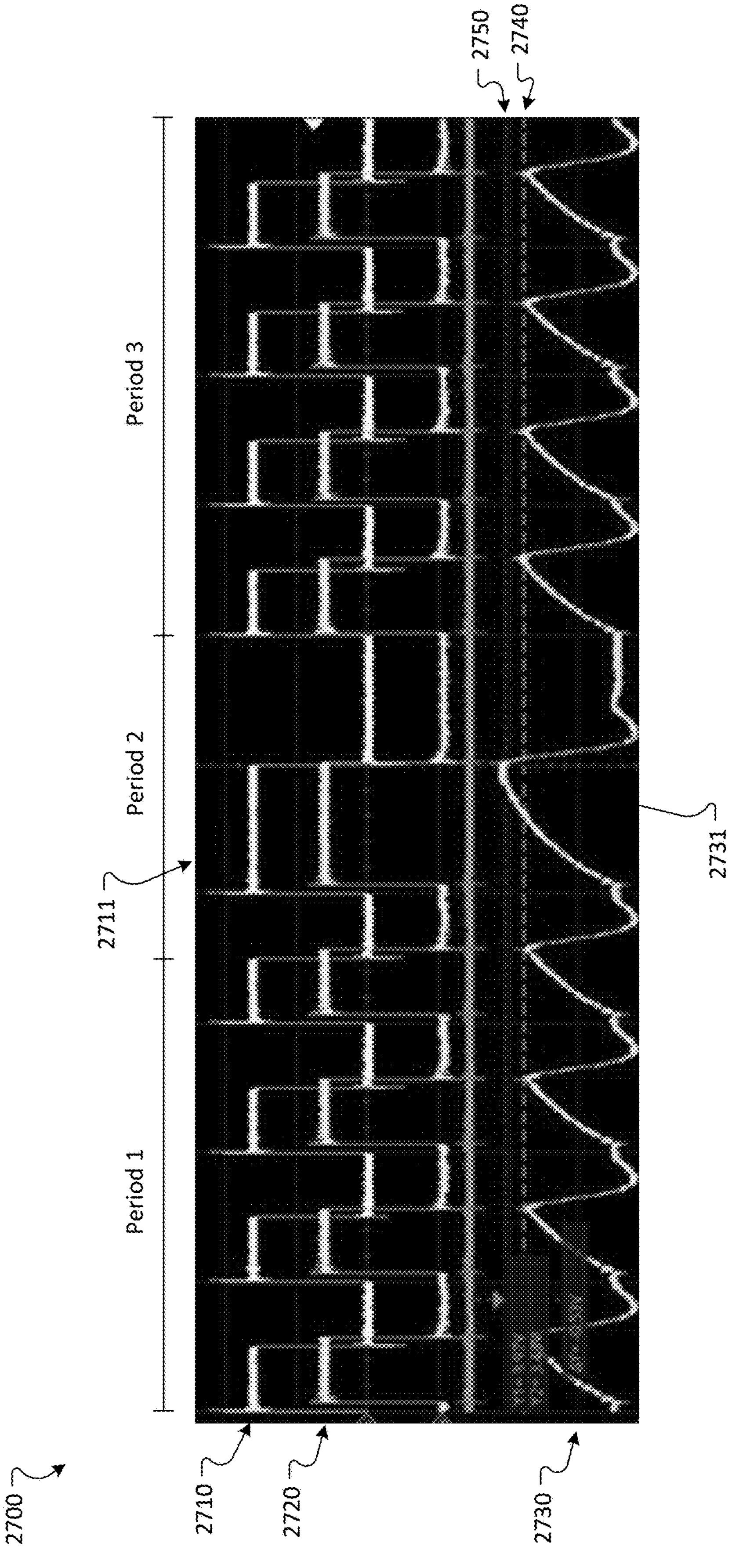
FIG. 27 is a plot depicting frequency modulated synchronization signals and a voltage level of a capacitor of a synchronization unit.

The voltage waveform 2643 of the synchronization signal typically has a normal pulse width 2643-1 for most pulses. This causes capacitor C1 to charge to a first level 2641-1, which may be less than a threshold to initiate a synchronization event such that the output waveform stays at a high level 2642-1. To initiate a synchronization event, the synchronization signal can be adjusted to have a longer pulse width 2643-1 at the high level. This causes capacitor C1 to charge to a higher level 2642-2, which in turn causes the output (e.g., the output of timer circuit 1743) to drop to a low level 2642-2. FIG. 27 is a plot 2700 depicting frequency modulated synchronization signals 2710 and 2720 and a voltage level 2730 of a capacitor C1 of a synchronization unit 2510. MCD 112 can send a frequency modulated synchronization signal 2710 to LCD 114 and LCD 114 receives frequency modulated synchronization signal 2720.

During a first time period (period 1), the frequency of frequency modulated synchronization signal 2710 remains constant. As a result, the voltage level 2730 of capacitor C1 charges to a first threshold level 2740 (e.g., data capture threshold) each period of frequency modulated synchronization signal 2710. As the frequency is constant, capacitor C1 charges to approximately the same value each period.

During a second time period (period 2), MCD 112 reduces the frequency of frequency modulated synchronization signal 2710 for one period of frequency modulated synchronization signal 2710. As a result of synchronization signal 2710 remaining at a high level for longer than previously in period 1 as indicated by reference numeral 2711, the voltage level of capacitor C1 charges past a second threshold 2750 (e.g., PWM synchronization threshold) at reference numeral 2731, which is higher than the first threshold 2740. For example, the first threshold 2740 can be for initiating data capture events and the second threshold 2750 can be for initiating PWM synchronization events. Thus, the reduced frequency of the frequency modulated signal during period 2 can charge capacitor C1 to a voltage level that initiates a PWM synchronization event. Each time a synchronization of PWM controllers 1123 is warranted, MCD 112 can reduce the frequency of the frequency modulation signal to the frequency shown in period 2 and then return the frequency to that of period 1 or period 3 to prevent another PWM synchronization event from being detected until another one is initiated by MCD 112.

Figure 28:
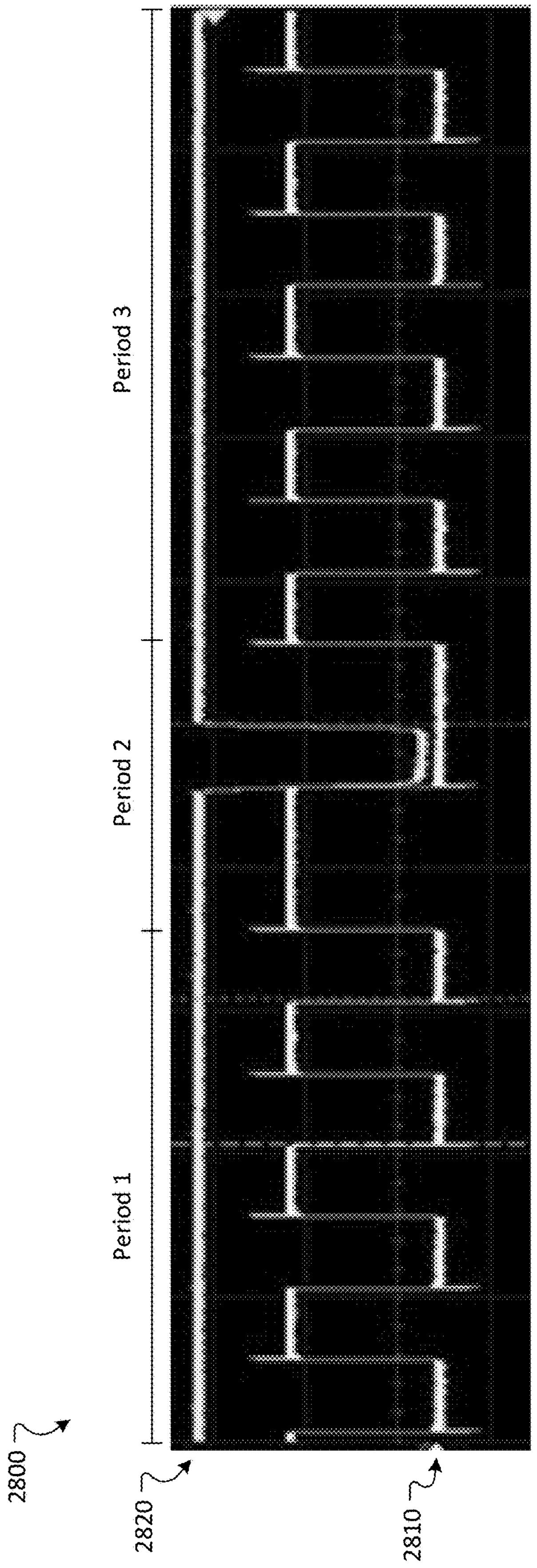
FIG. 28 is a plot depicting a frequency modulated synchronization signal and a reset signal generated based on the frequency modulated synchronization signal.

FIG. 28 is a plot 2800 depicting a frequency modulated synchronization signal 2810 and a reset signal 2820 generated based on the frequency modulated synchronization signal 2810. MCD 112 can generate and send frequency modulated signal 2810 to LCD 114. Synchronization unit 2510 can detect a synchronization event based on the frequency of frequency modulated synchronization signal 2810. Frequency modulated synchronization signals and periods 1-3 of FIG. 28 can be the same as, or similar to, frequency modulation signal 2710 and periods 1-3 of FIG. 27.

During a first time period (period 1), the frequency of frequency modulated synchronization signal 2810 remains constant at a sufficiently high frequency that does not allow capacitor C1 of synchronization unit 2510 to reach the threshold for detection of a PWM synchronization event. During a second time period (period 2), MCD 112 reduces the frequency of frequency modulated synchronization signal 2810, thereby causing the voltage level of C1 to each the threshold resulting in a low reset signal 2820 during period 2. As MCD 112 raises the frequency of frequency modulated synchronization signal 2810 to the previous level of period 1, reset signal 2820 remains high during a third period (period 3).

Figure 29:
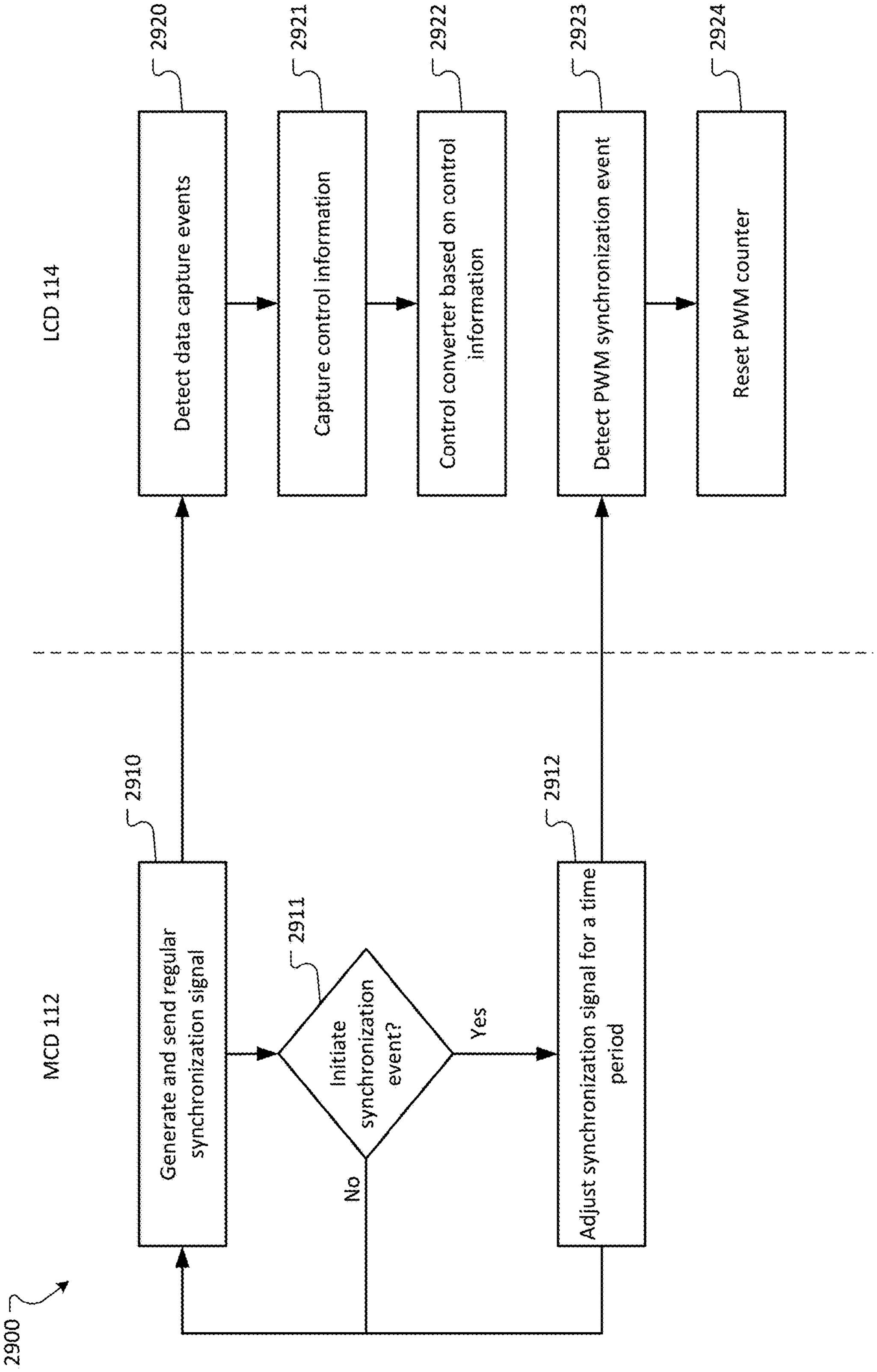
FIG. 29 is a flow diagram depicting an example embodiment of a method of synchronizing data capture events and PWM events.

FIG. 29 is a flow diagram depicting an example embodiment of a method 2900 of synchronizing data capture events and PWM events. The method 2900 can be performed by an energy system that includes an MCD 112 and one or more arrays 700 of cascaded modules 108. For example, the method 2900 can be performed by any one of the systems 100 described in this document.

At step, 2910, MCD 112 generates and sends a regular synchronization signal to LCDs 114 for modules 108 in one or more arrays 700 of system 100. In some implementations, MCD 112 sends a regular synchronization signal to each LCD 114 in an array 700. For multiphase embodiments, MCD 112 can send the same or different synchronization signal to LCDs 114 of the array 700 for each phase.

The synchronization signal can be a modulated voltage waveform having an alternating amplitude, e.g., a square wave voltage signal. The regular synchronization signal can have a constant (or at least near constant within a specified tolerance) amplitude and frequency. MCD 112 can generate and provide the regular synchronization signal to LCDs 114 to initiate data capture events.

MCD 112 can also send control information to LCDs 114 based on the regular synchronization signal. For example, MCD 112 can send control information on a communication path or link 115 during the time at which the regular synchronization signal is at a particular level (e.g., at or above a particular voltage level) or in a particular state (e.g., a high state). In this way, MCD 112 can notify LCDs 114 at to which control information is being sent to LCDs 114 using the synchronization signal.

At step 2920, LCD 114 detects data capture events based on the synchronization signal. As described above, LCD 114 can be configured to compare the amplitude of the synchronization signal to a data capture threshold. LCD 114 can detect a data capture event each time that the amplitude of the synchronization signal satisfies the data capture threshold, e.g., by meeting or exceeding the data capture threshold.

At step 2921, LCD 114 captures control information on a communication path or link 115. LCD 114 can capture control information data packets on the communication path or link in response to detecting the data capture event. LCD 114 can capture the control information as described elsewhere herein.

At step 2922, LCD 114 controls converter 202 based on the captured control information. As described above, LCD 114 can be configured to modulate or scale a normalized reference signal Vrn of the control information using a modulation index Mi of control information designated for LCD 114 to generate a modulated reference signal Vrnm. LCD 114 can control switches of converter 202 using the modulated reference signal Vrnm. As described above, LCD 114 can continue operating switches of converter 202 using control information designated for LCD 114 until updated control information designated for LCD 114 is captured from path or link 115.

At step 2911, MCD 112 determines whether to initiate a synchronization event. For example, MCD 112 can determine to initiate a PWM synchronization event. The PWM synchronization event synchronizes PWM controllers of each LCD 114 in an array 700 or in multiple arrays 700 of system 100.

MCD 112 can initiate PWM synchronization events periodically based on a specified time period. For example, MCD 112 can restart a timer after each PWM synchronization event is initiated and initiate a new PWM synchronization event when the timer elapses. MCD 112 can also initiate a PWM synchronization event to change the frequency of PWM, to synchronize data acquisition processes between MCD 112 and LCD 114, and/or to wake a sleeping LCD 114. If MCD 112 determines to not initiate a PWM synchronization event, the method 2900 returns to step 2910 where MCD 112 generates and sends the regular synchronization signal to LCD 114.

At step 2912, MCD 112 adjusts the synchronization signal for a time period in response to determining to initiate the PWM synchronization event and/or other type of synchronization event or action. For example, MCD 112 can adjust the synchronization signal for a specified duration (e.g., in seconds, milliseconds, or microseconds) or for a specified number of periods of the synchronization signal (e.g., one, two, five, or another appropriate number of periods). MCD 112 can adjust the synchronization signal to initiate a PWM synchronization event to synchronize the PWM counters of the LCDs 114, to wake LCD 114, to synchronize a data capture event, and/or to initiate another event or action.

In some embodiments, the synchronization signal is a frequency modulated synchronization signal. In this example, MCD 112 is configured to adjust the frequency of the synchronization signal. For example, MCD 112 can reduce the frequency of the synchronization signal to increase a voltage across a capacitor C1 (FIG. 26) to initiate detection of a PWM synchronization event by each LCD 114.

In some embodiments, MCD 112 is configured to adjust the duty cycle of the synchronization signal. For example, MCD 112 can increase the duty cycle of the synchronization signal such that the synchronization signal stays at a high level for a longer duration each period to drive the voltage level of a capacitor C1 (FIG. 26) to a higher level than a regular duty cycle of the regular synchronization signal.

In some embodiments, MCD 112 can is configured to adjust the amplitude of pulses of the synchronization signal. For example, MCD 112 can increase the amplitude of pulses of the synchronization signal to drive the voltage level of a capacitor C1 (FIG. 26) to a higher level than a regular amplitude of the regular synchronization signal.

After the time period elapses, MCD 112 can adjust the synchronization signal back to the regular synchronization signal.

At step 2923, LCD 114 detects a PWM synchronization event. As described above, LCD 114 can be configured to compare the amplitude of a voltage of a capacitor C1 (FIG. 26) to a PWM synchronization threshold. LCD 114 can detect a PWM synchronization event each time that the amplitude of the capacitor C1 satisfies the PWM synchronization threshold, e.g., by meeting or exceeding the PWM synchronization threshold.

At step 2924, LCD 114 resets PWM counter 2532 of PWM controller 1123. For example, LCD 114 can send a reset signal to PWM controller 1123, e.g., to a reset pin of a PWM controller integrated circuit. This is an example of a synchronization action that can be performed by LCD 114 in response to detecting a synchronization event.

In another example, LCD 114 detects a data capture event each time that the amplitude of the capacitor C1 satisfies a data capture threshold, e.g., by meeting or exceeding the data capture threshold. In response, LCD 114 can start monitoring for the control information from MCD 112, e.g., at control interface 1742.

Although the example method 2900 includes detecting data capture events and controlling a converter 202 based on control information captured in response to detecting data capture events, these steps can be omitted in some embodiments. For example, in some embodiments, MCD 112 can initiate PWM synchronization events by adjusting the synchronization signal in steps 2911-2913 and LCD 114 can detect the PWM synchronization events and reset PWM counter 2532 without using the synchronization steps 2920-2922 to synchronize the capture of control information.

In some embodiments, data absence events are used to synchronize the capture of control information data elements and/or to synchronize PWM controllers 1123 of LCDs 114 in one or more arrays 700. For example, the method 2000 of FIG. 20 can be modified to include an addition step of resetting a PWM counter 2532 in response to each determination that a control information data element has been received in step 2026, e.g., before, after, or in parallel with step 2030.

Figure 30:
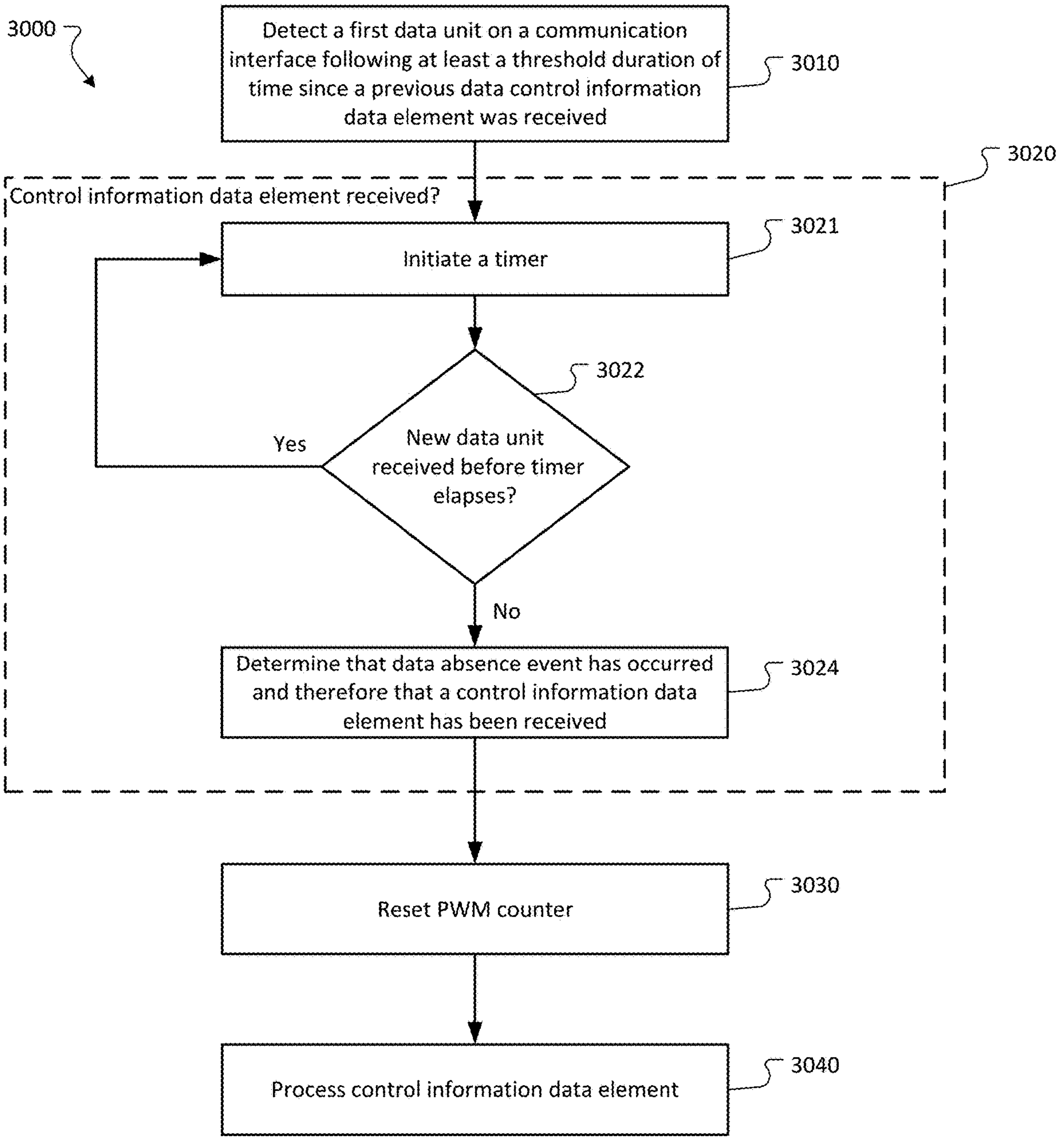
FIG. 30 is a flow diagram depicting an example embodiment of a method of synchronizing data capture events and PWM events.

FIG. 30 is a flow diagram depicting an example embodiment of a method 3000 of synchronizing data capture events and PWM events. The method 3000 is another example in which data absence events can be used to synchronize the capture of control information data elements and/or to synchronize PWM controllers 1123 of LCDs 114 in one or more arrays 700. The method 2900 can be performed by an energy system that includes an MCD 112 and one or more arrays 700 of cascaded modules 108. For example, the method 2900 can be performed by any one of the systems 100 described in this document.

At step 3010, LCD 114 detects a first data unit on a communication interface connected to a communication path following at least a threshold duration of time since a previous control information data element was received. Step 3010 can be implemented in the same manner or in a similar manner as step 2010 of the method 2000 of FIG. 20.

At step 3020, LCD 114 determines whether a new control information data element that includes the detected data unit has been received. LCD 114 can be configured to determine that a new control information data element has been received when data is absent on path or link 115 for a specified duration of time following a last received data unit. LCD 114 can determine whether a data absence event occurs and therefore whether a new control information data element has been received using constituent steps 3021-3024.

At step 3021, LCD 114 initiates a timer for a specified time period. The time period can be based on the expected duration of time between reception of successive data units (e.g., data segments) of a control information data element (e.g., in the form of a data frame). In some embodiments, the time period can be longer than this expected duration to account for delays in transmission. For example, the time period can be based on the duration of time for receiving one data unit, two data units, three data units, or another appropriate number of data units. In another example, the time period can be a multiple of the expected duration, e.g., two times the expected duration, three times the expected duration, and/or another appropriate multiple.

At step 3022, LCD 114 determines whether any additional data units are received before the timer elapses. If so, the method 3000 returns to step 3021 where the timer is reset. If not, at step 3024, LCD 114 determines that a data absence event has occurred. In response to determining that the data absence event has occurred, LCD 114 can determine that a control information data element has been received.

At step 3030, LCD 114 resets PWM counter 2532 of PWM controller 1132. For example, LCD 1134 can send a reset signal to PWM controller 1123, e.g., to a reset pin of a PWM controller integrated circuit.

At step 3040, LCD 114 processes the received control information data element. Step 3040 can be implemented in the same manner or in a similar manner as step 2010 of the method 2030 of FIG. 20.

The synchronization techniques described above that utilize a synchronization signal reduce the amount of jitter that would otherwise be present in the synchronization signals received by LCDs 114 and increase the precision of the synchronization of PWM controllers 1123 of multiple modules 108 in one or more arrays 700 of system 100. Jitter refers to variations in a signal from an ideal signal, such as an output waveform. Imprecise synchronization between LCDs 114 can result in jitter being present on switching signals output by LCDs 114. Jitter can be caused by software and uncontrolled execution time of low-level interrupts of processors and/or controllers that implement control logic. The jitter can include increases and/or decreases in the level of the signal, e.g., for a short amount of time during the rises and/or falls in the signal.

For example, resetting PWM counter 2532 of one LCD 114 in an array 700 before resetting PWM counter 2532 of another LCD 114 of an array 700 can result in imprecise phase shifts in their carrier signals, resulting in imprecise timing of switching signals for converters 202 and a distorted output voltage of system 100. Using the synchronization techniques described above, this jitter is reduced, resulting in more precise synchronization and corresponding switching signals, thereby resulting in better quality output voltages.

Figure 31:
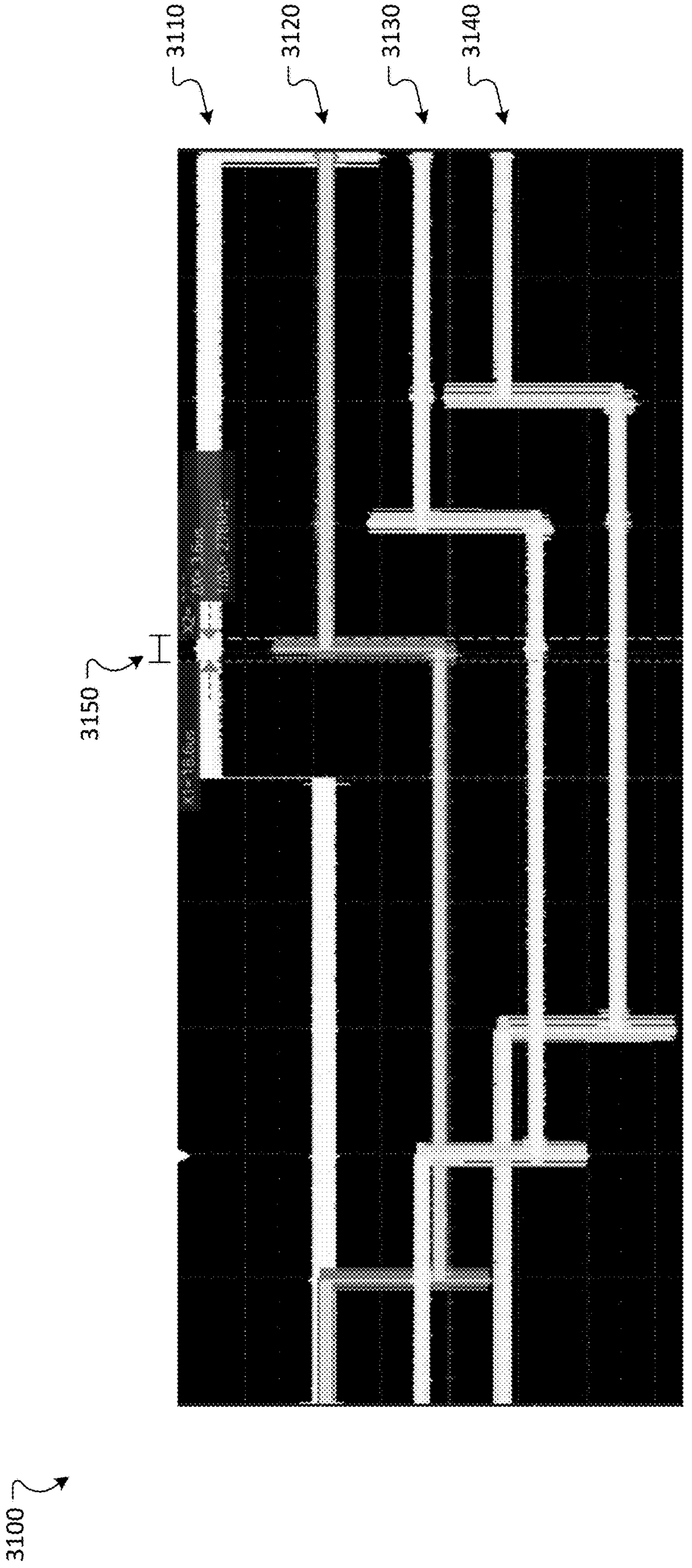
FIG. 31 is a plot depicting jitter present on switching signals output by local control devices.

FIG. 31 is a plot 3100 depicting jitter present on switching signals output by LCDs 114. The plot 3100 shows jitter present on the rising edges of switching signals 3110-3140 generated by LCDS 114 of four different modules 108 of an array 700 based on a PWM synchronization event. For switching signal 3210, the jitter is present for a jitter time period 3150. Similar jitter is present on the rising edges of switching signals 3120, 3130, and 3140 for similar time periods.

Figure 32:
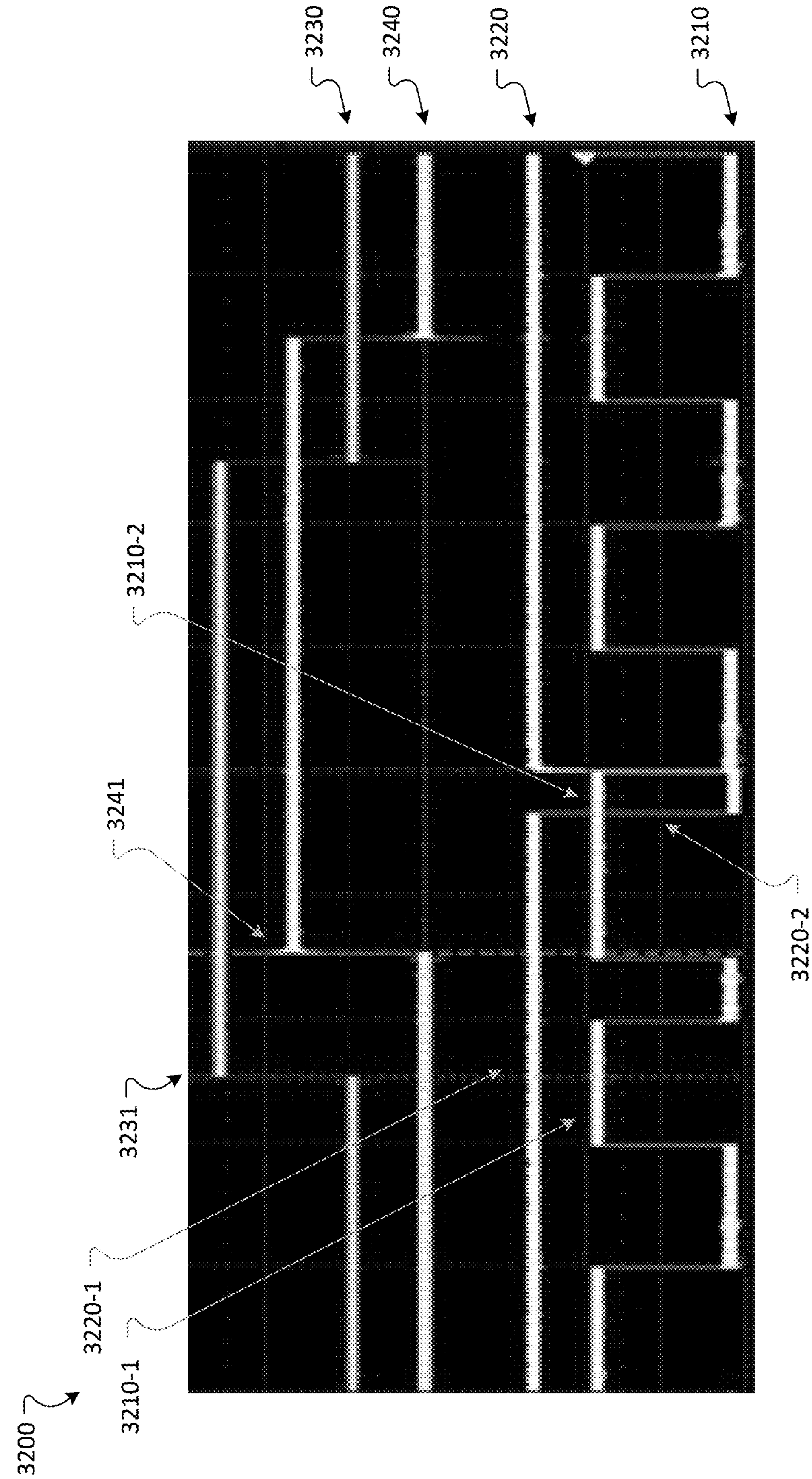
FIG. 32 is a plot depicting reduced jitter present on switching signals output by local control devices.

FIG. 32 is a plot 3200 depicting reduced jitter present on switching signals output by an LCD 114. This plot 3200 can be at the same time scale as plot 3100 to show the reduced jitter resulting from the use of systems 100, their synchronization units 2510, and/or the synchronization techniques described herein.

The plot 3200 depicts a voltage waveform 3210 of a synchronization signal input to synchronization unit 2610, a reset signal 3220 output by the synchronization unit 2610, a voltage waveform 3230 of a switching signal output by a first LCD 114 that receives the reset signal output by synchronization unit 2610, and a switching signal output by a second LCD 114 that receives the reset signal output by synchronization unit 2610.

Here, the voltage waveform 3210 of the synchronization signal typically has a normal pulse width 3210-1 for most pulses. To initiate a synchronization event, the synchronization signal can be adjusted to have a longer pulse width 3210-2 at the high level. This causes the output voltage 3220 to drop from a high level 3220-1 to a low level 3220-2 for a short pulse, as described above.

In this example, each LCD 114 uses the rising edge of the synchronization signal to reset PWM counter 2532. As described above, when PWM counter 2532 is reset, carrier generator 2530 restarts the carrier signal generation process. As shown in FIG. 32, the magnitude and duration of jitter 3231 and 3241 shown on the rising edges of waveforms 3230 and 3241, respectively, is much less than that of FIG. 31.

Various aspects of the present subject matter are set forth below, in review of, and/or in supplementation to, the embodiments described thus far, with the emphasis here being on the interrelation and interchangeability of the following embodiments. In other words, an emphasis is on the fact that each feature of the embodiments can be combined with each and every other feature unless explicitly stated or taught otherwise.

In many embodiments, an energy system includes an array of cascaded modules configured to output a voltage waveform and/or a current waveform to a load. In these embodiments, each module includes an energy source, switch circuitry, and a local control device, and each module having an identifier. The energy system can include a master control device communicably coupled to each local control device over a communication path and configured to send, over the communication path, control information data elements to the local control devices. Each control information data element can include a normalized reference signal for each module of the array of cascaded modules, a single identifier selected from a set of identifiers including the identifier for each module in the array of cascaded modules, and a modulation index for the module having the single identifier. The local control device of each module can be configured to scale the normalized reference signal of a most recently received control information data element by the modulation index of a most recently received control information data element that has the identifier of the module to generate a scaled reference signal and control the switch circuitry of the module using the scaled reference signal.

In many embodiments, the master control device periodically sends the control information data elements to the local control devices according to a sequence that defines an order of modules for which an updated modulation index is sent to the modules using the control information data elements.

In many embodiments, the local control device of each module is configured to determine whether the selected identifier of each control information data element matches the identifier of the module. When the selected identifier of a control information data element matches the identifier of the module, the local control device of the module can scale the normalized reference signal of the control information data element using the modulation index of the control information data element. When the selected identifier of the control information data element does not match the identifier of the module, the local control device of the module can scale the normalized reference signal of the control information data element using the modulation index of a most recently received control information data element that had the identifier of the module.

In many embodiments, the master control device includes a controller that is configured to generate respective modulation indexes for the modules.

In many embodiments, the modulation index for at least one module in the array of cascaded modules is different from the modulation index for at least one other module in the array of cascaded modules. The energy system can include a bidirectional data path that communicably couples each local control device to the master control device. Each local control device can be configured to send, to the master control device over the bidirectional data path, status information for the module that includes the local control device. The controller can generate the modulation index for each module using the status information received from each local control device. The status information for each module can include one or more of a state of charge of the energy source of the module, a state of health of the energy source of the module, or a temperature of the energy source of the module.

In many embodiments, the communication path includes a serial communication path.

In many embodiments, a method of controlling a voltage or current supplied to a load includes sending, by a master control device and over a communication path, control information data elements to local control devices of an array of cascaded modules configured to output a voltage waveform and/or a current waveform to a load. Each module includes an energy source, switch circuitry, a local control device, and an identifier. Each control information data element includes a normalized reference signal for each module of the array of cascaded modules, a single identifier selected from a set of identifiers including the identifier for each module in the array of cascaded modules, and a modulation index for the module having the single identifier. The method can include scaling, by each local control device, the normalized reference signal of a most recently received control information data element by the modulation index of a most recently received control information data element that has the identifier of the module to generate a scaled reference signal and controlling the switch circuitry of the module using the scaled reference signal.

In many embodiments, sending the control information data elements to the local control devices of the array of cascaded modules includes periodically sending, by the master control device, the control information data elements to the local control devices according to a sequence that defines an order of modules for which an updated modulation index is sent to the modules using the control information data elements.

In many embodiments, the method includes, for each module of the array of cascaded modules, determining, by the local control device of the module, whether the selected identifier of each control information data element matches the identifier of the module. The method can include, when the selected identifier of a control information data element matches the identifier of the module, scaling, by the local control device of the module, the normalized reference signal of the control information data element using the modulation index of the control information data element. The method can include, when the selected identifier of the control information data element does not match the identifier of the module, scaling, by the local control device of the module, the normalized reference signal of the control information data element using the modulation index of a most recently received control information data element that had the identifier of the module.

In many embodiments, the method includes generating, by a controller of the master control device, respective modulation indexes for the modules.

In many embodiments, the modulation index for at least one module in the array of cascaded modules is different from the modulation index for at least one other module in the array of cascaded modules. The method can include sending, by each local control device and over a bidirectional data interface that communicably couples each local control device to the master control device, status information for the module that includes the local control device. In many embodiments, the controller generates the modulation index for each module using the status information received from each local control device. In many embodiments, the status information for each module includes one or more of a state of charge of the energy source of the module, a state of health of the energy source of the module, or a temperature of the energy source of the module.

In many embodiments, the communication path includes a serial communication path.

In many embodiments, an energy system includes an array of cascaded modules configured to output a voltage waveform and/or a current waveform to a load. Each module includes an energy source, switch circuitry, and a local control device that controls the switch circuitry based at least in part on received normalized reference signals. The energy system can include a master control device communicably coupled to each local control device over a communication path and configured to send, over the communication path, control information data elements to the local control devices. Each control information data element can include a normalized reference signal. Each local control device can be configured to detect a first data unit on the communication path following at least a threshold duration of time since a previous control information data element was received, determine that a new control information data element including the first data unit has been received based on a duration of time that has elapsed since the first data unit was received and whether additional data units are received following a data reception time period for the new control information data element, and process the new control information data element.

In many embodiments, determining that the new control information data element has been received includes initiating a time for the data reception time period in response to detecting the first data unit, receiving additional data units during the data element reception time period, determining whether any additional data elements are received during the post reception time period, and determining that the new control information data element has been received based on the data element reception time period elapsing and a determination that the additional data units are not received during the post reception time period.

In many embodiments, the data reception time period is based on a data size of each control information data element and a data rate for the communication path. The data reception time period can be longer than an expected time period for receiving a control information data element. The data reception time period can include a duration for receiving data having a data size that is one or two bytes greater than the data size of each control information data element. Processing the new control information data element can include operating the switch circuitry using the normalized reference signal and a modulation index for the module that includes the local control device. The local control device is configured to use a previously stored normalized reference signal of a previously received control information data element to operate the switch circuitry whenever a received control information data element is corrupted or not fully received.

In many embodiments, a method of controlling a voltage or current supplied to a load includes sending, by a master control device and over a communication path, control information data elements to local control devices of an array of cascaded modules configured to output a voltage waveform and/or a current waveform to a load. Each module includes an energy source, switch circuitry, and a local control device that controls the switch circuitry based at least in part on received normalized reference signals. The method can include detecting, by the local control device, a first data unit on the communication path following at least a threshold duration of time since a previous control information data element was received. The method can include determining, by the local control device, that a new control information data element including the first data unit has been received based on a duration of time that has elapsed since the first data unit was received and whether additional data units are received following a data reception time period for the new control information data element and processing the new control information data element.

In many embodiments, determining that the new control information data element has been received includes initiating a time for the data reception time period in response to detecting the first data unit, receiving additional data units during the data element reception time period, determining whether any additional data elements are received during the post reception time period, and determining that the new control information data element has been received based on the data element reception time period elapsing and a determination that the additional data units are not received during the post reception time period.

In many embodiments, the data reception time period is based on a data size of each control information data element and a data rate for the communication path. The data reception time period can be longer than an expected time period for receiving a control information data element. The data reception time period can include a duration for receiving data having a data size that is one or two bytes greater than the data size of each control information data element. Processing the new control information data element can include operating the switch circuitry using the normalized reference signal and a modulation index for the module that includes the local control device. The local control device can be configured to use a previously stored normalized reference signal of a previously received control information data element to operate the switch circuitry whenever a received control information data element is corrupted or not fully received.

In many embodiments, an energy system includes an array of cascaded modules configured to output a voltage waveform and/or a current waveform to a load. Each module cam include an energy source, switch circuitry, and a local control device that controls the switch circuitry based at least in part on received normalized reference signals. The energy system can include a master control device communicably coupled to each local control device over a control path and a synchronization path and that sends, over the control path, control information data elements to the local control devices. Each control information data element can include a normalized reference signal for each module of the cascaded modules and a modulation index for scaling the reference signal. The master control device can send, over the synchronization path, a synchronization signal to the local control devices. The synchronization signal can indicate when a control information data element is being sent to the local control devices.

In many embodiments, the local control device of each module is configured to detect the synchronization signal and capture the control information data element in response to detecting the synchronization signal.

In many embodiments, the master control device is configured to remove the synchronization signal after transmission of a control information data element is complete. The local control device of each module can be configured to stop capturing the control information data element in response to detecting that the synchronization signal has been removed.

In many embodiments, sending the synchronization signal includes increasing a voltage level on a synchronization signal bus coupled to the master control device and the local control device of each module of the array of cascaded modules. Removing the synchronization signal can include reducing the voltage level on the synchronization signal bus.

In many embodiments, each local control device is configured to wake the module that includes the local control device from a sleep mode in response to detecting the synchronization signal. The master control device can be configured to send the synchronization signal in response to a determination to wake the modules of the array of cascaded modules.

In many embodiments, a method of controlling a voltage or current supplied to a load includes sending, by a master control device and over a control path, control information data elements to local control devices of an array of cascaded modules configured to output a voltage waveform and/or a current waveform to a load. Each module can include an energy source, switch circuitry, and a local control device that controls the switch circuitry based at least in part on received normalized reference signals. The master control device can be communicably coupled to each local control device over the control path and over a synchronization path. Each control information data element can include a normalized reference signal for each module of the cascaded modules and a modulation index for scaling the reference signal. The method can include sending, over the synchronization path, a synchronization signal to the local control devices. The synchronization signal can indicate when a control information data element is being sent to the local control devices.

In many embodiments, the method includes detecting, by the local control device of each module, the synchronization signal and capturing, by the local control device of each module, the control information data element in response to detecting the synchronization signal.

In many embodiments, the method includes removing, by the master control device, the synchronization signal after transmission of a control information data element is complete. The local control device of each module can be configured to stop capturing the control information data element in response to detecting that the synchronization signal has been removed.

In many embodiments, sending the synchronization signal includes increasing a voltage level on a synchronization signal bus coupled to the master control device and the local control device of each module of the array of cascaded modules. Removing the synchronization signal can include reducing the voltage level on the synchronization signal bus.

In many embodiments, each local control device is configured to wake the module that includes the local control device from a sleep mode in response to detecting the synchronization signal. Sending, over the synchronization path, a synchronization signal to the local control devices can include sending the synchronization signal in response to a determination to wake the modules of the array of cascaded modules.

In many embodiments, an energy system configured to generate split phase AC power includes a first and a second array of modules. Each module of the first and second arrays can include a converter coupled with an energy source. The first array can be configured to generate a first AC signal between a first output and a second output of the first array, the first AC signal having a first phase angle. The second array can be configured to generate a second AC signal having a second phase angle, that is 180 degrees different from the first phase angle, between a first output and a second output of the second array. The first output of the first array can be connected to a first system output terminal (L1).

The first output of the second array can be connected to a second system output terminal (L2). The second outputs of the first and second arrays can be connected to a third system output terminal (N).

In many embodiments, each module includes a local control device configured to control switch circuitry of the converter of the module based on a normalized reference signal and a modulation index. The energy system can include a master control device configured to send first control information data elements to each module of the first array and second control information data elements to each module of the second array. Each first control information data element can include a first normalized reference signal for each module of the array of the first array and a single first identifier selected from a set of first identifiers for the modules of the first array. The set of first identifiers can include a first identifier for each module in the first array. Each first control information data element can include a first modulation index for the module of the first array having the single first identifier. Each second control information data element can include a second normalized reference signal for each module of the array of the second array and a single second identifier selected from a set of second identifiers for the modules of the second array. The set of second identifiers can include a second identifier for each module in the second array. Each second control information data element can include a second modulation index for the module of the second array having the single second identifier.

In many embodiments, the local control device of each module in the first array is configured to scale the first normalized reference signal of a most recently received first control information data element by the first modulation index of a most recently received control information data element that has the identifier of the module of the first array to generate a scaled reference signal and control the switch circuitry of the converter of the module of the first array using the scaled reference signal.

In many embodiments, the master control device periodically sends the first control information data elements to each module of the first array according to a sequence that defines an order of modules for which an updated modulation index is sent to the modules using the first control information data elements.

In many embodiments, a method of waking local control devices includes determining, by a master control device communicably coupled to a local control device of each module of an array of cascaded modules over a synchronization path, to wake each local control device from a sleep mode of operation and, in response to determining to wake each local control device from the sleep mode of operation, sending, by the master control device and over the synchronization path, a synchronization signal to a wake interface of each local control device.

In many embodiments, the method includes sending, by the master control device to each local control device over the synchronization path, a synchronization signal each time the master control device sends a control information data element to each local control device. The synchronization signal indicates, to each local control device, that the master control device is sending the control information data element. The method can include sending, by the master control device to each local control device, control information data elements to each local control device over a control path that communicably couples the master control device to each local control device. Each control information data element can include a normalized reference signal for each module of the array, a single identifier selected from a set of identifiers for the modules of the array. The set of identifiers can include an identifier for each module in the array. Each control information data element can include a first modulation index for the module of the first array having the single identifier. The synchronization path can serve a first purpose for indicating to each local control device when a control information data element is being sent to each local control device and a second purpose to wake each local control device from the sleep mode of operation.

In many embodiments, an energy control system includes modules configured to be connected together to output a voltage waveform and/or a current waveform to a load. Each module can include an energy source, switch circuitry and a local control device. The energy control system can include a master control device configured to send, over a communication path, control information to each local control device. The control information can include reference signal information, modulated index information, and an identifier that associates the modulation index information with one module of the modules.

In many embodiments, the modules are arranged in a cascaded array.

In many embodiments, the control information can include control information data elements. Each control information data element can include the reference signal information for all modules in the set of modules, modulated index information for the one module, and the identifier. The local control device of each module can be configured to scale the reference signal information of a most recently received control information data element by the modulation index information of a most recently received control information data element that has the identifier of the module to generate a scaled reference signal. The local control device of each module can be configured to control the switch circuitry of the module using the scaled reference signal.

In many embodiments, the master control device periodically sends the control information to the local control devices according to a sequence that defines an order of modules for which updated modulation index information is sent to the modules.

In many embodiments, the local control device of each module is configured to determine whether the identifier matches an identifier of the module. When the identifier matches the identifier of the module, the local control device of the module can scale the reference signal information using the modulation index information. When the identifier does not match the identifier of the module, the local control device of the module can scale the reference signal information using previously stored modulation information for the module.

In many embodiments, the master control device includes a controller that is configured to generate respective modulation index information for the modules.

In many embodiments, a method of controlling a voltage or current supplied to a load includes sending, by a master control device and over a communication path, control information to each local control device of a multiple modules configured to be connected together to output a voltage waveform and/or a current waveform to a load. Each module of the multiple modules can include an energy source, switch circuitry and the local control device. The control information can include reference signal information, modulated index information, and an identifier that associates the modulation index information with one module of the multiple modules.

In many embodiments, the multiple modules are arranged in a cascaded array.

In many embodiments, the control information includes control information data elements. Each control information data element can include the reference signal information for all modules in the set of modules, modulated index information for the one module, and the identifier. The method can include scaling, by each local control device, the reference signal information of a most recently received control information data element by the modulation index information of a most recently received control information data element that has the identifier of the module to generate a scaled reference signal and controlling, by each local control device, the switch circuitry of the module using the scaled reference signal.

In many embodiments, the master control device periodically sends the control information to the local control devices according to a sequence that defines an order of modules for which updated modulation index information is sent to the modules.

In many embodiments, the method includes determining, by each local control device, whether the identifier matches an identifier of the module. The method can include, when the identifier matches the identifier of the module, scaling, by the local control device, the reference signal information using the modulation index information. The method can include, when the identifier does not match the identifier of the module, scaling, by the local control device, the reference signal information using previously stored modulation information for the module.

In many embodiments, the master control device includes a controller that is configured to generate respective modulation index information for the modules.

In many embodiments, a method of synchronizing modules of an energy system includes generating, by a master control device communicably coupled to a local control device of each module, a synchronization signal. The master control device sends the synchronization signal to the local control device of each local control device. The master control device adjusts the synchronization signal to initiate a synchronization event. The adjusting includes adjusting at least one of a duty cycle or a frequency of the synchronization signal. Each local control device detects the synchronization event based on the adjusted synchronization signal. Each local control device performs a synchronization action in response to detecting the synchronization event.

In many embodiments, performing the synchronization action includes resetting a pulse width modulation (PWM) controller of the module. The PWM controller is configured to generate PWM switching signals for a converter of the module.

In many embodiments, resetting the PWM controller includes resetting a PWM counter of the PWM controller.

In many embodiments, the PWM controller includes a carrier generator that generates carrier signals for use in generating the PWM switching signals based on the PWM counter.

In many embodiments, generating the synchronization signal includes generating a regular synchronization signal having a regular frequency and amplitude.

In many embodiments, the methods include detecting a data capture event based on the regular synchronization signal.

In many embodiments, the methods include capturing data from a path or link that communicably couples the master control device to the local control device in response to detecting the data capture event.

In many embodiments, detecting the synchronization event includes applying the synchronization signal to a capacitor, comparing a voltage of the capacitor to a threshold voltage level, and detecting the synchronization event when the voltage of the capacitor is greater than or equal to the threshold voltage level.

In many embodiments, adjusting the synchronization signal includes reducing a frequency of the synchronization signal.

In many embodiments, a method of synchronizing modules of an energy system includes detecting, by a local control device, a data absence event on a communication path that communicably couples a master control device to a local control device. In response to detecting the data absence event, a synchronization action is performed.

In many embodiments, performing the synchronization action includes resetting a pulse width modulation (PWM) controller of the module. The PWM controller can be configured to generate PWM switching signals for a converter of the module.

In many embodiments, resetting the PWM controller includes resetting a PWM counter of the PWM controller.

In many embodiments, the PWM controller includes a carrier generator that generates carrier signals for use in generating the PWM switching signals based on the PWM counter.

In many embodiments, detecting the data absence event includes detecting a first data unit on the communication path following at least a threshold duration of time since a previous data element was received and initiating a timer in response to detecting the first data unit. Whenever the timer elapses before a new data unit is detected on the communication path, the data absence event is detected.

In many embodiments, the methods include resetting the timer each time a new data unit is detected on the communication path prior to the timer elapsing.

In many embodiments, an energy system includes an array of cascaded modules configured to output a voltage waveform and/or a current waveform to a load. Each module includes an energy source, switch circuitry, and a local control device. Each module has an identifier. The energy system includes a master control device communicably coupled to each local control device over a communication path. The master control device is configured to: send, over the communication path, control information data elements and a synchronization signal to the local control devices, and adjust the synchronization signal to initiate synchronization events at each local control device.

In many embodiments, the master control device is configured to adjust the synchronizations signal by adjusting at least one of a duty cycle or a frequency of the synchronization signal.

In many embodiments, the local control device of each module is configured to detect the synchronization event based on the adjusted synchronization signal and perform a synchronization action in response to detecting the synchronization event.

In many embodiments, the local control device of each module includes a PWM controller configured to generate PWM switching signals for the switch circuitry of the module. The local control device of each module is configured to perform the synchronization action by resetting the PWM controller of the local control device.

In many embodiments, resetting the PWM controller includes resetting a PWM counter of the PWM controller.

In many embodiments, the PWM controller of each local control device includes a carrier generator that generates carrier signals for use in generating the PWM switching signals based on the PWM counter.

In many embodiments, each local control device includes a synchronization unit configured to receive the synchronization signal and detect synchronization events based on the adjusted synchronization signal.

In many embodiments, the synchronization unit is configured to detect the synchronization events based on a voltage level of a capacitor coupled to the synchronization unit.

In many embodiments, the master control device is configured to adjust at least one of a duty cycle or a frequency of the synchronization signal for one or more periods of the synchronization signal to increase a charge level of the capacitor.

In many embodiments, the synchronization unit is configured to detect the synchronization event in response the voltage level of the capacitor meeting or exceeding a threshold voltage level.

In many embodiments, the synchronization unit includes a comparator configured to compare the voltage level of the capacitor to the threshold voltage level.

In many embodiments, an energy system includes a plurality of modules. Each module has an energy source and a converter. The plurality of modules are configured to receive a synchronization signal and generate synchronized output signals. The system is configured to generate an AC signal based on a superposition of output signals from each module. The plurality of modules are configured to synchronize their output signals based on a change in frequency in the synchronization signal.

In many embodiments, the plurality of modules are configured to perform pulse width modulation to generate the output signals. The synchronization of the pulse width modulation is based on the change in frequency in the synchronization signal.

In many embodiments, the plurality of modules are configured to perform pulse width modulation with carrier signals having different phases and modulated reference signals. Generation of the carrier signals is synchronized between the plurality of modules based on the change in frequency in the synchronization signal.

In many embodiments, the plurality of modules are configured to determine when to perform data capture events based on the change in frequency in the synchronization signal.

In many embodiments, a method of synchronizing modules of an energy system includes receiving, by each module of a plurality of modules, a synchronization signal, generating, by each module of the plurality of modules, synchronized output signals for generating an AC signal based on a superposition of output signals from each module, and synchronizing, by the plurality of modules, the output signals of the plurality of modules based on a change in frequency in the synchronization signal.

In many embodiments, generating the synchronized output signals includes performing pulse width modulation. Synchronization of the pulse width modulation is based on the change in frequency in the synchronization signal.

In many embodiments, generating the synchronized output signals includes performing pulse width modulation with carrier signals having different phases and modulated reference signals. Generation of the carrier signals is synchronized between the plurality of modules based on the change in frequency in the synchronization signal.

In many embodiments, the methods include determining, by the plurality of modules, when to perform data capture events based on the change in frequency in the synchronization signal.

The term "module" as used herein refers to one of two or more devices or subsystems within a larger system. The module can be configured to work in conjunction with other modules of similar size, function, and physical arrangement (e.g., location of electrical terminals, connectors, etc.). Modules having the same function and energy source(s) can be configured identical (e.g., size and physical arrangement) to all other modules within the same system (e.g., rack or pack), while modules having different functions or energy source(s) may vary in size and physical arrangement. While each module may be physically removable and replaceable with respect to the other modules of the system (e.g., like wheels on a car, or blades in an information technology (IT) blade server), such is not required. For example, a system may be packaged in a common housing that does not permit removal and replacement any one module, without disassembly of the system as a whole. However, any and all embodiments herein can be configured such that each module is removable and replaceable with respect to the other modules in a convenient fashion, such as without disassembly of the system.

The term "master control device" is used herein in a broad sense and does not require implementation of any specific protocol such as a master and slave relationship with any other device, such as the local control device.

The term "output" is used herein in a broad sense, and does not preclude functioning in a bidirectional manner as both an output and an input. Similarly, the term "input" is used herein in a broad sense, and does not preclude functioning in a bidirectional manner as both an input and an output.

The terms "terminal" and "port" are used herein in a broad sense, can be either unidirectional or bidirectional, can be an input or an output, and do not require a specific physical or mechanical structure, such as a female or male configuration.

Various aspects of the present subject matter are set forth below, in review of, and/or in supplementation to, the embodiments described thus far, with the emphasis here being on the interrelation and interchangeability of the following embodiments. In other words, an emphasis is on the fact that each feature of the embodiments can be combined with each and every other feature unless explicitly stated otherwise or logically implausible.

Processing circuitry can include one or more processors, microprocessors, controllers, and/or microcontrollers, each of which can be a discrete or stand-alone chip or distributed amongst (and a portion of) a number of different chips. Any type of processing circuitry can be implemented, such as, but not limited to, personal computing architectures (e.g., such as used in desktop PC's, laptops, tablets, etc.), programmable gate array architectures, proprietary architectures, custom architectures, and others. Processing circuitry can include a digital signal processor, which can be implemented in hardware and/or software. Processing circuitry can execute software instructions stored on memory that cause processing circuitry to take a host of different actions and control other components.

Processing circuitry can also perform other software and/or hardware routines. For example, processing circuitry can interface with communication circuitry and perform analog-to-digital conversions, encoding and decoding, other digital signal processing, multimedia functions, conversion of data into a format (e.g., in-phase and quadrature) suitable for provision to communication circuitry, and/or can cause communication circuitry to transmit the data (wired or wirelessly).

Processing circuitry can also be adapted to execute the operating system and any software applications, and perform those other functions not related to the processing of communications transmitted and received.

Computer program instructions for carrying out operations in accordance with the described subject matter may be written in any combination of one or more programming languages, including an object oriented programming language such as Java, JavaScript, Smalltalk, C++, C #, Transact-SQL, XML, PHP or the like and conventional procedural programming languages, such as the "C" programming language or similar programming languages.

Memory, storage, and/or computer readable media can be shared by one or more of the various functional units present, or can be distributed amongst two or more of them (e.g., as separate memories present within different chips). Memory can also reside in a separate chip of its own.

To the extent the embodiments disclosed herein include or operate in association with memory, storage, and/or computer readable media, then that memory, storage, and/or computer readable media are non-transitory. Accordingly, to the extent that memory, storage, and/or computer readable media are covered by one or more claims, then that memory, storage, and/or computer readable media is only non-transitory. The terms "non-transitory" and "tangible" as used herein, are intended to describe memory, storage, and/or computer readable media excluding propagating electromagnetic signals, but are not intended to limit the type of memory, storage, and/or computer readable media in terms of the persistency of storage or otherwise. For example, "non-transitory" and/or "tangible" memory, storage, and/or computer readable media encompasses volatile and non-volatile media such as random access media (e.g., RAM, SRAM, DRAM, FRAM, etc.), read-only media (e.g., ROM, PROM, EPROM, EEPROM, flash, etc.) and combinations thereof (e.g., hybrid RAM and ROM, NVRAM, etc.) and variants thereof.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

As used herein and in the appended claims, the singular forms "a," "an," and "the" include plural referents unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

The invention claimed is:

1. An energy system, comprising:

an array of cascaded modules configured to output a voltage waveform and/or a current waveform to a load, each module comprising an energy source, switch circuitry, and a local control device, and each module having an identifier; and a master control device communicably coupled to each local control device over a communication path and configured to send, over the communication path, control information data elements to the local control devices, wherein each control information data element comprises:

a normalized reference signal for each module of the array of cascaded modules;

a single identifier selected from a set of identifiers comprising the identifier for each module in the array of cascaded modules; and a modulation index for the module having the single identifier; and wherein the local control device of each module is configured to:

scale the normalized reference signal of a most recently received control information data element by the modulation index of a most recently received control information data element that has the identifier of the module to generate a scaled reference signal; and control the switch circuitry of the module using the scaled reference signal.

2. The energy system of claim 1, wherein the master control device periodically sends the control information data elements to the local control devices according to a sequence that defines an order of modules for which an updated modulation index is sent to the modules using the control information data elements.

3. The energy system of claim 1, wherein the local control device of each module is configured to:

determine whether the selected single identifier of each control information data element matches the identifier of the module;

when the selected single identifier of a control information data element matches the identifier of the module, the local control device of the module scales the normalized reference signal of the control information data element using the modulation index of the control information data element; and when the selected single identifier of the control information data element does not match the identifier of the module, the local control device of the module scales the normalized reference signal of the control information data element using the modulation index of a most recently received control information data element that had the identifier of the module.

4. The energy system of claim 1, wherein the master control device comprises a controller that is configured to generate respective modulation indexes for the modules.

5. The energy system of claim 1, wherein the modulation index for at least one module in the array of cascaded modules is different from the modulation index for at least one other module in the array of cascaded modules.

6. The energy system of claim 5, further comprising a bidirectional data path that communicably couples each local control device to the master control device, wherein each local control device is configured to send, to the master control device over the bidirectional data path, status information for the module that includes the local control device.

7. The energy system of claim 6, wherein the controller generates the modulation index for each module using the status information received from each local control device.

8. The energy system of claim 6, wherein the status information for each module comprises one or more of: (i) a state of charge of the energy source of the module, (ii) a state of health of the energy source of the module, or (iii) a temperature of the energy source of the module.

9. An energy system, comprising:

an array of cascaded modules configured to output a voltage waveform and/or a current waveform to a load, each module comprising an energy source, switch circuitry, and a local control device that controls the switch circuitry based at least in part on received normalized reference signals; and a master control device communicably coupled to each local control device over a control path and a synchronization path and that:

sends, over the control path, control information data elements to the local control devices, wherein each control information data element comprises:

a normalized reference signal for each module of the cascaded modules, and a modulation index for scaling the normalized reference signal, and sends, over the synchronization path, a synchronization signal to the local control devices, wherein the synchronization signal indicates when a control information data element is being sent to the local control devices, wherein the local control device of each module is configured to detect the synchronization signal and capture the control information data element in response to detecting the synchronization signal.

10. An energy system, comprising:

an array of cascaded modules configured to output a voltage waveform and/or a current waveform to a load, each module comprising an energy source, switch circuitry, and a local control device that controls the switch circuitry based at least in part on received normalized reference signals; and a master control device communicably coupled to each local control device over a control path and a synchronization path and that:

sends, over the control path, control information data elements to the local control devices, wherein each control information data element comprises:

a normalized reference signal for each module of the cascaded modules, and a modulation index for scaling the normalized reference signal, and sends, over the synchronization path, a synchronization signal to the local control devices, wherein the synchronization signal indicates when a control information data element is being sent to the local control devices, wherein the master control device is configured to remove the synchronization signal after transmission of a control information data element is complete.

11. An energy system, comprising:

an array of cascaded modules configured to output a voltage waveform and/or a current waveform to a load, each module comprising an energy source, switch circuitry, and a local control device that controls the switch circuitry based at least in part on received normalized reference signals; and a master control device communicably coupled to each local control device over a control path and a synchronization path and that:

sends, over the control path, control information data elements to the local control devices, wherein each control information data element comprises:

a normalized reference signal for each module of the cascaded modules, and a modulation index for scaling the normalized reference signal, and sends, over the synchronization path, a synchronization signal to the local control devices, wherein the synchronization signal indicates when a control information data element is being sent to the local control devices, wherein each local control device is configured to wake the module that includes the local control device from a sleep mode in response to detecting the synchronization signal.

12. An energy system, comprising:

an array of cascaded modules configured to output a voltage waveform and/or a current waveform to a load, each module comprising an energy source, switch circuitry, and a local control device that controls the switch circuitry based at least in part on received normalized reference signals; and a master control device communicably coupled to each local control device over a control path and a synchronization path and that:

sends, over the control path, control information data elements to the local control devices, wherein each control information data element comprises:

a normalized reference signal for each module of the cascaded modules, and a modulation index for scaling the normalized reference signal, and sends, over the synchronization path, a synchronization signal to the local control devices, wherein the synchronization signal indicates when a control information data element is being sent to the local control devices, wherein the master control device is configured to send the synchronization signal in response to a determination to wake the modules of the array of cascaded modules.

13. A method, comprising:

outputting, using an array of cascaded modules and to a load, a voltage waveform and/or a current waveform, each cascaded module comprising an energy source, switch circuitry, and a local control device, and each module having an identifier;

sending, using a master control device communicably coupled to each local control device and over a communication path to the local control devices, control information data elements, wherein each control information data element comprises:

a normalized reference signal for each module of the array of cascaded modules;

a single identifier selected from a set of identifiers comprising the identifier for each module in the array of cascaded modules; and a modulation index for the module having the single identifier;

scaling, using the local control device of each module, the normalized reference signal of a most recently received control information data element by the modulation index of a most recently received control information data element that has the identifier of the module to generate a scaled reference signal; and controlling, using the local control device of each module and using the scaled reference signal, the switch circuitry of the module.

14. The method of claim 13, further comprising:

periodically sending, using the master control device and to the local control devices, the control information data elements according to a sequence that defines an order of modules for which an updated modulation index is sent to the modules using the control information data elements.

15. The method of claim 13, further comprising, by the local control device of each cascaded module:

determining whether the selected single identifier of each control information data element matches the identifier of the cascaded module; and when the selected single identifier of a control information data element matches the identifier of the module, scaling the normalized reference signal of the control information data element using the modulation index of the control information data element.

16. The method of claim 13, further comprising, by the local control device of each cascaded module:

determining whether the selected single identifier of each control information data element matches the identifier of the cascaded module;

when the selected single identifier of the control information data element does not match the identifier of the cascaded module, scaling the normalized reference signal of the control information data element using the modulation index of a most recently received control information data element that had the identifier of the module.

17. The method of claim 13, wherein the modulation index for at least one cascaded module in the array of cascaded modules is different from the modulation index for at least one other cascaded module in the array of cascaded modules.

18. The method of claim 17, wherein each local control device is configured to send, to the master control device over a bidirectional data path that communicably couples each local control device to the master control device, status information for the cascaded module that includes the local control device.

19. The method of claim 18, wherein the controller generates the modulation index for each cascaded module using the status information received from each local control device.

* * * * *